(12) United States Patent
Gruber et al.

(10) Patent No.: US 12,556,890 B2
(45) Date of Patent: Feb. 17, 2026

(54) ACTIVE TRANSPORT BASED NOTIFICATIONS

(71) Applicant: Apple Inc., Cupertino, CA (US)

(72) Inventors: Thomas Robert Gruber, Santa Cruz, CA (US); Alessandro F. Sabatelli, San Francisco, CA (US); Alexandre A. Aybes, San Francisco, CA (US); Donald W. Pitschel, San Francisco, CA (US); Edward D. Voas, Mountain View, CA (US); Freddy A. Anzures, San Francisco, CA (US); Paul D. Marcos, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 251 days.

(21) Appl. No.: 17/736,818

(22) Filed: May 4, 2022

(65) Prior Publication Data

US 2022/0264262 A1 Aug. 18, 2022

Related U.S. Application Data

(63) Continuation of application No. 16/036,730, filed on Jul. 16, 2018, now Pat. No. 11,350,253, which is a
(Continued)

(51) Int. Cl.
*H04W 4/16* (2009.01)
*G06F 16/242* (2019.01)
(Continued)

(52) U.S. Cl.
CPC ............ *H04W 4/16* (2013.01); *G06F 16/243* (2019.01); *G06F 40/00* (2020.01); *G06F 40/20* (2020.01);
(Continued)

(58) Field of Classification Search
CPC ....... H04W 4/16; H04W 4/029; G06F 16/243; G06F 40/00; G06F 40/56; G06F 40/20; G06Q 10/109; H04M 2242/12
See application file for complete search history.

(56) References Cited

U.S. PATENT DOCUMENTS 5,530,861 A 6/1996 Diamant et al.
5,546,538 A 8/1996 William et al.
(Continued)

FOREIGN PATENT DOCUMENTS

AU 2001261958 A1 2/2002
AU 2014100581 B4 9/2014
(Continued)

OTHER PUBLICATIONS

B. N. Schilit, D. M. Hilbert and J. Trevor, "Context-aware communication," in IEEE Wireless Communications, vol. 9, No. 5, pp. 46-54, Oct. 2002, doi: 10.1109/MWC.2002.1043853. (Year: 2002).*
(Continued)

*Primary Examiner* — Jerry O'Connor
*Assistant Examiner* — Ayanna Minor
(74) *Attorney, Agent, or Firm* — YHE Law LLP

(57) ABSTRACT

Techniques for triggering an action associated with a task items are provided. A task item associated with a triggering criterion is provided. The triggering criterion requires an occurrence of any of a plurality of communication events. The plurality of communication events includes a telephone call. In some implementations, at least two of the plurality of communication events are of different communication types. In some implementations, the different types are telephone calls, emails, and text messages. The occurrence of a first communication event of the plurality of communication events is detected. It is determined the triggering criterion is satisfied. In response to the determining, a
(Continued)

notification associated with the task item is caused to be presented to a user of the electronic device.

27 Claims, 27 Drawing Sheets

Related U.S. Application Data continuation of application No. 13/729,597, filed on Dec. 28, 2012, now Pat. No. 10,057,736, which is a continuation-in-part of application No. 13/251,118, filed on Sep. 30, 2011, now Pat. No. 10,706,373.

(60) Provisional application No. 61/493,201, filed on Jun. 3, 2011.

(51) Int. Cl.
*G06F 40/00* (2020.01)
*G06F 40/20* (2020.01)
*G06F 40/56* (2020.01)
*G06Q 10/109* (2023.01)
*H04W 4/029* (2018.01)

(52) U.S. Cl.
CPC ........... *G06F 40/56* (2020.01); *G06Q 10/109* (2013.01); *H04W 4/029* (2018.02); *H04M 2242/12* (2013.01)

(56) References Cited

U.S. PATENT DOCUMENTS

| | | | |
|---|---|---|---|
| 6,081,786 A | 6/2000 | Barry et al. |
| 6,177,905 B1 | 1/2001 | Welch |
| 6,526,351 B2 | 2/2003 | Whitham |
| 6,680,675 B1 | 1/2004 | Suzuki |
| 6,795,710 B1 | 9/2004 | Creemer |
| 6,957,076 B2 | 10/2005 | Hunzinger |
| 7,084,758 B1 | 8/2006 | Cole |
| 7,248,900 B2 | 7/2007 | Deeds |
| 7,302,686 B2 | 11/2007 | Togawa |
| 7,362,738 B2 | 4/2008 | Taube et al. |
| 7,398,209 B2 | 7/2008 | Kennewick et al. |
| 7,461,043 B2 | 12/2008 | Hess |
| 7,528,713 B2 | 5/2009 | Singh et al. |
| 7,541,940 B2 | 6/2009 | Upton |
| 7,561,069 B2 | 7/2009 | Horstemeyer |
| 7,577,522 B2 | 8/2009 | Rosenberg |
| 7,603,381 B2 | 10/2009 | Burke et al. |
| 7,649,454 B2 | 1/2010 | Singh et al. |
| 7,813,729 B2 | 10/2010 | Lee et al. |
| 7,818,291 B2 | 10/2010 | Ferguson et al. |
| 7,881,283 B2 | 2/2011 | Cormier et al. |
| 7,885,844 B1 | 2/2011 | Cohen et al. |
| 7,920,857 B2 | 4/2011 | Lau et al. |
| 7,930,197 B2 | 4/2011 | Ozzie et al. |
| 7,999,669 B2 | 8/2011 | Singh et al. |
| 8,015,144 B2 | 9/2011 | Zheng et al. |
| 8,060,824 B2 | 11/2011 | Brownrigg, Jr. et al. |
| 8,068,604 B2 | 11/2011 | Leeds et al. |
| 8,069,422 B2 | 11/2011 | Sheshagiri et al. |
| 8,090,571 B2 | 1/2012 | Elshishiny et al. |
| 8,095,364 B2 | 1/2012 | Longe et al. |
| 8,099,289 B2 | 1/2012 | Mozer et al. |
| 8,099,395 B2 | 1/2012 | Pabla et al. |
| 8,099,418 B2 | 1/2012 | Inoue et al. |
| 8,103,510 B2 | 1/2012 | Sato |
| 8,103,947 B2 | 1/2012 | Lunt et al. |
| 8,107,401 B2 | 1/2012 | John et al. |
| 8,112,275 B2 | 2/2012 | Kennewick et al. |
| 8,112,280 B2 | 2/2012 | Lu |
| 8,115,772 B2 | 2/2012 | Ostermann et al. |
| 8,117,026 B2 | 2/2012 | Lee et al. |
| 8,117,037 B2 | 2/2012 | Gazdzinski |
| 8,117,542 B2 | 2/2012 | Radtke et al. |
| 8,121,413 B2 | 2/2012 | Hwang et al. |
| 8,121,837 B2 | 2/2012 | Agapi et al. |
| 8,122,094 B1 | 2/2012 | Kotab |
| 8,122,353 B2 | 2/2012 | Bouta |
| 8,130,929 B2 | 3/2012 | Wilkes et al. |
| 8,131,557 B2 | 3/2012 | Davis et al. |
| 8,135,115 B1 | 3/2012 | Hogg, Jr. et al. |
| 8,138,912 B2 | 3/2012 | Singh et al. |
| 8,140,330 B2 | 3/2012 | Cevik et al. |
| 8,140,335 B2 | 3/2012 | Kennewick et al. |
| 8,140,368 B2 | 3/2012 | Eggenberger et al. |
| 8,140,567 B2 | 3/2012 | Padovitz et al. |
| 8,145,489 B2 | 3/2012 | Freeman et al. |
| 8,150,694 B2 | 4/2012 | Kennewick et al. |
| 8,150,700 B2 | 4/2012 | Shin et al. |
| 8,155,956 B2 | 4/2012 | Cho et al. |
| 8,156,005 B2 | 4/2012 | Vieri |
| 8,156,060 B2 | 4/2012 | Borzestowski et al. |
| 8,160,877 B1 | 4/2012 | Nucci et al. |
| 8,160,883 B2 | 4/2012 | Lecoeuche |
| 8,165,321 B2 | 4/2012 | Paquier et al. |
| 8,165,886 B1 | 4/2012 | Gagnon et al. |
| 8,166,019 B1 | 4/2012 | Lee et al. |
| 8,166,032 B2 | 4/2012 | Sommer et al. |
| 8,170,790 B2 | 5/2012 | Lee et al. |
| 8,170,966 B1 | 5/2012 | Musat et al. |
| 8,171,137 B1 | 5/2012 | Parks et al. |
| 8,175,872 B2 | 5/2012 | Kristjansson et al. |
| 8,175,876 B2 | 5/2012 | Bou-Ghazale et al. |
| 8,179,370 B1 | 5/2012 | Yamasani et al. |
| 8,188,856 B2 | 5/2012 | Singh et al. |
| 8,190,359 B2 | 5/2012 | Bourne |
| 8,190,596 B2 | 5/2012 | Nambiar et al. |
| 8,194,827 B2 | 6/2012 | Jaiswal et al. |
| 8,195,467 B2 | 6/2012 | Mozer et al. |
| 8,195,468 B2 | 6/2012 | Weider et al. |
| 8,200,489 B1 | 6/2012 | Baggenstoss |
| 8,200,495 B2 | 6/2012 | Braho et al. |
| 8,201,109 B2 | 6/2012 | Van Os et al. |
| 8,204,238 B2 | 6/2012 | Mozer |
| 8,205,788 B1 | 6/2012 | Gazdzinski et al. |
| 8,209,177 B2 | 6/2012 | Sakuma et al. |
| 8,209,183 B1 | 6/2012 | Patel et al. |
| 8,213,911 B2 | 7/2012 | Williams et al. |
| 8,219,115 B1 | 7/2012 | Nelissen |
| 8,219,406 B2 | 7/2012 | Yu et al. |
| 8,219,407 B1 | 7/2012 | Roy et al. |
| 8,219,555 B1 | 7/2012 | Mianji |
| 8,219,608 B2 | 7/2012 | Alsafadi et al. |
| 8,224,649 B2 | 7/2012 | Chaudhari et al. |
| 8,224,757 B2 | 7/2012 | Bohle |
| 8,228,299 B1 | 7/2012 | Maloney et al. |
| 8,233,919 B2 | 7/2012 | Haag et al. |
| 8,234,111 B2 | 7/2012 | Lloyd et al. |
| 8,239,206 B1 | 8/2012 | Lebeau et al. |
| 8,239,207 B2 | 8/2012 | Seligman et al. |
| 8,244,545 B2 | 8/2012 | Paek et al. |
| 8,244,712 B2 | 8/2012 | Serlet et al. |
| 8,250,071 B1 | 8/2012 | Killalea et al. |
| 8,254,829 B1 | 8/2012 | Kindred et al. |
| 8,255,216 B2 | 8/2012 | White |
| 8,255,217 B2 | 8/2012 | Stent et al. |
| 8,260,117 B1 | 9/2012 | Xu et al. |
| 8,260,247 B2 | 9/2012 | Lazaridis et al. |
| 8,260,617 B2 | 9/2012 | Dhanakshirur et al. |
| 8,260,619 B1 | 9/2012 | Bansal et al. |
| 8,270,933 B2 | 9/2012 | Riemer et al. |
| 8,271,287 B1 | 9/2012 | Kermani |
| 8,275,621 B2 | 9/2012 | Alewine et al. |
| 8,275,736 B2 | 9/2012 | Guo et al. |
| 8,279,171 B2 | 10/2012 | Hirai et al. |
| 8,280,438 B2 | 10/2012 | Barbera |
| 8,285,546 B2 | 10/2012 | Reich |
| 8,285,551 B2 | 10/2012 | Gazdzinski |
| 8,285,553 B2 | 10/2012 | Gazdzinski |
| 8,285,737 B1 | 10/2012 | Lynn et al. |
| 8,290,274 B2 | 10/2012 | Mori et al. |
| 8,290,777 B1 | 10/2012 | Nguyen et al. |

(56) References Cited

U.S. PATENT DOCUMENTS

| | | | |
|---|---|---|---|
| 8,290,778 B2 | 10/2012 | Gazdzinski |
| 8,290,781 B2 | 10/2012 | Gazdzinski |
| 8,296,124 B1 | 10/2012 | Holsztynska et al. |
| 8,296,145 B2 | 10/2012 | Clark et al. |
| 8,296,146 B2 | 10/2012 | Gazdzinski |
| 8,296,153 B2 | 10/2012 | Gazdzinski |
| 8,296,380 B1 | 10/2012 | Kelly et al. |
| 8,296,383 B2 | 10/2012 | Lindahl |
| 8,300,776 B2 | 10/2012 | Davies et al. |
| 8,300,801 B2 | 10/2012 | Sweeney et al. |
| 8,301,456 B2 | 10/2012 | Gazdzinski |
| 8,311,189 B2 | 11/2012 | Champlin et al. |
| 8,311,834 B1 | 11/2012 | Gazdzinski |
| 8,311,835 B2 | 11/2012 | Lecoeuche |
| 8,311,838 B2 | 11/2012 | Lindahl et al. |
| 8,312,017 B2 | 11/2012 | Martin et al. |
| 8,321,786 B2 | 11/2012 | Lunati |
| 8,326,627 B2 | 12/2012 | Kennewick et al. |
| 8,332,205 B2 | 12/2012 | Krishnan et al. |
| 8,332,218 B2 | 12/2012 | Cross et al. |
| 8,332,224 B2 | 12/2012 | Di Cristo et al. |
| 8,332,748 B1 | 12/2012 | Karam |
| 8,335,689 B2 | 12/2012 | Wittenstein et al. |
| 8,340,975 B1 | 12/2012 | Rosenberger |
| 8,345,665 B2 | 1/2013 | Vieri et al. |
| 8,346,563 B1 | 1/2013 | Hjelm et al. |
| 8,346,757 B1 | 1/2013 | Lamping et al. |
| 8,352,183 B2 | 1/2013 | Thota et al. |
| 8,352,268 B2 | 1/2013 | Naik et al. |
| 8,352,272 B2 | 1/2013 | Rogers et al. |
| 8,355,919 B2 | 1/2013 | Silverman et al. |
| 8,359,234 B2 | 1/2013 | Vieri |
| 8,370,145 B2 | 2/2013 | Endo et al. |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,375,320 B2 | 2/2013 | Kotler et al. |
| 8,380,504 B1 | 2/2013 | Peden et al. |
| 8,380,507 B2 | 2/2013 | Herman et al. |
| 8,381,107 B2 | 2/2013 | Rottler et al. |
| 8,381,135 B2 | 2/2013 | Hotelling et al. |
| 8,386,485 B2 | 2/2013 | Kerschberg et al. |
| 8,386,926 B1 | 2/2013 | Matsuoka et al. |
| 8,391,844 B2 | 3/2013 | Novick et al. |
| 8,392,717 B2 | 3/2013 | Chai et al. |
| 8,396,295 B2 | 3/2013 | Gao et al. |
| 8,396,714 B2 | 3/2013 | Rogers et al. |
| 8,396,715 B2 | 3/2013 | Odell et al. |
| 8,401,163 B1 | 3/2013 | Kirchhoff et al. |
| 8,406,745 B1 | 3/2013 | Upadhyay et al. |
| 8,407,239 B2 | 3/2013 | Dean et al. |
| 8,423,288 B2 | 4/2013 | Stahl et al. |
| 8,428,758 B2 | 4/2013 | Naik et al. |
| 8,433,572 B2 | 4/2013 | Caskey et al. |
| 8,433,778 B1 | 4/2013 | Shreesha et al. |
| 8,434,133 B2 | 4/2013 | Kulkarni et al. |
| 8,442,821 B1 | 5/2013 | Vanhoucke |
| 8,447,612 B2 | 5/2013 | Gazdzinski |
| 8,452,597 B2 | 5/2013 | Bringert et al. |
| 8,452,602 B1 | 5/2013 | Bringert et al. |
| 8,453,058 B1 | 5/2013 | Coccaro et al. |
| 8,457,959 B2 | 6/2013 | Kaiser |
| 8,458,115 B2 | 6/2013 | Cai et al. |
| 8,458,278 B2 | 6/2013 | Christie et al. |
| 8,463,592 B2 | 6/2013 | Lu et al. |
| 8,464,150 B2 | 6/2013 | Davidson et al. |
| 8,473,289 B2 | 6/2013 | Jitkoff et al. |
| 8,473,485 B2 | 6/2013 | Wong et al. |
| 8,477,323 B2 | 7/2013 | Low et al. |
| 8,478,816 B2 | 7/2013 | Parks et al. |
| 8,479,122 B2 | 7/2013 | Hotelling et al. |
| 8,484,027 B1 | 7/2013 | Murphy |
| 8,489,599 B2 | 7/2013 | Bellotti |
| 8,498,670 B2 | 7/2013 | Cha et al. |
| 8,498,857 B2 | 7/2013 | Kopparapu et al. |
| 8,514,197 B2 | 8/2013 | Shahraray et al. |
| 8,515,736 B1 | 8/2013 | Duta |
| 8,515,750 B1 | 8/2013 | Lei et al. |
| 8,521,513 B2 | 8/2013 | Millett et al. |
| 8,521,526 B1 | 8/2013 | Lloyd et al. |
| 8,521,531 B1 | 8/2013 | Kim |
| 8,521,533 B1 | 8/2013 | Ostermann et al. |
| 8,527,276 B1 | 9/2013 | Senior et al. |
| 8,533,266 B2 | 9/2013 | Koulomzin et al. |
| 8,537,033 B2 | 9/2013 | Gueziec |
| 8,539,342 B1 | 9/2013 | Lewis |
| 8,543,375 B2 | 9/2013 | Hong |
| 8,543,397 B1 | 9/2013 | Nguyen |
| 8,543,398 B1 | 9/2013 | Strope et al. |
| 8,560,229 B1 | 10/2013 | Park et al. |
| 8,560,366 B2 | 10/2013 | Mikurak |
| 8,571,528 B1 | 10/2013 | Channakeshava |
| 8,571,851 B1 | 10/2013 | Tickner et al. |
| 8,576,067 B2 * | 11/2013 | Malkin ............... H04W 4/024 340/539.11 |
| 8,577,683 B2 | 11/2013 | Dewitt |
| 8,583,416 B2 | 11/2013 | Huang et al. |
| 8,583,511 B2 | 11/2013 | Hendrickson |
| 8,583,638 B2 | 11/2013 | Donelli |
| 8,589,156 B2 | 11/2013 | Burke et al. |
| 8,589,161 B2 | 11/2013 | Kennewick et al. |
| 8,589,374 B2 | 11/2013 | Chaudhari |
| 8,589,869 B2 | 11/2013 | Wolfram |
| 8,589,911 B1 | 11/2013 | Sharkey et al. |
| 8,595,004 B2 | 11/2013 | Koshinaka |
| 8,595,642 B1 | 11/2013 | Lagassey |
| 8,600,743 B2 | 12/2013 | Lindahl et al. |
| 8,600,746 B1 | 12/2013 | Lei et al. |
| 8,600,930 B2 | 12/2013 | Sata et al. |
| 8,606,090 B2 | 12/2013 | Eyer |
| 8,606,568 B1 | 12/2013 | Tickner et al. |
| 8,606,576 B1 | 12/2013 | Barr et al. |
| 8,606,577 B1 | 12/2013 | Stewart et al. |
| 8,615,221 B1 | 12/2013 | Cosenza et al. |
| 8,620,659 B2 | 12/2013 | Di Cristo et al. |
| 8,620,662 B2 | 12/2013 | Bellegarda |
| 8,626,681 B1 | 1/2014 | Jurca et al. |
| 8,630,841 B2 | 1/2014 | Van Caldwell et al. |
| 8,635,073 B2 | 1/2014 | Chang |
| 8,638,363 B2 | 1/2014 | King et al. |
| 8,639,516 B2 | 1/2014 | Lindahl et al. |
| 8,645,128 B1 | 2/2014 | Agiomyrgiannakis |
| 8,645,137 B2 | 2/2014 | Bellegarda et al. |
| 8,645,138 B1 | 2/2014 | Weinstein et al. |
| 8,654,936 B1 | 2/2014 | Eslambolchi et al. |
| 8,655,646 B2 | 2/2014 | Lee et al. |
| 8,655,901 B1 | 2/2014 | Li et al. |
| 8,660,843 B2 | 2/2014 | Falcon et al. |
| 8,660,849 B2 | 2/2014 | Gruber et al. |
| 8,660,924 B2 | 2/2014 | Hoch et al. |
| 8,660,970 B1 | 2/2014 | Fiedorowicz |
| 8,661,112 B2 | 2/2014 | Creamer et al. |
| 8,661,340 B2 | 2/2014 | Goldsmith et al. |
| 8,670,979 B2 | 3/2014 | Gruber et al. |
| 8,675,084 B2 | 3/2014 | Bolton et al. |
| 8,676,273 B1 | 3/2014 | Fujisaki |
| 8,676,583 B2 | 3/2014 | Gupta et al. |
| 8,676,904 B2 | 3/2014 | Lindahl |
| 8,677,377 B2 | 3/2014 | Cheyer et al. |
| 8,681,950 B2 | 3/2014 | Mack et al. |
| 8,682,667 B2 | 3/2014 | Haughay |
| 8,687,777 B1 | 4/2014 | Lavian et al. |
| 8,688,446 B2 | 4/2014 | Yanagihara |
| 8,688,453 B1 | 4/2014 | Joshi et al. |
| 8,689,135 B2 | 4/2014 | Portele et al. |
| 8,694,322 B2 | 4/2014 | Snitkovskiy et al. |
| 8,695,074 B2 | 4/2014 | Saraf et al. |
| 8,696,364 B2 | 4/2014 | Cohen |
| 8,706,472 B2 | 4/2014 | Ramerth et al. |
| 8,706,474 B2 | 4/2014 | Blume et al. |
| 8,706,503 B2 | 4/2014 | Cheyer et al. |
| 8,707,195 B2 | 4/2014 | Fleizach et al. |
| 8,712,778 B1 | 4/2014 | Thenthiruperai |
| 8,713,119 B2 | 4/2014 | Lindahl et al. |

(56) References Cited

U.S. PATENT DOCUMENTS

| | | |
|---|---|---|
| 8,713,418 B2 | 4/2014 | King et al. |
| 8,719,006 B2 | 5/2014 | Bellegarda |
| 8,719,014 B2 | 5/2014 | Wagner |
| 8,719,039 B1 | 5/2014 | Sharifi |
| 8,731,610 B2 | 5/2014 | Appaji |
| 8,731,912 B1 | 5/2014 | Tickner et al. |
| 8,731,942 B2 | 5/2014 | Cheyer et al. |
| 8,739,208 B2 | 5/2014 | Davis et al. |
| 8,744,852 B1 | 6/2014 | Seymour et al. |
| 8,751,971 B2 | 6/2014 | Fleizach et al. |
| 8,760,537 B2 | 6/2014 | Johnson et al. |
| 8,762,145 B2 | 6/2014 | Ouchi et al. |
| 8,762,156 B2 | 6/2014 | Chen |
| 8,762,469 B2 | 6/2014 | Lindahl |
| 8,768,693 B2 | 7/2014 | Somekh et al. |
| 8,768,702 B2 | 7/2014 | Mason et al. |
| 8,775,154 B2 | 7/2014 | Clinchant et al. |
| 8,775,177 B1 | 7/2014 | Heigold et al. |
| 8,775,341 B1 | 7/2014 | Commons |
| 8,775,931 B2 | 7/2014 | Fux et al. |
| 8,781,456 B2 | 7/2014 | Prociw |
| 8,781,841 B1 | 7/2014 | Wang |
| 8,793,301 B2 | 7/2014 | Wegenkittl et al. |
| 8,798,255 B2 | 8/2014 | Lubowich et al. |
| 8,798,995 B1 | 8/2014 | Edara |
| 8,799,000 B2 | 8/2014 | Guzzoni et al. |
| 8,805,684 B1 | 8/2014 | Aleksic et al. |
| 8,805,690 B1 | 8/2014 | Lebeau et al. |
| 8,812,299 B1 | 8/2014 | Su |
| 8,812,302 B2 | 8/2014 | Xiao et al. |
| 8,812,321 B2 | 8/2014 | Gilbert et al. |
| 8,823,507 B1 | 9/2014 | Touloumtzis |
| 8,823,793 B2 | 9/2014 | Clayton et al. |
| 8,825,474 B1 | 9/2014 | Zhai et al. |
| 8,831,947 B2 | 9/2014 | Wasserblat et al. |
| 8,831,949 B1 | 9/2014 | Smith et al. |
| 8,838,457 B2 | 9/2014 | Cerra et al. |
| 8,855,915 B2 | 10/2014 | Furuhata et al. |
| 8,861,925 B1 | 10/2014 | Ohme |
| 8,862,252 B2 | 10/2014 | Rottler et al. |
| 8,868,111 B1 | 10/2014 | Kahn et al. |
| 8,868,409 B1 | 10/2014 | Mengibar et al. |
| 8,868,431 B2 | 10/2014 | Yamazaki et al. |
| 8,868,469 B2 | 10/2014 | Xu et al. |
| 8,868,529 B2 | 10/2014 | Lerenc |
| 8,880,405 B2 | 11/2014 | Cerra et al. |
| 8,886,534 B2 | 11/2014 | Nakano et al. |
| 8,886,540 B2 | 11/2014 | Cerra et al. |
| 8,886,541 B2 | 11/2014 | Friedlander |
| 8,892,446 B2 | 11/2014 | Cheyer et al. |
| 8,893,023 B2 | 11/2014 | Perry et al. |
| 8,897,822 B2 | 11/2014 | Martin |
| 8,898,064 B1 | 11/2014 | Thomas et al. |
| 8,898,568 B2 | 11/2014 | Bull et al. |
| 8,903,716 B2 | 12/2014 | Chen et al. |
| 8,909,693 B2 | 12/2014 | Frissora et al. |
| 8,918,321 B2 | 12/2014 | Czahor |
| 8,922,485 B1 | 12/2014 | Lloyd |
| 8,930,176 B2 | 1/2015 | Li et al. |
| 8,930,191 B2 | 1/2015 | Gruber et al. |
| 8,938,394 B1 | 1/2015 | Faaborg et al. |
| 8,938,450 B2 | 1/2015 | Spivack et al. |
| 8,938,688 B2 | 1/2015 | Bradford et al. |
| 8,942,986 B2 | 1/2015 | Cheyer et al. |
| 8,943,423 B2 | 1/2015 | Merrill et al. |
| 8,964,947 B1 | 2/2015 | Noolu et al. |
| 8,965,770 B2 | 2/2015 | Petrushin |
| 8,972,240 B2 | 3/2015 | Brockett et al. |
| 8,972,432 B2 | 3/2015 | Shaw et al. |
| 8,972,878 B2 | 3/2015 | Mohler et al. |
| 8,976,063 B1 | 3/2015 | Hawkins et al. |
| 8,976,108 B2 | 3/2015 | Hawkins et al. |
| 8,977,255 B2 | 3/2015 | Freeman et al. |
| 8,983,383 B1 | 3/2015 | Haskin |
| 8,984,098 B1 | 3/2015 | Tomkins et al. |
| 8,989,713 B2 | 3/2015 | Doulton |
| 8,990,235 B2 | 3/2015 | King et al. |
| 8,994,660 B2 | 3/2015 | Neels et al. |
| 8,995,972 B1 | 3/2015 | Cronin |
| 8,996,350 B1 | 3/2015 | Dub et al. |
| 8,996,376 B2 | 3/2015 | Fleizach et al. |
| 8,996,381 B2 | 3/2015 | Mozer et al. |
| 8,996,639 B1 | 3/2015 | Faaborg et al. |
| 9,002,714 B2 | 4/2015 | Kim et al. |
| 9,009,046 B1 | 4/2015 | Stewart |
| 9,015,036 B2 | 4/2015 | Karov et al. |
| 9,020,804 B2 | 4/2015 | Barbaiani et al. |
| 9,026,425 B2 | 5/2015 | Nikoulina et al. |
| 9,026,426 B2 | 5/2015 | Wu et al. |
| 9,031,834 B2 | 5/2015 | Coorman et al. |
| 9,031,970 B1 | 5/2015 | Das et al. |
| 9,037,967 B1 | 5/2015 | Al-jefri et al. |
| 9,043,208 B2 | 5/2015 | Koch et al. |
| 9,043,211 B2 | 5/2015 | Haiut et al. |
| 9,046,932 B2 | 6/2015 | Medlock et al. |
| 9,049,255 B2 | 6/2015 | Macfarlane et al. |
| 9,049,295 B1 | 6/2015 | Cooper et al. |
| 9,053,706 B2 | 6/2015 | Jitkoff et al. |
| 9,058,105 B2 | 6/2015 | Drory et al. |
| 9,058,332 B1 | 6/2015 | Darby et al. |
| 9,058,811 B2 | 6/2015 | Wang et al. |
| 9,063,979 B2 | 6/2015 | Chiu et al. |
| 9,064,495 B1 | 6/2015 | Torok et al. |
| 9,065,660 B2 | 6/2015 | Ellis et al. |
| 9,070,247 B2 | 6/2015 | Kuhn et al. |
| 9,070,366 B1 | 6/2015 | Mathias et al. |
| 9,071,701 B2 | 6/2015 | Donaldson et al. |
| 9,075,435 B1 | 7/2015 | Noble et al. |
| 9,075,824 B2 | 7/2015 | Gordo et al. |
| 9,076,448 B2 | 7/2015 | Bennett et al. |
| 9,076,450 B1 | 7/2015 | Sadek et al. |
| 9,081,411 B2 | 7/2015 | Kalns et al. |
| 9,081,482 B1 | 7/2015 | Zhai et al. |
| 9,082,402 B2 | 7/2015 | Yadgar et al. |
| 9,083,581 B1 | 7/2015 | Addepalli et al. |
| 9,094,636 B1 | 7/2015 | Sanders et al. |
| 9,098,467 B1 | 8/2015 | Blanksteen et al. |
| 9,101,279 B2 | 8/2015 | Ritchey et al. |
| 9,112,984 B2 | 8/2015 | Sejnoha et al. |
| 9,117,212 B2 | 8/2015 | Sheets et al. |
| 9,117,447 B2 | 8/2015 | Gruber et al. |
| 9,123,338 B1 | 9/2015 | Sanders et al. |
| 9,143,907 B1 | 9/2015 | Caldwell et al. |
| 9,159,319 B1 | 10/2015 | Hoffmeister |
| 9,164,983 B2 | 10/2015 | Liu et al. |
| 9,171,541 B2 | 10/2015 | Kennewick et al. |
| 9,171,546 B1 | 10/2015 | Pike |
| 9,172,747 B2 | 10/2015 | Walters et al. |
| 9,183,845 B1 | 11/2015 | Gopalakrishnan et al. |
| 9,190,062 B2 | 11/2015 | Haughay |
| 9,202,520 B1 | 12/2015 | Tang |
| 9,208,153 B1 | 12/2015 | Zaveri et al. |
| 9,213,754 B1 | 12/2015 | Zhan et al. |
| 9,218,122 B2 | 12/2015 | Thoma et al. |
| 9,218,809 B2 | 12/2015 | Bellegarda et al. |
| 9,218,819 B1 | 12/2015 | Stekkelpak et al. |
| 9,223,537 B2 | 12/2015 | Brown et al. |
| 9,230,561 B2 | 1/2016 | Ostermann et al. |
| 9,232,293 B1 | 1/2016 | Hanson |
| 9,236,047 B2 | 1/2016 | Rasmussen |
| 9,241,073 B1 | 1/2016 | Rensburg et al. |
| 9,245,151 B2 | 1/2016 | LeBeau et al. |
| 9,250,703 B2 | 2/2016 | Hernandez-Abrego et al. |
| 9,251,713 B1 | 2/2016 | Giovanniello et al. |
| 9,251,787 B1 | 2/2016 | Hart et al. |
| 9,255,812 B2 | 2/2016 | Maeoka et al. |
| 9,257,120 B1 | 2/2016 | Alvarez et al. |
| 9,258,604 B1 | 2/2016 | Bilobrov et al. |
| 9,262,412 B2 | 2/2016 | Yang et al. |
| 9,262,612 B2 | 2/2016 | Cheyer |
| 9,263,058 B2 | 2/2016 | Huang et al. |
| 9,274,598 B2 | 3/2016 | Beymer et al. |
| 9,280,535 B2 | 3/2016 | Varma et al. |
| 9,282,211 B2 | 3/2016 | Osawa |

(56) References Cited

U.S. PATENT DOCUMENTS

| | | |
|---|---|---|
| 9,286,727 B2 | 3/2016 | Kim et al. |
| 9,286,910 B1 | 3/2016 | Li et al. |
| 9,292,487 B1 | 3/2016 | Weber |
| 9,292,489 B1 | 3/2016 | Sak et al. |
| 9,292,492 B2 | 3/2016 | Sarikaya et al. |
| 9,299,344 B2 | 3/2016 | Braho et al. |
| 9,300,718 B2 | 3/2016 | Khanna |
| 9,301,256 B2 | 3/2016 | Mohan et al. |
| 9,305,543 B2 | 4/2016 | Fleizach et al. |
| 9,305,548 B2 | 4/2016 | Kennewick et al. |
| 9,311,308 B2 | 4/2016 | Sankarasubramaniam et al. |
| 9,311,912 B1 | 4/2016 | Swietlinski et al. |
| 9,313,317 B1 | 4/2016 | Lebeau et al. |
| 9,318,108 B2 | 4/2016 | Gruber et al. |
| 9,325,809 B1 | 4/2016 | Barros et al. |
| 9,325,842 B1 | 4/2016 | Siddiqi et al. |
| 9,330,659 B2 | 5/2016 | Ju et al. |
| 9,330,668 B2 | 5/2016 | Nanavati et al. |
| 9,330,720 B2 | 5/2016 | Lee |
| 9,335,983 B2 | 5/2016 | Breiner et al. |
| 9,338,493 B2 | 5/2016 | Van Os et al. |
| 9,342,829 B2 | 5/2016 | Zhou et al. |
| 9,342,930 B1 | 5/2016 | Kraft et al. |
| 9,349,368 B1 | 5/2016 | Lebeau et al. |
| 9,355,472 B2 | 5/2016 | Kocienda et al. |
| 9,361,084 B1 | 6/2016 | Costa |
| 9,367,541 B1 | 6/2016 | Servan et al. |
| 9,368,114 B2 | 6/2016 | Larson et al. |
| 9,377,871 B2 | 6/2016 | Waddell et al. |
| 9,378,456 B2 | 6/2016 | White et al. |
| 9,378,740 B1 | 6/2016 | Rosen et al. |
| 9,380,155 B1 | 6/2016 | Reding et al. |
| 9,383,827 B1 | 7/2016 | Faaborg et al. |
| 9,384,185 B2 | 7/2016 | Medlock et al. |
| 9,390,726 B1 | 7/2016 | Smus et al. |
| 9,396,722 B2 | 7/2016 | Chung et al. |
| 9,401,140 B1 | 7/2016 | Weber et al. |
| 9,401,147 B2 | 7/2016 | Jitkoff et al. |
| 9,405,741 B1 | 8/2016 | Schaaf et al. |
| 9,406,224 B1 | 8/2016 | Sanders et al. |
| 9,406,299 B2 | 8/2016 | Gollan et al. |
| 9,408,182 B1 | 8/2016 | Hurley et al. |
| 9,412,392 B2 | 8/2016 | Lindahl |
| 9,418,650 B2 | 8/2016 | Bharadwaj et al. |
| 9,423,266 B2 | 8/2016 | Clark et al. |
| 9,424,246 B2 | 8/2016 | Spencer et al. |
| 9,424,840 B1 | 8/2016 | Hart et al. |
| 9,431,021 B1 | 8/2016 | Scalise et al. |
| 9,432,499 B2 | 8/2016 | Hajdu et al. |
| 9,436,918 B2 | 9/2016 | Pantel et al. |
| 9,437,186 B1 | 9/2016 | Liu et al. |
| 9,437,189 B2 | 9/2016 | Epstein et al. |
| 9,442,687 B2 | 9/2016 | Park et al. |
| 9,443,527 B1 | 9/2016 | Watanabe et al. |
| 9,454,599 B2 | 9/2016 | Golden et al. |
| 9,454,957 B1 | 9/2016 | Mathias et al. |
| 9,465,798 B2 | 10/2016 | Lin |
| 9,465,833 B2 | 10/2016 | Aravamudan et al. |
| 9,465,864 B2 | 10/2016 | Hu et al. |
| 9,466,027 B2 | 10/2016 | Byrne et al. |
| 9,466,294 B1 | 10/2016 | Tunstall-Pedoe et al. |
| 9,471,566 B1 | 10/2016 | Zhang et al. |
| 9,472,196 B1 | 10/2016 | Wang et al. |
| 9,483,388 B2 | 11/2016 | Sankaranarasimhan et al. |
| 9,483,461 B2 | 11/2016 | Fleizach et al. |
| 9,483,529 B1 | 11/2016 | Pasoi et al. |
| 9,484,021 B1 | 11/2016 | Mairesse et al. |
| 9,485,286 B1 | 11/2016 | Sellier et al. |
| 9,495,129 B2 | 11/2016 | Fleizach et al. |
| 9,501,741 B2 | 11/2016 | Cheyer et al. |
| 9,502,025 B2 | 11/2016 | Kennewick et al. |
| 9,508,028 B2 | 11/2016 | Bannister et al. |
| 9,510,044 B1 | 11/2016 | Pereira et al. |
| 9,514,470 B2 | 12/2016 | Topatan et al. |
| 9,516,014 B2 | 12/2016 | Zafiroglu et al. |
| 9,519,453 B2 | 12/2016 | Perkuhn et al. |
| 9,524,355 B2 | 12/2016 | Forbes et al. |
| 9,529,500 B1 | 12/2016 | Gauci et al. |
| 9,531,862 B1 | 12/2016 | Vadodaria |
| 9,535,906 B2 | 1/2017 | Lee et al. |
| 9,536,527 B1 | 1/2017 | Carlson |
| 9,536,544 B2 | 1/2017 | Osterman et al. |
| 9,547,647 B2 | 1/2017 | Badaskar |
| 9,548,050 B2 | 1/2017 | Gruber et al. |
| 9,548,979 B1 | 1/2017 | Johnson et al. |
| 9,569,549 B1 | 2/2017 | Jenkins et al. |
| 9,574,894 B1* | 2/2017 | Karakotsios .......... H04W 4/029 |
| 9,575,964 B2 | 2/2017 | Yadgar et al. |
| 9,576,575 B2 | 2/2017 | Heide |
| 9,578,173 B2 | 2/2017 | Sanghavi et al. |
| 9,602,946 B2 | 3/2017 | Karkkainen et al. |
| 9,607,612 B2 | 3/2017 | Deleeuw |
| 9,612,999 B2 | 4/2017 | Prakah-Asante et al. |
| 9,619,200 B2 | 4/2017 | Chakladar et al. |
| 9,620,113 B2 | 4/2017 | Kennewick et al. |
| 9,620,126 B2 | 4/2017 | Chiba |
| 9,626,695 B2 | 4/2017 | Balasubramanian et al. |
| 9,626,955 B2 | 4/2017 | Fleizach et al. |
| 9,633,004 B2 | 4/2017 | Giuli et al. |
| 9,633,191 B2 | 4/2017 | Fleizach et al. |
| 9,633,660 B2 | 4/2017 | Haughay |
| 9,633,674 B2 | 4/2017 | Sinha |
| 9,646,313 B2 | 5/2017 | Kim et al. |
| 9,648,107 B1 | 5/2017 | Penilla et al. |
| 9,652,453 B2 | 5/2017 | Mathur et al. |
| 9,658,746 B2 | 5/2017 | Cohn et al. |
| 9,659,002 B2 | 5/2017 | Medlock et al. |
| 9,659,298 B2 | 5/2017 | Lynch et al. |
| 9,665,567 B2 | 5/2017 | Li et al. |
| 9,665,662 B1 | 5/2017 | Gautam et al. |
| 9,668,121 B2 | 5/2017 | Naik et al. |
| 9,672,725 B2 | 6/2017 | Dotan-Cohen et al. |
| 9,672,822 B2 | 6/2017 | Brown et al. |
| 9,690,542 B2 | 6/2017 | Reddy et al. |
| 9,691,161 B1 | 6/2017 | Yalniz et al. |
| 9,691,378 B1 | 6/2017 | Meyers et al. |
| 9,696,963 B2 | 7/2017 | Son et al. |
| 9,697,016 B2 | 7/2017 | Jacob |
| 9,697,822 B1 | 7/2017 | Naik et al. |
| 9,697,827 B1 | 7/2017 | Lilly et al. |
| 9,697,828 B1 | 7/2017 | Prasad et al. |
| 9,698,999 B2 | 7/2017 | Mutagi |
| 9,720,907 B2 | 8/2017 | Bangalore et al. |
| 9,721,566 B2 | 8/2017 | Newendorp et al. |
| 9,721,570 B1 | 8/2017 | Beal et al. |
| 9,723,130 B2 | 8/2017 | Rand |
| 9,734,817 B1 | 8/2017 | Putrycz |
| 9,734,839 B1 | 8/2017 | Adams |
| 9,741,343 B1 | 8/2017 | Miles et al. |
| 9,747,083 B1 | 8/2017 | Roman et al. |
| 9,747,093 B2 | 8/2017 | Latino et al. |
| 9,755,605 B1 | 9/2017 | Li et al. |
| 9,760,566 B2 | 9/2017 | Heck et al. |
| 9,767,710 B2 | 9/2017 | Lee et al. |
| 9,772,994 B2 | 9/2017 | Karov et al. |
| 9,786,271 B1 | 10/2017 | Combs et al. |
| 9,792,907 B2 | 10/2017 | Bocklet et al. |
| 9,798,719 B2 | 10/2017 | Karov et al. |
| 9,812,128 B2 | 11/2017 | Mixter et al. |
| 9,813,882 B1 | 11/2017 | Masterman |
| 9,818,400 B2 | 11/2017 | Paulik et al. |
| 9,823,811 B2 | 11/2017 | Brown et al. |
| 9,823,828 B2 | 11/2017 | Zambetti et al. |
| 9,824,379 B2 | 11/2017 | Khandelwal et al. |
| 9,824,691 B1 | 11/2017 | Montero et al. |
| 9,824,692 B1 | 11/2017 | Khoury et al. |
| 9,830,044 B2 | 11/2017 | Brown et al. |
| 9,830,449 B1 | 11/2017 | Wagner |
| 9,842,168 B2 | 12/2017 | Heck et al. |
| 9,842,584 B1 | 12/2017 | Hart et al. |
| 9,846,685 B2 | 12/2017 | Li |
| 9,846,836 B2 | 12/2017 | Gao et al. |
| 9,858,925 B2 | 1/2018 | Gruber et al. |
| 9,858,927 B2 | 1/2018 | Williams et al. |

(56) References Cited

U.S. PATENT DOCUMENTS

| | | |
|---|---|---|
| 9,886,953 B2 | 2/2018 | Lemay et al. |
| 9,887,949 B2 | 2/2018 | Shepherd et al. |
| 9,911,415 B2 | 3/2018 | Vanblon et al. |
| 9,916,839 B1 | 3/2018 | Scalise et al. |
| 9,922,642 B2 | 3/2018 | Pitschel et al. |
| 9,928,835 B1 | 3/2018 | Tang |
| 9,934,777 B1 | 4/2018 | Joseph et al. |
| 9,934,785 B1 | 4/2018 | Hulaud |
| 9,946,862 B2 | 4/2018 | Yun et al. |
| 9,948,728 B2 | 4/2018 | Linn et al. |
| 9,959,129 B2 | 5/2018 | Kannan et al. |
| 9,959,506 B1 | 5/2018 | Karppanen |
| 9,966,065 B2 | 5/2018 | Gruber et al. |
| 9,966,068 B2 | 5/2018 | Cash et al. |
| 9,967,381 B1 | 5/2018 | Kashimba et al. |
| 9,971,495 B2 | 5/2018 | Shetty et al. |
| 9,984,686 B1 | 5/2018 | Mutagi et al. |
| 9,986,419 B2 | 5/2018 | Naik et al. |
| 9,990,129 B2 | 6/2018 | Yang et al. |
| 9,990,176 B1 | 6/2018 | Gray |
| 9,990,921 B2 | 6/2018 | Vanblon et al. |
| 9,996,626 B1 | 6/2018 | Bailey et al. |
| 9,998,552 B1 | 6/2018 | Ledet |
| 10,001,817 B2 | 6/2018 | Zambetti et al. |
| 10,013,416 B1 | 7/2018 | Bhardwaj et al. |
| 10,013,654 B1 | 7/2018 | Levy et al. |
| 10,013,979 B1 | 7/2018 | Roma et al. |
| 10,019,436 B2 | 7/2018 | Huang |
| 10,025,378 B2 | 7/2018 | Venable et al. |
| 10,026,209 B1 | 7/2018 | Dagley et al. |
| 10,027,662 B1 | 7/2018 | Mutagi et al. |
| 10,032,451 B1 | 7/2018 | Mamkina et al. |
| 10,032,455 B2 | 7/2018 | Newman et al. |
| 10,037,758 B2 | 7/2018 | Jing et al. |
| 10,043,516 B2 | 8/2018 | Saddler et al. |
| 10,049,161 B2 | 8/2018 | Kaneko |
| 10,049,663 B2 | 8/2018 | Orr et al. |
| 10,049,668 B2 | 8/2018 | Huang et al. |
| 10,055,390 B2 | 8/2018 | Sharifi et al. |
| 10,055,681 B2 | 8/2018 | Brown et al. |
| 10,074,360 B2 | 9/2018 | Kim |
| 10,074,371 B1 | 9/2018 | Wang et al. |
| 10,078,487 B2 | 9/2018 | Gruber et al. |
| 10,083,213 B1 | 9/2018 | Podgorny et al. |
| 10,083,690 B2 | 9/2018 | Giuli et al. |
| 10,088,972 B2 | 10/2018 | Brown et al. |
| 10,089,072 B2 | 10/2018 | Piersol et al. |
| 10,096,319 B1 | 10/2018 | Jin et al. |
| 10,101,887 B2 | 10/2018 | Bernstein et al. |
| 10,102,359 B2 | 10/2018 | Cheyer |
| 10,115,055 B2 | 10/2018 | Weiss et al. |
| 10,127,901 B2 | 11/2018 | Zhao et al. |
| 10,127,908 B1 | 11/2018 | Deller et al. |
| 10,134,425 B1 | 11/2018 | Johnson, Jr. |
| 10,135,965 B2 | 11/2018 | Woolsey et al. |
| 10,146,923 B2 | 12/2018 | Pitkänen et al. |
| 10,147,421 B2 | 12/2018 | Liddell et al. |
| 10,147,441 B1 | 12/2018 | Pogue et al. |
| 10,169,329 B2 | 1/2019 | Futrell et al. |
| 10,170,123 B2 | 1/2019 | Orr et al. |
| 10,170,135 B1 | 1/2019 | Pearce et al. |
| 10,175,879 B2 | 1/2019 | Missig et al. |
| 10,176,167 B2 | 1/2019 | Evermann |
| 10,176,802 B1 | 1/2019 | Ladhak et al. |
| 10,176,808 B1 | 1/2019 | Lovitt et al. |
| 10,178,301 B1 | 1/2019 | Welbourne et al. |
| 10,185,542 B2 | 1/2019 | Carson et al. |
| 10,186,254 B2 | 1/2019 | Williams et al. |
| 10,186,266 B1 | 1/2019 | Devaraj et al. |
| 10,191,627 B2 | 1/2019 | Cieplinski et al. |
| 10,191,646 B2 | 1/2019 | Zambetti et al. |
| 10,191,718 B2 | 1/2019 | Rhee et al. |
| 10,192,546 B1 | 1/2019 | Piersol et al. |
| 10,192,552 B2 | 1/2019 | Raitio et al. |
| 10,192,557 B2 | 1/2019 | Lee et al. |
| 10,198,877 B1 | 2/2019 | Maltsev et al. |
| 10,199,051 B2 | 2/2019 | Binder et al. |
| 10,200,824 B2 | 2/2019 | Gross et al. |
| 10,204,627 B2 | 2/2019 | Nitz et al. |
| 10,210,860 B1 | 2/2019 | Ward et al. |
| 10,216,351 B2 | 2/2019 | Yang |
| 10,216,832 B2 | 2/2019 | Bangalore et al. |
| 10,223,066 B2 | 3/2019 | Martel et al. |
| 10,225,711 B2 | 3/2019 | Parks et al. |
| 10,228,904 B2 | 3/2019 | Raux |
| 10,229,109 B1 | 3/2019 | Cherepanov et al. |
| 10,229,356 B1 | 3/2019 | Liu et al. |
| 10,237,711 B2 | 3/2019 | Linn et al. |
| 10,242,501 B1 | 3/2019 | Pusch et al. |
| 10,248,308 B2 | 4/2019 | Karunamuni et al. |
| 10,249,300 B2 | 4/2019 | Booker et al. |
| 10,249,305 B2 | 4/2019 | Yu |
| 10,255,922 B1 | 4/2019 | Sharifi et al. |
| 10,261,672 B1 | 4/2019 | Dolbakian et al. |
| 10,261,830 B2 | 4/2019 | Gupta et al. |
| 10,269,345 B2 | 4/2019 | Castillo et al. |
| 10,275,513 B1 | 4/2019 | Cowan et al. |
| 10,289,205 B1 | 5/2019 | Sumter et al. |
| 10,296,160 B2 | 5/2019 | Shah et al. |
| 10,297,253 B2 | 5/2019 | Walker, II et al. |
| 10,303,772 B2 | 5/2019 | Hosn et al. |
| 10,304,463 B2 | 5/2019 | Mixter et al. |
| 10,311,482 B2 | 6/2019 | Baldwin |
| 10,311,871 B2 | 6/2019 | Newendorp et al. |
| 10,325,598 B2 | 6/2019 | Basye et al. |
| 10,332,509 B2 | 6/2019 | Catanzaro et al. |
| 10,332,513 B1 | 6/2019 | D'Souza et al. |
| 10,332,518 B2 | 6/2019 | Garg et al. |
| 10,339,224 B2 | 7/2019 | Fukuoka |
| 10,339,714 B2 | 7/2019 | Corso et al. |
| 10,346,540 B2 | 7/2019 | Karov et al. |
| 10,346,753 B2 | 7/2019 | Soon-Shiong et al. |
| 10,346,878 B1 | 7/2019 | Ostermann et al. |
| 10,353,975 B2 | 7/2019 | Oh et al. |
| 10,354,168 B2 | 7/2019 | Bluche |
| 10,354,677 B2 | 7/2019 | Mohamed et al. |
| 10,356,243 B2 | 7/2019 | Sanghavi et al. |
| 10,360,716 B1 | 7/2019 | Van Der Meulen et al. |
| 10,365,887 B1 | 7/2019 | Mulherkar |
| 10,366,160 B2 | 7/2019 | Castelli et al. |
| 10,366,692 B1 | 7/2019 | Adams et al. |
| 10,372,814 B2 | 8/2019 | Gliozzo et al. |
| 10,372,881 B2 | 8/2019 | Ingrassia, Jr. et al. |
| 10,389,876 B2 | 8/2019 | Engelke et al. |
| 10,402,066 B2 | 9/2019 | Kawana |
| 10,403,283 B1 | 9/2019 | Schramm et al. |
| 10,409,454 B2 | 9/2019 | Kagan et al. |
| 10,410,637 B2 | 9/2019 | Paulik et al. |
| 10,417,037 B2 | 9/2019 | Gruber et al. |
| 10,417,344 B2 | 9/2019 | Futrell et al. |
| 10,417,554 B2 | 9/2019 | Scheffler |
| 10,437,928 B2 | 10/2019 | Bhaya et al. |
| 10,446,142 B2 | 10/2019 | Lim et al. |
| 10,453,117 B1 | 10/2019 | Reavely et al. |
| 10,469,665 B1 | 11/2019 | Bell et al. |
| 10,474,961 B2 | 11/2019 | Brigham et al. |
| 10,475,446 B2 | 11/2019 | Gruber et al. |
| 10,482,875 B2 | 11/2019 | Henry |
| 10,490,195 B1 | 11/2019 | Krishnamoorthy et al. |
| 10,496,364 B2 | 12/2019 | Yao |
| 10,496,705 B1 | 12/2019 | Irani et al. |
| 10,497,365 B2 | 12/2019 | Gruber et al. |
| 10,504,518 B1 | 12/2019 | Irani et al. |
| 10,512,750 B1 | 12/2019 | Lewin et al. |
| 10,515,133 B1 | 12/2019 | Sharifi |
| 10,521,946 B1 | 12/2019 | Roche et al. |
| 10,528,386 B2 | 1/2020 | Yu |
| 10,540,976 B2 | 1/2020 | Van Os et al. |
| 10,558,893 B2 | 2/2020 | Bluche |
| 10,566,007 B2 | 2/2020 | Fawaz et al. |
| 10,568,032 B2 | 2/2020 | Freeman et al. |
| 10,579,401 B2 | 3/2020 | Dawes |
| 10,580,409 B2 | 3/2020 | Walker, II et al. |
| 10,582,355 B1 | 3/2020 | Lebeau et al. |

(56) References Cited

U.S. PATENT DOCUMENTS

| | | |
|---|---|---|
| 10,585,957 B2 | 3/2020 | Heck et al. |
| 10,586,369 B1 | 3/2020 | Roche et al. |
| 10,599,449 B1 | 3/2020 | Chatzipanagiotis et al. |
| 10,629,186 B1 | 4/2020 | Slifka |
| 10,630,795 B2 | 4/2020 | Aoki et al. |
| 10,642,934 B2 | 5/2020 | Heck et al. |
| 10,659,851 B2 | 5/2020 | Lister et al. |
| 10,671,428 B2 | 6/2020 | Zeitlin |
| 10,684,099 B2 | 6/2020 | Zaetterqvist |
| 10,684,703 B2 | 6/2020 | Hindi et al. |
| 10,699,697 B2 | 6/2020 | Qian et al. |
| 10,706,841 B2 | 7/2020 | Gruber et al. |
| 10,721,190 B2 | 7/2020 | Zhao et al. |
| 10,732,708 B1 | 8/2020 | Roche et al. |
| 10,743,107 B1 | 8/2020 | Yoshioka et al. |
| 10,748,529 B1 | 8/2020 | Milden |
| 10,748,546 B2 | 8/2020 | Kim et al. |
| 10,754,658 B2 | 8/2020 | Tamiya |
| 10,755,032 B2 | 8/2020 | Douglas et al. |
| 10,757,499 B1 | 8/2020 | Vautrin et al. |
| 10,769,385 B2 | 9/2020 | Evermann |
| 10,783,151 B1 | 9/2020 | Bushkin et al. |
| 10,783,883 B2 | 9/2020 | Mixter et al. |
| 10,789,945 B2 | 9/2020 | Acero et al. |
| 10,791,176 B2 | 9/2020 | Phipps et al. |
| 10,795,944 B2 | 10/2020 | Brown et al. |
| 10,796,100 B2 | 10/2020 | Bangalore et al. |
| 10,803,255 B2 | 10/2020 | Dubyak et al. |
| 10,811,013 B1 | 10/2020 | Secker-Walker et al. |
| 10,818,288 B2 | 10/2020 | Garcia et al. |
| 10,842,968 B1 | 11/2020 | Kahn et al. |
| 10,846,618 B2 | 11/2020 | Ravi et al. |
| 10,860,629 B1 | 12/2020 | Gangadharaiah et al. |
| 10,861,483 B2 | 12/2020 | Feinauer et al. |
| 10,880,668 B1 | 12/2020 | Robinson et al. |
| 10,885,277 B2 | 1/2021 | Ravi et al. |
| 10,892,996 B2 | 1/2021 | Piersol |
| 10,909,459 B2 | 2/2021 | Tsatsin et al. |
| 10,944,859 B2 | 3/2021 | Weinstein et al. |
| 10,957,311 B2 | 3/2021 | Solomon et al. |
| 10,957,337 B2 | 3/2021 | Chen et al. |
| 10,970,660 B1 | 4/2021 | Harris et al. |
| 10,974,139 B2 | 4/2021 | Feder et al. |
| 10,978,056 B1 | 4/2021 | Challa et al. |
| 10,978,090 B2 | 4/2021 | Binder et al. |
| 10,983,971 B2 | 4/2021 | Carvalho et al. |
| 11,009,970 B2 | 5/2021 | Hindi et al. |
| 11,037,565 B2 | 6/2021 | Kudurshian et al. |
| 11,061,543 B1 | 7/2021 | Blatz et al. |
| 11,076,039 B2 | 7/2021 | Weinstein et al. |
| 11,094,311 B2 | 8/2021 | Candelore et al. |
| 11,132,172 B1 | 9/2021 | Naik et al. |
| 11,169,660 B2 | 11/2021 | Gupta et al. |
| 11,183,205 B1 | 11/2021 | Ebenezer et al. |
| 11,200,027 B2 | 12/2021 | Aggarwal et al. |
| 11,204,787 B2 | 12/2021 | Radebaugh et al. |
| 11,269,426 B2 | 3/2022 | Jorasch et al. |
| 2002/0004703 A1 | 1/2002 | Gaspard, II |
| 2002/0007300 A1 | 1/2002 | Slatter |
| 2002/0067308 A1 | 6/2002 | Robertson |
| 2002/0086680 A1 | 7/2002 | Hunzinger |
| 2002/0154160 A1 | 10/2002 | Hosokawa |
| 2003/0140088 A1 | 7/2003 | Robinson et al. |
| 2003/0177046 A1 | 9/2003 | Socha-Leialoha |
| 2004/0167652 A1 | 8/2004 | Ishii |
| 2004/0193420 A1 | 9/2004 | Kennewick et al. |
| 2004/0194141 A1 | 9/2004 | Sanders |
| 2005/0015772 A1 | 1/2005 | Saare et al. |
| 2005/0033713 A1 | 2/2005 | Bala et al. |
| 2005/0075875 A1 | 4/2005 | Shozakai et al. |
| 2005/0108074 A1 | 5/2005 | Bloechl et al. |
| 2005/0221876 A1 | 10/2005 | Van Bosch et al. |
| 2006/0058948 A1* | 3/2006 | Blass ............... G01C 21/343 455/456.1 |
| 2006/0061488 A1 | 3/2006 | Dunton |
| 2006/0074844 A1 | 4/2006 | Frankel et al. |
| 2006/0077055 A1 | 4/2006 | Basir |
| 2006/0136280 A1 | 6/2006 | Cho et al. |
| 2006/0141990 A1 | 6/2006 | Zak et al. |
| 2006/0142933 A1 | 6/2006 | Feng |
| 2006/0156252 A1 | 7/2006 | Sheshagiri et al. |
| 2006/0156307 A1 | 7/2006 | Kunjithapatham et al. |
| 2007/0006098 A1 | 1/2007 | Krumm et al. |
| 2007/0014280 A1 | 1/2007 | Cormier et al. |
| 2007/0027732 A1 | 2/2007 | Hudgens |
| 2007/0036117 A1 | 2/2007 | Taube et al. |
| 2007/0036286 A1 | 2/2007 | Champlin et al. |
| 2007/0050191 A1 | 3/2007 | Weider et al. |
| 2007/0052586 A1 | 3/2007 | Horstemeyer |
| 2007/0124263 A1 | 5/2007 | Katariya et al. |
| 2007/0143163 A1 | 6/2007 | Weiss et al. |
| 2007/0185754 A1 | 8/2007 | Schmidt |
| 2007/0276714 A1 | 11/2007 | Beringer |
| 2008/0005053 A1* | 1/2008 | Pulsipher ............... G06Q 10/10 706/45 |
| 2008/0015864 A1 | 1/2008 | Ross et al. |
| 2008/0046170 A1 | 2/2008 | Degrazia |
| 2008/0079566 A1 | 4/2008 | Singh et al. |
| 2008/0082390 A1 | 4/2008 | Hawkins et al. |
| 2008/0082651 A1 | 4/2008 | Singh et al. |
| 2008/0096531 A1* | 4/2008 | McQuaide ............... H04L 51/00 455/412.1 |
| 2008/0101584 A1 | 5/2008 | Gray et al. |
| 2008/0114714 A1 | 5/2008 | Vemuri |
| 2008/0132221 A1 | 6/2008 | Willey |
| 2008/0155547 A1 | 6/2008 | Weber et al. |
| 2008/0195312 A1 | 8/2008 | Aaron et al. |
| 2008/0242363 A1 | 10/2008 | Onda et al. |
| 2008/0247519 A1 | 10/2008 | Abella et al. |
| 2008/0281510 A1 | 11/2008 | Shahine |
| 2008/0294418 A1 | 11/2008 | Cleary et al. |
| 2008/0313335 A1 | 12/2008 | Jung et al. |
| 2009/0102637 A1 | 4/2009 | Hsu |
| 2009/0132378 A1 | 5/2009 | Othmer et al. |
| 2009/0150156 A1 | 6/2009 | Kennewick et al. |
| 2009/0157693 A1 | 6/2009 | Palahnuk |
| 2009/0191895 A1 | 7/2009 | Singh et al. |
| 2009/0197619 A1 | 8/2009 | Colligan et al. |
| 2009/0216569 A1 | 8/2009 | Bonev et al. |
| 2009/0216704 A1 | 8/2009 | Zheng et al. |
| 2009/0219166 A1 | 9/2009 | Macfarlane et al. |
| 2009/0224867 A1 | 9/2009 | O'Shaughnessy et al. |
| 2009/0239552 A1 | 9/2009 | Churchill et al. |
| 2009/0248420 A1* | 10/2009 | Basir ............... H04M 1/6075 704/E15.001 |
| 2009/0271109 A1 | 10/2009 | Lee et al. |
| 2010/0081456 A1 | 4/2010 | Singh et al. |
| 2010/0100371 A1 | 4/2010 | Yuezhong et al. |
| 2010/0103779 A1 | 4/2010 | Kakirde et al. |
| 2010/0138416 A1 | 6/2010 | Bellotti |
| 2010/0146442 A1 | 6/2010 | Nagasaka et al. |
| 2010/0174998 A1 | 7/2010 | Lazarus et al. |
| 2010/0222033 A1 | 9/2010 | Scott et al. |
| 2010/0223131 A1 | 9/2010 | Scott et al. |
| 2010/0229082 A1 | 9/2010 | Karmarkar et al. |
| 2010/0295676 A1 | 11/2010 | Khachaturov et al. |
| 2010/0311395 A1 | 12/2010 | Zheng et al. |
| 2010/0332236 A1 | 12/2010 | Tan |
| 2010/0332280 A1 | 12/2010 | Bradley et al. |
| 2011/0016421 A1 | 1/2011 | Krupka et al. |
| 2011/0045841 A1* | 2/2011 | Kuhlke ............... H04L 51/222 340/686.1 |
| 2011/0076994 A1 | 3/2011 | Kim et al. |
| 2011/0090078 A1 | 4/2011 | Kim et al. |
| 2011/0130958 A1 | 6/2011 | Stahl et al. |
| 2011/0176670 A1* | 7/2011 | Kaplan ............... H04W 4/16 455/414.1 |
| 2011/0184789 A1 | 7/2011 | Kirsch |
| 2011/0231218 A1 | 9/2011 | Tovar |
| 2011/0260861 A1 | 10/2011 | Singh et al. |
| 2011/0288917 A1 | 11/2011 | Wanek et al. |
| 2011/0295590 A1 | 12/2011 | Lloyd et al. |
| 2011/0307810 A1 | 12/2011 | Hilerio et al. |
| 2011/0313803 A1 | 12/2011 | Friend et al. |

(56) References Cited

U.S. PATENT DOCUMENTS

| | | |
|---|---|---|
| 2011/0314404 A1 | 12/2011 | Kotler et al. |
| 2012/0002820 A1 | 1/2012 | Leichter |
| 2012/0005224 A1 | 1/2012 | Ahrens et al. |
| 2012/0005602 A1 | 1/2012 | Anttila et al. |
| 2012/0008754 A1 | 1/2012 | Mukherjee et al. |
| 2012/0010886 A1 | 1/2012 | Razavilar |
| 2012/0011138 A1 | 1/2012 | Dunning et al. |
| 2012/0013609 A1 | 1/2012 | Reponen et al. |
| 2012/0015629 A1 | 1/2012 | Olsen et al. |
| 2012/0016658 A1 | 1/2012 | Wu et al. |
| 2012/0016678 A1 * | 1/2012 | Gruber .................. G06F 40/40 704/E21.001 |
| 2012/0019400 A1 | 1/2012 | Patel et al. |
| 2012/0020490 A1 | 1/2012 | Leichter |
| 2012/0020503 A1 | 1/2012 | Endo et al. |
| 2012/0022787 A1 | 1/2012 | Lebeau et al. |
| 2012/0022857 A1 | 1/2012 | Baldwin et al. |
| 2012/0022860 A1 | 1/2012 | Lloyd et al. |
| 2012/0022868 A1 | 1/2012 | Lebeau et al. |
| 2012/0022869 A1 | 1/2012 | Lloyd et al. |
| 2012/0022870 A1 | 1/2012 | Kristjansson et al. |
| 2012/0022872 A1 | 1/2012 | Gruber et al. |
| 2012/0022874 A1 | 1/2012 | Lloyd et al. |
| 2012/0022876 A1 | 1/2012 | Lebeau et al. |
| 2012/0022967 A1 | 1/2012 | Bachman et al. |
| 2012/0023088 A1 | 1/2012 | Cheng et al. |
| 2012/0023095 A1 | 1/2012 | Wadycki et al. |
| 2012/0023462 A1 | 1/2012 | Rosing et al. |
| 2012/0026395 A1 | 2/2012 | Jin et al. |
| 2012/0029661 A1 | 2/2012 | Jones et al. |
| 2012/0029910 A1 | 2/2012 | Medlock et al. |
| 2012/0034904 A1 | 2/2012 | Lebeau et al. |
| 2012/0035907 A1 | 2/2012 | Lebeau et al. |
| 2012/0035908 A1 | 2/2012 | Lebeau et al. |
| 2012/0035924 A1 | 2/2012 | Jitkoff et al. |
| 2012/0035925 A1 | 2/2012 | Friend et al. |
| 2012/0035926 A1 | 2/2012 | Ambler |
| 2012/0035931 A1 | 2/2012 | Lebeau et al. |
| 2012/0035932 A1 * | 2/2012 | Jitkoff ................ G01C 21/3608 704/254 |
| 2012/0035935 A1 | 2/2012 | Park et al. |
| 2012/0036556 A1 | 2/2012 | Lebeau et al. |
| 2012/0039539 A1 | 2/2012 | Boiman et al. |
| 2012/0039578 A1 | 2/2012 | Issa et al. |
| 2012/0041752 A1 | 2/2012 | Wang et al. |
| 2012/0041756 A1 | 2/2012 | Hanazawa et al. |
| 2012/0041759 A1 | 2/2012 | Barker et al. |
| 2012/0042014 A1 | 2/2012 | Desai et al. |
| 2012/0042343 A1 | 2/2012 | Laligand et al. |
| 2012/0052945 A1 | 3/2012 | Miyamoto et al. |
| 2012/0053815 A1 | 3/2012 | Montanari et al. |
| 2012/0053829 A1 | 3/2012 | Agarwal et al. |
| 2012/0053945 A1 | 3/2012 | Gupta et al. |
| 2012/0055253 A1 | 3/2012 | Sinha |
| 2012/0056815 A1 | 3/2012 | Mehra |
| 2012/0058783 A1 | 3/2012 | Kim et al. |
| 2012/0059655 A1 | 3/2012 | Cartales |
| 2012/0059813 A1 | 3/2012 | Sejnoha et al. |
| 2012/0060052 A1 | 3/2012 | White et al. |
| 2012/0062473 A1 | 3/2012 | Xiao et al. |
| 2012/0064975 A1 | 3/2012 | Gault et al. |
| 2012/0065972 A1 | 3/2012 | Strifler et al. |
| 2012/0066212 A1 | 3/2012 | Jennings |
| 2012/0066581 A1 | 3/2012 | Spalink |
| 2012/0075054 A1 | 3/2012 | Ge et al. |
| 2012/0075184 A1 | 3/2012 | Madhvanath |
| 2012/0077479 A1 | 3/2012 | Sabotta et al. |
| 2012/0078611 A1 | 3/2012 | Soltani et al. |
| 2012/0078624 A1 | 3/2012 | Yook et al. |
| 2012/0078627 A1 | 3/2012 | Wagner |
| 2012/0078635 A1 | 3/2012 | Rothkopf et al. |
| 2012/0078747 A1 | 3/2012 | Chakrabarti et al. |
| 2012/0082317 A1 | 4/2012 | Pance et al. |
| 2012/0083286 A1 | 4/2012 | Kim et al. |
| 2012/0084086 A1 | 4/2012 | Gilbert et al. |
| 2012/0084087 A1 | 4/2012 | Yang et al. |
| 2012/0084089 A1 | 4/2012 | Lloyd et al. |
| 2012/0084251 A1 | 4/2012 | Lingenfelder et al. |
| 2012/0084634 A1 | 4/2012 | Wong et al. |
| 2012/0088219 A1 | 4/2012 | Briscoe et al. |
| 2012/0089331 A1 | 4/2012 | Schmidt et al. |
| 2012/0089659 A1 | 4/2012 | Halevi et al. |
| 2012/0094645 A1 | 4/2012 | Jeffrey |
| 2012/0101823 A1 | 4/2012 | Weng et al. |
| 2012/0105257 A1 | 5/2012 | Murillo et al. |
| 2012/0108166 A1 | 5/2012 | Hymel |
| 2012/0108221 A1 | 5/2012 | Thomas et al. |
| 2012/0109632 A1 | 5/2012 | Sugiura et al. |
| 2012/0109753 A1 | 5/2012 | Kennewick et al. |
| 2012/0109997 A1 | 5/2012 | Sparks et al. |
| 2012/0110456 A1 | 5/2012 | Larco et al. |
| 2012/0114108 A1 | 5/2012 | Katis et al. |
| 2012/0116770 A1 | 5/2012 | Chen et al. |
| 2012/0117499 A1 | 5/2012 | Mori et al. |
| 2012/0117590 A1 | 5/2012 | Agnihotri et al. |
| 2012/0124126 A1 | 5/2012 | Alcazar et al. |
| 2012/0124177 A1 | 5/2012 | Sparks |
| 2012/0124178 A1 | 5/2012 | Sparks |
| 2012/0128322 A1 | 5/2012 | Shaffer et al. |
| 2012/0130709 A1 | 5/2012 | Bocchieri et al. |
| 2012/0130978 A1 | 5/2012 | Li et al. |
| 2012/0130995 A1 | 5/2012 | Risvik et al. |
| 2012/0135714 A1 | 5/2012 | King, II |
| 2012/0136529 A1 | 5/2012 | Curtis et al. |
| 2012/0136572 A1 | 5/2012 | Norton |
| 2012/0136649 A1 | 5/2012 | Freising et al. |
| 2012/0136658 A1 | 5/2012 | Shrum, Jr. et al. |
| 2012/0136855 A1 | 5/2012 | Ni et al. |
| 2012/0136985 A1 | 5/2012 | Popescu et al. |
| 2012/0137367 A1 | 5/2012 | Dupont et al. |
| 2012/0148077 A1 | 6/2012 | Aldaz et al. |
| 2012/0149342 A1 | 6/2012 | Cohen et al. |
| 2012/0149394 A1 | 6/2012 | Singh et al. |
| 2012/0150532 A1 | 6/2012 | Mirowski et al. |
| 2012/0150544 A1 | 6/2012 | Mcloughlin et al. |
| 2012/0150580 A1 | 6/2012 | Norton |
| 2012/0158293 A1 | 6/2012 | Burnham |
| 2012/0158399 A1 | 6/2012 | Tremblay et al. |
| 2012/0158422 A1 | 6/2012 | Burnham et al. |
| 2012/0159380 A1 | 6/2012 | Kocienda et al. |
| 2012/0162540 A1 | 6/2012 | Ouchi et al. |
| 2012/0163710 A1 | 6/2012 | Skaff et al. |
| 2012/0166177 A1 | 6/2012 | Beld et al. |
| 2012/0166196 A1 | 6/2012 | Ju et al. |
| 2012/0166429 A1 | 6/2012 | Moore et al. |
| 2012/0166942 A1 | 6/2012 | Ramerth et al. |
| 2012/0166959 A1 | 6/2012 | Hilerio et al. |
| 2012/0166998 A1 | 6/2012 | Cotterill et al. |
| 2012/0173222 A1 | 7/2012 | Wang et al. |
| 2012/0173244 A1 | 7/2012 | Kwak et al. |
| 2012/0173464 A1 | 7/2012 | Tur et al. |
| 2012/0174121 A1 | 7/2012 | Treat et al. |
| 2012/0176255 A1 | 7/2012 | Choi et al. |
| 2012/0179457 A1 | 7/2012 | Newman et al. |
| 2012/0179467 A1 | 7/2012 | Williams et al. |
| 2012/0179471 A1 | 7/2012 | Newman et al. |
| 2012/0185237 A1 | 7/2012 | Gajic et al. |
| 2012/0185480 A1 | 7/2012 | Ni et al. |
| 2012/0185781 A1 | 7/2012 | Guzman et al. |
| 2012/0185803 A1 | 7/2012 | Wang et al. |
| 2012/0185821 A1 | 7/2012 | Yaseen et al. |
| 2012/0191461 A1 | 7/2012 | Lin et al. |
| 2012/0192096 A1 | 7/2012 | Bowman et al. |
| 2012/0197743 A1 | 8/2012 | Grigg et al. |
| 2012/0197967 A1 | 8/2012 | Sivavakeesar |
| 2012/0197995 A1 | 8/2012 | Caruso |
| 2012/0197998 A1 | 8/2012 | Kessel et al. |
| 2012/0200489 A1 | 8/2012 | Miyashita et al. |
| 2012/0201362 A1 | 8/2012 | Crossan et al. |
| 2012/0203767 A1 | 8/2012 | Williams et al. |
| 2012/0209454 A1 | 8/2012 | Miller et al. |
| 2012/0209654 A1 | 8/2012 | Romagnino et al. |
| 2012/0209853 A1 | 8/2012 | Desai et al. |
| 2012/0209874 A1 | 8/2012 | Wong et al. |

(56) References Cited

U.S. PATENT DOCUMENTS

| | | |
|---|---|---|
| 2012/0210266 A1 | 8/2012 | Jiang et al. |
| 2012/0210378 A1 | 8/2012 | Mccoy et al. |
| 2012/0214141 A1 | 8/2012 | Raya et al. |
| 2012/0214517 A1 | 8/2012 | Singh et al. |
| 2012/0215640 A1 | 8/2012 | Ramer et al. |
| 2012/0215762 A1 | 8/2012 | Hall et al. |
| 2012/0221339 A1 | 8/2012 | Wang et al. |
| 2012/0221552 A1 | 8/2012 | Reponen et al. |
| 2012/0222132 A1 | 8/2012 | Burger et al. |
| 2012/0223889 A1 | 9/2012 | Medlock et al. |
| 2012/0223936 A1 | 9/2012 | Aughey et al. |
| 2012/0232885 A1 | 9/2012 | Barbosa et al. |
| 2012/0232886 A1 | 9/2012 | Capuozzo et al. |
| 2012/0232906 A1 | 9/2012 | Lindahl |
| 2012/0233207 A1 | 9/2012 | Mohajer |
| 2012/0233266 A1 | 9/2012 | Hassan et al. |
| 2012/0233280 A1 | 9/2012 | Ebara |
| 2012/0239403 A1 | 9/2012 | Cano et al. |
| 2012/0239661 A1 | 9/2012 | Giblin |
| 2012/0239761 A1 | 9/2012 | Linner et al. |
| 2012/0242482 A1 | 9/2012 | Elumalai et al. |
| 2012/0245719 A1 | 9/2012 | Story, Jr. et al. |
| 2012/0245939 A1 | 9/2012 | Braho et al. |
| 2012/0245941 A1 | 9/2012 | Cheyer |
| 2012/0245944 A1 | 9/2012 | Gruber et al. |
| 2012/0246064 A1 | 9/2012 | Balkow |
| 2012/0250858 A1 | 10/2012 | Iqbal et al. |
| 2012/0252367 A1 | 10/2012 | Gaglio et al. |
| 2012/0252540 A1 | 10/2012 | Kirigaya |
| 2012/0253785 A1 | 10/2012 | Hamid et al. |
| 2012/0253791 A1 | 10/2012 | Heck et al. |
| 2012/0254143 A1 | 10/2012 | Varma et al. |
| 2012/0254152 A1 | 10/2012 | Park et al. |
| 2012/0254290 A1 | 10/2012 | Naaman |
| 2012/0259615 A1 | 10/2012 | Morin et al. |
| 2012/0259638 A1 | 10/2012 | Kalinli |
| 2012/0262296 A1 | 10/2012 | Bezar |
| 2012/0265482 A1 | 10/2012 | Grokop et al. |
| 2012/0265528 A1 | 10/2012 | Gruber et al. |
| 2012/0265535 A1 | 10/2012 | Bryant-Rich et al. |
| 2012/0265787 A1 | 10/2012 | Hsu et al. |
| 2012/0265806 A1 | 10/2012 | Blanchflower et al. |
| 2012/0271625 A1 | 10/2012 | Bernard |
| 2012/0271634 A1 | 10/2012 | Lenke |
| 2012/0271635 A1 | 10/2012 | Ljolje |
| 2012/0271640 A1 | 10/2012 | Basir |
| 2012/0271676 A1 | 10/2012 | Aravamudan et al. |
| 2012/0272177 A1 | 10/2012 | Vaghefinazari et al. |
| 2012/0275377 A1 | 11/2012 | Lehane et al. |
| 2012/0278744 A1 | 11/2012 | Kozitsyn et al. |
| 2012/0278812 A1 | 11/2012 | Wang |
| 2012/0284015 A1 | 11/2012 | Drewes |
| 2012/0284027 A1 | 11/2012 | Mallett et al. |
| 2012/0287067 A1 | 11/2012 | Ikegami |
| 2012/0290291 A1 | 11/2012 | Shelley et al. |
| 2012/0290300 A1 | 11/2012 | Lee et al. |
| 2012/0290657 A1 | 11/2012 | Parks et al. |
| 2012/0290680 A1 | 11/2012 | Hwang |
| 2012/0295708 A1 | 11/2012 | Hernandez-Abrego et al. |
| 2012/0296638 A1 | 11/2012 | Patwa |
| 2012/0296649 A1 | 11/2012 | Bansal et al. |
| 2012/0296654 A1 | 11/2012 | Hendrickson et al. |
| 2012/0296891 A1 | 11/2012 | Rangan |
| 2012/0297341 A1 | 11/2012 | Glazer et al. |
| 2012/0297348 A1 | 11/2012 | Santoro |
| 2012/0303369 A1 | 11/2012 | Brush et al. |
| 2012/0303371 A1 | 11/2012 | Labsky et al. |
| 2012/0304124 A1 | 11/2012 | Chen et al. |
| 2012/0304239 A1 | 11/2012 | Shahraray et al. |
| 2012/0309363 A1 | 12/2012 | Gruber et al. |
| 2012/0310642 A1 | 12/2012 | Cao et al. |
| 2012/0310649 A1 | 12/2012 | Cannistraro et al. |
| 2012/0310652 A1 | 12/2012 | O'Sullivan |
| 2012/0310922 A1 | 12/2012 | Johnson et al. |
| 2012/0311478 A1 | 12/2012 | Van Os et al. |
| 2012/0311583 A1 | 12/2012 | Gruber et al. |
| 2012/0311584 A1 | 12/2012 | Gruber et al. |
| 2012/0311585 A1 | 12/2012 | Gruber et al. |
| 2012/0316774 A1 | 12/2012 | Yariv et al. |
| 2012/0316862 A1 | 12/2012 | Sultan et al. |
| 2012/0316875 A1 | 12/2012 | Nyquist et al. |
| 2012/0316878 A1 | 12/2012 | Singleton et al. |
| 2012/0316955 A1 | 12/2012 | Panguluri et al. |
| 2012/0317194 A1 | 12/2012 | Tian |
| 2012/0317498 A1 | 12/2012 | Logan et al. |
| 2012/0321112 A1 | 12/2012 | Schubert et al. |
| 2012/0323560 A1 | 12/2012 | Cortes et al. |
| 2012/0324391 A1 | 12/2012 | Tocci |
| 2012/0327009 A1 | 12/2012 | Fleizach |
| 2012/0329529 A1 | 12/2012 | Van Der Raadt |
| 2012/0330660 A1 | 12/2012 | Jaiswal |
| 2012/0330661 A1 | 12/2012 | Lindahl |
| 2012/0330990 A1 | 12/2012 | Chen et al. |
| 2013/0002716 A1 | 1/2013 | Walker et al. |
| 2013/0005405 A1* | 1/2013 | Prociw ............... H04M 1/724 455/566 |
| 2013/0006633 A1 | 1/2013 | Grokop et al. |
| 2013/0006637 A1 | 1/2013 | Kanevsky et al. |
| 2013/0006638 A1 | 1/2013 | Lindahl |
| 2013/0007240 A1 | 1/2013 | Qiu et al. |
| 2013/0007648 A1 | 1/2013 | Gamon et al. |
| 2013/0009858 A1 | 1/2013 | Lacey |
| 2013/0010575 A1 | 1/2013 | He et al. |
| 2013/0013313 A1 | 1/2013 | Shechtman et al. |
| 2013/0013319 A1 | 1/2013 | Grant et al. |
| 2013/0014026 A1 | 1/2013 | Beringer et al. |
| 2013/0014143 A1 | 1/2013 | Bhatia et al. |
| 2013/0018659 A1 | 1/2013 | Chi |
| 2013/0018863 A1 | 1/2013 | Regan et al. |
| 2013/0022189 A1 | 1/2013 | Ganong et al. |
| 2013/0024277 A1 | 1/2013 | Tuchman et al. |
| 2013/0024576 A1 | 1/2013 | Dishneau et al. |
| 2013/0027875 A1 | 1/2013 | Zhu et al. |
| 2013/0028404 A1 | 1/2013 | Omalley et al. |
| 2013/0030787 A1 | 1/2013 | Cancedda et al. |
| 2013/0030789 A1 | 1/2013 | Dalce |
| 2013/0030804 A1 | 1/2013 | Zavaliagkos et al. |
| 2013/0030815 A1 | 1/2013 | Madhvanath et al. |
| 2013/0030904 A1 | 1/2013 | Aidasani et al. |
| 2013/0030913 A1 | 1/2013 | Zhu et al. |
| 2013/0030955 A1 | 1/2013 | David |
| 2013/0031162 A1 | 1/2013 | Willis et al. |
| 2013/0031476 A1 | 1/2013 | Coin et al. |
| 2013/0033643 A1 | 2/2013 | Kim et al. |
| 2013/0035086 A1 | 2/2013 | Chardon et al. |
| 2013/0035942 A1 | 2/2013 | Kim et al. |
| 2013/0035961 A1 | 2/2013 | Yegnanarayanan |
| 2013/0035994 A1 | 2/2013 | Pattan et al. |
| 2013/0036200 A1 | 2/2013 | Roberts et al. |
| 2013/0038618 A1 | 2/2013 | Urbach |
| 2013/0041647 A1 | 2/2013 | Ramerth et al. |
| 2013/0041654 A1 | 2/2013 | Walker et al. |
| 2013/0041661 A1 | 2/2013 | Lee et al. |
| 2013/0041665 A1 | 2/2013 | Jang et al. |
| 2013/0041667 A1 | 2/2013 | Longe et al. |
| 2013/0041968 A1 | 2/2013 | Cohen et al. |
| 2013/0046544 A1 | 2/2013 | Kay et al. |
| 2013/0047178 A1 | 2/2013 | Moon et al. |
| 2013/0050089 A1 | 2/2013 | Neels et al. |
| 2013/0054550 A1 | 2/2013 | Bolohan |
| 2013/0054609 A1 | 2/2013 | Rajput et al. |
| 2013/0054613 A1 | 2/2013 | Bishop |
| 2013/0054631 A1 | 2/2013 | Govani et al. |
| 2013/0054675 A1 | 2/2013 | Jenkins et al. |
| 2013/0054706 A1 | 2/2013 | Graham et al. |
| 2013/0054945 A1 | 2/2013 | Free et al. |
| 2013/0055099 A1 | 2/2013 | Yao et al. |
| 2013/0055147 A1 | 2/2013 | Vasudev et al. |
| 2013/0055201 A1 | 2/2013 | No et al. |
| 2013/0060571 A1 | 3/2013 | Soemo et al. |
| 2013/0060807 A1 | 3/2013 | Rambhia et al. |
| 2013/0061139 A1 | 3/2013 | Mahkovec et al. |
| 2013/0063611 A1 | 3/2013 | Papakipos et al. |
| 2013/0066832 A1 | 3/2013 | Sheehan et al. |

(56) References Cited

U.S. PATENT DOCUMENTS

| | | |
|---|---|---|
| 2013/0067307 A1 | 3/2013 | Tian et al. |
| 2013/0067312 A1 | 3/2013 | Rose |
| 2013/0067421 A1 | 3/2013 | Osman et al. |
| 2013/0069769 A1 | 3/2013 | Pennington et al. |
| 2013/0073286 A1 | 3/2013 | Bastea-Forte et al. |
| 2013/0073293 A1 | 3/2013 | Jang et al. |
| 2013/0073346 A1 | 3/2013 | Chun et al. |
| 2013/0073580 A1 | 3/2013 | Mehanna et al. |
| 2013/0073676 A1 | 3/2013 | Cockcroft |
| 2013/0078930 A1 | 3/2013 | Chen et al. |
| 2013/0080152 A1 | 3/2013 | Brun et al. |
| 2013/0080162 A1 | 3/2013 | Chang et al. |
| 2013/0080167 A1 | 3/2013 | Mozer |
| 2013/0080177 A1 | 3/2013 | Chen |
| 2013/0080178 A1 | 3/2013 | Kang et al. |
| 2013/0080251 A1 | 3/2013 | Dempski |
| 2013/0082967 A1 | 4/2013 | Hillis et al. |
| 2013/0084882 A1 | 4/2013 | Khorashadi et al. |
| 2013/0085755 A1 | 4/2013 | Bringert et al. |
| 2013/0085761 A1 | 4/2013 | Bringert et al. |
| 2013/0086609 A1 | 4/2013 | Levy et al. |
| 2013/0090921 A1 | 4/2013 | Liu et al. |
| 2013/0091090 A1 | 4/2013 | Spivack et al. |
| 2013/0095805 A1 | 4/2013 | Lebeau et al. |
| 2013/0096909 A1 | 4/2013 | Brun et al. |
| 2013/0096911 A1 | 4/2013 | Beaufort et al. |
| 2013/0096917 A1 | 4/2013 | Edgar et al. |
| 2013/0097566 A1 | 4/2013 | Berglund |
| 2013/0097682 A1 | 4/2013 | Zeljkovic et al. |
| 2013/0100017 A1 | 4/2013 | Papakipos et al. |
| 2013/0100268 A1 | 4/2013 | Mihailidis et al. |
| 2013/0103391 A1 | 4/2013 | Millmore et al. |
| 2013/0103405 A1 | 4/2013 | Namba et al. |
| 2013/0106742 A1 | 5/2013 | Lee et al. |
| 2013/0107053 A1 | 5/2013 | Ozaki |
| 2013/0109412 A1 | 5/2013 | Nguyen et al. |
| 2013/0110505 A1 | 5/2013 | Gruber et al. |
| 2013/0110511 A1 | 5/2013 | Spiegel et al. |
| 2013/0110515 A1 | 5/2013 | Guzzoni et al. |
| 2013/0110518 A1 | 5/2013 | Gruber et al. |
| 2013/0110519 A1 | 5/2013 | Cheyer et al. |
| 2013/0110520 A1 | 5/2013 | Cheyer et al. |
| 2013/0110943 A1 | 5/2013 | Menon et al. |
| 2013/0111330 A1 | 5/2013 | Staikos et al. |
| 2013/0111348 A1 | 5/2013 | Gruber et al. |
| 2013/0111365 A1 | 5/2013 | Chen et al. |
| 2013/0111487 A1 | 5/2013 | Cheyer et al. |
| 2013/0111581 A1 | 5/2013 | Griffin et al. |
| 2013/0115927 A1 | 5/2013 | Gruber et al. |
| 2013/0117022 A1 | 5/2013 | Chen et al. |
| 2013/0124189 A1 | 5/2013 | Baldwin et al. |
| 2013/0124672 A1 | 5/2013 | Pan |
| 2013/0125168 A1 | 5/2013 | Agnihotri et al. |
| 2013/0130669 A1 | 5/2013 | Xiao et al. |
| 2013/0132081 A1 | 5/2013 | Ryu et al. |
| 2013/0132084 A1 | 5/2013 | Stonehocker et al. |
| 2013/0132089 A1 | 5/2013 | Fanty et al. |
| 2013/0132871 A1 | 5/2013 | Zeng et al. |
| 2013/0138440 A1 | 5/2013 | Strope et al. |
| 2013/0141551 A1 | 6/2013 | Kim |
| 2013/0142317 A1 | 6/2013 | Reynolds |
| 2013/0142345 A1 | 6/2013 | Waldmann |
| 2013/0144594 A1 | 6/2013 | Bangalore et al. |
| 2013/0144616 A1 | 6/2013 | Bangalore |
| 2013/0151258 A1 | 6/2013 | Chandrasekar et al. |
| 2013/0151339 A1 | 6/2013 | Kim et al. |
| 2013/0152092 A1 | 6/2013 | Yadgar |
| 2013/0154811 A1 | 6/2013 | Ferren et al. |
| 2013/0155948 A1 | 6/2013 | Pinheiro et al. |
| 2013/0156198 A1 | 6/2013 | Kim et al. |
| 2013/0157629 A1 | 6/2013 | Lee et al. |
| 2013/0158977 A1 | 6/2013 | Senior |
| 2013/0159847 A1 | 6/2013 | Banke et al. |
| 2013/0159861 A1 | 6/2013 | Rottler et al. |
| 2013/0165232 A1 | 6/2013 | Nelson et al. |
| 2013/0166278 A1 | 6/2013 | James et al. |
| 2013/0166303 A1 | 6/2013 | Chang et al. |
| 2013/0166332 A1 | 6/2013 | Hammad |
| 2013/0166442 A1 | 6/2013 | Nakajima et al. |
| 2013/0167242 A1 | 6/2013 | Paliwal |
| 2013/0170738 A1 | 7/2013 | Capuozzo et al. |
| 2013/0172022 A1 | 7/2013 | Seymour et al. |
| 2013/0173258 A1 | 7/2013 | Liu et al. |
| 2013/0173268 A1 | 7/2013 | Weng et al. |
| 2013/0173513 A1 | 7/2013 | Chu et al. |
| 2013/0173610 A1 | 7/2013 | Hu et al. |
| 2013/0173614 A1 | 7/2013 | Ismalon |
| 2013/0174034 A1 | 7/2013 | Brown et al. |
| 2013/0176147 A1 | 7/2013 | Anderson et al. |
| 2013/0176208 A1 | 7/2013 | Tanaka et al. |
| 2013/0176244 A1 | 7/2013 | Yamamoto et al. |
| 2013/0176592 A1 | 7/2013 | Sasaki |
| 2013/0179168 A1 | 7/2013 | Bae et al. |
| 2013/0179172 A1 | 7/2013 | Nakamura et al. |
| 2013/0179440 A1 | 7/2013 | Gordon |
| 2013/0179806 A1 | 7/2013 | Bastide et al. |
| 2013/0183942 A1 | 7/2013 | Novick et al. |
| 2013/0183944 A1 | 7/2013 | Mozer et al. |
| 2013/0185059 A1 | 7/2013 | Riccardi |
| 2013/0185066 A1 | 7/2013 | Tzirkel-Hancock et al. |
| 2013/0185074 A1 | 7/2013 | Gruber et al. |
| 2013/0185081 A1 | 7/2013 | Cheyer et al. |
| 2013/0185336 A1 | 7/2013 | Singh et al. |
| 2013/0187850 A1 | 7/2013 | Schulz et al. |
| 2013/0187857 A1 | 7/2013 | Griffin et al. |
| 2013/0190021 A1 | 7/2013 | Vieri et al. |
| 2013/0191117 A1 | 7/2013 | Atti et al. |
| 2013/0191408 A1 | 7/2013 | Volkert |
| 2013/0197911 A1 | 8/2013 | Wei et al. |
| 2013/0197914 A1 | 8/2013 | Yelvington et al. |
| 2013/0198159 A1 | 8/2013 | Hendry |
| 2013/0198841 A1 | 8/2013 | Poulson |
| 2013/0204813 A1 | 8/2013 | Master et al. |
| 2013/0204897 A1 | 8/2013 | Mcdougall |
| 2013/0204967 A1 | 8/2013 | Seo et al. |
| 2013/0207898 A1 | 8/2013 | Sullivan et al. |
| 2013/0210410 A1 | 8/2013 | Xu |
| 2013/0210492 A1 | 8/2013 | You et al. |
| 2013/0212501 A1 | 8/2013 | Anderson et al. |
| 2013/0218553 A1 | 8/2013 | Fujii et al. |
| 2013/0218560 A1 | 8/2013 | Hsiao et al. |
| 2013/0218574 A1 | 8/2013 | Falcon et al. |
| 2013/0218899 A1 | 8/2013 | Raghavan et al. |
| 2013/0219333 A1 | 8/2013 | Palwe et al. |
| 2013/0222249 A1 | 8/2013 | Pasquero et al. |
| 2013/0223279 A1 | 8/2013 | Tinnakornsrisuphap et al. |
| 2013/0225128 A1 | 8/2013 | Gomar |
| 2013/0226935 A1 | 8/2013 | Bai et al. |
| 2013/0226996 A1 | 8/2013 | Itagaki et al. |
| 2013/0231917 A1 | 9/2013 | Naik |
| 2013/0234947 A1 | 9/2013 | Kristensson et al. |
| 2013/0235987 A1 | 9/2013 | Arroniz-Escobar |
| 2013/0238312 A1 | 9/2013 | Waibel |
| 2013/0238326 A1 | 9/2013 | Kim et al. |
| 2013/0238334 A1 | 9/2013 | Ma et al. |
| 2013/0238540 A1 | 9/2013 | O'Donoghue et al. |
| 2013/0238647 A1 | 9/2013 | Thompson |
| 2013/0238729 A1 | 9/2013 | Holzman et al. |
| 2013/0244615 A1 | 9/2013 | Miller |
| 2013/0244633 A1 | 9/2013 | Jacobs et al. |
| 2013/0246048 A1 | 9/2013 | Nagase et al. |
| 2013/0246050 A1 | 9/2013 | Yu et al. |
| 2013/0246329 A1 | 9/2013 | Pasquero et al. |
| 2013/0253911 A1 | 9/2013 | Petri et al. |
| 2013/0253912 A1 | 9/2013 | Medlock et al. |
| 2013/0260739 A1 | 10/2013 | Saino |
| 2013/0262168 A1 | 10/2013 | Makanawala et al. |
| 2013/0268263 A1 | 10/2013 | Park et al. |
| 2013/0268956 A1 | 10/2013 | Recco |
| 2013/0275117 A1 | 10/2013 | Winer |
| 2013/0275136 A1 | 10/2013 | Czahor |
| 2013/0275138 A1 | 10/2013 | Gruber et al. |
| 2013/0275164 A1 | 10/2013 | Gruber et al. |
| 2013/0275199 A1 | 10/2013 | Proctor et al. |

(56) References Cited

U.S. PATENT DOCUMENTS

| | | |
|---|---|---|
| 2013/0275625 A1 | 10/2013 | Taivalsaari et al. |
| 2013/0275875 A1 | 10/2013 | Gruber et al. |
| 2013/0275899 A1 | 10/2013 | Schubert et al. |
| 2013/0279724 A1 | 10/2013 | Stafford et al. |
| 2013/0282709 A1 | 10/2013 | Zhu et al. |
| 2013/0283168 A1 | 10/2013 | Brown et al. |
| 2013/0283199 A1 | 10/2013 | Selig et al. |
| 2013/0283283 A1 | 10/2013 | Wang et al. |
| 2013/0285913 A1 | 10/2013 | Griffin et al. |
| 2013/0288722 A1 | 10/2013 | Ramanujam et al. |
| 2013/0289991 A1 | 10/2013 | Eshwar et al. |
| 2013/0289993 A1 | 10/2013 | Rao |
| 2013/0289994 A1 | 10/2013 | Newman et al. |
| 2013/0290001 A1 | 10/2013 | Yun et al. |
| 2013/0290222 A1 | 10/2013 | Gordo et al. |
| 2013/0290905 A1 | 10/2013 | Luvogt et al. |
| 2013/0291015 A1 | 10/2013 | Pan |
| 2013/0297078 A1 | 11/2013 | Kolavennu |
| 2013/0297198 A1 | 11/2013 | Velde et al. |
| 2013/0297317 A1 | 11/2013 | Lee et al. |
| 2013/0297319 A1 | 11/2013 | Kim |
| 2013/0297348 A1 | 11/2013 | Cardoza et al. |
| 2013/0300645 A1 | 11/2013 | Fedorov |
| 2013/0300648 A1 | 11/2013 | Kim et al. |
| 2013/0303106 A1 | 11/2013 | Martin |
| 2013/0304476 A1 | 11/2013 | Kim et al. |
| 2013/0304479 A1 | 11/2013 | Teller et al. |
| 2013/0304758 A1 | 11/2013 | Gruber et al. |
| 2013/0304815 A1 | 11/2013 | Puente et al. |
| 2013/0305119 A1 | 11/2013 | Kern et al. |
| 2013/0307855 A1 | 11/2013 | Lamb et al. |
| 2013/0307997 A1 | 11/2013 | O'Keefe et al. |
| 2013/0308922 A1 | 11/2013 | Sano et al. |
| 2013/0311179 A1 | 11/2013 | Wagner |
| 2013/0311184 A1 | 11/2013 | Badavne et al. |
| 2013/0311487 A1 | 11/2013 | Moore et al. |
| 2013/0311997 A1 | 11/2013 | Gruber et al. |
| 2013/0315038 A1 | 11/2013 | Ferren et al. |
| 2013/0316679 A1 | 11/2013 | Miller et al. |
| 2013/0316746 A1 | 11/2013 | Miller et al. |
| 2013/0317921 A1 | 11/2013 | Havas |
| 2013/0318478 A1 | 11/2013 | Ogura |
| 2013/0321267 A1 | 12/2013 | Bhatti et al. |
| 2013/0322634 A1 | 12/2013 | Bennett et al. |
| 2013/0322665 A1 | 12/2013 | Bennett et al. |
| 2013/0325340 A1 | 12/2013 | Forstall et al. |
| 2013/0325436 A1 | 12/2013 | Wang et al. |
| 2013/0325443 A1 | 12/2013 | Begeja et al. |
| 2013/0325447 A1 | 12/2013 | Levien et al. |
| 2013/0325448 A1 | 12/2013 | Levien et al. |
| 2013/0325460 A1 | 12/2013 | Kim et al. |
| 2013/0325480 A1 | 12/2013 | Lee et al. |
| 2013/0325481 A1 | 12/2013 | Van Os et al. |
| 2013/0325484 A1 | 12/2013 | Chakladar et al. |
| 2013/0325844 A1 | 12/2013 | Plaisant |
| 2013/0325967 A1 | 12/2013 | Parks et al. |
| 2013/0325970 A1 | 12/2013 | Roberts et al. |
| 2013/0325979 A1 | 12/2013 | Mansfield et al. |
| 2013/0326576 A1 | 12/2013 | Zhang et al. |
| 2013/0328809 A1 | 12/2013 | Smith |
| 2013/0329023 A1 | 12/2013 | Suplee, III et al. |
| 2013/0331127 A1 | 12/2013 | Sabatelli et al. |
| 2013/0332113 A1 | 12/2013 | Piemonte et al. |
| 2013/0332159 A1 | 12/2013 | Federighi et al. |
| 2013/0332162 A1 | 12/2013 | Keen |
| 2013/0332164 A1 | 12/2013 | Nalk |
| 2013/0332168 A1 | 12/2013 | Kim et al. |
| 2013/0332172 A1 | 12/2013 | Prakash et al. |
| 2013/0332400 A1 | 12/2013 | González |
| 2013/0332538 A1 | 12/2013 | Clark et al. |
| 2013/0332721 A1 | 12/2013 | Chaudhri et al. |
| 2013/0339028 A1 | 12/2013 | Rosner et al. |
| 2013/0339256 A1 | 12/2013 | Shroff |
| 2013/0339454 A1 | 12/2013 | Walker et al. |
| 2013/0339991 A1 | 12/2013 | Ricci |
| 2013/0342672 A1 | 12/2013 | Gray et al. |
| 2013/0343584 A1 | 12/2013 | Bennett et al. |
| 2013/0343721 A1 | 12/2013 | Abecassis |
| 2013/0346065 A1 | 12/2013 | Davidson et al. |
| 2013/0346068 A1 | 12/2013 | Solem et al. |
| 2013/0346347 A1 | 12/2013 | Patterson et al. |
| 2013/0346488 A1 | 12/2013 | Lunt et al. |
| 2013/0347018 A1 | 12/2013 | Limp et al. |
| 2013/0347029 A1 | 12/2013 | Tang et al. |
| 2013/0347102 A1 | 12/2013 | Shi |
| 2013/0347117 A1 | 12/2013 | Parks et al. |
| 2014/0001255 A1 | 1/2014 | Anthoine |
| 2014/0002338 A1 | 1/2014 | Raffa et al. |
| 2014/0006012 A1 | 1/2014 | Zhou et al. |
| 2014/0006025 A1 | 1/2014 | Krishnan et al. |
| 2014/0006027 A1 | 1/2014 | Kim et al. |
| 2014/0006028 A1 | 1/2014 | Hu |
| 2014/0006030 A1 | 1/2014 | Fleizach et al. |
| 2014/0006153 A1 | 1/2014 | Thangam et al. |
| 2014/0006191 A1 | 1/2014 | Shankar et al. |
| 2014/0006483 A1 | 1/2014 | Garmark et al. |
| 2014/0006496 A1 | 1/2014 | Dearman et al. |
| 2014/0006562 A1 | 1/2014 | Handa et al. |
| 2014/0006947 A1 | 1/2014 | Garmark et al. |
| 2014/0006951 A1 | 1/2014 | Hunter |
| 2014/0006955 A1 | 1/2014 | Greenzeiger et al. |
| 2014/0008163 A1 | 1/2014 | Mikonaho et al. |
| 2014/0012574 A1 | 1/2014 | Pasupalak et al. |
| 2014/0012580 A1 | 1/2014 | Ganong, III et al. |
| 2014/0012586 A1 | 1/2014 | Rubin et al. |
| 2014/0012587 A1 | 1/2014 | Park |
| 2014/0013336 A1 | 1/2014 | Yang |
| 2014/0019116 A1 | 1/2014 | Lundberg et al. |
| 2014/0019133 A1 | 1/2014 | Bao et al. |
| 2014/0019460 A1 | 1/2014 | Sambrani et al. |
| 2014/0026037 A1 | 1/2014 | Garb et al. |
| 2014/0028029 A1 | 1/2014 | Jochman |
| 2014/0028477 A1 | 1/2014 | Michalske |
| 2014/0028735 A1 | 1/2014 | Williams et al. |
| 2014/0032453 A1 | 1/2014 | Eustice et al. |
| 2014/0032678 A1 | 1/2014 | Koukoumidis et al. |
| 2014/0033071 A1 | 1/2014 | Gruber et al. |
| 2014/0035823 A1 | 2/2014 | Khoe et al. |
| 2014/0037075 A1 | 2/2014 | Bouzid et al. |
| 2014/0039888 A1 | 2/2014 | Taubman et al. |
| 2014/0039893 A1 | 2/2014 | Weiner et al. |
| 2014/0039894 A1 | 2/2014 | Shostak |
| 2014/0040274 A1 | 2/2014 | Aravamudan et al. |
| 2014/0040748 A1 | 2/2014 | Lemay et al. |
| 2014/0040754 A1 | 2/2014 | Donelli |
| 2014/0040801 A1 | 2/2014 | Patel et al. |
| 2014/0040918 A1 | 2/2014 | Li |
| 2014/0040961 A1 | 2/2014 | Green et al. |
| 2014/0046934 A1 | 2/2014 | Zhou et al. |
| 2014/0047001 A1 | 2/2014 | Phillips et al. |
| 2014/0052451 A1 | 2/2014 | Cheong et al. |
| 2014/0052680 A1 | 2/2014 | Nitz et al. |
| 2014/0052791 A1 | 2/2014 | Chakra et al. |
| 2014/0053082 A1 | 2/2014 | Park |
| 2014/0053101 A1 | 2/2014 | Buehler et al. |
| 2014/0053210 A1 | 2/2014 | Cheong et al. |
| 2014/0057610 A1 | 2/2014 | Olincy et al. |
| 2014/0059030 A1 | 2/2014 | Hakkani-Tur et al. |
| 2014/0059423 A1 | 2/2014 | Gorga et al. |
| 2014/0067361 A1 | 3/2014 | Nikoulina et al. |
| 2014/0067371 A1 | 3/2014 | Liensberger |
| 2014/0067402 A1 | 3/2014 | Kim |
| 2014/0067738 A1 | 3/2014 | Kingsbury |
| 2014/0067740 A1 | 3/2014 | Solari |
| 2014/0068751 A1 | 3/2014 | Last |
| 2014/0074454 A1 | 3/2014 | Brown et al. |
| 2014/0074466 A1 | 3/2014 | Sharifi et al. |
| 2014/0074470 A1 | 3/2014 | Jansche et al. |
| 2014/0074472 A1 | 3/2014 | Lin et al. |
| 2014/0074482 A1 | 3/2014 | Ohno |
| 2014/0074483 A1 | 3/2014 | Van Os |
| 2014/0074589 A1 | 3/2014 | Nielsen et al. |
| 2014/0074815 A1 | 3/2014 | Plimton |
| 2014/0074846 A1 | 3/2014 | Moss et al. |

(56) References Cited

U.S. PATENT DOCUMENTS

| | | |
|---|---|---|
| 2014/0075453 A1 | 3/2014 | Bellessort et al. |
| 2014/0078065 A1 | 3/2014 | Akkok |
| 2014/0079195 A1 | 3/2014 | Srivastava et al. |
| 2014/0080410 A1 | 3/2014 | Jung et al. |
| 2014/0080428 A1 | 3/2014 | Rhoads et al. |
| 2014/0081619 A1 | 3/2014 | Solntseva et al. |
| 2014/0081633 A1 | 3/2014 | Badaskar |
| 2014/0081635 A1 | 3/2014 | Yanagihara |
| 2014/0081829 A1 | 3/2014 | Milne |
| 2014/0081941 A1 | 3/2014 | Bai et al. |
| 2014/0082500 A1 | 3/2014 | Wilensky et al. |
| 2014/0082501 A1 | 3/2014 | Bae et al. |
| 2014/0082545 A1 | 3/2014 | Zhai et al. |
| 2014/0082715 A1 | 3/2014 | Grajek et al. |
| 2014/0086458 A1 | 3/2014 | Rogers |
| 2014/0087711 A1 | 3/2014 | Geyer et al. |
| 2014/0088952 A1 | 3/2014 | Fife et al. |
| 2014/0088961 A1 | 3/2014 | Woodward et al. |
| 2014/0088964 A1 | 3/2014 | Bellegarda |
| 2014/0088970 A1 | 3/2014 | Kang |
| 2014/0092007 A1 | 4/2014 | Kim et al. |
| 2014/0095171 A1 | 4/2014 | Lynch et al. |
| 2014/0095172 A1 | 4/2014 | Cabaco et al. |
| 2014/0095173 A1 | 4/2014 | Lynch et al. |
| 2014/0095432 A1 | 4/2014 | Trumbull et al. |
| 2014/0095601 A1 | 4/2014 | Abuelsaad et al. |
| 2014/0095965 A1 | 4/2014 | Li |
| 2014/0096077 A1 | 4/2014 | Jacob et al. |
| 2014/0096209 A1 | 4/2014 | Saraf et al. |
| 2014/0098247 A1 | 4/2014 | Rao et al. |
| 2014/0100847 A1 | 4/2014 | Ishii et al. |
| 2014/0101127 A1 | 4/2014 | Simhon et al. |
| 2014/0104175 A1 | 4/2014 | Ouyang et al. |
| 2014/0108017 A1 | 4/2014 | Mason et al. |
| 2014/0108357 A1 | 4/2014 | Procops et al. |
| 2014/0108391 A1 | 4/2014 | Volkert |
| 2014/0112556 A1 | 4/2014 | Kalinli-Akbacak |
| 2014/0114554 A1 | 4/2014 | Lagassey |
| 2014/0115062 A1 | 4/2014 | Liu et al. |
| 2014/0115114 A1 | 4/2014 | Garmark et al. |
| 2014/0118155 A1 | 5/2014 | Bowers et al. |
| 2014/0118624 A1 | 5/2014 | Jang et al. |
| 2014/0120961 A1 | 5/2014 | Buck |
| 2014/0122059 A1 | 5/2014 | Patel et al. |
| 2014/0122085 A1 | 5/2014 | Piety et al. |
| 2014/0122086 A1 | 5/2014 | Kapur et al. |
| 2014/0122136 A1 | 5/2014 | Jayanthi |
| 2014/0122153 A1 | 5/2014 | Truitt |
| 2014/0123022 A1 | 5/2014 | Lee et al. |
| 2014/0128021 A1 | 5/2014 | Walker et al. |
| 2014/0129006 A1 | 5/2014 | Chen et al. |
| 2014/0129226 A1 | 5/2014 | Lee et al. |
| 2014/0132935 A1 | 5/2014 | Kim et al. |
| 2014/0134983 A1 | 5/2014 | Jung et al. |
| 2014/0135036 A1 | 5/2014 | Bonanni et al. |
| 2014/0136013 A1 | 5/2014 | Wolverton et al. |
| 2014/0136187 A1 | 5/2014 | Wolverton et al. |
| 2014/0136195 A1 | 5/2014 | Abdossalami et al. |
| 2014/0136212 A1 | 5/2014 | Kwon et al. |
| 2014/0136946 A1 | 5/2014 | Matas |
| 2014/0136987 A1 | 5/2014 | Rodriguez |
| 2014/0142922 A1 | 5/2014 | Liang et al. |
| 2014/0142923 A1 | 5/2014 | Jones et al. |
| 2014/0142935 A1 | 5/2014 | Lindahl et al. |
| 2014/0142953 A1 | 5/2014 | Kim et al. |
| 2014/0143550 A1 | 5/2014 | Ganong, III et al. |
| 2014/0143721 A1 | 5/2014 | Suzuki et al. |
| 2014/0143784 A1 | 5/2014 | Mistry et al. |
| 2014/0146200 A1 | 5/2014 | Scott et al. |
| 2014/0149118 A1 | 5/2014 | Lee et al. |
| 2014/0152577 A1 | 6/2014 | Yuen et al. |
| 2014/0153709 A1 | 6/2014 | Byrd et al. |
| 2014/0155031 A1 | 6/2014 | Lee et al. |
| 2014/0156262 A1 | 6/2014 | Yuen et al. |
| 2014/0156269 A1 | 6/2014 | Lee et al. |
| 2014/0156279 A1 | 6/2014 | Okamoto et al. |
| 2014/0156564 A1 | 6/2014 | Knight et al. |
| 2014/0157319 A1 | 6/2014 | Kimura et al. |
| 2014/0157422 A1 | 6/2014 | Livshits et al. |
| 2014/0163751 A1 | 6/2014 | Davis et al. |
| 2014/0163951 A1 | 6/2014 | Nikoulina et al. |
| 2014/0163953 A1 | 6/2014 | Parikh |
| 2014/0163954 A1 | 6/2014 | Joshi et al. |
| 2014/0163962 A1 | 6/2014 | Castelli et al. |
| 2014/0163976 A1 | 6/2014 | Park et al. |
| 2014/0163977 A1 | 6/2014 | Hoffmeister et al. |
| 2014/0163978 A1 | 6/2014 | Basye et al. |
| 2014/0163981 A1 | 6/2014 | Cook et al. |
| 2014/0163995 A1 | 6/2014 | Burns et al. |
| 2014/0164305 A1 | 6/2014 | Lynch et al. |
| 2014/0164312 A1 | 6/2014 | Lynch et al. |
| 2014/0164476 A1 | 6/2014 | Thomson |
| 2014/0164508 A1 | 6/2014 | Lynch et al. |
| 2014/0164532 A1 | 6/2014 | Lynch et al. |
| 2014/0164533 A1 | 6/2014 | Lynch et al. |
| 2014/0164953 A1 | 6/2014 | Lynch et al. |
| 2014/0169795 A1 | 6/2014 | Clough |
| 2014/0171064 A1 | 6/2014 | Das |
| 2014/0172412 A1 | 6/2014 | Viegas et al. |
| 2014/0172878 A1 | 6/2014 | Clark et al. |
| 2014/0173445 A1 | 6/2014 | Grassiotto |
| 2014/0173460 A1 | 6/2014 | Kim |
| 2014/0176814 A1 | 6/2014 | Ahn |
| 2014/0179295 A1 | 6/2014 | Luebbers et al. |
| 2014/0180499 A1 | 6/2014 | Cooper et al. |
| 2014/0180689 A1 | 6/2014 | Kim |
| 2014/0180697 A1 | 6/2014 | Torok et al. |
| 2014/0181741 A1 | 6/2014 | Apacible et al. |
| 2014/0181865 A1 | 6/2014 | Koganei |
| 2014/0188335 A1 | 7/2014 | Madhok et al. |
| 2014/0188460 A1 | 7/2014 | Ouyang et al. |
| 2014/0188477 A1 | 7/2014 | Zhang |
| 2014/0188478 A1 | 7/2014 | Zhang |
| 2014/0188485 A1 | 7/2014 | Kim et al. |
| 2014/0188835 A1 | 7/2014 | Zhang et al. |
| 2014/0195226 A1 | 7/2014 | Yun et al. |
| 2014/0195230 A1 | 7/2014 | Han et al. |
| 2014/0195233 A1 | 7/2014 | Bapat et al. |
| 2014/0195244 A1 | 7/2014 | Cha et al. |
| 2014/0195251 A1 | 7/2014 | Zeinstra et al. |
| 2014/0195252 A1 | 7/2014 | Gruber et al. |
| 2014/0198048 A1 | 7/2014 | Unruh et al. |
| 2014/0203939 A1 | 7/2014 | Harrington et al. |
| 2014/0205076 A1 | 7/2014 | Kumar et al. |
| 2014/0207439 A1 | 7/2014 | Venkatapathy et al. |
| 2014/0207446 A1 | 7/2014 | Klein et al. |
| 2014/0207447 A1 | 7/2014 | Jiang et al. |
| 2014/0207466 A1 | 7/2014 | Smadi |
| 2014/0207468 A1 | 7/2014 | Bartnik |
| 2014/0207582 A1 | 7/2014 | Flinn et al. |
| 2014/0211944 A1 | 7/2014 | Hayward et al. |
| 2014/0214429 A1 | 7/2014 | Pantel |
| 2014/0214537 A1 | 7/2014 | Yoo et al. |
| 2014/0215367 A1 | 7/2014 | Kim et al. |
| 2014/0215513 A1 | 7/2014 | Ramer et al. |
| 2014/0218372 A1 | 8/2014 | Missig et al. |
| 2014/0222422 A1 | 8/2014 | Sarikaya et al. |
| 2014/0222435 A1 | 8/2014 | Li et al. |
| 2014/0222436 A1 | 8/2014 | Binder et al. |
| 2014/0222678 A1 | 8/2014 | Sheets et al. |
| 2014/0222967 A1 | 8/2014 | Harrang et al. |
| 2014/0223377 A1 | 8/2014 | Shaw et al. |
| 2014/0223481 A1 | 8/2014 | Fundament |
| 2014/0226503 A1 | 8/2014 | Cooper et al. |
| 2014/0229158 A1 | 8/2014 | Zweig et al. |
| 2014/0229184 A1 | 8/2014 | Shires |
| 2014/0230055 A1 | 8/2014 | Boehl |
| 2014/0232570 A1 | 8/2014 | Skinder et al. |
| 2014/0232656 A1 | 8/2014 | Pasquero et al. |
| 2014/0236595 A1 | 8/2014 | Gray |
| 2014/0236986 A1 | 8/2014 | Guzman |
| 2014/0237042 A1 | 8/2014 | Ahmed et al. |
| 2014/0237366 A1 | 8/2014 | Poulos et al. |
| 2014/0244248 A1 | 8/2014 | Arisoy et al. |

(56) References Cited

U.S. PATENT DOCUMENTS

| | | |
|---|---|---|
| 2014/0244249 A1 | 8/2014 | Mohamed et al. |
| 2014/0244254 A1 | 8/2014 | Ju et al. |
| 2014/0244257 A1 | 8/2014 | Colibro et al. |
| 2014/0244258 A1 | 8/2014 | Song et al. |
| 2014/0244263 A1 | 8/2014 | Pontual et al. |
| 2014/0244266 A1 | 8/2014 | Brown et al. |
| 2014/0244268 A1 | 8/2014 | Abdelsamie et al. |
| 2014/0244270 A1 | 8/2014 | Han et al. |
| 2014/0244271 A1 | 8/2014 | Lindahl |
| 2014/0244712 A1 | 8/2014 | Walters et al. |
| 2014/0245140 A1 | 8/2014 | Brown et al. |
| 2014/0247383 A1 | 9/2014 | Dave et al. |
| 2014/0247926 A1 | 9/2014 | Gainsboro et al. |
| 2014/0249812 A1 | 9/2014 | Bou-Ghazale et al. |
| 2014/0249816 A1 | 9/2014 | Pickering et al. |
| 2014/0249817 A1 | 9/2014 | Hart et al. |
| 2014/0249820 A1 | 9/2014 | Hsu et al. |
| 2014/0249821 A1 | 9/2014 | Kennewick et al. |
| 2014/0250046 A1 | 9/2014 | Winn et al. |
| 2014/0257809 A1 | 9/2014 | Goel et al. |
| 2014/0257815 A1 | 9/2014 | Zhao et al. |
| 2014/0257902 A1 | 9/2014 | Moore et al. |
| 2014/0258324 A1 | 9/2014 | Mauro et al. |
| 2014/0258357 A1 | 9/2014 | Singh et al. |
| 2014/0258857 A1 | 9/2014 | Dykstra-Erickson et al. |
| 2014/0258905 A1 | 9/2014 | Lee et al. |
| 2014/0267022 A1 | 9/2014 | Kim |
| 2014/0267599 A1 | 9/2014 | Drouin et al. |
| 2014/0267933 A1 | 9/2014 | Young |
| 2014/0272821 A1 | 9/2014 | Pitschel et al. |
| 2014/0273979 A1 | 9/2014 | Van Os et al. |
| 2014/0274005 A1 | 9/2014 | Luna et al. |
| 2014/0274203 A1 | 9/2014 | Ganong, III et al. |
| 2014/0274211 A1 | 9/2014 | Sejnoha et al. |
| 2014/0278051 A1 | 9/2014 | Mcgavran et al. |
| 2014/0278343 A1 | 9/2014 | Tran |
| 2014/0278349 A1 | 9/2014 | Grieves et al. |
| 2014/0278379 A1 | 9/2014 | Coccaro et al. |
| 2014/0278390 A1 | 9/2014 | Kingsbury et al. |
| 2014/0278391 A1 | 9/2014 | Braho et al. |
| 2014/0278394 A1 | 9/2014 | Bastyr et al. |
| 2014/0278406 A1 | 9/2014 | Tsumura et al. |
| 2014/0278413 A1 | 9/2014 | Pitschel et al. |
| 2014/0278426 A1 | 9/2014 | Jost et al. |
| 2014/0278429 A1 | 9/2014 | Ganong, III |
| 2014/0278435 A1 | 9/2014 | Ganong, III et al. |
| 2014/0278436 A1 | 9/2014 | Khanna et al. |
| 2014/0278438 A1 | 9/2014 | Hart et al. |
| 2014/0278443 A1 | 9/2014 | Gunn et al. |
| 2014/0278444 A1 | 9/2014 | Larson et al. |
| 2014/0278513 A1 | 9/2014 | Prakash et al. |
| 2014/0279622 A1 | 9/2014 | Lamoureux et al. |
| 2014/0279739 A1 | 9/2014 | Elkington et al. |
| 2014/0279787 A1 | 9/2014 | Cheng et al. |
| 2014/0280072 A1 | 9/2014 | Coleman |
| 2014/0280107 A1 | 9/2014 | Heymans et al. |
| 2014/0280138 A1 | 9/2014 | Li et al. |
| 2014/0280292 A1 | 9/2014 | Skinder |
| 2014/0280353 A1 | 9/2014 | Delaney et al. |
| 2014/0280450 A1 | 9/2014 | Luna |
| 2014/0280757 A1 | 9/2014 | Tran |
| 2014/0281944 A1 | 9/2014 | Winer |
| 2014/0281983 A1 | 9/2014 | Xian et al. |
| 2014/0281997 A1 | 9/2014 | Fleizach et al. |
| 2014/0282003 A1 | 9/2014 | Gruber et al. |
| 2014/0282007 A1 | 9/2014 | Fleizach |
| 2014/0282045 A1 | 9/2014 | Ayanam et al. |
| 2014/0282178 A1 | 9/2014 | Borzello et al. |
| 2014/0282201 A1 | 9/2014 | Pasquero et al. |
| 2014/0282203 A1 | 9/2014 | Pasquero et al. |
| 2014/0282559 A1 | 9/2014 | Verduzco et al. |
| 2014/0282586 A1 | 9/2014 | Shear et al. |
| 2014/0282743 A1 | 9/2014 | Howard et al. |
| 2014/0288990 A1 | 9/2014 | Moore et al. |
| 2014/0289508 A1 | 9/2014 | Wang |
| 2014/0297267 A1 | 10/2014 | Spencer et al. |
| 2014/0297281 A1 | 10/2014 | Togawa et al. |
| 2014/0297284 A1 | 10/2014 | Gruber et al. |
| 2014/0297288 A1 | 10/2014 | Yu et al. |
| 2014/0298395 A1 | 10/2014 | Yang et al. |
| 2014/0304086 A1 | 10/2014 | Dasdan et al. |
| 2014/0304605 A1 | 10/2014 | Ohmura et al. |
| 2014/0309990 A1 | 10/2014 | Gandrabur et al. |
| 2014/0309996 A1 | 10/2014 | Zhang |
| 2014/0310001 A1 | 10/2014 | Kalns et al. |
| 2014/0310002 A1 | 10/2014 | Nitz et al. |
| 2014/0310348 A1 | 10/2014 | Keskitalo et al. |
| 2014/0310365 A1 | 10/2014 | Sample et al. |
| 2014/0310595 A1 | 10/2014 | Acharya et al. |
| 2014/0313007 A1 | 10/2014 | Harding |
| 2014/0315492 A1 | 10/2014 | Woods |
| 2014/0316585 A1 | 10/2014 | Boesveld et al. |
| 2014/0317030 A1 | 10/2014 | Shen et al. |
| 2014/0317502 A1 | 10/2014 | Brown et al. |
| 2014/0324429 A1 | 10/2014 | Weilhammer et al. |
| 2014/0324884 A1 | 10/2014 | Lindahl et al. |
| 2014/0330560 A1 | 11/2014 | Venkatesha et al. |
| 2014/0330569 A1 | 11/2014 | Kolavennu et al. |
| 2014/0330951 A1 | 11/2014 | Sukoff et al. |
| 2014/0335823 A1 | 11/2014 | Heredia et al. |
| 2014/0337037 A1 | 11/2014 | Chi |
| 2014/0337048 A1 | 11/2014 | Brown et al. |
| 2014/0337266 A1 | 11/2014 | Wolverton et al. |
| 2014/0337370 A1 | 11/2014 | Aravamudan et al. |
| 2014/0337371 A1 | 11/2014 | Li |
| 2014/0337438 A1 | 11/2014 | Govande et al. |
| 2014/0337621 A1 | 11/2014 | Nakhimov |
| 2014/0337751 A1 | 11/2014 | Lim et al. |
| 2014/0337814 A1 | 11/2014 | Kalns et al. |
| 2014/0342762 A1 | 11/2014 | Hajdu et al. |
| 2014/0343834 A1 | 11/2014 | Demerchant et al. |
| 2014/0343943 A1 | 11/2014 | Al-Telmissani |
| 2014/0343946 A1 | 11/2014 | Torok et al. |
| 2014/0344205 A1 | 11/2014 | Luna et al. |
| 2014/0344627 A1 | 11/2014 | Schaub et al. |
| 2014/0344687 A1 | 11/2014 | Durham et al. |
| 2014/0347181 A1 | 11/2014 | Luna et al. |
| 2014/0350847 A1 | 11/2014 | Ichinokawa |
| 2014/0350924 A1 | 11/2014 | Zurek et al. |
| 2014/0350933 A1 | 11/2014 | Bak et al. |
| 2014/0351741 A1 | 11/2014 | Medlock et al. |
| 2014/0351760 A1 | 11/2014 | Skory et al. |
| 2014/0358519 A1 | 12/2014 | Mirkin et al. |
| 2014/0358521 A1 | 12/2014 | Mikutel et al. |
| 2014/0358523 A1 | 12/2014 | Sheth et al. |
| 2014/0358549 A1 | 12/2014 | O'Connor et al. |
| 2014/0359637 A1 | 12/2014 | Yan |
| 2014/0359709 A1 | 12/2014 | Nassar et al. |
| 2014/0361973 A1 | 12/2014 | Raux et al. |
| 2014/0363074 A1 | 12/2014 | Dolfing et al. |
| 2014/0364149 A1 | 12/2014 | Marti et al. |
| 2014/0365209 A1 | 12/2014 | Evermann |
| 2014/0365214 A1 | 12/2014 | Bayley |
| 2014/0365216 A1 | 12/2014 | Gruber et al. |
| 2014/0365226 A1 | 12/2014 | Sinha |
| 2014/0365227 A1 | 12/2014 | Cash et al. |
| 2014/0365407 A1 | 12/2014 | Brown et al. |
| 2014/0365505 A1 | 12/2014 | Clark et al. |
| 2014/0365880 A1 | 12/2014 | Bellegarda |
| 2014/0365885 A1 | 12/2014 | Carson et al. |
| 2014/0365895 A1 | 12/2014 | Magahern et al. |
| 2014/0365922 A1 | 12/2014 | Yang |
| 2014/0365945 A1 | 12/2014 | Karunamuni et al. |
| 2014/0370817 A1 | 12/2014 | Luna |
| 2014/0370841 A1 | 12/2014 | Roberts et al. |
| 2014/0372112 A1 | 12/2014 | Xue et al. |
| 2014/0372356 A1 | 12/2014 | Bilal et al. |
| 2014/0372468 A1 | 12/2014 | Collins et al. |
| 2014/0372931 A1 | 12/2014 | Zhai et al. |
| 2014/0379326 A1 | 12/2014 | Sarikaya et al. |
| 2014/0379334 A1 | 12/2014 | Fry |
| 2014/0379338 A1 | 12/2014 | Fry |
| 2014/0379341 A1 | 12/2014 | Seo et al. |
| 2014/0379798 A1 | 12/2014 | Bunner et al. |

(56) References Cited

U.S. PATENT DOCUMENTS

| | | |
|---|---|---|
| 2014/0380285 A1 | 12/2014 | Gabel et al. |
| 2015/0003797 A1 | 1/2015 | Schmidt |
| 2015/0004958 A1 | 1/2015 | Wang et al. |
| 2015/0005009 A1 | 1/2015 | Tomkins et al. |
| 2015/0006148 A1 | 1/2015 | Goldszmit et al. |
| 2015/0006157 A1 | 1/2015 | Silva et al. |
| 2015/0006167 A1 | 1/2015 | Kato et al. |
| 2015/0006176 A1 | 1/2015 | Pogue et al. |
| 2015/0006178 A1 | 1/2015 | Peng et al. |
| 2015/0006184 A1 | 1/2015 | Marti et al. |
| 2015/0006199 A1 | 1/2015 | Snider et al. |
| 2015/0012271 A1 | 1/2015 | Peng et al. |
| 2015/0012862 A1 | 1/2015 | Ikeda et al. |
| 2015/0019219 A1 | 1/2015 | Tzirkel-Hancock et al. |
| 2015/0019221 A1 | 1/2015 | Lee et al. |
| 2015/0019445 A1 | 1/2015 | Glass et al. |
| 2015/0019944 A1 | 1/2015 | Kalgi |
| 2015/0019954 A1 | 1/2015 | Dalal et al. |
| 2015/0019974 A1 | 1/2015 | Doi et al. |
| 2015/0025405 A1 | 1/2015 | Vairavan et al. |
| 2015/0025890 A1 | 1/2015 | Jagatheesan et al. |
| 2015/0026620 A1 | 1/2015 | Kwon et al. |
| 2015/0027178 A1 | 1/2015 | Scalisi |
| 2015/0031416 A1 | 1/2015 | Labowicz et al. |
| 2015/0032443 A1 | 1/2015 | Karov et al. |
| 2015/0032457 A1 | 1/2015 | Koo et al. |
| 2015/0033219 A1 | 1/2015 | Breiner et al. |
| 2015/0033275 A1 | 1/2015 | Natani et al. |
| 2015/0034855 A1 | 2/2015 | Shen |
| 2015/0038161 A1 | 2/2015 | Jakobson et al. |
| 2015/0039292 A1 | 2/2015 | Suleman et al. |
| 2015/0039295 A1 | 2/2015 | Soschen |
| 2015/0039299 A1 | 2/2015 | Weinstein et al. |
| 2015/0039305 A1 | 2/2015 | Huang |
| 2015/0039606 A1 | 2/2015 | Salaka et al. |
| 2015/0040012 A1 | 2/2015 | Faaborg et al. |
| 2015/0045003 A1 | 2/2015 | Vora et al. |
| 2015/0045007 A1 | 2/2015 | Cash |
| 2015/0045068 A1 | 2/2015 | Soffer et al. |
| 2015/0046434 A1 | 2/2015 | Lim et al. |
| 2015/0046537 A1 | 2/2015 | Rakib |
| 2015/0046828 A1 | 2/2015 | Desai et al. |
| 2015/0050633 A1 | 2/2015 | Christmas et al. |
| 2015/0050923 A1 | 2/2015 | Tu et al. |
| 2015/0051754 A1 | 2/2015 | Kwon et al. |
| 2015/0053779 A1 | 2/2015 | Adamek et al. |
| 2015/0053781 A1 | 2/2015 | Nelson et al. |
| 2015/0055879 A1 | 2/2015 | Yang |
| 2015/0058013 A1 | 2/2015 | Pakhomov et al. |
| 2015/0058018 A1 | 2/2015 | Georges et al. |
| 2015/0058720 A1 | 2/2015 | Smadja et al. |
| 2015/0058785 A1 | 2/2015 | Ookawara |
| 2015/0065149 A1 | 3/2015 | Russell et al. |
| 2015/0065200 A1 | 3/2015 | Namgung et al. |
| 2015/0066479 A1 | 3/2015 | Pasupalak et al. |
| 2015/0066494 A1 | 3/2015 | Salvador et al. |
| 2015/0066496 A1 | 3/2015 | Deoras et al. |
| 2015/0066506 A1 | 3/2015 | Romano et al. |
| 2015/0066516 A1 | 3/2015 | Nishikawa et al. |
| 2015/0066817 A1 | 3/2015 | Slayton et al. |
| 2015/0067485 A1 | 3/2015 | Kim et al. |
| 2015/0067819 A1 | 3/2015 | Shribman et al. |
| 2015/0067822 A1 | 3/2015 | Randall |
| 2015/0071121 A1 | 3/2015 | Patil et al. |
| 2015/0073788 A1 | 3/2015 | Sak et al. |
| 2015/0073804 A1 | 3/2015 | Senior et al. |
| 2015/0074524 A1 | 3/2015 | Nicholson et al. |
| 2015/0074615 A1 | 3/2015 | Han et al. |
| 2015/0081295 A1 | 3/2015 | Yun et al. |
| 2015/0082180 A1 | 3/2015 | Ames et al. |
| 2015/0082229 A1 | 3/2015 | Ouyang et al. |
| 2015/0086174 A1 | 3/2015 | Abecassis et al. |
| 2015/0088511 A1 | 3/2015 | Bharadwaj et al. |
| 2015/0088514 A1 | 3/2015 | Typrin |
| 2015/0088518 A1 | 3/2015 | Kim et al. |
| 2015/0088522 A1 | 3/2015 | Hendrickson et al. |
| 2015/0088523 A1 | 3/2015 | Schuster |
| 2015/0088998 A1 | 3/2015 | Isensee et al. |
| 2015/0092520 A1 | 4/2015 | Robison et al. |
| 2015/0094834 A1 | 4/2015 | Vega et al. |
| 2015/0095031 A1 | 4/2015 | Conkie et al. |
| 2015/0095159 A1 | 4/2015 | Kennewick et al. |
| 2015/0095268 A1 | 4/2015 | Greenzeiger et al. |
| 2015/0095278 A1 | 4/2015 | Flinn et al. |
| 2015/0100144 A1 | 4/2015 | Lee et al. |
| 2015/0100313 A1 | 4/2015 | Sharma |
| 2015/0100316 A1 | 4/2015 | Williams et al. |
| 2015/0100537 A1 | 4/2015 | Grieves et al. |
| 2015/0100983 A1 | 4/2015 | Pan |
| 2015/0106061 A1 | 4/2015 | Yang et al. |
| 2015/0106085 A1 | 4/2015 | Lindahl |
| 2015/0106093 A1 | 4/2015 | Weeks et al. |
| 2015/0106737 A1 | 4/2015 | Montoy-Wilson et al. |
| 2015/0112684 A1 | 4/2015 | Scheffer et al. |
| 2015/0113407 A1 | 4/2015 | Hoffert et al. |
| 2015/0113435 A1 | 4/2015 | Phillips |
| 2015/0120296 A1 | 4/2015 | Stern et al. |
| 2015/0120641 A1 | 4/2015 | Soon-Shiong et al. |
| 2015/0120723 A1 | 4/2015 | Deshmukh et al. |
| 2015/0121216 A1 | 4/2015 | Brown et al. |
| 2015/0123898 A1 | 5/2015 | Kim et al. |
| 2015/0127337 A1 | 5/2015 | Heigold et al. |
| 2015/0127348 A1 | 5/2015 | Follis |
| 2015/0127350 A1 | 5/2015 | Agiomyrgiannakis |
| 2015/0128058 A1 | 5/2015 | Anajwala |
| 2015/0133049 A1 | 5/2015 | Lee et al. |
| 2015/0133109 A1 | 5/2015 | Freeman et al. |
| 2015/0134318 A1 | 5/2015 | Cuthbert et al. |
| 2015/0134322 A1 | 5/2015 | Cuthbert et al. |
| 2015/0134323 A1 | 5/2015 | Cuthbert et al. |
| 2015/0134334 A1 | 5/2015 | Sachidanandam et al. |
| 2015/0135085 A1 | 5/2015 | Shoham et al. |
| 2015/0135123 A1 | 5/2015 | Carr et al. |
| 2015/0140934 A1 | 5/2015 | Abdurrahman et al. |
| 2015/0140990 A1 | 5/2015 | Kim et al. |
| 2015/0141150 A1 | 5/2015 | Zha |
| 2015/0142420 A1 | 5/2015 | Sarikaya et al. |
| 2015/0142438 A1 | 5/2015 | Dai et al. |
| 2015/0142440 A1 | 5/2015 | Parkinson et al. |
| 2015/0142447 A1 | 5/2015 | Kennewick et al. |
| 2015/0142851 A1 | 5/2015 | Gupta et al. |
| 2015/0143419 A1 | 5/2015 | Bhagwat et al. |
| 2015/0148013 A1 | 5/2015 | Baldwin et al. |
| 2015/0149177 A1 | 5/2015 | Kalns et al. |
| 2015/0149182 A1 | 5/2015 | Kalns et al. |
| 2015/0149354 A1 | 5/2015 | Mccoy |
| 2015/0149469 A1 | 5/2015 | Xu et al. |
| 2015/0149899 A1 | 5/2015 | Bernstein et al. |
| 2015/0149964 A1 | 5/2015 | Bernstein et al. |
| 2015/0154001 A1 | 6/2015 | Knox et al. |
| 2015/0154185 A1 | 6/2015 | Waibel |
| 2015/0154976 A1 | 6/2015 | Mutagi |
| 2015/0160855 A1 | 6/2015 | Bi |
| 2015/0161291 A1 | 6/2015 | Gur et al. |
| 2015/0161370 A1 | 6/2015 | North et al. |
| 2015/0161521 A1 | 6/2015 | Shah et al. |
| 2015/0161989 A1 | 6/2015 | Hsu et al. |
| 2015/0162000 A1 | 6/2015 | Di Censo et al. |
| 2015/0162001 A1 | 6/2015 | Kar et al. |
| 2015/0162006 A1 | 6/2015 | Kummer |
| 2015/0163558 A1 | 6/2015 | Wheatley |
| 2015/0169081 A1 | 6/2015 | Neels et al. |
| 2015/0169284 A1 | 6/2015 | Quast et al. |
| 2015/0169336 A1 | 6/2015 | Harper et al. |
| 2015/0169696 A1 | 6/2015 | Krishnappa et al. |
| 2015/0170073 A1 | 6/2015 | Baker |
| 2015/0170664 A1 | 6/2015 | Doherty et al. |
| 2015/0172262 A1 | 6/2015 | Ortiz, Jr. et al. |
| 2015/0172463 A1 | 6/2015 | Quast et al. |
| 2015/0178388 A1 | 6/2015 | Winnemoeller et al. |
| 2015/0178785 A1 | 6/2015 | Salonen |
| 2015/0179168 A1 | 6/2015 | Hakkani-Tur et al. |
| 2015/0179176 A1 | 6/2015 | Ryu et al. |
| 2015/0181285 A1 | 6/2015 | Zhang et al. |

(56) References Cited

U.S. PATENT DOCUMENTS

| | | |
|---|---|---|
| 2015/0185964 A1 | 7/2015 | Stout |
| 2015/0185993 A1 | 7/2015 | Wheatley et al. |
| 2015/0185996 A1 | 7/2015 | Brown et al. |
| 2015/0186012 A1 | 7/2015 | Coleman et al. |
| 2015/0186110 A1 | 7/2015 | Kannan |
| 2015/0186154 A1 | 7/2015 | Brown et al. |
| 2015/0186155 A1 | 7/2015 | Brown et al. |
| 2015/0186156 A1 | 7/2015 | Brown et al. |
| 2015/0186351 A1 | 7/2015 | Hicks et al. |
| 2015/0186538 A1 | 7/2015 | Yan et al. |
| 2015/0186783 A1 | 7/2015 | Byrne et al. |
| 2015/0186892 A1 | 7/2015 | Zhang et al. |
| 2015/0187355 A1 | 7/2015 | Parkinson et al. |
| 2015/0187369 A1 | 7/2015 | Dadu et al. |
| 2015/0189362 A1 | 7/2015 | Lee et al. |
| 2015/0193379 A1 | 7/2015 | Mehta |
| 2015/0193391 A1 | 7/2015 | Khvostichenko et al. |
| 2015/0193392 A1 | 7/2015 | Greenblatt et al. |
| 2015/0194152 A1 | 7/2015 | Katuri et al. |
| 2015/0194165 A1 | 7/2015 | Faaborg et al. |
| 2015/0195379 A1 | 7/2015 | Zhang et al. |
| 2015/0195606 A1 | 7/2015 | Mcdevitt |
| 2015/0199077 A1 | 7/2015 | Zuger et al. |
| 2015/0199960 A1 | 7/2015 | Huo et al. |
| 2015/0199965 A1 | 7/2015 | Leak et al. |
| 2015/0199967 A1 | 7/2015 | Reddy et al. |
| 2015/0200879 A1 | 7/2015 | Wu et al. |
| 2015/0201064 A1 | 7/2015 | Bells et al. |
| 2015/0201077 A1 | 7/2015 | Konig et al. |
| 2015/0205425 A1 | 7/2015 | Kuscher et al. |
| 2015/0205568 A1 | 7/2015 | Matsuoka |
| 2015/0205632 A1 | 7/2015 | Gaster |
| 2015/0205858 A1 | 7/2015 | Xie et al. |
| 2015/0206529 A1 | 7/2015 | Kwon et al. |
| 2015/0208226 A1 | 7/2015 | Kuusilinna et al. |
| 2015/0212791 A1 | 7/2015 | Kumar et al. |
| 2015/0213140 A1 | 7/2015 | Volkert |
| 2015/0213796 A1 | 7/2015 | Waltermann et al. |
| 2015/0215258 A1 | 7/2015 | Nowakowski et al. |
| 2015/0215350 A1 | 7/2015 | Slayton et al. |
| 2015/0217870 A1 | 8/2015 | Mccullough et al. |
| 2015/0220264 A1 | 8/2015 | Lewis et al. |
| 2015/0220507 A1 | 8/2015 | Mohajer et al. |
| 2015/0220715 A1 | 8/2015 | Kim et al. |
| 2015/0220972 A1 | 8/2015 | Subramanya et al. |
| 2015/0221302 A1 | 8/2015 | Han et al. |
| 2015/0221304 A1 | 8/2015 | Stewart |
| 2015/0221307 A1 | 8/2015 | Shah et al. |
| 2015/0222586 A1 | 8/2015 | Ebersman et al. |
| 2015/0224848 A1 | 8/2015 | Eisenhour |
| 2015/0227505 A1 | 8/2015 | Morimoto |
| 2015/0227633 A1 | 8/2015 | Shapira |
| 2015/0228274 A1 | 8/2015 | Leppanen et al. |
| 2015/0228275 A1 | 8/2015 | Watanabe et al. |
| 2015/0228281 A1 | 8/2015 | Raniere |
| 2015/0228282 A1 | 8/2015 | Evrard |
| 2015/0228283 A1 | 8/2015 | Ehsani et al. |
| 2015/0228292 A1 | 8/2015 | Goldstein et al. |
| 2015/0230095 A1 | 8/2015 | Smith et al. |
| 2015/0234556 A1 | 8/2015 | Shaofeng et al. |
| 2015/0234636 A1 | 8/2015 | Barnes, Jr. |
| 2015/0234800 A1 | 8/2015 | Ehlen et al. |
| 2015/0235434 A1 | 8/2015 | Miller et al. |
| 2015/0237301 A1 | 8/2015 | Shi et al. |
| 2015/0242091 A1 | 8/2015 | Lu et al. |
| 2015/0242385 A1 | 8/2015 | Bao et al. |
| 2015/0243278 A1 | 8/2015 | Kibre et al. |
| 2015/0243279 A1 | 8/2015 | Morse et al. |
| 2015/0243283 A1 | 8/2015 | Halash et al. |
| 2015/0244665 A1 | 8/2015 | Choi et al. |
| 2015/0245154 A1 | 8/2015 | Dadu et al. |
| 2015/0248651 A1 | 9/2015 | Akutagawa et al. |
| 2015/0248886 A1 | 9/2015 | Sarikaya et al. |
| 2015/0249715 A1 | 9/2015 | Helvik et al. |
| 2015/0253146 A1 | 9/2015 | Annapureddy et al. |
| 2015/0253885 A1 | 9/2015 | Kagan et al. |
| 2015/0254057 A1 | 9/2015 | Klein et al. |
| 2015/0254058 A1 | 9/2015 | Klein et al. |
| 2015/0254333 A1 | 9/2015 | Fife et al. |
| 2015/0255068 A1 | 9/2015 | Kim et al. |
| 2015/0255071 A1 | 9/2015 | Chiba |
| 2015/0256873 A1 | 9/2015 | Klein et al. |
| 2015/0261298 A1 | 9/2015 | Li |
| 2015/0261496 A1 | 9/2015 | Faaborg et al. |
| 2015/0261850 A1 | 9/2015 | Mittal |
| 2015/0261944 A1 | 9/2015 | Hosom et al. |
| 2015/0262583 A1 | 9/2015 | Kanda et al. |
| 2015/0269139 A1 | 9/2015 | Mcateer et al. |
| 2015/0269617 A1 | 9/2015 | Mikurak |
| 2015/0269677 A1 | 9/2015 | Milne |
| 2015/0269943 A1 | 9/2015 | VanBlon et al. |
| 2015/0277574 A1 | 10/2015 | Jain et al. |
| 2015/0278199 A1 | 10/2015 | Hazen et al. |
| 2015/0278348 A1 | 10/2015 | Paruchuri et al. |
| 2015/0278370 A1 | 10/2015 | Stratvert et al. |
| 2015/0278737 A1 | 10/2015 | Chen et al. |
| 2015/0279358 A1 | 10/2015 | Kingsbury et al. |
| 2015/0279360 A1 | 10/2015 | Mengibar et al. |
| 2015/0279366 A1 | 10/2015 | Krestnikov et al. |
| 2015/0281380 A1 | 10/2015 | Wang et al. |
| 2015/0281401 A1 | 10/2015 | Le et al. |
| 2015/0286627 A1 | 10/2015 | Chang et al. |
| 2015/0286716 A1 | 10/2015 | Snibbe et al. |
| 2015/0286937 A1 | 10/2015 | Hildebrand |
| 2015/0287401 A1 | 10/2015 | Lee et al. |
| 2015/0287408 A1 | 10/2015 | Svendsen et al. |
| 2015/0287409 A1 | 10/2015 | Jang |
| 2015/0287411 A1 | 10/2015 | Kojima et al. |
| 2015/0288629 A1 | 10/2015 | Choi et al. |
| 2015/0294086 A1 | 10/2015 | Kare et al. |
| 2015/0294377 A1 | 10/2015 | Chow |
| 2015/0294516 A1 | 10/2015 | Chiang |
| 2015/0294670 A1 | 10/2015 | Roblek et al. |
| 2015/0295915 A1 | 10/2015 | Xiu |
| 2015/0296065 A1 | 10/2015 | Narita et al. |
| 2015/0301796 A1 | 10/2015 | Visser et al. |
| 2015/0302316 A1 | 10/2015 | Buryak et al. |
| 2015/0302855 A1 | 10/2015 | Kim et al. |
| 2015/0302856 A1 | 10/2015 | Kim et al. |
| 2015/0302857 A1 | 10/2015 | Yamada |
| 2015/0302870 A1 | 10/2015 | Burke et al. |
| 2015/0308470 A1 | 10/2015 | Graham et al. |
| 2015/0309691 A1 | 10/2015 | Seo et al. |
| 2015/0309997 A1 | 10/2015 | Lee et al. |
| 2015/0310114 A1 | 10/2015 | Ryger et al. |
| 2015/0310858 A1 | 10/2015 | Li et al. |
| 2015/0310862 A1 | 10/2015 | Dauphin et al. |
| 2015/0310879 A1 | 10/2015 | Buchanan et al. |
| 2015/0310888 A1 | 10/2015 | Chen |
| 2015/0312182 A1 | 10/2015 | Langholz |
| 2015/0312409 A1 | 10/2015 | Czarnecki et al. |
| 2015/0314454 A1 | 11/2015 | Breazeal et al. |
| 2015/0317069 A1 | 11/2015 | Clements et al. |
| 2015/0317310 A1 | 11/2015 | Eiche et al. |
| 2015/0319264 A1 | 11/2015 | Allen et al. |
| 2015/0319411 A1 | 11/2015 | Kasmir et al. |
| 2015/0324041 A1 | 11/2015 | Varley et al. |
| 2015/0324334 A1 | 11/2015 | Lee et al. |
| 2015/0324362 A1 | 11/2015 | Glass et al. |
| 2015/0331664 A1 | 11/2015 | Osawa et al. |
| 2015/0331711 A1 | 11/2015 | Huang et al. |
| 2015/0332667 A1 | 11/2015 | Mason |
| 2015/0334346 A1 | 11/2015 | Cheatham, III et al. |
| 2015/0339049 A1 | 11/2015 | Kasemset et al. |
| 2015/0339391 A1 | 11/2015 | Kang et al. |
| 2015/0340033 A1 | 11/2015 | Di Fabbrizio et al. |
| 2015/0340034 A1 | 11/2015 | Schalkwyk et al. |
| 2015/0340040 A1 | 11/2015 | Mun et al. |
| 2015/0340042 A1 | 11/2015 | Sejnoha et al. |
| 2015/0341717 A1 | 11/2015 | Song et al. |
| 2015/0346845 A1 | 12/2015 | Di Censo et al. |
| 2015/0347086 A1 | 12/2015 | Liedholm et al. |
| 2015/0347381 A1 | 12/2015 | Bellegarda |
| 2015/0347382 A1 | 12/2015 | Dolfing et al. |

(56) References Cited

U.S. PATENT DOCUMENTS

| | | |
|---|---|---|
| 2015/0347383 A1 | 12/2015 | Willmore et al. |
| 2015/0347385 A1 | 12/2015 | Flor et al. |
| 2015/0347393 A1 | 12/2015 | Futrell et al. |
| 2015/0347552 A1 | 12/2015 | Habouzit et al. |
| 2015/0347733 A1 | 12/2015 | Tsou et al. |
| 2015/0347985 A1 | 12/2015 | Gross et al. |
| 2015/0348533 A1 | 12/2015 | Saddler et al. |
| 2015/0348547 A1 | 12/2015 | Paulik et al. |
| 2015/0348548 A1 | 12/2015 | Piernot et al. |
| 2015/0348549 A1 | 12/2015 | Giuli et al. |
| 2015/0348551 A1 | 12/2015 | Gruber et al. |
| 2015/0348554 A1 | 12/2015 | Orr et al. |
| 2015/0348555 A1 | 12/2015 | Sugita |
| 2015/0348565 A1 | 12/2015 | Rhoten et al. |
| 2015/0349934 A1 | 12/2015 | Pollack et al. |
| 2015/0350031 A1 | 12/2015 | Burks et al. |
| 2015/0350342 A1 | 12/2015 | Thorpe et al. |
| 2015/0350594 A1 | 12/2015 | Mate et al. |
| 2015/0352999 A1 | 12/2015 | Bando et al. |
| 2015/0355879 A1 | 12/2015 | Beckhardt et al. |
| 2015/0356410 A1 | 12/2015 | Faith et al. |
| 2015/0363587 A1 | 12/2015 | Ahn et al. |
| 2015/0364128 A1 | 12/2015 | Zhao et al. |
| 2015/0364140 A1 | 12/2015 | Thörn |
| 2015/0365251 A1 | 12/2015 | Kinoshita et al. |
| 2015/0370531 A1 | 12/2015 | Faaborg |
| 2015/0370780 A1 | 12/2015 | Wang et al. |
| 2015/0370787 A1 | 12/2015 | Akbacak et al. |
| 2015/0370884 A1 | 12/2015 | Hurley et al. |
| 2015/0371215 A1 | 12/2015 | Zhou et al. |
| 2015/0371529 A1 | 12/2015 | Dolecki |
| 2015/0371639 A1 | 12/2015 | Foerster et al. |
| 2015/0371663 A1 | 12/2015 | Gustafson et al. |
| 2015/0371664 A1 | 12/2015 | Bar-Or et al. |
| 2015/0371665 A1 | 12/2015 | Naik et al. |
| 2015/0373183 A1 | 12/2015 | Woolsey et al. |
| 2015/0379118 A1 | 12/2015 | Wickenkamp et al. |
| 2015/0379414 A1 | 12/2015 | Yeh et al. |
| 2015/0379993 A1 | 12/2015 | Subhojit et al. |
| 2015/0381923 A1 | 12/2015 | Wickenkamp et al. |
| 2015/0382047 A1 | 12/2015 | Van Os et al. |
| 2015/0382079 A1 | 12/2015 | Lister et al. |
| 2015/0382147 A1 | 12/2015 | Clark et al. |
| 2016/0004499 A1 | 1/2016 | Kim et al. |
| 2016/0004690 A1 | 1/2016 | Bangalore et al. |
| 2016/0005320 A1 | 1/2016 | DeCharms et al. |
| 2016/0006795 A1 | 1/2016 | Yunten |
| 2016/0012038 A1 | 1/2016 | Edwards et al. |
| 2016/0014476 A1 | 1/2016 | Caliendo, Jr. et al. |
| 2016/0018872 A1 | 1/2016 | Tu et al. |
| 2016/0018900 A1 | 1/2016 | Tu et al. |
| 2016/0018959 A1 | 1/2016 | Yamashita et al. |
| 2016/0019886 A1 | 1/2016 | Hong |
| 2016/0019896 A1 | 1/2016 | Alvarez Guevara et al. |
| 2016/0021414 A1 | 1/2016 | Padi et al. |
| 2016/0026242 A1 | 1/2016 | Burns et al. |
| 2016/0026258 A1 | 1/2016 | Ou et al. |
| 2016/0027431 A1 | 1/2016 | Kurzweil et al. |
| 2016/0028666 A1 | 1/2016 | Li |
| 2016/0028802 A1 | 1/2016 | Balasingh et al. |
| 2016/0029316 A1 | 1/2016 | Mohan et al. |
| 2016/0034042 A1 | 2/2016 | Joo |
| 2016/0034811 A1 | 2/2016 | Paulik et al. |
| 2016/0036750 A1 | 2/2016 | Yuan et al. |
| 2016/0036953 A1 | 2/2016 | Lee et al. |
| 2016/0041809 A1 | 2/2016 | Clayton et al. |
| 2016/0042735 A1 | 2/2016 | Vibbert et al. |
| 2016/0042748 A1 | 2/2016 | Jain et al. |
| 2016/0043905 A1 | 2/2016 | Fiedler |
| 2016/0048666 A1 | 2/2016 | Dey et al. |
| 2016/0050254 A1 | 2/2016 | Rao et al. |
| 2016/0055422 A1 | 2/2016 | Li |
| 2016/0061623 A1 | 3/2016 | Pahwa et al. |
| 2016/0062459 A1 | 3/2016 | Publicover et al. |
| 2016/0062605 A1 | 3/2016 | Agarwal et al. |
| 2016/0063094 A1 | 3/2016 | Udupa et al. |
| 2016/0063095 A1 | 3/2016 | Nassar et al. |
| 2016/0063998 A1 | 3/2016 | Krishnamoorthy et al. |
| 2016/0065155 A1 | 3/2016 | Bharj et al. |
| 2016/0065626 A1 | 3/2016 | Jain et al. |
| 2016/0066020 A1 | 3/2016 | Mountain |
| 2016/0070581 A1 | 3/2016 | Soon-Shiong |
| 2016/0071516 A1 | 3/2016 | Lee et al. |
| 2016/0071517 A1 | 3/2016 | Beaver et al. |
| 2016/0071521 A1 | 3/2016 | Haughay |
| 2016/0072940 A1 | 3/2016 | Cronin |
| 2016/0077794 A1 | 3/2016 | Kim et al. |
| 2016/0078359 A1 | 3/2016 | Csurka et al. |
| 2016/0078860 A1 | 3/2016 | Paulik et al. |
| 2016/0080165 A1 | 3/2016 | Ehsani et al. |
| 2016/0080475 A1 | 3/2016 | Singh et al. |
| 2016/0085295 A1 | 3/2016 | Shimy et al. |
| 2016/0085827 A1 | 3/2016 | Chadha et al. |
| 2016/0086116 A1 | 3/2016 | Rao et al. |
| 2016/0086599 A1 | 3/2016 | Kurata et al. |
| 2016/0088335 A1 | 3/2016 | Zucchetta |
| 2016/0091871 A1 | 3/2016 | Marti et al. |
| 2016/0091967 A1 | 3/2016 | Prokofieva et al. |
| 2016/0092046 A1 | 3/2016 | Hong et al. |
| 2016/0092434 A1 | 3/2016 | Bellegarda |
| 2016/0092447 A1 | 3/2016 | Pathurudeen et al. |
| 2016/0092766 A1 | 3/2016 | Sainath et al. |
| 2016/0093291 A1 | 3/2016 | Kim |
| 2016/0093298 A1 | 3/2016 | Naik et al. |
| 2016/0093301 A1 | 3/2016 | Bellegarda et al. |
| 2016/0093304 A1 | 3/2016 | Kim et al. |
| 2016/0094700 A1 | 3/2016 | Lee et al. |
| 2016/0094889 A1 | 3/2016 | Venkataraman et al. |
| 2016/0094979 A1 | 3/2016 | Naik et al. |
| 2016/0098991 A1 | 4/2016 | Luo et al. |
| 2016/0098992 A1 | 4/2016 | Renard et al. |
| 2016/0099892 A1 | 4/2016 | Palakovich et al. |
| 2016/0099984 A1 | 4/2016 | Karagiannis et al. |
| 2016/0104480 A1 | 4/2016 | Sharifi |
| 2016/0104486 A1 | 4/2016 | Penilla et al. |
| 2016/0111091 A1 | 4/2016 | Bakish |
| 2016/0112746 A1 | 4/2016 | Zhang et al. |
| 2016/0112792 A1 | 4/2016 | Lee et al. |
| 2016/0117386 A1 | 4/2016 | Ajmera et al. |
| 2016/0118048 A1 | 4/2016 | Heide |
| 2016/0119338 A1 | 4/2016 | Cheyer |
| 2016/0125048 A1 | 5/2016 | Hamada |
| 2016/0125071 A1 | 5/2016 | Gabbai |
| 2016/0132046 A1 | 5/2016 | Beoughter et al. |
| 2016/0132290 A1 | 5/2016 | Raux |
| 2016/0132484 A1 | 5/2016 | Nauze et al. |
| 2016/0132488 A1 | 5/2016 | Clark et al. |
| 2016/0133254 A1 | 5/2016 | Vogel et al. |
| 2016/0139662 A1 | 5/2016 | Dabhade |
| 2016/0140951 A1 | 5/2016 | Agiomyrgiannakis et al. |
| 2016/0140962 A1 | 5/2016 | Sharifi |
| 2016/0147725 A1 | 5/2016 | Patten et al. |
| 2016/0148610 A1 | 5/2016 | Kennewick, Jr. et al. |
| 2016/0148612 A1 | 5/2016 | Guo et al. |
| 2016/0149966 A1 | 5/2016 | Remash et al. |
| 2016/0150020 A1 | 5/2016 | Farmer et al. |
| 2016/0151668 A1 | 6/2016 | Barnes et al. |
| 2016/0154624 A1 | 6/2016 | Son et al. |
| 2016/0154880 A1 | 6/2016 | Hoarty |
| 2016/0155442 A1 | 6/2016 | Kannan et al. |
| 2016/0155443 A1 | 6/2016 | Khan et al. |
| 2016/0156574 A1 | 6/2016 | Hum et al. |
| 2016/0162456 A1 | 6/2016 | Munro et al. |
| 2016/0163311 A1 | 6/2016 | Crook et al. |
| 2016/0163312 A1 | 6/2016 | Naik et al. |
| 2016/0170710 A1 | 6/2016 | Kim et al. |
| 2016/0170966 A1 | 6/2016 | Kolo |
| 2016/0171980 A1 | 6/2016 | Liddell et al. |
| 2016/0173578 A1 | 6/2016 | Sharma et al. |
| 2016/0173617 A1 | 6/2016 | Allinson |
| 2016/0173960 A1 | 6/2016 | Snibbe et al. |
| 2016/0179462 A1 | 6/2016 | Bjorkengren |
| 2016/0179464 A1 | 6/2016 | Reddy et al. |
| 2016/0179787 A1 | 6/2016 | Deleeuw |

(56) References Cited

U.S. PATENT DOCUMENTS

| | | |
|---|---|---|
| 2016/0180840 A1 | 6/2016 | Siddiq et al. |
| 2016/0180844 A1 | 6/2016 | Vanblon et al. |
| 2016/0182410 A1 | 6/2016 | Janakiraman et al. |
| 2016/0182709 A1 | 6/2016 | Kim et al. |
| 2016/0188181 A1 | 6/2016 | Smith |
| 2016/0188738 A1 | 6/2016 | Gruber et al. |
| 2016/0189198 A1 | 6/2016 | Daniel et al. |
| 2016/0189715 A1 | 6/2016 | Nishikawa |
| 2016/0189717 A1 | 6/2016 | Kannan et al. |
| 2016/0196110 A1 | 7/2016 | Yehoshua et al. |
| 2016/0198319 A1 | 7/2016 | Huang et al. |
| 2016/0203002 A1 | 7/2016 | Kannan et al. |
| 2016/0203193 A1 | 7/2016 | Kevin et al. |
| 2016/0210551 A1 | 7/2016 | Lee et al. |
| 2016/0210981 A1 | 7/2016 | Lee |
| 2016/0212206 A1 | 7/2016 | Wu et al. |
| 2016/0212208 A1 | 7/2016 | Kulkarni et al. |
| 2016/0212488 A1 | 7/2016 | Os et al. |
| 2016/0217784 A1 | 7/2016 | Gelfenbeyn et al. |
| 2016/0217794 A1 | 7/2016 | Imoto et al. |
| 2016/0224540 A1 | 8/2016 | Stewart et al. |
| 2016/0224559 A1 | 8/2016 | Hicks et al. |
| 2016/0224774 A1 | 8/2016 | Pender |
| 2016/0225372 A1 | 8/2016 | Cheung et al. |
| 2016/0227107 A1 | 8/2016 | Beaumont |
| 2016/0227633 A1 | 8/2016 | Sun et al. |
| 2016/0232500 A1 | 8/2016 | Wang et al. |
| 2016/0239568 A1 | 8/2016 | Packer et al. |
| 2016/0239645 A1 | 8/2016 | Heo et al. |
| 2016/0239848 A1 | 8/2016 | Chang et al. |
| 2016/0240187 A1 | 8/2016 | Fleizach et al. |
| 2016/0240189 A1 | 8/2016 | Lee et al. |
| 2016/0240192 A1 | 8/2016 | Raghuvir |
| 2016/0247061 A1 | 8/2016 | Trask et al. |
| 2016/0249319 A1 | 8/2016 | Dotan-Cohen et al. |
| 2016/0253312 A1 | 9/2016 | Rhodes |
| 2016/0253528 A1 | 9/2016 | Gao et al. |
| 2016/0259623 A1 | 9/2016 | Sumner et al. |
| 2016/0259656 A1 | 9/2016 | Sumner et al. |
| 2016/0259779 A1 | 9/2016 | Labský et al. |
| 2016/0260431 A1 | 9/2016 | Newendorp et al. |
| 2016/0260433 A1 | 9/2016 | Sumner et al. |
| 2016/0260434 A1 | 9/2016 | Gelfenbeyn et al. |
| 2016/0260436 A1 | 9/2016 | Lemay et al. |
| 2016/0262442 A1 | 9/2016 | Davila et al. |
| 2016/0266871 A1 | 9/2016 | Schmid et al. |
| 2016/0267904 A1 | 9/2016 | Biadsy et al. |
| 2016/0269540 A1 | 9/2016 | Butcher et al. |
| 2016/0274938 A1 | 9/2016 | Strinati et al. |
| 2016/0275941 A1 | 9/2016 | Bellegarda et al. |
| 2016/0275947 A1 | 9/2016 | Li et al. |
| 2016/0282824 A1 | 9/2016 | Smallwood et al. |
| 2016/0282956 A1 | 9/2016 | Ouyang et al. |
| 2016/0283185 A1 | 9/2016 | Mclaren et al. |
| 2016/0284005 A1 | 9/2016 | Daniel et al. |
| 2016/0284199 A1 | 9/2016 | Dotan-Cohen et al. |
| 2016/0285808 A1 | 9/2016 | Franklin et al. |
| 2016/0286045 A1 | 9/2016 | Shaltiel et al. |
| 2016/0293157 A1 | 10/2016 | Chen et al. |
| 2016/0293167 A1 | 10/2016 | Chen et al. |
| 2016/0293168 A1 | 10/2016 | Chen |
| 2016/0294755 A1 | 10/2016 | Prabhu |
| 2016/0299685 A1 | 10/2016 | Zhai et al. |
| 2016/0299882 A1 | 10/2016 | Hegerty et al. |
| 2016/0299883 A1 | 10/2016 | Zhu et al. |
| 2016/0299977 A1 | 10/2016 | Hreha |
| 2016/0300571 A1 | 10/2016 | Foerster et al. |
| 2016/0301639 A1 | 10/2016 | Liu et al. |
| 2016/0306683 A1 | 10/2016 | Standley et al. |
| 2016/0307566 A1 | 10/2016 | Bellegarda |
| 2016/0308799 A1 | 10/2016 | Schubert et al. |
| 2016/0309035 A1 | 10/2016 | Li |
| 2016/0313906 A1 | 10/2016 | Kilchenko et al. |
| 2016/0314788 A1 | 10/2016 | Jitkoff et al. |
| 2016/0314789 A1 | 10/2016 | Marcheret et al. |
| 2016/0314792 A1 | 10/2016 | Alvarez et al. |
| 2016/0315996 A1 | 10/2016 | Ha et al. |
| 2016/0316349 A1 | 10/2016 | Lee et al. |
| 2016/0317924 A1 | 11/2016 | Tanaka et al. |
| 2016/0321239 A1 | 11/2016 | Iso-Sipiläet al. |
| 2016/0321261 A1 | 11/2016 | Spasojevic et al. |
| 2016/0321358 A1 | 11/2016 | Kanani et al. |
| 2016/0322043 A1 | 11/2016 | Bellegarda |
| 2016/0322044 A1 | 11/2016 | Jung et al. |
| 2016/0322045 A1 | 11/2016 | Hatfield et al. |
| 2016/0322048 A1 | 11/2016 | Amano et al. |
| 2016/0322050 A1 | 11/2016 | Wang et al. |
| 2016/0322055 A1 | 11/2016 | Sainath et al. |
| 2016/0328147 A1 | 11/2016 | Zhang et al. |
| 2016/0328205 A1 | 11/2016 | Agrawal et al. |
| 2016/0328893 A1 | 11/2016 | Cordova et al. |
| 2016/0329060 A1 | 11/2016 | Ito et al. |
| 2016/0334973 A1 | 11/2016 | Reckhow et al. |
| 2016/0335138 A1 | 11/2016 | Surti et al. |
| 2016/0335139 A1 | 11/2016 | Hurley et al. |
| 2016/0335532 A1 | 11/2016 | Sanghavi et al. |
| 2016/0336007 A1 | 11/2016 | Hanazawa et al. |
| 2016/0336010 A1 | 11/2016 | Lindahl |
| 2016/0336011 A1 | 11/2016 | Koll et al. |
| 2016/0336024 A1 | 11/2016 | Choi et al. |
| 2016/0337299 A1 | 11/2016 | Lane et al. |
| 2016/0337301 A1 | 11/2016 | Rollins et al. |
| 2016/0342317 A1 | 11/2016 | Lim et al. |
| 2016/0342685 A1 | 11/2016 | Basu et al. |
| 2016/0342781 A1 | 11/2016 | Jeon |
| 2016/0350650 A1 | 12/2016 | Leeman-Munk et al. |
| 2016/0350812 A1 | 12/2016 | Priness et al. |
| 2016/0351190 A1 | 12/2016 | Piernot et al. |
| 2016/0352567 A1 | 12/2016 | Robbins et al. |
| 2016/0352924 A1 | 12/2016 | Senarath et al. |
| 2016/0357304 A1 | 12/2016 | Hatori et al. |
| 2016/0357728 A1 | 12/2016 | Bellegarda et al. |
| 2016/0357790 A1 | 12/2016 | Elkington et al. |
| 2016/0357861 A1 | 12/2016 | Carlhian et al. |
| 2016/0357870 A1 | 12/2016 | Hentschel et al. |
| 2016/0358598 A1 | 12/2016 | Williams et al. |
| 2016/0358600 A1 | 12/2016 | Nallasamy et al. |
| 2016/0358619 A1 | 12/2016 | Ramprashad et al. |
| 2016/0359771 A1 | 12/2016 | Sridhar |
| 2016/0360039 A1 | 12/2016 | Sanghavi et al. |
| 2016/0360336 A1 | 12/2016 | Gross et al. |
| 2016/0360382 A1 | 12/2016 | Gross et al. |
| 2016/0364378 A1 | 12/2016 | Futrell et al. |
| 2016/0365101 A1 | 12/2016 | Foy et al. |
| 2016/0371250 A1 | 12/2016 | Rhodes |
| 2016/0372112 A1 | 12/2016 | Miller et al. |
| 2016/0372119 A1 | 12/2016 | Sak et al. |
| 2016/0378747 A1 | 12/2016 | Orr et al. |
| 2016/0379091 A1 | 12/2016 | Lin et al. |
| 2016/0379626 A1 | 12/2016 | Deisher et al. |
| 2016/0379632 A1 | 12/2016 | Hoffmeister et al. |
| 2016/0379633 A1 | 12/2016 | Lehman et al. |
| 2016/0379639 A1 | 12/2016 | Weinstein et al. |
| 2016/0379641 A1 | 12/2016 | Liu et al. |
| 2017/0000348 A1 | 1/2017 | Karsten et al. |
| 2017/0003931 A1 | 1/2017 | Dvortsov et al. |
| 2017/0004209 A1 | 1/2017 | Johl et al. |
| 2017/0004824 A1 | 1/2017 | Yoo et al. |
| 2017/0005818 A1 | 1/2017 | Gould |
| 2017/0006329 A1 | 1/2017 | Jang et al. |
| 2017/0011091 A1 | 1/2017 | Chehreghani |
| 2017/0011279 A1 | 1/2017 | Soldevila et al. |
| 2017/0011303 A1 | 1/2017 | Annapureddy et al. |
| 2017/0011742 A1 | 1/2017 | Jing et al. |
| 2017/0013124 A1 | 1/2017 | Havelka et al. |
| 2017/0013331 A1 | 1/2017 | Watanabe et al. |
| 2017/0018271 A1 | 1/2017 | Khan et al. |
| 2017/0019987 A1 | 1/2017 | Dragone et al. |
| 2017/0023963 A1 | 1/2017 | Davis et al. |
| 2017/0025124 A1 | 1/2017 | Mixter et al. |
| 2017/0026318 A1 | 1/2017 | Daniel et al. |
| 2017/0026509 A1 | 1/2017 | Rand |
| 2017/0027522 A1 | 2/2017 | Van Hasselt et al. |
| 2017/0031576 A1 | 2/2017 | Saoji et al. |

(56) References Cited

U.S. PATENT DOCUMENTS

| | | |
|---|---|---|
| 2017/0032783 A1 | 2/2017 | Lord et al. |
| 2017/0032787 A1 | 2/2017 | Dayal |
| 2017/0032791 A1 | 2/2017 | Elson et al. |
| 2017/0039283 A1 | 2/2017 | Bennett et al. |
| 2017/0039475 A1 | 2/2017 | Cheyer et al. |
| 2017/0040002 A1 | 2/2017 | Basson et al. |
| 2017/0041388 A1 | 2/2017 | Tal et al. |
| 2017/0047063 A1 | 2/2017 | Ohmura et al. |
| 2017/0052760 A1 | 2/2017 | Johnson et al. |
| 2017/0053652 A1 | 2/2017 | Choi et al. |
| 2017/0055895 A1 | 3/2017 | Des Jardins et al. |
| 2017/0060853 A1 | 3/2017 | Lee et al. |
| 2017/0061423 A1 | 3/2017 | Bryant et al. |
| 2017/0068423 A1 | 3/2017 | Napolitano et al. |
| 2017/0068513 A1 | 3/2017 | Stasior et al. |
| 2017/0068550 A1 | 3/2017 | Zeitlin |
| 2017/0068670 A1 | 3/2017 | Orr et al. |
| 2017/0069308 A1 | 3/2017 | Aleksic et al. |
| 2017/0069321 A1 | 3/2017 | Toiyama |
| 2017/0075653 A1 | 3/2017 | Dawidowsky et al. |
| 2017/0076518 A1 | 3/2017 | Patterson et al. |
| 2017/0076720 A1 | 3/2017 | Gopalan et al. |
| 2017/0076721 A1 | 3/2017 | Bargetzi et al. |
| 2017/0078490 A1 | 3/2017 | Kaminsky et al. |
| 2017/0083179 A1 | 3/2017 | Gruber et al. |
| 2017/0083285 A1 | 3/2017 | Meyers et al. |
| 2017/0083504 A1 | 3/2017 | Huang |
| 2017/0084277 A1 | 3/2017 | Sharifi |
| 2017/0085547 A1 | 3/2017 | De Aguiar et al. |
| 2017/0085696 A1 | 3/2017 | Abkairov |
| 2017/0090428 A1 | 3/2017 | Oohara |
| 2017/0090569 A1 | 3/2017 | Levesque |
| 2017/0091168 A1 | 3/2017 | Bellegarda et al. |
| 2017/0091169 A1 | 3/2017 | Bellegarda et al. |
| 2017/0091612 A1 | 3/2017 | Gruber et al. |
| 2017/0092259 A1 | 3/2017 | Jeon |
| 2017/0092270 A1 | 3/2017 | Newendorp et al. |
| 2017/0092278 A1 | 3/2017 | Evermann et al. |
| 2017/0093356 A1 | 3/2017 | Cudak et al. |
| 2017/0097743 A1 | 4/2017 | Hameed et al. |
| 2017/0102837 A1 | 4/2017 | Toumpelis |
| 2017/0102915 A1 | 4/2017 | Kuscher et al. |
| 2017/0103749 A1 | 4/2017 | Zhao et al. |
| 2017/0103752 A1 | 4/2017 | Senior et al. |
| 2017/0105190 A1 | 4/2017 | Logan et al. |
| 2017/0110117 A1 | 4/2017 | Chakladar et al. |
| 2017/0110125 A1 | 4/2017 | Xu et al. |
| 2017/0116177 A1 | 4/2017 | Walia |
| 2017/0116982 A1 | 4/2017 | Gelfenbeyn et al. |
| 2017/0116987 A1 | 4/2017 | Kang et al. |
| 2017/0116989 A1 | 4/2017 | Yadgar et al. |
| 2017/0124190 A1 | 5/2017 | Wang et al. |
| 2017/0124311 A1 | 5/2017 | Li et al. |
| 2017/0124531 A1 | 5/2017 | McCormack |
| 2017/0125016 A1 | 5/2017 | Wang |
| 2017/0127124 A9 | 5/2017 | Wilson et al. |
| 2017/0131778 A1 | 5/2017 | Iyer |
| 2017/0132019 A1 | 5/2017 | Karashchuk et al. |
| 2017/0132199 A1 | 5/2017 | Vescovi et al. |
| 2017/0133007 A1 | 5/2017 | Drewes |
| 2017/0140041 A1 | 5/2017 | Dotan-Cohen et al. |
| 2017/0140052 A1 | 5/2017 | Bufe, III et al. |
| 2017/0140644 A1 | 5/2017 | Hwang et al. |
| 2017/0140760 A1 | 5/2017 | Sachdev |
| 2017/0147722 A1 | 5/2017 | Greenwood |
| 2017/0147841 A1 | 5/2017 | Stagg et al. |
| 2017/0148044 A1 | 5/2017 | Fukuda et al. |
| 2017/0154033 A1 | 6/2017 | Lee |
| 2017/0154055 A1 | 6/2017 | Dimson et al. |
| 2017/0154628 A1 | 6/2017 | Mohajer et al. |
| 2017/0155940 A1 | 6/2017 | Jin et al. |
| 2017/0155965 A1 | 6/2017 | Ward |
| 2017/0161018 A1 | 6/2017 | Lemay et al. |
| 2017/0161268 A1 | 6/2017 | Badaskar |
| 2017/0161293 A1 | 6/2017 | Ionescu et al. |
| 2017/0161393 A1 | 6/2017 | Oh et al. |
| 2017/0161500 A1 | 6/2017 | Yang |
| 2017/0162191 A1 | 6/2017 | Grost et al. |
| 2017/0162202 A1 | 6/2017 | Anthony et al. |
| 2017/0162203 A1 | 6/2017 | Huang et al. |
| 2017/0169506 A1 | 6/2017 | Wishne et al. |
| 2017/0169818 A1 | 6/2017 | Vanblon et al. |
| 2017/0169819 A1 | 6/2017 | Mese et al. |
| 2017/0177080 A1 | 6/2017 | Deleeuw |
| 2017/0177547 A1 | 6/2017 | Ciereszko et al. |
| 2017/0178619 A1 | 6/2017 | Naik et al. |
| 2017/0178620 A1 | 6/2017 | Fleizach et al. |
| 2017/0178626 A1 | 6/2017 | Gruber et al. |
| 2017/0178666 A1 | 6/2017 | Yu |
| 2017/0180499 A1 | 6/2017 | Gelfenbeyn et al. |
| 2017/0185375 A1 | 6/2017 | Martel et al. |
| 2017/0185581 A1 | 6/2017 | Bojja et al. |
| 2017/0186429 A1 | 6/2017 | Giuli et al. |
| 2017/0187711 A1 | 6/2017 | Joo et al. |
| 2017/0193083 A1 | 7/2017 | Bhatt et al. |
| 2017/0195493 A1 | 7/2017 | Sudarsan et al. |
| 2017/0195495 A1 | 7/2017 | Deora et al. |
| 2017/0195636 A1 | 7/2017 | Child et al. |
| 2017/0199870 A1 | 7/2017 | Zheng et al. |
| 2017/0199874 A1 | 7/2017 | Patel et al. |
| 2017/0200066 A1 | 7/2017 | Wang et al. |
| 2017/0201609 A1 | 7/2017 | Salmenkaita et al. |
| 2017/0201613 A1 | 7/2017 | Engelke et al. |
| 2017/0206899 A1 | 7/2017 | Bryant et al. |
| 2017/0215052 A1 | 7/2017 | Koum et al. |
| 2017/0220212 A1 | 8/2017 | Yang et al. |
| 2017/0221486 A1 | 8/2017 | Kurata et al. |
| 2017/0223189 A1 | 8/2017 | Meredith et al. |
| 2017/0227935 A1 | 8/2017 | Su et al. |
| 2017/0228367 A1 | 8/2017 | Pasupalak et al. |
| 2017/0228382 A1 | 8/2017 | Haviv et al. |
| 2017/0229121 A1 | 8/2017 | Taki et al. |
| 2017/0230429 A1 | 8/2017 | Garmark et al. |
| 2017/0230497 A1 | 8/2017 | Kim et al. |
| 2017/0230709 A1 | 8/2017 | Van Os et al. |
| 2017/0235361 A1 | 8/2017 | Rigazio et al. |
| 2017/0235618 A1 | 8/2017 | Lin et al. |
| 2017/0235721 A1 | 8/2017 | Almosallam et al. |
| 2017/0236512 A1 | 8/2017 | Williams et al. |
| 2017/0236514 A1 | 8/2017 | Nelson |
| 2017/0238039 A1 | 8/2017 | Sabattini |
| 2017/0242478 A1 | 8/2017 | Ma |
| 2017/0242653 A1 | 8/2017 | Lang et al. |
| 2017/0242657 A1 | 8/2017 | Jarvis et al. |
| 2017/0242840 A1 | 8/2017 | Lu et al. |
| 2017/0243468 A1 | 8/2017 | Dotan-Cohen et al. |
| 2017/0243576 A1 | 8/2017 | Millington et al. |
| 2017/0243583 A1 | 8/2017 | Raichelgauz et al. |
| 2017/0243586 A1 | 8/2017 | Civelli et al. |
| 2017/0249309 A1 | 8/2017 | Sarikaya |
| 2017/0256256 A1 | 9/2017 | Wang et al. |
| 2017/0262051 A1 | 9/2017 | Tall et al. |
| 2017/0263247 A1 | 9/2017 | Kang et al. |
| 2017/0263248 A1 | 9/2017 | Gruber et al. |
| 2017/0263249 A1 | 9/2017 | Akbacak et al. |
| 2017/0263254 A1 | 9/2017 | Dewan et al. |
| 2017/0264451 A1 | 9/2017 | Yu et al. |
| 2017/0264711 A1 | 9/2017 | Natarajan et al. |
| 2017/0270715 A1 | 9/2017 | Lindsay et al. |
| 2017/0270822 A1 | 9/2017 | Cohen |
| 2017/0270912 A1 | 9/2017 | Levit et al. |
| 2017/0278513 A1 | 9/2017 | Li et al. |
| 2017/0278514 A1 | 9/2017 | Mathias et al. |
| 2017/0285915 A1 | 10/2017 | Napolitano et al. |
| 2017/0286397 A1 | 10/2017 | Gonzalez |
| 2017/0287472 A1 | 10/2017 | Ogawa et al. |
| 2017/0289305 A1 | 10/2017 | Liensberger et al. |
| 2017/0295446 A1 | 10/2017 | Shivappa |
| 2017/0301348 A1 | 10/2017 | Chen et al. |
| 2017/0308552 A1 | 10/2017 | Soni et al. |
| 2017/0308609 A1 | 10/2017 | Berkhin et al. |
| 2017/0311005 A1 | 10/2017 | Lin |
| 2017/0316775 A1 | 11/2017 | Le et al. |
| 2017/0316782 A1 | 11/2017 | Haughay |

(56) References Cited

U.S. PATENT DOCUMENTS

| | | |
|---|---|---|
| 2017/0319123 A1 | 11/2017 | Voss et al. |
| 2017/0323637 A1 | 11/2017 | Naik |
| 2017/0329466 A1 | 11/2017 | Krenkler et al. |
| 2017/0329490 A1 | 11/2017 | Esinovskaya et al. |
| 2017/0329572 A1 | 11/2017 | Shah et al. |
| 2017/0329630 A1 | 11/2017 | Jann et al. |
| 2017/0330567 A1 | 11/2017 | Van Wissen et al. |
| 2017/0336920 A1 | 11/2017 | Chan et al. |
| 2017/0337035 A1 | 11/2017 | Choudhary et al. |
| 2017/0337478 A1 | 11/2017 | Sarikaya et al. |
| 2017/0345411 A1 | 11/2017 | Raitio et al. |
| 2017/0345420 A1 | 11/2017 | Barnett, Jr. |
| 2017/0345429 A1 | 11/2017 | Hardee et al. |
| 2017/0346949 A1 | 11/2017 | Sanghavi et al. |
| 2017/0347180 A1 | 11/2017 | Petrank |
| 2017/0351487 A1 | 12/2017 | Avilés-Casco et al. |
| 2017/0352346 A1 | 12/2017 | Paulik et al. |
| 2017/0352350 A1 | 12/2017 | Booker et al. |
| 2017/0357478 A1 | 12/2017 | Piersol et al. |
| 2017/0357529 A1 | 12/2017 | Venkatraman et al. |
| 2017/0357632 A1 | 12/2017 | Pagallo et al. |
| 2017/0357633 A1 | 12/2017 | Wang et al. |
| 2017/0357637 A1 | 12/2017 | Nell et al. |
| 2017/0357640 A1 | 12/2017 | Bellegarda et al. |
| 2017/0357716 A1 | 12/2017 | Bellegarda et al. |
| 2017/0358300 A1 | 12/2017 | Laurens et al. |
| 2017/0358301 A1 | 12/2017 | Raitio et al. |
| 2017/0358302 A1 | 12/2017 | Orr et al. |
| 2017/0358303 A1 | 12/2017 | Walker, II et al. |
| 2017/0358304 A1 | 12/2017 | Castillo et al. |
| 2017/0358305 A1 | 12/2017 | Kudurshian et al. |
| 2017/0358317 A1 | 12/2017 | James |
| 2017/0359680 A1 | 12/2017 | Ledvina et al. |
| 2017/0365251 A1 | 12/2017 | Park et al. |
| 2017/0371509 A1 | 12/2017 | Jung et al. |
| 2017/0371885 A1 | 12/2017 | Aggarwal et al. |
| 2017/0374093 A1 | 12/2017 | Dhar et al. |
| 2017/0374176 A1 | 12/2017 | Agrawal et al. |
| 2018/0004372 A1 | 1/2018 | Zurek et al. |
| 2018/0004396 A1 | 1/2018 | Ying |
| 2018/0005112 A1 | 1/2018 | Iso-Sipila et al. |
| 2018/0007060 A1 | 1/2018 | Leblang et al. |
| 2018/0007096 A1 | 1/2018 | Levin et al. |
| 2018/0007538 A1 | 1/2018 | Naik et al. |
| 2018/0012596 A1 | 1/2018 | Piernot et al. |
| 2018/0018248 A1 | 1/2018 | Bhargava et al. |
| 2018/0018590 A1 | 1/2018 | Szeto et al. |
| 2018/0018814 A1 | 1/2018 | Patrik et al. |
| 2018/0024985 A1 | 1/2018 | Asano |
| 2018/0025124 A1 | 1/2018 | Mohr et al. |
| 2018/0025287 A1 | 1/2018 | Mathew et al. |
| 2018/0028918 A1 | 2/2018 | Tang et al. |
| 2018/0033431 A1 | 2/2018 | Newendorp et al. |
| 2018/0033435 A1 | 2/2018 | Jacobs, II |
| 2018/0033436 A1 | 2/2018 | Zhou |
| 2018/0045963 A1 | 2/2018 | Hoover et al. |
| 2018/0046340 A1 | 2/2018 | Mall |
| 2018/0047201 A1 | 2/2018 | Filev et al. |
| 2018/0047391 A1 | 2/2018 | Baik et al. |
| 2018/0047393 A1 | 2/2018 | Tian et al. |
| 2018/0047406 A1 | 2/2018 | Park |
| 2018/0052909 A1 | 2/2018 | Sharifi et al. |
| 2018/0054505 A1 | 2/2018 | Hart et al. |
| 2018/0060032 A1 | 3/2018 | Boesen |
| 2018/0060301 A1 | 3/2018 | Li et al. |
| 2018/0060312 A1 | 3/2018 | Won |
| 2018/0060555 A1 | 3/2018 | Boesen |
| 2018/0061400 A1 | 3/2018 | Carbune et al. |
| 2018/0061401 A1 | 3/2018 | Sarikaya et al. |
| 2018/0062691 A1 | 3/2018 | Barnett, Jr. |
| 2018/0063308 A1 | 3/2018 | Crystal et al. |
| 2018/0063324 A1 | 3/2018 | Van, II |
| 2018/0063624 A1 | 3/2018 | Boesen |
| 2018/0067904 A1 | 3/2018 | Li |
| 2018/0067914 A1 | 3/2018 | Chen et al. |
| 2018/0067918 A1 | 3/2018 | Bellegarda et al. |
| 2018/0068074 A1 | 3/2018 | Shen |
| 2018/0069743 A1 | 3/2018 | Bakken et al. |
| 2018/0075847 A1 | 3/2018 | Lee et al. |
| 2018/0075849 A1 | 3/2018 | Khoury et al. |
| 2018/0077095 A1 | 3/2018 | Deyle et al. |
| 2018/0082692 A1 | 3/2018 | Khoury et al. |
| 2018/0088969 A1 | 3/2018 | Vanblon et al. |
| 2018/0089166 A1 | 3/2018 | Meyer et al. |
| 2018/0089588 A1 | 3/2018 | Ravi et al. |
| 2018/0090143 A1 | 3/2018 | Saddler et al. |
| 2018/0091604 A1 | 3/2018 | Yamashita et al. |
| 2018/0091847 A1 | 3/2018 | Wu et al. |
| 2018/0096683 A1 | 4/2018 | James et al. |
| 2018/0096690 A1 | 4/2018 | Mixter et al. |
| 2018/0101599 A1 | 4/2018 | Arnold et al. |
| 2018/0101925 A1 | 4/2018 | Brinig et al. |
| 2018/0102914 A1 | 4/2018 | Kawachi et al. |
| 2018/0103209 A1 | 4/2018 | Fischler et al. |
| 2018/0107917 A1 | 4/2018 | Hewavitharana et al. |
| 2018/0107945 A1 | 4/2018 | Gao et al. |
| 2018/0108346 A1 | 4/2018 | Paulik et al. |
| 2018/0108351 A1 | 4/2018 | Beckhardt et al. |
| 2018/0108357 A1 | 4/2018 | Liu |
| 2018/0113673 A1 | 4/2018 | Sheynblat |
| 2018/0122376 A1 | 5/2018 | Kojima |
| 2018/0122378 A1 | 5/2018 | Mixter et al. |
| 2018/0124132 A1 | 5/2018 | Assemaly Salama et al. |
| 2018/0126260 A1 | 5/2018 | Chansoriya et al. |
| 2018/0129967 A1 | 5/2018 | Herreshoff |
| 2018/0130470 A1 | 5/2018 | Lemay et al. |
| 2018/0130471 A1 | 5/2018 | Trufinescu et al. |
| 2018/0137856 A1 | 5/2018 | Gilbert |
| 2018/0137857 A1 | 5/2018 | Zhou et al. |
| 2018/0137865 A1 | 5/2018 | Ling |
| 2018/0143857 A1 | 5/2018 | Anbazhagan et al. |
| 2018/0143967 A1 | 5/2018 | Anbazhagan et al. |
| 2018/0144465 A1 | 5/2018 | Hsieh et al. |
| 2018/0144615 A1 | 5/2018 | Kinney et al. |
| 2018/0144746 A1 | 5/2018 | Mishra et al. |
| 2018/0144748 A1 | 5/2018 | Leong |
| 2018/0146089 A1 | 5/2018 | Rauenbuehler et al. |
| 2018/0150744 A1 | 5/2018 | Orr et al. |
| 2018/0152557 A1 | 5/2018 | White et al. |
| 2018/0157372 A1 | 6/2018 | Kurabayashi |
| 2018/0157408 A1 | 6/2018 | Yu et al. |
| 2018/0157992 A1 | 6/2018 | Susskind et al. |
| 2018/0158548 A1 | 6/2018 | Taheri et al. |
| 2018/0158552 A1 | 6/2018 | Liu et al. |
| 2018/0165857 A1 | 6/2018 | Lee et al. |
| 2018/0166076 A1 | 6/2018 | Higuchi et al. |
| 2018/0167884 A1 | 6/2018 | Dawid et al. |
| 2018/0173403 A1 | 6/2018 | Carbune et al. |
| 2018/0173542 A1 | 6/2018 | Chan et al. |
| 2018/0174406 A1 | 6/2018 | Arashi et al. |
| 2018/0174576 A1 | 6/2018 | Soltau et al. |
| 2018/0174597 A1 | 6/2018 | Lee et al. |
| 2018/0182376 A1 | 6/2018 | Gysel et al. |
| 2018/0188840 A1 | 7/2018 | Tamura et al. |
| 2018/0188948 A1 | 7/2018 | Ouyang et al. |
| 2018/0189267 A1 | 7/2018 | Takiel |
| 2018/0190263 A1 | 7/2018 | Calef, III |
| 2018/0190273 A1 | 7/2018 | Karimli et al. |
| 2018/0190279 A1 | 7/2018 | Anderson et al. |
| 2018/0191670 A1 | 7/2018 | Suyama |
| 2018/0196683 A1 | 7/2018 | Radebaugh et al. |
| 2018/0205983 A1 | 7/2018 | Lee et al. |
| 2018/0210874 A1 | 7/2018 | Fuxman et al. |
| 2018/0213448 A1 | 7/2018 | Segal et al. |
| 2018/0217810 A1 | 8/2018 | Agrawal |
| 2018/0218735 A1 | 8/2018 | Hunt et al. |
| 2018/0221783 A1 | 8/2018 | Gamero |
| 2018/0225131 A1 | 8/2018 | Tommy et al. |
| 2018/0225274 A1 | 8/2018 | Tommy et al. |
| 2018/0232203 A1 | 8/2018 | Gelfenbeyn et al. |
| 2018/0232688 A1 | 8/2018 | Pike et al. |
| 2018/0233132 A1 | 8/2018 | Herold et al. |
| 2018/0233140 A1 | 8/2018 | Koishida et al. |
| 2018/0247065 A1 | 8/2018 | Rhee et al. |

(56) References Cited

U.S. PATENT DOCUMENTS

| | | |
|---|---|---|
| 2018/0253209 A1 | 9/2018 | Jaygarl et al. |
| 2018/0253652 A1 | 9/2018 | Palzer et al. |
| 2018/0260680 A1 | 9/2018 | Finkelstein et al. |
| 2018/0268023 A1 | 9/2018 | Korpusik et al. |
| 2018/0268106 A1 | 9/2018 | Velaga |
| 2018/0270343 A1 | 9/2018 | Rout et al. |
| 2018/0275839 A1 | 9/2018 | Kocienda et al. |
| 2018/0276197 A1 | 9/2018 | Nell et al. |
| 2018/0277113 A1 | 9/2018 | Hartung et al. |
| 2018/0278740 A1 | 9/2018 | Choi et al. |
| 2018/0285056 A1 | 10/2018 | Cutler et al. |
| 2018/0293984 A1 | 10/2018 | Lindahl |
| 2018/0293988 A1 | 10/2018 | Huang et al. |
| 2018/0293989 A1 | 10/2018 | De et al. |
| 2018/0299878 A1 | 10/2018 | Cella et al. |
| 2018/0300317 A1 | 10/2018 | Bradbury |
| 2018/0300400 A1 | 10/2018 | Paulus |
| 2018/0300608 A1 | 10/2018 | Sevrens et al. |
| 2018/0300952 A1 | 10/2018 | Evans et al. |
| 2018/0307216 A1 | 10/2018 | Ypma et al. |
| 2018/0308470 A1 | 10/2018 | Park et al. |
| 2018/0308477 A1 | 10/2018 | Nagasaka |
| 2018/0308480 A1 | 10/2018 | Jang et al. |
| 2018/0308485 A1 | 10/2018 | Kudurshian et al. |
| 2018/0308486 A1 | 10/2018 | Saddler et al. |
| 2018/0314362 A1 | 11/2018 | Kim et al. |
| 2018/0314552 A1 | 11/2018 | Kim et al. |
| 2018/0314689 A1 | 11/2018 | Wang et al. |
| 2018/0315415 A1 | 11/2018 | Mosley et al. |
| 2018/0315416 A1 | 11/2018 | Berthelsen et al. |
| 2018/0322112 A1 | 11/2018 | Bellegarda et al. |
| 2018/0322881 A1 | 11/2018 | Min et al. |
| 2018/0324518 A1 | 11/2018 | Dusan et al. |
| 2018/0329508 A1 | 11/2018 | Klein et al. |
| 2018/0329677 A1 | 11/2018 | Gruber et al. |
| 2018/0329957 A1 | 11/2018 | Frazzingaro et al. |
| 2018/0329982 A1 | 11/2018 | Patel et al. |
| 2018/0329998 A1 | 11/2018 | Thomson et al. |
| 2018/0330714 A1 | 11/2018 | Paulik et al. |
| 2018/0330721 A1 | 11/2018 | Thomson et al. |
| 2018/0330722 A1 | 11/2018 | Newendorp et al. |
| 2018/0330723 A1 | 11/2018 | Acero et al. |
| 2018/0330729 A1 | 11/2018 | Golipour et al. |
| 2018/0330730 A1 | 11/2018 | Garg et al. |
| 2018/0330731 A1 | 11/2018 | Zeitlin et al. |
| 2018/0330733 A1 | 11/2018 | Orr et al. |
| 2018/0330737 A1 | 11/2018 | Paulik et al. |
| 2018/0332118 A1 | 11/2018 | Phipps et al. |
| 2018/0332389 A1 | 11/2018 | Ekkizogloy et al. |
| 2018/0335903 A1 | 11/2018 | Coffman et al. |
| 2018/0336049 A1 | 11/2018 | Mukherjee et al. |
| 2018/0336184 A1 | 11/2018 | Bellegarda et al. |
| 2018/0336197 A1 | 11/2018 | Skilling et al. |
| 2018/0336275 A1 | 11/2018 | Graham et al. |
| 2018/0336439 A1 | 11/2018 | Kliger et al. |
| 2018/0336449 A1 | 11/2018 | Adan et al. |
| 2018/0336880 A1 | 11/2018 | Arik et al. |
| 2018/0336885 A1 | 11/2018 | Mukherjee et al. |
| 2018/0336892 A1 | 11/2018 | Kim et al. |
| 2018/0336894 A1 | 11/2018 | Graham et al. |
| 2018/0336904 A1 | 11/2018 | Piercy et al. |
| 2018/0336905 A1 | 11/2018 | Kim et al. |
| 2018/0336911 A1 | 11/2018 | Dahl et al. |
| 2018/0336920 A1 | 11/2018 | Bastian et al. |
| 2018/0338191 A1 | 11/2018 | Van Scheltinga et al. |
| 2018/0341643 A1 | 11/2018 | Alders et al. |
| 2018/0343557 A1 | 11/2018 | Naik et al. |
| 2018/0349084 A1 | 12/2018 | Nagasaka et al. |
| 2018/0349346 A1 | 12/2018 | Hatori et al. |
| 2018/0349349 A1 | 12/2018 | Bellegarda et al. |
| 2018/0349447 A1 | 12/2018 | Maccartney et al. |
| 2018/0349472 A1 | 12/2018 | Kohlschuetter et al. |
| 2018/0349728 A1 | 12/2018 | Wang et al. |
| 2018/0350345 A1 | 12/2018 | Naik |
| 2018/0350353 A1 | 12/2018 | Gruber et al. |
| 2018/0357073 A1 | 12/2018 | Johnson et al. |
| 2018/0357308 A1 | 12/2018 | Cheyer |
| 2018/0358015 A1 | 12/2018 | Cash et al. |
| 2018/0358019 A1 | 12/2018 | Mont-Reynaud |
| 2018/0365653 A1 | 12/2018 | Cleaver et al. |
| 2018/0366105 A1 | 12/2018 | Kim |
| 2018/0366116 A1 | 12/2018 | Nicholson et al. |
| 2018/0373487 A1 | 12/2018 | Gruber et al. |
| 2018/0373493 A1 | 12/2018 | Watson et al. |
| 2018/0373796 A1 | 12/2018 | Rathod |
| 2018/0374484 A1 | 12/2018 | Huang et al. |
| 2019/0005024 A1 | 1/2019 | Somech et al. |
| 2019/0012141 A1 | 1/2019 | Piersol et al. |
| 2019/0012445 A1 | 1/2019 | Lesso et al. |
| 2019/0012449 A1 | 1/2019 | Cheyer |
| 2019/0012599 A1 | 1/2019 | El Kaliouby et al. |
| 2019/0013018 A1 | 1/2019 | Rekstad |
| 2019/0013025 A1 | 1/2019 | Alcorn et al. |
| 2019/0014450 A1 | 1/2019 | Gruber et al. |
| 2019/0019077 A1 | 1/2019 | Griffin et al. |
| 2019/0027152 A1 | 1/2019 | Huang et al. |
| 2019/0034040 A1 | 1/2019 | Shah et al. |
| 2019/0034826 A1 | 1/2019 | Ahmad et al. |
| 2019/0035385 A1 | 1/2019 | Lawson et al. |
| 2019/0035405 A1 | 1/2019 | Haughay |
| 2019/0037258 A1 | 1/2019 | Justin et al. |
| 2019/0042059 A1 | 2/2019 | Baer |
| 2019/0042627 A1 | 2/2019 | Osotio et al. |
| 2019/0043507 A1 | 2/2019 | Huang et al. |
| 2019/0044854 A1 | 2/2019 | Yang et al. |
| 2019/0045040 A1 | 2/2019 | Lee et al. |
| 2019/0051306 A1 | 2/2019 | Torama et al. |
| 2019/0051309 A1 | 2/2019 | Kim et al. |
| 2019/0057697 A1 | 2/2019 | Giuli et al. |
| 2019/0065144 A1 | 2/2019 | Sumner et al. |
| 2019/0065993 A1 | 2/2019 | Srinivasan et al. |
| 2019/0066674 A1 | 2/2019 | Jaygarl et al. |
| 2019/0068810 A1 | 2/2019 | Okamoto et al. |
| 2019/0073607 A1 | 3/2019 | Jia et al. |
| 2019/0073998 A1 | 3/2019 | Leblang et al. |
| 2019/0074009 A1 | 3/2019 | Kim et al. |
| 2019/0074015 A1 | 3/2019 | Orr et al. |
| 2019/0074016 A1 | 3/2019 | Orr et al. |
| 2019/0079476 A1 | 3/2019 | Funes |
| 2019/0080685 A1 | 3/2019 | Johnson, Jr. |
| 2019/0080698 A1 | 3/2019 | Miller |
| 2019/0082044 A1 | 3/2019 | Olivia et al. |
| 2019/0087412 A1 | 3/2019 | Seyed et al. |
| 2019/0087455 A1 | 3/2019 | He et al. |
| 2019/0095050 A1 | 3/2019 | Gruber et al. |
| 2019/0095069 A1 | 3/2019 | Proctor et al. |
| 2019/0095171 A1 | 3/2019 | Carson et al. |
| 2019/0102145 A1 | 4/2019 | Wilberding et al. |
| 2019/0102378 A1 | 4/2019 | Piernot et al. |
| 2019/0102381 A1 | 4/2019 | Futrell et al. |
| 2019/0103103 A1 | 4/2019 | Ni et al. |
| 2019/0103112 A1 | 4/2019 | Walker et al. |
| 2019/0116264 A1 | 4/2019 | Sanghavi et al. |
| 2019/0122666 A1 | 4/2019 | Raitio et al. |
| 2019/0122692 A1 | 4/2019 | Binder et al. |
| 2019/0124019 A1 | 4/2019 | Leon et al. |
| 2019/0129499 A1 | 5/2019 | Li |
| 2019/0129615 A1 | 5/2019 | Sundar et al. |
| 2019/0132694 A1 | 5/2019 | Hanes et al. |
| 2019/0134501 A1 | 5/2019 | Feder et al. |
| 2019/0138704 A1 | 5/2019 | Shrivastava et al. |
| 2019/0139541 A1 | 5/2019 | Andersen et al. |
| 2019/0139563 A1 | 5/2019 | Chen et al. |
| 2019/0141494 A1 | 5/2019 | Gross et al. |
| 2019/0147052 A1 | 5/2019 | Lu et al. |
| 2019/0147369 A1 | 5/2019 | Gupta et al. |
| 2019/0147880 A1 | 5/2019 | Booker et al. |
| 2019/0147883 A1 | 5/2019 | Mellenthin et al. |
| 2019/0149972 A1 | 5/2019 | Parks et al. |
| 2019/0156830 A1 | 5/2019 | Devaraj et al. |
| 2019/0158994 A1 | 5/2019 | Gross et al. |
| 2019/0163667 A1 | 5/2019 | Feuz et al. |
| 2019/0164546 A1 | 5/2019 | Piernot et al. |
| 2019/0172243 A1 | 6/2019 | Mishra et al. |

(56) References Cited

U.S. PATENT DOCUMENTS

| | | |
|---|---|---|
| 2019/0172467 A1 | 6/2019 | Kim et al. |
| 2019/0173996 A1 | 6/2019 | Butcher et al. |
| 2019/0179607 A1 | 6/2019 | Thangarathnam et al. |
| 2019/0179890 A1 | 6/2019 | Evermann |
| 2019/0180770 A1 | 6/2019 | Kothari et al. |
| 2019/0182176 A1 | 6/2019 | Niewczas |
| 2019/0187787 A1 | 6/2019 | White et al. |
| 2019/0188326 A1 | 6/2019 | Daianu et al. |
| 2019/0188328 A1 | 6/2019 | Oyenan et al. |
| 2019/0189118 A1 | 6/2019 | Piernot et al. |
| 2019/0189125 A1 | 6/2019 | Van Os et al. |
| 2019/0190898 A1 | 6/2019 | Cui |
| 2019/0197053 A1 | 6/2019 | Graham et al. |
| 2019/0213601 A1 | 7/2019 | Hackman et al. |
| 2019/0213774 A1 | 7/2019 | Jiao et al. |
| 2019/0213999 A1 | 7/2019 | Grupen et al. |
| 2019/0214024 A1 | 7/2019 | Gruber et al. |
| 2019/0220245 A1 | 7/2019 | Martel et al. |
| 2019/0220246 A1 | 7/2019 | Orr et al. |
| 2019/0220247 A1 | 7/2019 | Lemay et al. |
| 2019/0220704 A1 | 7/2019 | Schulz-Trieglaff et al. |
| 2019/0220727 A1 | 7/2019 | Dohrmann et al. |
| 2019/0222684 A1 | 7/2019 | Li et al. |
| 2019/0224049 A1 | 7/2019 | Creasy et al. |
| 2019/0230215 A1 | 7/2019 | Zhu et al. |
| 2019/0230426 A1 | 7/2019 | Chun |
| 2019/0236130 A1 | 8/2019 | Li et al. |
| 2019/0236459 A1 | 8/2019 | Cheyer et al. |
| 2019/0244618 A1 | 8/2019 | Newendorp et al. |
| 2019/0251167 A1 | 8/2019 | Krishnapura et al. |
| 2019/0251339 A1 | 8/2019 | Hawker |
| 2019/0251960 A1 | 8/2019 | Maker et al. |
| 2019/0259386 A1 | 8/2019 | Kudurshian et al. |
| 2019/0272818 A1 | 9/2019 | Fernandez et al. |
| 2019/0272825 A1 | 9/2019 | O'Malley et al. |
| 2019/0272831 A1 | 9/2019 | Kajarekar |
| 2019/0273963 A1 | 9/2019 | Jobanputra et al. |
| 2019/0278841 A1 | 9/2019 | Pusateri et al. |
| 2019/0287012 A1 | 9/2019 | Asli et al. |
| 2019/0287522 A1 | 9/2019 | Lambourne et al. |
| 2019/0294769 A1 | 9/2019 | Lesso |
| 2019/0295529 A1 | 9/2019 | Tomita |
| 2019/0295540 A1 | 9/2019 | Grima |
| 2019/0295544 A1 | 9/2019 | Garcia et al. |
| 2019/0303442 A1 | 10/2019 | Peitz et al. |
| 2019/0304438 A1 | 10/2019 | Qian et al. |
| 2019/0310765 A1 | 10/2019 | Napolitano et al. |
| 2019/0311708 A1 | 10/2019 | Bengio et al. |
| 2019/0311720 A1 | 10/2019 | Pasko |
| 2019/0318722 A1 | 10/2019 | Bromand |
| 2019/0318724 A1 | 10/2019 | Chao et al. |
| 2019/0318725 A1 | 10/2019 | Le Roux et al. |
| 2019/0318732 A1 | 10/2019 | Huang et al. |
| 2019/0318735 A1 | 10/2019 | Chao et al. |
| 2019/0318739 A1 | 10/2019 | Garg et al. |
| 2019/0339784 A1 | 11/2019 | Lemay et al. |
| 2019/0341027 A1 | 11/2019 | Vescovi et al. |
| 2019/0341056 A1 | 11/2019 | Paulik et al. |
| 2019/0347063 A1 | 11/2019 | Liu et al. |
| 2019/0348022 A1 | 11/2019 | Park et al. |
| 2019/0354548 A1 | 11/2019 | Orr et al. |
| 2019/0355346 A1 | 11/2019 | Bellegarda |
| 2019/0355384 A1 | 11/2019 | Sereshki et al. |
| 2019/0361729 A1 | 11/2019 | Gruber et al. |
| 2019/0369748 A1 | 12/2019 | Hindi et al. |
| 2019/0369842 A1 | 12/2019 | Dolbakian et al. |
| 2019/0369868 A1 | 12/2019 | Jin et al. |
| 2019/0370292 A1 | 12/2019 | Irani et al. |
| 2019/0370323 A1 | 12/2019 | Davidson et al. |
| 2019/0370443 A1 | 12/2019 | Lesso |
| 2019/0371315 A1 | 12/2019 | Newendorp et al. |
| 2019/0371316 A1 | 12/2019 | Weinstein et al. |
| 2019/0371317 A1 | 12/2019 | Irani et al. |
| 2019/0371331 A1 | 12/2019 | Schramm et al. |
| 2019/0372902 A1 | 12/2019 | Piersol |
| 2019/0373102 A1 | 12/2019 | Weinstein et al. |
| 2019/0385418 A1 | 12/2019 | Mixter et al. |
| 2019/0387352 A1 | 12/2019 | Jot et al. |
| 2020/0019609 A1 | 1/2020 | Yu et al. |
| 2020/0020326 A1 | 1/2020 | Srinivasan et al. |
| 2020/0035224 A1 | 1/2020 | Ward et al. |
| 2020/0042334 A1 | 2/2020 | Radebaugh et al. |
| 2020/0043467 A1 | 2/2020 | Qian et al. |
| 2020/0043471 A1 | 2/2020 | Ma et al. |
| 2020/0043482 A1 | 2/2020 | Gruber et al. |
| 2020/0043489 A1 | 2/2020 | Bradley et al. |
| 2020/0044485 A1 | 2/2020 | Smith et al. |
| 2020/0051565 A1 | 2/2020 | Singh |
| 2020/0051583 A1 | 2/2020 | Wu et al. |
| 2020/0053218 A1 | 2/2020 | Gray |
| 2020/0058299 A1 | 2/2020 | Lee et al. |
| 2020/0065601 A1 | 2/2020 | Andreassen |
| 2020/0073629 A1 | 3/2020 | Lee et al. |
| 2020/0075018 A1 | 3/2020 | Chen |
| 2020/0075040 A1 | 3/2020 | Provost et al. |
| 2020/0076538 A1 | 3/2020 | Soultan et al. |
| 2020/0081615 A1 | 3/2020 | Yi et al. |
| 2020/0090393 A1 | 3/2020 | Shin et al. |
| 2020/0091958 A1 | 3/2020 | Curtis et al. |
| 2020/0092625 A1 | 3/2020 | Raffle |
| 2020/0098352 A1 | 3/2020 | Feinstein et al. |
| 2020/0098362 A1 | 3/2020 | Piernot et al. |
| 2020/0098368 A1 | 3/2020 | Lemay et al. |
| 2020/0104357 A1 | 4/2020 | Bellegarda et al. |
| 2020/0104362 A1 | 4/2020 | Yang et al. |
| 2020/0104369 A1 | 4/2020 | Bellegarda |
| 2020/0104668 A1 | 4/2020 | Sanghavi et al. |
| 2020/0105260 A1 | 4/2020 | Piernot et al. |
| 2020/0117717 A1 | 4/2020 | Ramamurti et al. |
| 2020/0118566 A1 | 4/2020 | Zhou |
| 2020/0118568 A1 | 4/2020 | Kudurshian et al. |
| 2020/0125820 A1 | 4/2020 | Kim et al. |
| 2020/0127988 A1 | 4/2020 | Bradley et al. |
| 2020/0134316 A1 | 4/2020 | Krishnamurthy et al. |
| 2020/0135180 A1 | 4/2020 | Mukherjee et al. |
| 2020/0135209 A1 | 4/2020 | Delfarah et al. |
| 2020/0135226 A1 | 4/2020 | Mittal et al. |
| 2020/0137230 A1 | 4/2020 | Spohrer |
| 2020/0143812 A1 | 5/2020 | Walker, II et al. |
| 2020/0143819 A1 | 5/2020 | Delcroix et al. |
| 2020/0152186 A1 | 5/2020 | Koh et al. |
| 2020/0159579 A1 | 5/2020 | Shear et al. |
| 2020/0159651 A1 | 5/2020 | Myers |
| 2020/0160179 A1 | 5/2020 | Chien et al. |
| 2020/0169637 A1 | 5/2020 | Sanghavi et al. |
| 2020/0175566 A1 | 6/2020 | Bender et al. |
| 2020/0176004 A1 | 6/2020 | Kleijn et al. |
| 2020/0176018 A1 | 6/2020 | Feinauer et al. |
| 2020/0184057 A1 | 6/2020 | Mukund |
| 2020/0184964 A1 | 6/2020 | Myers et al. |
| 2020/0184966 A1 | 6/2020 | Yavagal |
| 2020/0193997 A1 | 6/2020 | Piernot et al. |
| 2020/0210142 A1 | 7/2020 | Mu et al. |
| 2020/0218780 A1 | 7/2020 | Jun et al. |
| 2020/0219517 A1 | 7/2020 | Wang et al. |
| 2020/0221155 A1 | 7/2020 | Hansen et al. |
| 2020/0227034 A1 | 7/2020 | Summa et al. |
| 2020/0227044 A1 | 7/2020 | Lindahl |
| 2020/0243069 A1 | 7/2020 | Amores et al. |
| 2020/0249985 A1 | 8/2020 | Zeitlin |
| 2020/0252508 A1 | 8/2020 | Gray |
| 2020/0258508 A1 | 8/2020 | Aggarwal et al. |
| 2020/0267222 A1 | 8/2020 | Phipps et al. |
| 2020/0272485 A1 | 8/2020 | Karashchuk et al. |
| 2020/0279556 A1 | 9/2020 | Gruber et al. |
| 2020/0279576 A1 | 9/2020 | Binder et al. |
| 2020/0279627 A1 | 9/2020 | Nida et al. |
| 2020/0285327 A1 | 9/2020 | Hindi et al. |
| 2020/0286472 A1 | 9/2020 | Newendorp et al. |
| 2020/0286493 A1 | 9/2020 | Orr et al. |
| 2020/0294494 A1 | 9/2020 | Suyama et al. |
| 2020/0298394 A1 | 9/2020 | Han et al. |
| 2020/0301950 A1 | 9/2020 | Theo et al. |
| 2020/0302356 A1 | 9/2020 | Gruber et al. |

(56) References Cited

U.S. PATENT DOCUMENTS

| | | |
|---|---|---|
| 2020/0302919 A1 | 9/2020 | Greborio et al. |
| 2020/0302925 A1 | 9/2020 | Shah et al. |
| 2020/0302930 A1 | 9/2020 | Chen et al. |
| 2020/0302932 A1 | 9/2020 | Schramm et al. |
| 2020/0304955 A1 | 9/2020 | Gross et al. |
| 2020/0304972 A1 | 9/2020 | Gross et al. |
| 2020/0305084 A1 | 9/2020 | Freeman et al. |
| 2020/0310513 A1 | 10/2020 | Nicholson et al. |
| 2020/0312315 A1 | 10/2020 | Li et al. |
| 2020/0312317 A1 | 10/2020 | Kothari et al. |
| 2020/0314191 A1 | 10/2020 | Madhavan et al. |
| 2020/0319850 A1 | 10/2020 | Stasior et al. |
| 2020/0320592 A1 | 10/2020 | Soule et al. |
| 2020/0327895 A1 | 10/2020 | Gruber et al. |
| 2020/0334492 A1 | 10/2020 | Zheng et al. |
| 2020/0335121 A1 | 10/2020 | Mosseri et al. |
| 2020/0342082 A1 | 10/2020 | Sapozhnykov et al. |
| 2020/0342849 A1 | 10/2020 | Yu et al. |
| 2020/0342863 A1 | 10/2020 | Aggarwal et al. |
| 2020/0356243 A1 | 11/2020 | Meyer et al. |
| 2020/0356634 A1 | 11/2020 | Srinivasan et al. |
| 2020/0357391 A1 | 11/2020 | Ghoshal et al. |
| 2020/0357406 A1 | 11/2020 | York et al. |
| 2020/0357409 A1 | 11/2020 | Sun et al. |
| 2020/0364411 A1 | 11/2020 | Evermann |
| 2020/0365155 A1 | 11/2020 | Milden |
| 2020/0367006 A1 | 11/2020 | Beckhardt |
| 2020/0372633 A1 | 11/2020 | Lee, II et al. |
| 2020/0372904 A1 | 11/2020 | Vescovi et al. |
| 2020/0372905 A1 | 11/2020 | Wang et al. |
| 2020/0374243 A1 | 11/2020 | Jina et al. |
| 2020/0379610 A1 | 12/2020 | Ford et al. |
| 2020/0379640 A1 | 12/2020 | Bellegarda et al. |
| 2020/0379726 A1 | 12/2020 | Blatz et al. |
| 2020/0379727 A1 | 12/2020 | Blatz et al. |
| 2020/0379728 A1 | 12/2020 | Gada et al. |
| 2020/0380389 A1 | 12/2020 | Eldeeb et al. |
| 2020/0380956 A1 | 12/2020 | Rossi et al. |
| 2020/0380963 A1 | 12/2020 | Chappidi et al. |
| 2020/0380966 A1 | 12/2020 | Acero et al. |
| 2020/0380973 A1 | 12/2020 | Novitchenko et al. |
| 2020/0380980 A1 | 12/2020 | Shum et al. |
| 2020/0380985 A1 | 12/2020 | Gada et al. |
| 2020/0382616 A1 | 12/2020 | Vaishampayan et al. |
| 2020/0382635 A1 | 12/2020 | Vora et al. |
| 2021/0006943 A1 | 1/2021 | Gross et al. |
| 2021/0011557 A1 | 1/2021 | Lemay et al. |
| 2021/0012113 A1 | 1/2021 | Petill et al. |
| 2021/0012775 A1 | 1/2021 | Kang et al. |
| 2021/0012776 A1 | 1/2021 | Peterson et al. |
| 2021/0043190 A1 | 2/2021 | Wang et al. |
| 2021/0065698 A1 | 3/2021 | Topcu et al. |
| 2021/0067631 A1 | 3/2021 | Van Os et al. |
| 2021/0072953 A1 | 3/2021 | Amarilio et al. |
| 2021/0074264 A1 | 3/2021 | Liang et al. |
| 2021/0090314 A1 | 3/2021 | Hussen et al. |
| 2021/0097998 A1 | 4/2021 | Kim et al. |
| 2021/0104232 A1 | 4/2021 | Lee et al. |
| 2021/0105528 A1 | 4/2021 | Van Os et al. |
| 2021/0110106 A1 | 4/2021 | Vescovi et al. |
| 2021/0110115 A1 | 4/2021 | Moritz et al. |
| 2021/0110254 A1 | 4/2021 | Duy et al. |
| 2021/0124597 A1 | 4/2021 | Ramakrishnan et al. |
| 2021/0127220 A1 | 4/2021 | Mathieu et al. |
| 2021/0134318 A1 | 5/2021 | Harvey et al. |
| 2021/0141839 A1 | 5/2021 | Tang et al. |
| 2021/0149629 A1 | 5/2021 | Martel et al. |
| 2021/0149996 A1 | 5/2021 | Bellegarda |
| 2021/0150151 A1 | 5/2021 | Jiaming et al. |
| 2021/0151041 A1 | 5/2021 | Gruber et al. |
| 2021/0151070 A1 | 5/2021 | Binder et al. |
| 2021/0152684 A1 | 5/2021 | Weinstein et al. |
| 2021/0165826 A1 | 6/2021 | Graham et al. |
| 2021/0191603 A1 | 6/2021 | Napolitano et al. |
| 2021/0191968 A1 | 6/2021 | Orr et al. |
| 2021/0208752 A1 | 7/2021 | Hwang |
| 2021/0208841 A1 | 7/2021 | Wilberding |
| 2021/0216760 A1 | 7/2021 | Dominic et al. |
| 2021/0224032 A1 | 7/2021 | Ryan et al. |
| 2021/0224474 A1 | 7/2021 | Jerome et al. |
| 2021/0233532 A1 | 7/2021 | Aram et al. |
| 2021/0248804 A1 | 8/2021 | Hussen et al. |
| 2021/0249009 A1 | 8/2021 | Manjunath et al. |
| 2021/0258881 A1 | 8/2021 | Freeman et al. |
| 2021/0264913 A1 | 8/2021 | Schramm et al. |
| 2021/0271333 A1 | 9/2021 | Hindi et al. |
| 2021/0273894 A1 | 9/2021 | Tian et al. |
| 2021/0278956 A1 | 9/2021 | Dolbakian et al. |
| 2021/0281965 A1 | 9/2021 | Malik et al. |
| 2021/0294569 A1 | 9/2021 | Piersol et al. |
| 2021/0294571 A1 | 9/2021 | Carson et al. |
| 2021/0303116 A1 | 9/2021 | Barlow |
| 2021/0306812 A1 | 9/2021 | Gross et al. |
| 2021/0312931 A1 | 10/2021 | Paulik et al. |
| 2021/0318901 A1 | 10/2021 | Gruber et al. |
| 2021/0327409 A1 | 10/2021 | Naik |
| 2021/0334528 A1 | 10/2021 | Bray et al. |
| 2021/0335342 A1 | 10/2021 | Yuan et al. |
| 2021/0349605 A1 | 11/2021 | Nonaka et al. |
| 2021/0349608 A1 | 11/2021 | Blatz et al. |
| 2021/0350799 A1 | 11/2021 | Hansen et al. |
| 2021/0350803 A1 | 11/2021 | Hansen et al. |
| 2021/0350810 A1 | 11/2021 | Phipps et al. |
| 2021/0352115 A1 | 11/2021 | Hansen et al. |
| 2021/0357172 A1 | 11/2021 | Sinesio et al. |
| 2021/0365161 A1 | 11/2021 | Ellis et al. |
| 2021/0365174 A1 | 11/2021 | Ellis et al. |
| 2021/0366480 A1 | 11/2021 | Lemay et al. |
| 2021/0373851 A1 | 12/2021 | Stasior et al. |
| 2021/0375290 A1 | 12/2021 | Hu et al. |
| 2021/0377381 A1 | 12/2021 | Aggarwal et al. |
| 2021/0390259 A1 | 12/2021 | Hildick-Smith et al. |
| 2021/0390955 A1 | 12/2021 | Piernot et al. |
| 2021/0393168 A1 | 12/2021 | Santarelli et al. |
| 2021/0402306 A1 | 12/2021 | Huang |
| 2021/0407318 A1 | 12/2021 | Pitschel et al. |
| 2021/0407502 A1 | 12/2021 | Vescovi et al. |
| 2022/0019292 A1 | 1/2022 | Lemay et al. |
| 2022/0021631 A1 | 1/2022 | Jina et al. |
| 2022/0021978 A1 | 1/2022 | Gui et al. |
| 2022/0028387 A1 | 1/2022 | Walker et al. |
| 2022/0030345 A1 | 1/2022 | Gong et al. |
| 2022/0043986 A1 | 2/2022 | Nell et al. |
| 2022/0067283 A1 | 3/2022 | Bellegarda et al. |
| 2022/0068278 A1 | 3/2022 | York et al. |
| 2022/0083986 A1 | 3/2022 | Duffy et al. |
| 2022/0084511 A1 | 3/2022 | Nickson et al. |
| 2022/0093088 A1 | 3/2022 | Sridhar et al. |
| 2022/0093095 A1 | 3/2022 | Dighe et al. |
| 2022/0093109 A1 | 3/2022 | Orr et al. |
| 2022/0093110 A1 | 3/2022 | Kim et al. |
| 2022/0107780 A1 | 4/2022 | Gruber et al. |
| 2022/0122615 A1 | 4/2022 | Chen et al. |
| 2022/0139396 A1 | 5/2022 | Gada et al. |
| 2022/0148587 A1 | 5/2022 | Drummie et al. |
| 2022/0156041 A1 | 5/2022 | Newendorp et al. |
| 2022/0157310 A1 | 5/2022 | Newendorp et al. |
| 2022/0157315 A1 | 5/2022 | Raux et al. |

FOREIGN PATENT DOCUMENTS

| | | |
|---|---|---|
| AU | 2015203483 A1 | 7/2015 |
| AU | 2015101171 A4 | 10/2015 |
| AU | 2018100187 A4 | 3/2018 |
| AU | 2017222436 A1 | 10/2018 |
| CA | 2666438 C | 6/2013 |
| CH | 709795 A1 | 12/2015 |
| CN | 1501329 A | 6/2004 |
| CN | 1533163 A | 9/2004 |
| CN | 1755618 A | 4/2006 |
| CN | 1973256 A | 5/2007 |
| CN | 101233741 A | 7/2008 |
| CN | 101277501 A | 10/2008 |
| CN | 101292282 A | 10/2008 |

(56) References Cited

FOREIGN PATENT DOCUMENTS

| | | | |
|---|---|---|---|
| CN | 101356525 A | 1/2009 |
| CN | 101420471 A | 4/2009 |
| CN | 101427105 A | 5/2009 |
| CN | 101453498 A | 6/2009 |
| CN | 101583949 A | 11/2009 |
| CN | 101939740 A | 1/2011 |
| CN | 102324233 A | 1/2012 |
| CN | 102340590 A | 2/2012 |
| CN | 102346557 A | 2/2012 |
| CN | 102346719 A | 2/2012 |
| CN | 102368256 A | 3/2012 |
| CN | 102402985 A | 4/2012 |
| CN | 102405463 A | 4/2012 |
| CN | 102449438 A | 5/2012 |
| CN | 102483915 A | 5/2012 |
| CN | 102495406 A | 6/2012 |
| CN | 102498457 A | 6/2012 |
| CN | 102510426 A | 6/2012 |
| CN | 102520789 A | 6/2012 |
| CN | 101661754 B | 7/2012 |
| CN | 102629246 A | 8/2012 |
| CN | 102651217 A | 8/2012 |
| CN | 102663016 A | 9/2012 |
| CN | 102681761 A | 9/2012 |
| CN | 102681896 A | 9/2012 |
| CN | 102682769 A | 9/2012 |
| CN | 102682771 A | 9/2012 |
| CN | 102685295 A | 9/2012 |
| CN | 102693725 A | 9/2012 |
| CN | 102694909 A | 9/2012 |
| CN | 202453859 U | 9/2012 |
| CN | 102710976 A | 10/2012 |
| CN | 102722478 A | 10/2012 |
| CN | 102737104 A | 10/2012 |
| CN | 102750087 A | 10/2012 |
| CN | 102792320 A | 11/2012 |
| CN | 102801853 A | 11/2012 |
| CN | 102820033 A | 12/2012 |
| CN | 102844738 A | 12/2012 |
| CN | 102866828 A | 1/2013 |
| CN | 102870065 A | 1/2013 |
| CN | 102882752 A | 1/2013 |
| CN | 102890936 A | 1/2013 |
| CN | 102915731 A | 2/2013 |
| CN | 102917004 A | 2/2013 |
| CN | 102917271 A | 2/2013 |
| CN | 102918493 A | 2/2013 |
| CN | 102955652 A | 3/2013 |
| CN | 103035240 A | 4/2013 |
| CN | 103035251 A | 4/2013 |
| CN | 103038728 A | 4/2013 |
| CN | 103064956 A | 4/2013 |
| CN | 103093334 A | 5/2013 |
| CN | 103093755 A | 5/2013 |
| CN | 103109249 A | 5/2013 |
| CN | 103135916 A | 6/2013 |
| CN | 103187053 A | 7/2013 |
| CN | 103197963 A | 7/2013 |
| CN | 103198831 A | 7/2013 |
| CN | 103209369 A | 7/2013 |
| CN | 103217892 A | 7/2013 |
| CN | 103226949 A | 7/2013 |
| CN | 103236260 A | 8/2013 |
| CN | 103246638 A | 8/2013 |
| CN | 103268315 A | 8/2013 |
| CN | 103280218 A | 9/2013 |
| CN | 103292437 A | 9/2013 |
| CN | 103324100 A | 9/2013 |
| CN | 103327063 A | 9/2013 |
| CN | 103365279 A | 10/2013 |
| CN | 103366741 A | 10/2013 |
| CN | 203249629 U | 10/2013 |
| CN | 103390016 A | 11/2013 |
| CN | 103412789 A | 11/2013 |
| CN | 103414949 A | 11/2013 |
| CN | 103426428 A | 12/2013 |
| CN | 103455234 A | 12/2013 |
| CN | 103456303 A | 12/2013 |
| CN | 103456306 A | 12/2013 |
| CN | 103457837 A | 12/2013 |
| CN | 103475551 A | 12/2013 |
| CN | 103477592 A | 12/2013 |
| CN | 103533143 A | 1/2014 |
| CN | 103533154 A | 1/2014 |
| CN | 103543902 A | 1/2014 |
| CN | 103562863 A | 2/2014 |
| CN | 103582896 A | 2/2014 |
| CN | 103593054 A | 2/2014 |
| CN | 103608859 A | 2/2014 |
| CN | 103620605 A | 3/2014 |
| CN | 103645876 A | 3/2014 |
| CN | 103677261 A | 3/2014 |
| CN | 103686723 A | 3/2014 |
| CN | 103714816 A | 4/2014 |
| CN | 103716454 A | 4/2014 |
| CN | 103727948 A | 4/2014 |
| CN | 103744761 A | 4/2014 |
| CN | 103760984 A | 4/2014 |
| CN | 103761104 A | 4/2014 |
| CN | 103765385 A | 4/2014 |
| CN | 103778527 A | 5/2014 |
| CN | 103780758 A | 5/2014 |
| CN | 103792985 A | 5/2014 |
| CN | 103794212 A | 5/2014 |
| CN | 103795850 A | 5/2014 |
| CN | 103809548 A | 5/2014 |
| CN | 103841268 A | 6/2014 |
| CN | 103885663 A | 6/2014 |
| CN | 103902373 A | 7/2014 |
| CN | 103930945 A | 7/2014 |
| CN | 103942932 A | 7/2014 |
| CN | 103959751 A | 7/2014 |
| CN | 203721183 U | 7/2014 |
| CN | 103971680 A | 8/2014 |
| CN | 104007832 A | 8/2014 |
| CN | 102693729 B | 9/2014 |
| CN | 104036774 A | 9/2014 |
| CN | 104038621 A | 9/2014 |
| CN | 104050153 A | 9/2014 |
| CN | 104090652 A | 10/2014 |
| CN | 104092829 A | 10/2014 |
| CN | 104113471 A | 10/2014 |
| CN | 104125322 A | 10/2014 |
| CN | 104144377 A | 11/2014 |
| CN | 104145304 A | 11/2014 |
| CN | 104169837 A | 11/2014 |
| CN | 104180815 A | 12/2014 |
| CN | 104185868 A | 12/2014 |
| CN | 104240701 A | 12/2014 |
| CN | 104243699 A | 12/2014 |
| CN | 104281259 A | 1/2015 |
| CN | 104281390 A | 1/2015 |
| CN | 104284257 A | 1/2015 |
| CN | 104284486 A | 1/2015 |
| CN | 104335207 A | 2/2015 |
| CN | 104335234 A | 2/2015 |
| CN | 104350454 A | 2/2015 |
| CN | 104360990 A | 2/2015 |
| CN | 104374399 A | 2/2015 |
| CN | 104423625 A | 3/2015 |
| CN | 104423780 A | 3/2015 |
| CN | 104427104 A | 3/2015 |
| CN | 104463552 A | 3/2015 |
| CN | 104464733 A | 3/2015 |
| CN | 104487929 A | 4/2015 |
| CN | 104516522 A | 4/2015 |
| CN | 104573472 A | 4/2015 |
| CN | 104575493 A | 4/2015 |
| CN | 104575501 A | 4/2015 |
| CN | 104584010 A | 4/2015 |
| CN | 104584096 A | 4/2015 |
| CN | 104584601 A | 4/2015 |
| CN | 104604274 A | 5/2015 |
| CN | 104679472 A | 6/2015 |

(56) References Cited

FOREIGN PATENT DOCUMENTS

| | | | |
|---|---|---|---|
| CN | 104699746 A | 6/2015 |
| CN | 104731441 A | 6/2015 |
| CN | 104769584 A | 7/2015 |
| CN | 104769670 A | 7/2015 |
| CN | 104798012 A | 7/2015 |
| CN | 104821167 A | 8/2015 |
| CN | 104821934 A | 8/2015 |
| CN | 104836909 A | 8/2015 |
| CN | 104854583 A | 8/2015 |
| CN | 104867492 A | 8/2015 |
| CN | 104869342 A | 8/2015 |
| CN | 104951077 A | 9/2015 |
| CN | 104967748 A | 10/2015 |
| CN | 104969289 A | 10/2015 |
| CN | 104978963 A | 10/2015 |
| CN | 105025051 A | 11/2015 |
| CN | 105027197 A | 11/2015 |
| CN | 105093526 A | 11/2015 |
| CN | 105100356 A | 11/2015 |
| CN | 105144136 A | 12/2015 |
| CN | 105164678 A | 12/2015 |
| CN | 105164719 A | 12/2015 |
| CN | 105190607 A | 12/2015 |
| CN | 105247511 A | 1/2016 |
| CN | 105247551 A | 1/2016 |
| CN | 105264524 A | 1/2016 |
| CN | 105278681 A | 1/2016 |
| CN | 105320251 A | 2/2016 |
| CN | 105320726 A | 2/2016 |
| CN | 105379234 A | 3/2016 |
| CN | 105430186 A | 3/2016 |
| CN | 105471705 A | 4/2016 |
| CN | 105472587 A | 4/2016 |
| CN | 105516441 A | 4/2016 |
| CN | 105554217 A | 5/2016 |
| CN | 105556592 A | 5/2016 |
| CN | 105808200 A | 7/2016 |
| CN | 105830048 A | 8/2016 |
| CN | 105869641 A | 8/2016 |
| CN | 105872222 A | 8/2016 |
| CN | 105917311 A | 8/2016 |
| CN | 106030699 A | 10/2016 |
| CN | 106062734 A | 10/2016 |
| CN | 106062790 A | 10/2016 |
| CN | 106415412 A | 2/2017 |
| CN | 106462383 A | 2/2017 |
| CN | 106463114 A | 2/2017 |
| CN | 106465074 A | 2/2017 |
| CN | 106471570 A | 3/2017 |
| CN | 106534469 A | 3/2017 |
| CN | 106558310 A | 4/2017 |
| CN | 106773742 A | 5/2017 |
| CN | 106776581 A | 5/2017 |
| CN | 107004412 A | 8/2017 |
| CN | 107450800 A | 12/2017 |
| CN | 107480161 A | 12/2017 |
| CN | 107491285 A | 12/2017 |
| CN | 107491468 A | 12/2017 |
| CN | 107506037 A | 12/2017 |
| CN | 107545262 A | 1/2018 |
| CN | 107608998 A | 1/2018 |
| CN | 107615378 A | 1/2018 |
| CN | 107623616 A | 1/2018 |
| CN | 107786730 A | 3/2018 |
| CN | 107852436 A | 3/2018 |
| CN | 107871500 A | 4/2018 |
| CN | 107919123 A | 4/2018 |
| CN | 107924313 A | 4/2018 |
| CN | 107978313 A | 5/2018 |
| CN | 108268187 A | 7/2018 |
| CN | 108647681 A | 10/2018 |
| CN | 109447234 A | 3/2019 |
| CN | 109657629 A | 4/2019 |
| CN | 110135411 A | 8/2019 |
| CN | 110263144 A | 9/2019 |
| CN | 105164719 B | 11/2019 |
| CN | 110531860 A | 12/2019 |
| CN | 110598671 A | 12/2019 |
| CN | 110647274 A | 1/2020 |
| CN | 110825469 A | 2/2020 |
| CN | 110945840 A | 3/2020 |
| CN | 111124224 A | 5/2020 |
| CN | 107123417 B | 6/2020 |
| CN | 111316203 A | 6/2020 |
| DE | 202016008226 U1 | 5/2017 |
| EP | 2096840 A1 | 9/2009 |
| EP | 2431842 A2 | 3/2012 |
| EP | 2523109 A1 | 11/2012 |
| EP | 2523188 A1 | 11/2012 |
| EP | 2551784 A1 | 1/2013 |
| EP | 2555536 A1 | 2/2013 |
| EP | 2575128 A2 | 4/2013 |
| EP | 2632129 A1 | 8/2013 |
| EP | 2639792 A1 | 9/2013 |
| EP | 2669889 A2 | 12/2013 |
| EP | 2672229 A2 | 12/2013 |
| EP | 2672231 A2 | 12/2013 |
| EP | 2675147 A1 | 12/2013 |
| EP | 2680257 A1 | 1/2014 |
| EP | 2683147 A1 | 1/2014 |
| EP | 2683175 A1 | 1/2014 |
| EP | 2672231 A3 | 4/2014 |
| EP | 2717259 A2 | 4/2014 |
| EP | 2725577 A2 | 4/2014 |
| EP | 2733598 A2 | 5/2014 |
| EP | 2733896 A1 | 5/2014 |
| EP | 2743846 A2 | 6/2014 |
| EP | 2760015 A1 | 7/2014 |
| EP | 2779160 A1 | 9/2014 |
| EP | 2781883 A2 | 9/2014 |
| EP | 2787683 A1 | 10/2014 |
| EP | 2801890 A1 | 11/2014 |
| EP | 2801972 A1 | 11/2014 |
| EP | 2801974 A2 | 11/2014 |
| EP | 2824564 A1 | 1/2015 |
| EP | 2849177 A1 | 3/2015 |
| EP | 2879402 A1 | 6/2015 |
| EP | 2881939 A1 | 6/2015 |
| EP | 2891049 A1 | 7/2015 |
| EP | 2915021 A2 | 9/2015 |
| EP | 2930715 A1 | 10/2015 |
| EP | 2938022 A1 | 10/2015 |
| EP | 2940556 A1 | 11/2015 |
| EP | 2947859 A1 | 11/2015 |
| EP | 2950307 A1 | 12/2015 |
| EP | 2957986 A1 | 12/2015 |
| EP | 2973380 A2 | 1/2016 |
| EP | 2985984 A2 | 2/2016 |
| EP | 2891049 A4 | 3/2016 |
| EP | 3032532 A1 | 6/2016 |
| EP | 3035329 A1 | 6/2016 |
| EP | 3038333 A1 | 6/2016 |
| EP | 3115905 A1 | 1/2017 |
| EP | 3125097 A2 | 2/2017 |
| EP | 2672231 B1 | 5/2017 |
| EP | 3161612 A1 | 5/2017 |
| EP | 3200185 A1 | 8/2017 |
| EP | 3224708 A1 | 10/2017 |
| EP | 3227771 A1 | 10/2017 |
| EP | 3246916 A1 | 11/2017 |
| EP | 3270658 A1 | 1/2018 |
| EP | 3300074 A1 | 3/2018 |
| EP | 2973380 B1 | 8/2018 |
| EP | 2983065 B1 | 8/2018 |
| EP | 3392876 A1 | 10/2018 |
| EP | 3401773 A1 | 11/2018 |
| EP | 2973002 B1 | 6/2019 |
| EP | 3506151 A1 | 7/2019 |
| EP | 3323058 B1 | 2/2020 |
| IN | 2011MU01227 A | 2/2012 |
| IN | 2012MU01227 A | 6/2012 |
| JP | 10-69578 A | 3/1998 |
| JP | 2001-101100 A | 4/2001 |
| JP | 2002-41624 A | 2/2002 |

(56) References Cited

FOREIGN PATENT DOCUMENTS

| | | |
|---|---|---|
| JP | 2002-41731 A | 2/2002 |
| JP | 2002-91892 A | 3/2002 |
| JP | 2002-281562 A | 9/2002 |
| JP | 2004-171216 A | 6/2004 |
| JP | 2005-80094 A | 3/2005 |
| JP | 2005-223782 A | 8/2005 |
| JP | 2006-107438 A | 4/2006 |
| JP | 2006-107445 A | 4/2006 |
| JP | 2006-155368 A | 6/2006 |
| JP | 2006-166118 A | 6/2006 |
| JP | 2006-309457 A | 11/2006 |
| JP | 2007-193794 A | 8/2007 |
| JP | 2008-134949 A | 6/2008 |
| JP | 2008-526101 A | 7/2008 |
| JP | 2008-217468 A | 9/2008 |
| JP | 2008-252161 A | 10/2008 |
| JP | 2009-134409 A | 6/2009 |
| JP | 2009-294946 A | 12/2009 |
| JP | 2010-518475 A | 5/2010 |
| JP | 2010-157207 A | 7/2010 |
| JP | 2010-287063 A | 12/2010 |
| JP | 2012-14394 A | 1/2012 |
| JP | 2012-502377 A | 1/2012 |
| JP | 2012-22478 A | 2/2012 |
| JP | 2012-33997 A | 2/2012 |
| JP | 2012-37619 A | 2/2012 |
| JP | 2012-40655 A | 3/2012 |
| JP | 2012-63536 A | 3/2012 |
| JP | 2012-508530 A | 4/2012 |
| JP | 2012-89020 A | 5/2012 |
| JP | 2012-511774 A | 5/2012 |
| JP | 2012-116442 A | 6/2012 |
| JP | 2012-142744 A | 7/2012 |
| JP | 2012-147063 A | 8/2012 |
| JP | 2012-150804 A | 8/2012 |
| JP | 2012-164070 A | 8/2012 |
| JP | 2012-165084 A | 8/2012 |
| JP | 2012-518847 A | 8/2012 |
| JP | 2012-211932 A | 11/2012 |
| JP | 2012-220959 A | 11/2012 |
| JP | 2013-37688 A | 2/2013 |
| JP | 2013-46171 A | 3/2013 |
| JP | 2013-511214 A | 3/2013 |
| JP | 2013-65284 A | 4/2013 |
| JP | 2013-73240 A | 4/2013 |
| JP | 2013-513315 A | 4/2013 |
| JP | 2013-80476 A | 5/2013 |
| JP | 2013-517566 A | 5/2013 |
| JP | 2013-131087 A | 7/2013 |
| JP | 2013-134430 A | 7/2013 |
| JP | 2013-134729 A | 7/2013 |
| JP | 2013-140520 A | 7/2013 |
| JP | 2013-527947 A | 7/2013 |
| JP | 2013-528012 A | 7/2013 |
| JP | 2013-148419 A | 8/2013 |
| JP | 2013-156349 A | 8/2013 |
| JP | 2013-174987 A | 9/2013 |
| JP | 2013-535059 A | 9/2013 |
| JP | 2013-200265 A | 10/2013 |
| JP | 2013-200423 A | 10/2013 |
| JP | 2013-205999 A | 10/2013 |
| JP | 2013-238935 A | 11/2013 |
| JP | 2013-238936 A | 11/2013 |
| JP | 2013-248292 A | 12/2013 |
| JP | 2013-257694 A | 12/2013 |
| JP | 2013-258600 A | 12/2013 |
| JP | 2014-2586 A | 1/2014 |
| JP | 2014-10688 A | 1/2014 |
| JP | 2014-502445 A | 1/2014 |
| JP | 2014-26629 A | 2/2014 |
| JP | 2014-45449 A | 3/2014 |
| JP | 2014-507903 A | 3/2014 |
| JP | 2014-60600 A | 4/2014 |
| JP | 2014-72586 A | 4/2014 |
| JP | 2014-77969 A | 5/2014 |
| JP | 2014-89711 A | 5/2014 |
| JP | 2014-109889 A | 6/2014 |
| JP | 2014-124332 A | 7/2014 |
| JP | 2014-126600 A | 7/2014 |
| JP | 2014-127754 A | 7/2014 |
| JP | 2014-140121 A | 7/2014 |
| JP | 2014-518409 A | 7/2014 |
| JP | 2014-142566 A | 8/2014 |
| JP | 2014-145842 A | 8/2014 |
| JP | 2014-146940 A | 8/2014 |
| JP | 2014-150323 A | 8/2014 |
| JP | 2014-519648 A | 8/2014 |
| JP | 2014-524627 A | 9/2014 |
| JP | 2014-191272 A | 10/2014 |
| JP | 2014-219614 A | 11/2014 |
| JP | 2014-222514 A | 11/2014 |
| JP | 2015-1931 A | 1/2015 |
| JP | 2015-4928 A | 1/2015 |
| JP | 2015-8001 A | 1/2015 |
| JP | 2015-12301 A | 1/2015 |
| JP | 2015-18365 A | 1/2015 |
| JP | 2015-501022 A | 1/2015 |
| JP | 2015-501034 A | 1/2015 |
| JP | 2015-504619 A | 2/2015 |
| JP | 2015-41845 A | 3/2015 |
| JP | 2015-52500 A | 3/2015 |
| JP | 2015-60423 A | 3/2015 |
| JP | 2015-81971 A | 4/2015 |
| JP | 2015-83938 A | 4/2015 |
| JP | 2015-94848 A | 5/2015 |
| JP | 2015-514254 A | 5/2015 |
| JP | 2015-519675 A | 7/2015 |
| JP | 2015-524974 A | 8/2015 |
| JP | 2015-526776 A | 9/2015 |
| JP | 2015-527683 A | 9/2015 |
| JP | 2015-528140 A | 9/2015 |
| JP | 2015-528918 A | 10/2015 |
| JP | 2015-531909 A | 11/2015 |
| JP | 2016-504651 A | 2/2016 |
| JP | 2016-35614 A | 3/2016 |
| JP | 2016-508007 A | 3/2016 |
| JP | 2016-71247 A | 5/2016 |
| JP | 2016-119615 A | 6/2016 |
| JP | 2016-151928 A | 8/2016 |
| JP | 2016-524193 A | 8/2016 |
| JP | 2016-536648 A | 11/2016 |
| JP | 2017-11608 A | 1/2017 |
| JP | 2017-19331 A | 1/2017 |
| JP | 2017-516153 A | 6/2017 |
| JP | 2017-123187 A | 7/2017 |
| JP | 2017-211608 A | 11/2017 |
| JP | 2017-537361 A | 12/2017 |
| JP | 6291147 B1 | 2/2018 |
| JP | 2018-101242 A | 6/2018 |
| JP | 2018-113035 A | 7/2018 |
| JP | 2018-525950 A | 9/2018 |
| JP | 2018-536889 A | 12/2018 |
| KR | 10-2006-0127647 A | 12/2006 |
| KR | 10-2010-0053149 A | 5/2010 |
| KR | 10-2011-0115134 A | 10/2011 |
| KR | 10-2012-0020164 A | 3/2012 |
| KR | 10-2012-0031722 A | 4/2012 |
| KR | 10-2012-0066523 A | 6/2012 |
| KR | 10-2012-0082371 A | 7/2012 |
| KR | 10-2012-0084472 A | 7/2012 |
| KR | 10-1178310 B1 | 8/2012 |
| KR | 10-2012-0120316 A | 11/2012 |
| KR | 10-2012-0137424 A | 12/2012 |
| KR | 10-2012-0137435 A | 12/2012 |
| KR | 10-2012-0137440 A | 12/2012 |
| KR | 10-2012-0138826 A | 12/2012 |
| KR | 10-2012-0139827 A | 12/2012 |
| KR | 10-1193668 B1 | 12/2012 |
| KR | 10-2013-0035983 A | 4/2013 |
| KR | 10-2013-0086750 A | 8/2013 |
| KR | 10-2013-0090947 A | 8/2013 |
| KR | 10-2013-0108563 A | 10/2013 |
| KR | 10-1334342 B1 | 11/2013 |
| KR | 10-2013-0131252 A | 12/2013 |

(56) References Cited

FOREIGN PATENT DOCUMENTS

| | | |
|---|---|---|
| KR | 10-2013-0133629 A | 12/2013 |
| KR | 10-2014-0007282 A | 1/2014 |
| KR | 10-2014-0024271 A | 2/2014 |
| KR | 10-2014-0025996 A | 3/2014 |
| KR | 10-2014-0031283 A | 3/2014 |
| KR | 10-2014-0033574 A | 3/2014 |
| KR | 10-2014-0042994 A | 4/2014 |
| KR | 10-2014-0055204 A | 5/2014 |
| KR | 10-2014-0059697 A | 5/2014 |
| KR | 10-2014-0068752 A | 6/2014 |
| KR | 10-2014-0071208 A | 6/2014 |
| KR | 10-2014-0088449 A | 7/2014 |
| KR | 10-2014-0093949 A | 7/2014 |
| KR | 10-2014-0106715 A | 9/2014 |
| KR | 10-2014-0107253 A | 9/2014 |
| KR | 10-2014-0147557 A | 12/2014 |
| KR | 10-2015-0006454 A | 1/2015 |
| KR | 10-2015-0013631 A | 2/2015 |
| KR | 10-1506510 B1 | 3/2015 |
| KR | 10-2015-0038375 A | 4/2015 |
| KR | 10-2015-0039380 A | 4/2015 |
| KR | 10-2015-0041974 A | 4/2015 |
| KR | 10-2015-0043512 A | 4/2015 |
| KR | 10-2015-0062811 A | 6/2015 |
| KR | 10-2015-0095624 A | 8/2015 |
| KR | 10-1555742 B1 | 9/2015 |
| KR | 10-2015-0113127 A | 10/2015 |
| KR | 10-2015-0131262 A | 11/2015 |
| KR | 10-2015-0138109 A | 12/2015 |
| KR | 10-2016-0004351 A | 1/2016 |
| KR | 10-2016-0010523 A | 1/2016 |
| KR | 10-2016-0040279 A | 4/2016 |
| KR | 10-2016-0055839 A | 5/2016 |
| KR | 10-2016-0065503 A | 6/2016 |
| KR | 10-2016-0101079 A | 8/2016 |
| KR | 10-2016-0101198 A | 8/2016 |
| KR | 10-2016-0105847 A | 9/2016 |
| KR | 10-2016-0121585 A | 10/2016 |
| KR | 10-2016-0127165 A | 11/2016 |
| KR | 10-2016-0140694 A | 12/2016 |
| KR | 10-2016-0147854 A | 12/2016 |
| KR | 10-2017-0004482 A | 1/2017 |
| KR | 10-2017-0036805 A | 4/2017 |
| KR | 10-2017-0104006 A | 9/2017 |
| KR | 10-2017-0107058 A | 9/2017 |
| KR | 10-1776673 B1 | 9/2017 |
| KR | 10-2018-0032632 A | 3/2018 |
| KR | 10-2018-0034637 A | 4/2018 |
| KR | 10-2018-0135877 A | 12/2018 |
| KR | 10-1959328 B1 | 3/2019 |
| KR | 10-2020-0105519 A | 9/2020 |
| RU | 2012141604 A | 4/2014 |
| TW | 201227715 A | 7/2012 |
| TW | 201245989 A | 11/2012 |
| TW | 201312548 A | 3/2013 |
| TW | 201407184 A | 2/2014 |
| TW | 201610982 A | 3/2016 |
| TW | 201629750 A | 8/2016 |
| WO | 2007/009225 A1 | 1/2007 |
| WO | 2007/036762 A1 | 4/2007 |
| WO | 2008/085637 A2 | 7/2008 |
| WO | 2009/075912 A1 | 6/2009 |
| WO | 2010/109358 A1 | 9/2010 |
| WO | 2011/088053 A2 | 7/2011 |
| WO | WO-2011117456 A1 * | 9/2011 ........... G06F 3/0481 |
| WO | 2011/133573 A2 | 10/2011 |
| WO | 2011/097309 A3 | 12/2011 |
| WO | 2011/088053 A3 | 1/2012 |
| WO | 2012/008434 A1 | 1/2012 |
| WO | 2012/019020 A1 | 2/2012 |
| WO | 2012/019637 A1 | 2/2012 |
| WO | 2012/033312 A1 | 3/2012 |
| WO | 2012/056463 A1 | 5/2012 |
| WO | 2012/063260 A2 | 5/2012 |
| WO | 2012/084965 A1 | 6/2012 |
| WO | 2012/092562 A1 | 7/2012 |
| WO | 2012/112331 A2 | 8/2012 |
| WO | 2012/129231 A1 | 9/2012 |
| WO | 2012/063260 A3 | 10/2012 |
| WO | 2012/135157 A2 | 10/2012 |
| WO | 2012/154317 A1 | 11/2012 |
| WO | 2012/154748 A1 | 11/2012 |
| WO | 2012/155079 A2 | 11/2012 |
| WO | 2012/160567 A1 | 11/2012 |
| WO | 2012/167168 A2 | 12/2012 |
| WO | 2012/173902 A2 | 12/2012 |
| WO | 2013/009578 A2 | 1/2013 |
| WO | 2013/022135 A1 | 2/2013 |
| WO | 2013/022223 A2 | 2/2013 |
| WO | 2013/048880 A1 | 4/2013 |
| WO | 2013/049358 A1 | 4/2013 |
| WO | 2013/057153 A1 | 4/2013 |
| WO | 2013/101489 A1 | 7/2013 |
| WO | 2013/118988 A1 | 8/2013 |
| WO | 2013/122310 A1 | 8/2013 |
| WO | 2013/128999 A1 | 9/2013 |
| WO | 2013/133533 A1 | 9/2013 |
| WO | 2013/137660 A1 | 9/2013 |
| WO | 2013/163113 A1 | 10/2013 |
| WO | 2013/163857 A1 | 11/2013 |
| WO | 2013/169842 A2 | 11/2013 |
| WO | 2013/173504 A1 | 11/2013 |
| WO | 2013/173511 A2 | 11/2013 |
| WO | 2013/176847 A1 | 11/2013 |
| WO | 2013/184953 A1 | 12/2013 |
| WO | 2013/184990 A1 | 12/2013 |
| WO | 2014/003138 A1 | 1/2014 |
| WO | 2014/004544 A2 | 1/2014 |
| WO | 2014/018580 A1 | 1/2014 |
| WO | 2014/021967 A1 | 2/2014 |
| WO | 2014/022148 A1 | 2/2014 |
| WO | 2014/028735 A2 | 2/2014 |
| WO | 2014/028797 A1 | 2/2014 |
| WO | 2014/031505 A1 | 2/2014 |
| WO | 2014/032461 A1 | 3/2014 |
| WO | 2014/040022 A2 | 3/2014 |
| WO | 2014/046475 A1 | 3/2014 |
| WO | 2014/047047 A1 | 3/2014 |
| WO | 2014/048855 A1 | 4/2014 |
| WO | 2014/066352 A1 | 5/2014 |
| WO | 2014/070872 A2 | 5/2014 |
| WO | 2014/073825 A1 | 5/2014 |
| WO | 2014/078965 A1 | 5/2014 |
| WO | 2014/093339 A1 | 6/2014 |
| WO | 2014/093911 A2 | 6/2014 |
| WO | 2014/096506 A1 | 6/2014 |
| WO | 2014/124332 A2 | 8/2014 |
| WO | 2014/137074 A1 | 9/2014 |
| WO | 2014/138604 A1 | 9/2014 |
| WO | 2014/143959 A2 | 9/2014 |
| WO | 2014/144395 A2 | 9/2014 |
| WO | 2014/144579 A1 | 9/2014 |
| WO | 2014/144949 A2 | 9/2014 |
| WO | 2014/149473 A1 | 9/2014 |
| WO | 2014/151153 A2 | 9/2014 |
| WO | 2014/124332 A3 | 10/2014 |
| WO | 2014/159578 A1 | 10/2014 |
| WO | 2014/159581 A1 | 10/2014 |
| WO | 2014/162570 A1 | 10/2014 |
| WO | 2014/169269 A1 | 10/2014 |
| WO | 2014/173189 A1 | 10/2014 |
| WO | 2013/173504 A8 | 12/2014 |
| WO | 2014/197336 A1 | 12/2014 |
| WO | 2014/197339 A1 | 12/2014 |
| WO | 2014/197635 A2 | 12/2014 |
| WO | 2014/197730 A1 | 12/2014 |
| WO | 2014/200728 A1 | 12/2014 |
| WO | 2014/204659 A2 | 12/2014 |
| WO | 2014/210392 A2 | 12/2014 |
| WO | 2015/018440 A1 | 2/2015 |
| WO | 2015/020942 A1 | 2/2015 |
| WO | 2015/029379 A1 | 3/2015 |
| WO | 2015/030796 A1 | 3/2015 |
| WO | 2015/036817 A1 | 3/2015 |

(56) References Cited

FOREIGN PATENT DOCUMENTS

| | | |
|---|---|---|
| WO | 2015/041882 A1 | 3/2015 |
| WO | 2015/041892 A1 | 3/2015 |
| WO | 2015/047932 A1 | 4/2015 |
| WO | 2015/053485 A1 | 4/2015 |
| WO | 2015/054141 A1 | 4/2015 |
| WO | 2015/080530 A1 | 6/2015 |
| WO | 2015/084659 A1 | 6/2015 |
| WO | 2015/092943 A1 | 6/2015 |
| WO | 2015/094169 A1 | 6/2015 |
| WO | 2015/094369 A1 | 6/2015 |
| WO | 2015/098306 A1 | 7/2015 |
| WO | 2015/099939 A1 | 7/2015 |
| WO | 2015/112625 A1 | 7/2015 |
| WO | 2015/116151 A1 | 8/2015 |
| WO | 2015/121449 A1 | 8/2015 |
| WO | 2015/127404 A1 | 8/2015 |
| WO | 2015/151133 A1 | 10/2015 |
| WO | 2015/153310 A1 | 10/2015 |
| WO | 2015/157013 A1 | 10/2015 |
| WO | 2015/183368 A1 | 12/2015 |
| WO | 2015/183401 A1 | 12/2015 |
| WO | 2015/183699 A1 | 12/2015 |
| WO | 2015/184186 A1 | 12/2015 |
| WO | 2015/184387 A1 | 12/2015 |
| WO | 2015/200207 A1 | 12/2015 |
| WO | 2016/027933 A1 | 2/2016 |
| WO | 2016/028946 A1 | 2/2016 |
| WO | 2016/033257 A1 | 3/2016 |
| WO | 2016/039992 A1 | 3/2016 |
| WO | 2016/040721 A1 | 3/2016 |
| WO | 2016/051519 A1 | 4/2016 |
| WO | 2016/052164 A1 | 4/2016 |
| WO | 2016/054230 A1 | 4/2016 |
| WO | 2016/057268 A1 | 4/2016 |
| WO | 2016/075081 A1 | 5/2016 |
| WO | 2016/085775 A2 | 6/2016 |
| WO | 2016/085776 A1 | 6/2016 |
| WO | 2016/089029 A1 | 6/2016 |
| WO | 2016/100139 A1 | 6/2016 |
| WO | 2016/111881 A1 | 7/2016 |
| WO | 2016/144840 A1 | 9/2016 |
| WO | 2016/144982 A1 | 9/2016 |
| WO | 2016/144983 A1 | 9/2016 |
| WO | 2016/175354 A1 | 11/2016 |
| WO | 2016/187149 A1 | 11/2016 |
| WO | 2016/190950 A1 | 12/2016 |
| WO | 2016/209444 A1 | 12/2016 |
| WO | 2016/209924 A1 | 12/2016 |
| WO | 2017/044160 A1 | 3/2017 |
| WO | 2017/044257 A1 | 3/2017 |
| WO | 2017/044260 A1 | 3/2017 |
| WO | 2017/044629 A1 | 3/2017 |
| WO | 2017/053311 A1 | 3/2017 |
| WO | 2017/058293 A1 | 4/2017 |
| WO | 2017/059388 A1 | 4/2017 |
| WO | 2017/071420 A1 | 5/2017 |
| WO | 2017/142116 A1 | 8/2017 |
| WO | 2017/160487 A1 | 9/2017 |
| WO | 2017/200777 A1 | 11/2017 |
| WO | 2017/203484 A1 | 11/2017 |
| WO | 2017/213678 A1 | 12/2017 |
| WO | 2017/213682 A1 | 12/2017 |
| WO | 2017/218194 A1 | 12/2017 |
| WO | 2018/009397 A1 | 1/2018 |
| WO | 2018/044633 A1 | 3/2018 |
| WO | 2018/067528 A1 | 4/2018 |
| WO | 2018/176053 A1 | 9/2018 |
| WO | 2018/209152 A1 | 11/2018 |
| WO | 2018/213401 A1 | 11/2018 |
| WO | 2018/213415 A1 | 11/2018 |
| WO | 2018/231307 A1 | 12/2018 |
| WO | 2019/067930 A1 | 4/2019 |
| WO | 2019/078576 A1 | 4/2019 |
| WO | 2019/079017 A1 | 4/2019 |
| WO | 2019/143397 A1 | 7/2019 |
| WO | 2019/147429 A1 | 8/2019 |
| WO | 2019/236217 A1 | 12/2019 |
| WO | 2020/010530 A1 | 1/2020 |
| WO | 2020/109074 A1 | 6/2020 |
| WO | 2021/054565 A1 | 3/2021 |
| WO | 2021/252230 A1 | 12/2021 |

OTHER PUBLICATIONS

Office Action received for Chinese Patent Application No. 201910143437.3, mailed on Oct. 31, 2023, 10 pages (4 pages of English Translation and 6 pages of Official Copy).
Lin Li, "Digital City Construction Guide", Southeast University Press, 2010, 5 pages (Official Copy only). Cited by the Chinese Patent Office in an Office Action for related Patent Application No. 201910143032.X on Jul. 25, 2023.
Advisory action received for U.S. Appl. No. 13/251,104, mailed on Nov. 2, 2015, 3 pages.
Advisory Action received for U.S. Appl. No. 13/729,597, mailed on Oct. 16, 2015, 5 pages.
Advisory Action received for U.S. Appl. No. 13/894,354, mailed on Mar. 24, 2016, 4 pages.
Advisory Action received for U.S. Appl. No. 16/036,730, mailed on Dec. 1, 2020, 7 pages.
"Alexa, Turn Up the Heat!, Smartthings Samsung [online]", Available online at: <https://web.archive.org/web/20160329142041/https://blog.smartthings.com/news/smartthingsupdates/alexa-turn-up-the-heat/>, Mar. 3, 2016, 3 pages.
Alfred, App, "Alfred", available at: <http://www.alfredapp.com/>, retrieved on Feb. 8, 2012, 5 pages.
Anania, Peter, "Amazon Echo with Home Automation (Smartthings)", Available online at: https://www.youtube.com/watch?v=LMW6aXmsWNE, Dec. 20, 2015, 1 page.
Apple, "VoiceOver for OS X", <http://www.apple.com/accessibility/voiceover/>, May 19, 2014, pp. 1-3.
Applicant Initiated Interview Summary received for U.S. Appl. No. 15/193,971, mailed on Jun. 15, 2020, 3 pages.
Applicant Initiated Interview Summary received for U.S. Appl. No. 15/193,971, mailed on Nov. 4, 2019, 3 pages.
Applicant-Initiated Interview Summary received for U.S. Appl. No. 16/036,730, mailed on Aug. 17, 2021, 4 pages.
Applicant-Initiated Interview Summary received for U.S. Appl. No. 16/036,730, mailed on Jul. 20, 2020, 6 pages.
Applicant-Initiated Interview Summary received for U.S. Appl. No. 16/036,730, mailed on Nov. 4, 2020, 5 pages.
Asakura et al., "What LG thinks; How the TV should be in the Living Room", HiVi, vol. 31, No. 7 (Jul. 2013), Stereo Sound Publishing, Inc., ISSN:1345-6113, Jun. 17, 2013, pp. 68-71.
"Ask Alexa—Things That Are Smart Wiki", Available online at: <http://thingsthataresmart.wiki/index.php?title=Ask_Alexa&oldid=4283>, Jun. 8, 2016, pp. 1-31.
Board Decision received for Chinese Patent Application No. 201280027176.5, mailed on Nov. 12, 2018, 22 pages.
Board Opinion received for Chinese Patent Application No. 201280027176.5, mailed on Feb. 12, 2018, 10 pages.
Board Opinion received for Chinese Patent Application No. 201280027176.5, mailed on Jun. 14, 2018, 12 pages.
Butcher, Mike, "EVI Arrives in Town to go Toe-to-Toe with Siri", TechCrunch, Jan. 23, 2012, pp. 1-2.
Cambria et al., "Jumping NLP curves: A review of natural language processing research.", IEEE Computational Intelligence magazine, 2014, vol. 9, May 2014, pp. 48-57.
Caraballo et al., "Language Identification Based on a Discriminative Text Categorization Technique", Iberspeech 2012—VII Jornadas En Tecnologia Del Habla and III Iberian Sltech Workshop, Nov. 21, 2012, pp. 1-10.
Castleos, "Whole House Voice Control Demonstration", available online at: https://www.youtube.com/watch?v=9SRCoxrZ_W4, Jun. 2, 2012, 1 page.
Chen, Yi, "Multimedia Siri Finds and Plays Whatever You Ask For", PSFK Report, Feb. 9, 2012, pp. 1-9.

(56) References Cited

OTHER PUBLICATIONS

Cheyer, Adam, "Adam Cheyer—About", available at: <http://www.adam.cheyer.com/about.html>, retrieved on Sep. 17, 2012, pp. 1-2.
Colt, Sam, "Here's One Way Apple's Smartwatch Could Be Better Than Anything Else", Business Insider, Aug. 21, 2014, pp. 1-4.
Decision on Appeal received for U.S. Appl. No. 13/251,104, mailed on Mar. 29, 2019, 39 pages.
Decision on Appeal received for U.S. Appl. No. 13/251,118, mailed on Jun. 3, 2019, 20 pages.
Decision on Appeal received for U.S. Appl. No. 13/251,127, mailed on Aug. 30, 2019, 28 pages.
Decision to Refuse received for European Patent Application No. 12727027.0, mailed on Oct. 18, 2018, 29 pages.
Decision to Refuse received for European Patent Application No. 13726938.7, mailed on Jul. 11, 2019, 19 pages.
Deedeevuu, "Amazon Echo Alarm Feature", Available online at: https://www.youtube.com/watch?v=fdjU8eRLk7c, Feb. 16, 2015, 1 page.
"Directv™ Voice, Now Part of the DIRECTTV Mobile App for Phones", Sep. 18, 2013, 5 pages.
Eustice et al., "A universal information appliance", IBM Systems Journal, vol. 38, No. 4, 1999, pp. 575-601.
Evi, "Meet Evi: The One Mobile Application that Provides Solutions for your Everyday Problems", Feb. 2012, 3 pages.
Extended European Search Report received for European Patent Application No. 12727027.0, mailed on Sep. 26, 2014, 7 pages.
Extended European Search Report received for European Patent Application No. 13726938.7, mailed on Dec. 14, 2015, 8 pages.
Extended European Search Report received for European Patent Application No. 18213462.7, mailed on Mar. 21, 2019, 12 pages.
Filipowicz, Luke, "How to use the QuickType keyboard in iOS 8", available online at: <https://www.imore.com/comment/568232>, Oct. 11, 2014, pp. 1-17.
Final Office Action received for U.S. Appl. No. 13/251,088, mailed on Aug. 2, 2013, 16 pages.
Final Office Action received for U.S. Appl. No. 13/251,088, mailed on May 20, 2015, 26 pages.
Final Office Action received for U.S. Appl. No. 13/251,104, mailed on Aug. 14, 2013, 39 pages.
Final Office Action received for U.S. Appl. No. 13/251,104, mailed on Jul. 10, 2015, 36 pages.
Final Office Action received for U.S. Appl. No. 13/251,118, mailed on Jun. 13, 2013, 35 pages.
Final Office Action received for U.S. Appl. No. 13/251,118, mailed on Oct. 2, 2015, 27 pages.
Final Office Action received for U.S. Appl. No. 13/251,127, mailed on Mar. 25, 2013, 46 pages.
Final Office Action received for U.S. Appl. No. 13/251,127, mailed on May 5, 2016, 60 pages.
Final Office Action received for U.S. Appl. No. 13/729,597, mailed on Jun. 26, 2015, 27 pages.
Final Office Action received for U.S. Appl. No. 13/729,597, mailed on Jun. 29, 2017, 49 pages.
Final Office Action received for U.S. Appl. No. 13/894,354, mailed on Oct. 7, 2015, 25 pages.
Final Office Action received for U.S. Appl. No. 15/193,971, mailed on Mar. 19, 2020, 18 pages.
Final Office Action received for U.S. Appl. No. 16/036,730, mailed on Oct. 14, 2020, 37 pages.
Final Office Action received for U.S. Appl. No. 16/036,730, mailed on Oct. 26, 2021, 13 pages.
Findlater et al., "Beyond QWERTY: Augmenting Touch-Screen Keyboards with Multi-Touch Gestures for Non-Alphanumeric Input", CHI '12, Austin, Texas, USA, May 5-10, 2012, 4 pages.
Guay, Matthew, "Location-Driven Productivity with Task Ave", Available at: <http://iphone.appstorm.net/reviews/productivity/location-driven-productivity-with-task-ave/>, Feb. 19, 2011, 7 pages.
Guim, Mark, "How to Set a Person-Based Reminder with Cortana", available at: <http://www.wpcentral.com/how-to-person-based-reminder-cortana>, Apr. 26, 2014, 15 pages.
Hardawar, Devindra, "Driving App Waze Builds its own Siri for Hands-Free Voice Control", Available online at: <http://venturebeat.com/2012/02/09/driving-app-waze-builds-its-own-siri-for-hands-free-voice-control/>, retrieved on Feb. 9, 2012, 4 pages.
Hashimoto, Yoshiyuki, "Simple Guide for iPhone Siri, which can be Operated with your Voice", Shuwa System Co. Ltd., vol. 1, Jul. 5, 2012, pp. 8, 130, 131.
"Headset Button Controller v7.3 APK Full APP Download for Andriod", Blackberry, iPhone, Available online at: http://fullappdownload.com/headset-button-controller-v7-3-apk/, Jan. 27, 2014, 11 pages.
"id3v2.4.0-Frames", available at: <http://id3.org/id3v2.4.0-frames?action=print>, retrieved on Jan. 22, 2015, pp. 1-41.
"Interactive Voice", available at: < http://www.helloivee.com/company/>, retrieved on Feb. 10, 2014, 2 pages.
International Preliminary Report on Patentability received for PCT Patent Application No. PCT/US2012/040571, mailed on Dec. 19, 2013, 10 pages.
International Preliminary Report on Patentability received for PCT Patent Application No. PCT/US2013/041233, mailed on Nov. 27, 2014, 9 pages.
International Search Report and Written Opinion received for PCT Patent Application No. PCT/US2012/040571, mailed on Nov. 16, 2012, 14 pages.
International Search Report and Written Opinion received for PCT Patent Application No. PCT/US2013/041233, mailed on Nov. 22, 2013, 11 pages.
Jonsson et al., "Proximity-based Reminders Using Bluetooth", 2014 IEEE International Conference on Pervasive Computing and Communications Demonstrations, 2014, pp. 151-153.
Jouvet et al., "Evaluating Grapheme-to-phoneme Converters in Automatic Speech Recognition Context", IEEE, 2012, pp. 4821-4824.
Karn, Ujjwal, "An Intuitive Explanation of Convolutional Neural Networks", The Data Science Blog, Aug. 11, 2016, 23 pages.
Kazmucha, Allyson, "How to Send Map Locations Using iMessage", iMore.com, Available at <http://www.imore.com/how-use-imessage-share-your-location-your-iphone>, Aug. 2, 2012, 6 pages.
Kickstarter, "Ivee Sleek: Wi-Fi Voice-Activated Assistant", available at: <https://www.kickstarter.com/projects/ivee/ivee-sleek-wi-fi-voice-activated-assistant>, retrieved on Feb. 10, 2014, pp. 1-13.
Lewis, Cameron, "Task Ave for iPhone Review", Mac Life, Available at: <http://www.maclife.com/article/reviews/task_ave_iphone_review>, Mar. 3, 2011, 5 pages.
"Meet Ivee, Your Wi-Fi Voice Activated Assistant", available at: <http://www.helloivee.com/>, retrieved on Feb. 10, 2014, 8 pages.
Mhatre et al., "Donna Interactive Chat-bot acting as a Personal Assistant", International Journal of Computer Applications (0975 - 8887), vol. 140, No. 10, Apr. 2016, 6 pages.
Miller, Chance, "Google Keyboard Updated with New Personalized Suggestions Feature", available at <http://9to5google.com/2014/03/19/google-keyboard-updated-with-new-personalized-suggestions-feature/>, Mar. 19, 2014, 4 pages.
Minutes of Meeting received for European Patent Application No. 12727027.0, mailed on Oct. 18, 2018, 3 pages.
"Mobile Speech Solutions, Mobile Accessibility, SVOX AG Product Information Sheet", available at: <http://www.svox.com/site/bra840604/con782768/mob965831936.aSQ?osLang=1>, Sep. 27, 2012, 1 page.
Morrison, Jonathan, "iPhone 5 Siri Demo", Online Available at: <https://www.youtube.com/watch?v wHWwG5IhWc>, Sep. 21, 2012, 3 pages.
My Cool Aids, "What's New", available at: < http://www.mycoolaids.com/>, 2012, 1 page.
"Natural Language Interface Using Constrained Intermediate Dictionary of Results", List of Publications Manually reviewed for the Search of U.S. Pat. No. 7,177,798, Mar. 22, 2013, 1 page.
NDTV, "Sony SmartWatch 2 Launched in India for Rs. 14,990", available at: <http://gadgets.ndtv.com/others/news/sony-smartwatch-2-launched-in-india-for-rs-14990-420319>, Sep. 18, 2013, 4 pages.
Ng Simon, "Google's Task List Now Comes to Iphone", SimonBlog, Available at: <http://www.simonblog.com/2009/02/04/googles-task-list-now-comes-to-iphone/>, Feb. 4, 2009, 3 pages.

(56) References Cited

OTHER PUBLICATIONS

Non-Final Office Action received for U.S. Appl. No. 13/251,088, mailed on Dec. 4, 2014, 19 pages.
Non-Final Office Action received for U.S. Appl. No. 13/251,088, mailed on Jan. 31, 2013, 17 pages.
Non-Final Office Action received for U.S. Appl. No. 13/251,088, mailed on Jun. 19, 2014, 16 pages.
Non-Final Office Action received for U.S. Appl. No. 13/251,104, mailed on Jan. 28, 2014, 48 pages.
Non-Final Office Action received for U.S. Appl. No. 13/251,104, mailed on Nov. 28, 2012, 32 pages.
Non-Final Office Action received for U.S. Appl. No. 13/251,104, mailed on Oct. 9, 2014, 52 pages.
Non-Final Office Action received for U.S. Appl. No. 13/251,118, mailed on Dec. 7, 2012, 34 pages.
Non-Final Office Action received for U.S. Appl. No. 13/251,118, mailed on Jan. 30, 2015, 20 pages.
Non-Final Office Action received for U.S. Appl. No. 13/251,118, mailed on Jun. 6, 2014, 33 pages.
Office Action received for U.S. Appl. No. 13/251,118, mailed on Oct. 4, 2019, 22 pages.
Office Action received for U.S. Appl. No. 13/251,127, mailed on Jan. 16, 2014, 46 pages.
Office Action received for U.S. Appl. No. 13/251,127, mailed on Jul. 17, 2015, 53 pages.
Office Action received for U.S. Appl. No. 13/251,127, mailed on Nov. 5, 2014, 42 pages.
Office Action received for U.S. Appl. No. 13/251,127, mailed on Nov. 8, 2012, 18 pages.
Office Action received for U.S. Appl. No. 13/729,597, mailed on Dec. 18, 2014, 19 pages.
Non-Final Office Action received for U.S. Appl. No. 13/729,597, mailed on Dec. 21, 2016, 30 pages.
Non-Final Office Action received for U.S. Appl. No. 13/894,354, mailed on Apr. 9, 2015, 20 pages.
Non-Final Office Action received for U.S. Appl. No. 13/894,354, mailed on Jan. 13, 2017, 28 pages.
Non-Final Office Action received for U.S. Appl. No. 13/894,354, mailed on Jul. 3, 2017, 32 pages.
Non-Final Office Action received for U.S. Appl. No. 15/193,971, mailed on Jan. 10, 2019, 22 pages.
Non-Final Office Action received for U.S. Appl. No. 15/193,971, mailed on Sep. 19, 2019, 16 pages.
Non-Final Office Action received for U.S. Appl. No. 16/036,730, mailed on Apr. 6, 2020, 35 pages.
Non-Final Office Action received for U.S. Appl. No. 16/036,730, mailed on May 25, 2021 , 41 pages.
Notice of Acceptance received for Australian Patent application No. 2012261958, mailed on Apr. 6, 2016, 3 pages.
Notice of Acceptance received for Australian Patent application No. 2013262803, mailed on Jul. 8, 2016, 3 pages.
Notice of Acceptance received for Australian Patent application No. 2016204091, mailed on Feb. 28, 2018, 3 pages.
Notice of Acceptance received for Australian Patent Application No. 2018204265, mailed on Feb. 27, 2020, 3 pages.
Notice of Acceptance received for Australian Patent Application No. 2020202534, mailed on May 21, 2020, 3 pages.
Notice of Acceptance received for Australian Patent Application No. 2020220088, mailed on Feb. 4, 2021, 3 pages.
Notice of Allowance received for Chinese Patent Application No. 201380028060.8, mailed on Jul. 10, 2018, 2 pages.
Notice of Allowance received for Chinese Patent Application No. 201811108851.2, mailed on Jun. 3, 2021, 2 pages.
Notice of Allowance received for Japanese Patent Application No. 2014-513765, mailed on May 8, 2017, 3 pages.
Notice of Allowance received for Japanese Patent application No. 2015-512807, mailed on Jul. 28, 2017, 3 pages.
Notice of Allowance received for Japanese Patent Application No. 2017-068594, mailed on Aug. 7, 2020, 4 pages.
Notice of Allowance received for Japanese Patent Application No. 2020-082199, mailed on Sep. 4, 2020, 4 pages.
Notice of Allowance received for Japanese Patent Application No. 2020-167209, mailed on Jul. 12, 2021 , 4 pages.
Notice of Allowance received for Korean Patent Application No. 10-2013-7034856, mailed on Mar. 22, 2017, 4 pages.
Notice of Allowance received for Korean Patent Application No. 10-2014-7033076, mailed on Oct. 31, 2016, 4 pages.
Notice of Allowance received for Korean Patent Application No. 10-2017-7017149, mailed on Jul. 30, 2018, 4 pages.
Notice of Allowance received for Korean Patent Application No. 10-2018-7031467, mailed on Jul. 30, 2019, 9 pages.
Notice of Allowance received for Korean Patent Application No. 10-2019-7031839, mailed on Jan. 27, 2020, 6 pages.
Notice of Allowance received for Korean Patent Application No. 10-2020-7010042, mailed on Apr. 30, 2020, 5 pages.
Notice of Allowance received for U.S. Appl. No. 13/251,088, mailed on Jun. 8, 2018, 8 pages.
Notice of Allowance received for U.S. Appl. No. 13/251,088, mailed on Oct. 30, 2018, 7 pages.
Notice of Allowance received for U.S. Appl. No. 13/251,118, mailed on Mar. 26, 2020, 17 pages.
Notice of Allowance received for U.S. Appl. No. 13/729,597, mailed on Apr. 18, 2018, 12 pages.
Notice of Allowance received for U.S. Appl. No. 13/729,597, mailed on Nov. 30, 2017, 10 pages.
Notice of Allowance received for U.S. Appl. No. 13/894,354, mailed on Aug. 30, 2018, 13 pages.
Notice of Allowance received for U.S. Appl. No. 13/894,354, mailed on Jan. 8, 2019, 13 pages.
Notice of Allowance received for U.S. Appl. No. 15/193,971, mailed on Jul. 14, 2020, 15 pages.
Notice of Allowance received for U.S. Appl. No. 16/036,730, mailed on Jan. 26, 2022, 9 pages.
Notice of Allowance received for U.S. Appl. No. 16/895,944, mailed on Jun. 4, 2021, 24 pages.
Office Action received for Australian Patent Application No. 2012261958, mailed on Mar. 10, 2016, 3 pages.
Office Action received for Australian Patent Application No. 2012261958, mailed on Mar. 27, 2015, 3 pages.
Office Action received for Australian Patent Application No. 2013262803, mailed on Aug. 6, 2015, 3 pages.
Office Action received for Australian Patent Application No. 2016204091, mailed on Mar. 3, 2017, 3 pages.
Office Action received for Australian Patent Application No. 2018204265, mailed on Mar. 20, 2019, 3 pages.
Office Action received for Australian Patent Application No. 2020220088, mailed on Nov. 17, 2020, 7 pages.
Office Action received for Australian Patent Application No. 2020220088, mailed on Sep. 14, 2020, 6 pages.
Office Action received for Chinese Patent Application No. 201280027176.5, mailed on Aug. 26, 2016, 12 pages.
Office Action received for Chinese Patent Application No. 201280027176.5, mailed on Dec. 29, 2015, 22 pages.
Office Action received for Chinese Patent Application No. 201280027176.5, mailed on Feb. 15, 2017, 9 pages.
Office Action received for Chinese Patent Application No. 201380028060.8, mailed on Dec. 14, 2017, 6 pages.
Office Action received for Chinese Patent Application No. 201380028060.8, mailed on Feb. 8, 2017, 14 pages.
Office Action received for Chinese Patent Application No. 201811108851.2, mailed on Feb. 3, 2021, 20 pages.
Office Action received for European Patent Application No. 12727027.0, mailed on Mar. 8, 2017, 6 pages.
Office Action received for European Patent Application No. 18213462.7, mailed on Jan. 22, 2020, 20 pages.
Office Action received for European Patent Application No. 13726938.7, mailed on Jan. 11, 2018, 7 pages.
Office Action received for Japanese Patent Application No. 2014-513765, mailed on Dec. 2, 2016, 7 pages.
Office Action received for Japanese Patent Application No. 2014-513765, mailed on Jan. 5, 2016, 8 pages.

(56) References Cited

OTHER PUBLICATIONS

Office Action received for Japanese Patent Application No. 2014-513765, mailed on Jan. 19, 2015, 8 pages.
Office Action received for Japanese Patent Application No. 2015-512807, mailed on Nov. 2, 2015, 5 pages.
Office Action received for Japanese Patent Application No. 2015-512807, mailed on Oct. 3, 2016, 9 pages.
Office Action received for Japanese Patent Application No. 2017-068594, mailed on Jan. 7, 2020, 12 pages.
Office Action received for Japanese Patent Application No. 2017-068594, mailed on May 7, 2018, 10 pages.
Office Action received for Japanese Patent Application No. 2017-068594, mailed on May 10, 2019, 8 pages.
Office Action received for Korean Patent Application No. 10-2013-7034856, mailed on Apr. 29, 2016, 7 pages.
Office Action received for Korean Patent Application No. 10-2013-7034856, mailed on Jun. 13, 2015, 13 pages.
Office Action received for Korean Patent Application No. 10-2014-7033076, mailed on Dec. 23, 2015, 9 pages.
Office Action received for Korean Patent Application No. 10-2017-7017149, mailed on Sep. 21, 2017, 10 pages.
Office Action received for Korean Patent Application No. 10-2018-7031467, mailed on Jan. 22, 2019, 6 pages.
Oral Hearing Minutes received for U.S. Appl. No. 13/251,104, mailed on Feb. 28, 2019, 18 pages.
Osxdaily, "Get a List of Siri Commands Directly from Siri", Available at: <http://osxdaily.com/2013/02/05/list-siri-commands/>, Feb. 5, 2013, 15 pages.
Pathak et al., "Privacy-preserving Speech Processing: Cryptographic and String-matching Frameworks Show Promise", In: IEEE signal processing magazine, retrieved from <http://www.merl.com/publications/docs/TR2013-063.pdf>, Feb. 13, 2013, 16 pages.
Patra et al., "A Kernel-Based Approach for Biomedical Named Entity Recognition", Scientific World Journal, vol. 2013, 2013, pp. 1-7.
Preliminary Opinion received for European Patent Application No. 12727027.0, mailed on Aug. 17, 2018, 22 pages.
Result of Consultation received for European Patent Application No. 13726938.7, mailed on Jun. 18, 2019, 5 pages.
Rios, Mafe, "New Bar Search for Facebook", YouTube, available at: <https://www.youtube.com/watch?v=vwgN1WbvCas>, Jul. 19, 2013, 2 pages.
Routines, "SmartThings Support", Available online at: https://web.archive.org/web/20151207165701/https://support.smartthings.com/hc/en-us/articles/205380034-Routines, 2015, 3 pages.
Selfridge et al., "Interact: Tightly-coupling Multimodal Dialog with an Interactive Virtual Assistant", International Conference on Multimodal Interaction, ACM, Nov. 9, 2015, pp. 381-382.
"SmartThings +Amazon Echo, Smartthings Samsung [online]", Available online at: <https://web.archive.org/web/20160509231428/https://blog.smartthings.com/featured/alex a-turn-on-my-smartthings/>, Aug. 21, 2015, 3 pages.
Sow et al., "Uncovering the to-dos hidden in your in-box", IBM Systems Journal, vol. 45, No. 4, 2006, pp. 739-757.
SRI, "SRI Speech: Products: Software Development Kits: EduSpeak", available at: <http://web.archive.org/web/20090828084033/http://www.speechatsri.com/products/eduspeak>shtml, retrieved on Jun. 20, 2013, pp. 1-2.
Summons to Attend Oral Proceeding received for European Patent Application No. 12727027.0, mailed on Apr. 3, 2018, 15 pages.
Summons to Attend Oral Proceedings received for European Patent Application No. 13726938.7, mailed on Jan. 15, 2019, 8 pages.
Sundaram et al., "Latent Perceptual Mapping with Data-Driven Variable-Length Acoustic Units for Template-Based Speech Recognition", ICASSP 2012, Mar. 2012, pp. 4125-4128.
Sundermeyer et al., "From feedforward to recurrent LSTM neural networks for language modeling.", IEEE Transactions to Audio, Speech, and Language Processing, vol. 23, No. 3, Mar. 2015, pp. 517-529.

Supplementary European Search Report received for European Patent Application No. 12727027.0, mailed on Oct. 14, 2014, 1 page.
Tofel et al., "SpeakToit: A Personal Assistant for Older iPhones, iPads", Apple News, Tips and Reviews, Feb. 9, 2012, 7 pages.
Vodafone Deutschland, "Samsung Galaxy S3 Tastatur Spracheingabe", Available online at: "https://www.youtube.com/watch?v=6kOd6Gr8uFE", Aug. 22, 2012, 1 page.
Xai, "How it Works", Available online at: https://web.archive.org/web/20160531201426/https://x.ai/how-it-works/, May 31, 2016, 6 pages.
Xiang et al., "Correcting Phoneme Recognition Errors in Learning Word Pronunciation through Speech Interaction", Speech Communication, vol. 55, No. 1, Jan. 1, 2013, pp. 190-203.
Xu et al., "Policy Optimization of Dialogue Management in Spoken Dialogue System For Out-of-Domain Utterances", 2016 International Conference on Asian Language Processing (IALP), IEEE, Nov. 21, 2016, pp. 10-13.
Yan et al., "A scalable approach to using DNN-derived features in GMM-HMM based acoustic modeling for LVCSR", 14th Annual Conference of the International Speech Communication Association, InterSpeech 2013, Aug. 2013, pp. 104-108.
Zainab, "Google Input Tools Shows Onscreen Keyboard in Multiple Languages [Chrome]", available at: http://www.addictivetips.com/internet-tips/google-input-tools-shows-multiple-language-onscreen-keyboards-chrome/>, Jan. 3, 2012, 3 pages.
Zhong et al., "JustSpeak: Enabling Universal Voice Control on Android", W4A'14, Proceedings of the 11th Web for All Conference, No. 36, Apr. 7-9, 2014, 8 pages.
"[Zhuan] Play "Zhuan" Siri-Siri function excavation", Available online at: https://www.feng.com/post/3255659, Nov. 12, 2011, 30 pages.
Office Action received for Chinese Patent Application No. 201910143032.X, mailed on Nov. 21, 2022, 18 pages (8 pages of English Translation and 10 pages of Official Copy).
Office Action received for Chinese Patent Application No. 201910143437.3, mailed on Nov. 21, 2022, 15 pages (6 pages of English Translation and 9 pages of Official Copy).
Office Action received for Chinese Patent Application No. 201910145055.4, mailed on Nov. 21, 2022, 12 pages (5 pages of English Translation and 7 pages of Official Copy).
Notice of Allowance received for Chinese Patent Application No. 201910145055.4, mailed on Mar. 10, 2023, 2 pages (1 page of English Translation and 1 page of Official Copy).
Notice of Allowance received for Chinese Patent Application No. 201910143076.2, mailed on Jun. 1, 2023, 6 pages (3 pages of English Translation and 3 pages of Official Copy).
Office Action received for Chinese Patent Application No. 201910143032.X, mailed on Nov. 4, 2023, 11 pages (4 pages of English Translation and 7 pages of Official Copy).
Aaaaplay, "Sony Media Remote for iOS and Android", Online available at: <https://www.youtube.com/watch?v=W8QoeQhIGok>, Feb. 4, 2012, 3 pages.
Abdelaziz et al., "Speaker-Independent Speech-Driven Visual Speech Synthesis using Domain-Adapted Acoustic Models", May 15, 2019, 9 pages.
"Accessibility on iOS", Apple Inc., Online available at: https://developer.apple.com/accessibility/ios/, Retrieved on Jul. 26, 2021, 2 pages.
Alsharif et al., "Long Short-Term Memory Neural Network for Keyboard Gesture Decoding", IEEE International Conference on Acoustics, Speech and Signal Processing (ICASSP), Brisbane, Australia, Sep. 2015, 5 pages.
Android Authority, "How to use Tasker: A Beginner's Guide", Online available at: <https://youtube.com/watch?v= rDpdS_YWzFc>, May 1, 2013, 1 page.
Apple Differential Privacy Team, "Learning with Privacy at Scale", Apple Machine Learning Blog, vol. 1, No. 8, Online available at: <https://machinelearning.apple.com/2017/12/06/learning-with-privacy-at-scale.html>, Dec. 2017, 9 pages.
Ashington DC Tech & Gaming, "SwipeStatusBar—Reveal the Status Bar in a Fullscreen App", Online Available at: <https://www.youtube.com/watch?v=wA_tT9IAreQ>, Jul. 1, 2013, 3 pages.

(56) References Cited

OTHER PUBLICATIONS

Automate Your Life, "How to Setup Google Home Routines—A Google Home Routines Walkthrough", Online Available at: <https://www.youtube.com/watch?v=pXokZHP9kZg>, Aug. 12, 2018, 1 page.
Bell, Jason, "Machine Learning Hands-On for Developers and Technical Professionals", Wiley, 2014, 82 pages.
Bellegarda, Jeromer, "Chapter 1: Spoken Language Understanding for Natural Interaction: The Siri Experience", Natural Interaction with Robots, Knowbots and Smartphones, 2014, pp. 3-14.
Bellegarda, Jeromer, "Spoken Language Understanding for Natural Interaction: The Siri Experience", Slideshow retrieved from: <https://www.uni-ulm.de/fileadmin/website_uni_ulm/iui.iwsds2012/files/Bellegarda.pdf>, International Workshop on Spoken Dialog Systems (IWSDS), May 2012, pp. 1-43.
Beointegration.com, "BeoLink Gateway—Programming Example", Online Available at: <https://www.youtube.com/watch?v=TXDaJFm5UH4>, Mar. 4, 2015, 3 pages.
Bodapati et al., "Neural Word Decomposition Models for Abusive Language Detection", Proceedings of the Third Workshop on Abusive Language Online, Aug. 1, 2019, pp. 135-145.
Burgess, Brian, "Amazon Echo Tip: Enable the Wake Up Sound", Online available at: <https://www.groovypost.com/howto/amazon-echo-tip-enable-wake-up-sound/>, Jun. 30, 2015, 4 pages.
Büttner et al., "The Design Space of Augmented and Virtual Reality Applications for Assistive Environments in Manufacturing: A Visual Approach", In Proceedings of the 10th International Conference on PErvasive Technologies Related to Assistive Environments (PETRA '17), Island of Rhodes, Greece, Online available at: https://dl.acm.org/doi/pdf/10.1145/3056540.3076193, Jun. 21-23, 2017, pp. 433-440.
Chang et al., "Monaural Multi-Talker Speech Recognition with Attention Mechanism and Gated Convolutional Networks", Interspeech 2018, Sep. 2-6, 2018, pp. 1586-1590.
Chen et al., "A Convolutional Neural Network with Dynamic Correlation Pooling", 13th International Conference on Computational Intelligence and Security, IEEE, 2017, pp. 496-499.
Chen et al., "Progressive Joint Modeling in Unsupervised Single-Channel Overlapped Speech Recognition", IEEE/ACM Transactions on Audio, Speech, and Language Processing, vol. 26, No. 1, Jan. 2018, pp. 184-196.
Chen, Angela, "Amazon's Alexa now handles patient health information", Available online at: <https://www.theverge.com/2019/4/4/18295260/amazon-hipaa-alexa-echo-patient-health-information-privacy-voice-assistant>, Apr. 4, 2019, 2 pages.
Chenghao, Yuan, "MacroDroid", Online available at: https://www.ifanr.com/weizhizao/612531, Jan. 25, 2016, 7 pages (Official Copy Only). {See communication under 37 CFR § 1.98(a) (3)}.
Conneau et al., "Supervised Learning of Universal Sentence Representations from Natural Language Inference Data", Proceedings of the 2017 Conference on Empirical Methods in Natural Language Processing, Copenhagen, Denmark, Sep. 7-11, 2017, pp. 670-680.
Czech, Lucas, "A System for Recognizing Natural Spelling of English Words", Diploma Thesis, Karlsruhe Institute of Technology, May 7, 2014, 107 pages.
Dai et al., "Transformer-XL: Attentive Language Models Beyond a Fixed-Length Context", Online available at: arXiv:1901.02860v3, Jun. 2, 2019, 20 pages.
Delcroix et al., "Context Adaptive Deep Neural Networks for Fast Acoustic Model Adaptation", ICASSP, 2015, pp. 4535-4539.
Delcroix et al., "Context Adaptive Neural Network for Rapid Adaptation of Deep CNN Based Acoustic Models", Interspeech 2016, Sep. 8-12, 2016, pp. 1573-1577.
Derrick, Amanda, "How to Set Up Google Home for Multiple Users", Lifewire, Online available at: <https://www.lifewire.com/set-up-google-home-multiple-users-4685691>, Jun. 8, 2020, 9 pages.
Dighe et al., "Lattice-Based Improvements for Voice Triggering Using Graph Neural Networks", in 2020 IEEE International Conference on Acoustics, Speech and Signal Processing (ICASSP), Jan. 25, 2020, 5 pages.
Dihelson, "How Can I Use Voice or Phrases as Triggers to Macrodroid?", Macrodroid Forums, Online Available at:—<https://www.tapatalk.com/groups/macrodroid/how-can-i-use-voice-or-phrases-as-triggers-to-macr-t4845.html>, May 9, 2018, 5 pages.
Dwork et al., "The Algorithmic Foundations of Differential Privacy", Foundations and Trends in Theoretical Computer Science: vol. 9: No. 3-4, 211-407, 2014, 281 pages.
Earthling1984, "Samsung Galaxy Smart Stay Feature Explained", Online available at: <https://www.youtube.com/watch?v=RpjBNtSjupl>, May 29, 2013, 1 page.
Eder et al., "At the Lower End of Language—Exploring the Vulgar and Obscene Side of German", Proceedings of the Third Workshop on Abusive Language Online, Florence, Italy, Aug. 1, 2019, pp. 119-128.
Edim, et al., "A Multi-Agent Based Virtual Personal Assistant for E-Health Service", Journal of Information Engineering and Applications, vol. 3, No. 11, 2013, 9 pages.
Gadget Hacks, "Tasker Too Complicated? Give MacroDroid a Try [How-To]", Online available at: <https://www.youtube.com/watch?v=8YL9cWCykKc>, May 27, 2016, 1 page.
"Galaxy S7: How to Adjust Screen Timeout & Lock Screen Timeout", Online available at: <https://www.youtube.com/watch?v=n6e1WKUS2ww>, Jun. 9, 2016, 1 page.
Ganin et al., "Unsupervised Domain Adaptation by Backpropagation", in Proceedings of the 32nd International Conference on Machine Learning, vol. 37, Jul. 2015, 10 pages.
Gatys et al., "Image Style Transfer Using Convolutional Neural Networks", Proceedings of IEEE International Conference on Acoustics, Speech and Signal Processing (ICASSP), 2016, pp. 2414-2423.
Geyer et al., "Differentially Private Federated Learning: A Client Level Perspective", arXiv:1712.07557v2, Mar. 2018, 7 pages.
Ghauth et al., "Text Censoring System for Filtering Malicious Content Using Approximate String Matching and Bayesian Filtering", Proc. 4th INNS Symposia Series on Computational Intelligence in Information Systems, Bandar Seri Begawan, Brunei, 2015, pp. 149-158.
Goodfellow et al., "Generative Adversarial Networks", Proceedings of the Neural Information Processing Systems, Dec. 2014, 9 pages.
Google Developers, "Voice search in your app", Online available at: <https://www.youtube.com/watch?v=PS1FbB5qWEI>, Nov. 12, 2014, 1 page.
Graves, Alex, "Sequence Transduction with Recurrent Neural Networks", Proceeding of International Conference of Machine Learning (ICML) Representation Learning Workshop, Nov. 14, 2012, 9 pages.
Gu et al., "BadNets: Evaluating Backdooring Attacks on Deep Neural Networks", IEEE Access, vol. 7, Mar. 21, 2019, pp. 47230-47244.
Guo et al., "StateLens: A Reverse Engineering Solution for Making Existing Dynamic Touchscreens Accessible", In Proceedings of the 32nd Annual Symposium on User Interface Software and Technology (UIST '19), New Orleans, LA, USA, Online available at: https://dl.acm.org/doi/pdf/10.1145/3332165.3347873, Oct. 20-23, 2019, pp. 371-385.
Guo et al., "Time-Delayed Bottleneck Highway Networks Using a DFT Feature for Keyword Spotting", IEEE International Conference on Acoustics, Speech and Signal Processing (ICASSP). IEEE, 2018, 5 pages.
Guo et al., "VizLens: A Robust and Interactive Screen Reader for Interfaces in the Real World", In Proceedings of the 29th Annual Symposium on User Interface Software and Technology (UIST '16), Tokyo, Japan, Online available at: https://dl.acm.org/doi/pdf/10.1145/2984511.2984518, Oct. 16-19, 2016, pp. 651-664.
Gupta et al., "I-vector-based Speaker Adaptation of Deep Neural Networks for French Broadcast Audio Transcription", ICASSP, 2014, 2014, pp. 6334-6338.
Gupta, Naresh, "Inside Bluetooth Low Energy", Artech House, 2013, 274 pages.
Haung et al., "A Study for Improving Device-Directed Speech Detection Toward Frictionless Human-Machine Interaction", in Proc. Interspeech, 2019, 5 pages.

(56) References Cited

OTHER PUBLICATIONS

Hawkeye, "Hawkeye—A better user testing platform", Online Available at: https://www.youtube.com/watch?v=el0TW0g_760, Oct. 16, 2019, 3 pages.
Hawkeye, "Learn where people look in your products", Online Available at: https://www.usehawkeye.com, 2019, 6 pages.
Heller et al., "AudioScope: Smartphones as Directional Microphones in Mobile Audio Augmented Reality Systems", In Proceedings of the 33rd Annual ACM Conference on Human Factors in Computing Systems (CHI '15), Crossings, Seoul, Korea, Online available at: https://dl.acm.org/doi/pdf/10.1145/2702123.2702159, Apr. 18-23, 2015, pp. 949-952.
Henderson et al., "Efficient Natural Language Response Suggestion for Smart Reply", Available Online at: https://static.googleusercontent.com/media/research.google.com/en//pubs/archive/1846e8a466c079eae7e90727e27caf5f98f10e0c.pdf, 2017, 15 pages.
Hershey et al., "Deep Clustering: Discriminative Embeddings for Segmentation and Separation", Proc. ICASSP, Mar. 2016, 6 pages.
"Hey Google: How to Create a Shopping List with Your Google Assistant", Online available at: <https://www.youtube.com/watch?v=w9NCsElax1Y>, May 25, 2018, 1 page.
Hinton et al., "Distilling the Knowledge in a Neural Network", arXiv preprintarXiv:1503.02531, Mar. 2, 2015, 9 pages.
Hook et al., "Automatic speech based emotion recognition using paralinguistics features", Bulletin of the Polish Academy of Sciences, Technical Sciences, vol. 67, No. 3, 2019, pp. 479-488.
"How to adjust the order of control center buttons on iPhone iOS12 version after buying a mobile phone", Available online at: https://jingyan.baidu.com/article/5bbb5albbe5a9713eba1791b.html?, Jun. 14, 2019, 4 pages (Official Copy only). {See communication under 37 CFR § 1.98(a) (3)}.
"How to Enable Google Assistant on Galaxy S7 and Other Android Phones (No Root)", Online available at: <https://www.youtube.com/watch?v=HekIQbWyksE>, Mar. 20, 2017, 1 page.
"How to Use Ok Google Assistant Even Phone is Locked", Online available at: <https://www.youtube.com/watch?v=9B_gP4j_SP8>, Mar. 12, 2018, 1 page.
Hutsko et al., "iPhone All-in-One For Dummies", 3rd Edition, 2013, 98 pages.
Idasallinen, "What's The 'Like' Meter Based on?", Online Available at: <https://community.spotify.com/t5/Content-Questions/What-s-the-like-meter-based-on/td-p/1209974>, Sep. 22, 2015, 6 pages.
Ikeda, Masaru, "beGLOBAL SEOUL 2015 Startup Battle: Talkey", YouTube Publisher, Online Available at: <https://www.youtube.com/watch?v=4Wkp7sAAldg>, May 14, 2015, 1 page.
I News and Tech, "How To Use The QuickType Keyboard In IOS 8", Online available at: < http://www.inewsandtech.com/how-to-use-the-quicktype-keyboard-in-ios-8/>, Sep. 17, 2014, 6 pages.
Internet Services and Social Net, "How to Search for Similar Websites", Online available at: <https://www.youtube.com/watch?v=nLf2uirpt5s>, see from 0:17 to 1:06, Jul. 4, 2013, 1 page.
"iPhone 6 Smart Guide Full Version for SoftBank", Gijutsu-Hyohron Co. Ltd., vol. 1, Dec. 1, 2014, 4 pages (Official Copy Only). {See communication under 37 CFR § 1.98(a) (3)}.
Isik et al., "Single-Channel Multi-Speaker Separation using Deep Clustering", Interspeech 2016, Sep. 8-12, 2016, pp. 545-549.
Jeon et al., "Voice Trigger Detection from LVCSR Hypothesis Lattices Using Bidirectional Lattice Recurrent Neural Networks", International Conference on Acoustics, Speech and Signal Processing (ICASSP). IEEE, Feb. 29, 2020, 5 pages.
Jeong et al., "Development Trend of N-Screen Service", Journal of Broadcasting Engineering, vol. 17, No. 1, Sep. 2012, 18 pages (6 pages of English Translation and 12 pages of Official Copy).
Kannan et al., "Smart Reply: Automated Response Suggestion for Email", Available Online at: https://arxiv.org/pdf/1606.04870.pdf, Jun. 15, 2016, 10 pages.
Kastrenakes, Jacob, "Siri's creators will unveil their new AI bot on Monday", The Verge, Online available at: <https://web.archive.org/web/20160505090418/https://www.theverge.com/2016/5/4/11593564/viv-labs-unveiling-monday-new-ai-from-siri-creators>, May 4, 2016, 3 pages.
King et al., "Robust Speech Recognition Via Anchor Word Representations", Interspeech 2017, Aug. 20-24, 2017, pp. 2471-2475.
Kondrat, Tomek, "Automation for Everyone with MacroDroid", Online available at: https://www.xda-developers.com/automation-for-everyone-with-macrodroid/, Nov. 17, 2013, 6 pages.
Kruger et al., "Virtual World Accessibility with the Perspective Viewer", Proceedings of ICEAPVI, Athens, Greece, Feb. 12-14, 2015, 6 pages.
Kumar, Shiu, "Ubiquitous Smart Home System Using Android Application", International Journal of Computer Networks & Communications (IJCNC) vol. 6, No. 1, Jan. 2014, pp. 33-43.
Kumatani et al., "Direct Modeling of Raw Audio with DNNS For Wake Word Detection", in 2017 IEEE Automatic Speech Recognition and Understanding Workshop (ASRU), 2017, 6 pages.
Lee, Sungjin, "Structured Discriminative Model For Dialog State Tracking", Proceedings of the SIGDIAL 2013 Conference, Aug. 22-24, 2013, pp. 442-451.
Lin, Luyuan, "An Assistive Handwashing System with Emotional Intelligence", Using Emotional Intelligence in Cognitive Intelligent Assistant Systems, 2014, 101 pages.
"Link Your Voice to Your Devices with Voice Match, Google Assistant Help", Online available at: <https://support.google.com/assistant/answer/9071681?co=GENIE.Platform%3DAndroid& hl=en>, Retrieved on Jul. 1, 2020, 2 pages.
Liou et al., "Autoencoder for Words", Neurocomputing, vol. 139, Sep. 2014, pp. 84-96.
Liu et al., "Accurate Endpointing with Expected Pause Duration", Sep. 6-10, 2015, pp. 2912-2916.
Loukides et al., "What Is the Internet of Things?", O'Reilly Media Inc., Online Available at: <https://www.oreilly.com/library/view/what-is-the/9781491975633/>, 2015, 31 pages.
Luo et al., "Speaker-Independent Speech Separation With Deep Attractor Network", IEEE/ACM Transactions on Audio, Speech, and Language Processing, vol. 26, No. 4, Apr. 2018, pp. 787-796.
Maas et al., "Combining Acoustic Embeddings and Decoding Features for End-of-Utterance Detection in Real-Time Far-Field Speech Recognition Systems", in 2018 IEEE International Conference on Acoustics, Speech and Signal Processing (ICASSP) IEEE, 2018, 5 pages.
Mallidi et al., "Device-Directed Utterance Detection", Proc. Interspeech, Aug. 7, 2018, 4 pages.
Marketing Land, "Amazon Echo: Play music", Online Available at: <https://www.youtube.com/watch?v=A7V5NPbsXi4>, Apr. 27, 2015, 3 pages.
"Method to Provide Remote Voice Navigation Capability on the Device", ip.com, Jul. 21, 2016, 4 pages.
"Microsoft Soundscape—A map delivered in 3D sound", Microsoft Research, Online available at: https://www.microsoft.com/en-us/research/product/soundscape/, Retrieved on Jul. 26, 2021, 5 pages.
Mikolov et al., "Linguistic Regularities in Continuous Space Word Representations", Proceedings of NAACL-HLT, Jun. 9-14, 2013, pp. 746-751.
Mnih et al., "Human-Level Control Through Deep Reinforcement Learning", Nature, vol. 518, Feb. 26, 2015, pp. 529-533.
Modern Techies, "Braina-Artificial Personal Assistant for PC(like Cortana, Siri) !!! ", Online available at: https://www.youtube.com/watch?v =_Coo2P8ilqQ>, Feb. 24, 2017, 3 pages.
Müller et al., "A Taxonomy for Information Linking in Augmented Reality", AVR 2016, Part I, LNCS 9768, 2016, pp. 368-387.
Muller et al., "Control Theoretic Models of Pointing", ACM Transactions on Computer-Human Interaction, Aug. 2017, 36 pages.
Nakamura et al., "Study of Information Clouding Methods to Prevent Spoilers of Sports Match", Proceedings of the International Working Conference on Advanced Visual Interfaces (AVI' 12), ISBN: 978-1-4503-1287-5, May 2012, pp. 661-664.
Nakamura et al., "Study of Methods to Diminish Spoilers of Sports Match: Potential of a Novel Concept "Information Clouding"", vol. 54, No. 4, ISSN: 1882-7764. Online available at: <https://ipsj.ixsq.nii.ac.jp/ej/index.php?active_action=repository_view_main_item_

(56) References Cited

OTHER PUBLICATIONS detail&page_id=13&block_id=8&item_id=91589&item_no=1>, Apr. 2013, pp. 1402-1412 (Official Copy Only). {See communication under 37 CFR § 1.98(a) (3)}.
Norouzian et al., "Exploring Attention Mechanism for Acoustic based Classification of Speech Utterances into System-Directed and Non-System-Directed", International Conference on Acoustics, Speech and Signal Processing (ICASSP). IEEE, Feb. 1, 2019, 5 pages.
Pak, Gamerz, "Braina: Artificially Intelligent Assistant Software for Windows PC in (urdu / hindhi)", Online available at: <https://www.youtube.com/watch?v=JH_rMjw8lqc>, Jul. 24, 2018, 3 pages.
Pavlopoulos et al., "ConvAI at SemEval-2019 Task 6: Offensive Language Identification and Categorization with Perspective and BERT", Proceedings of the 13th International Workshop on Semantic Evaluation (SemEval-2019), Jun. 6-7, 2019, pp. 571-576.
Pc Mag, "How to Voice Train Your Google Home Smart Speaker", Online available at: <https://in.pcmag.com/google-home/126520/how-to-voice-train-your-google-home-smart-speaker>, Oct. 25, 2018, 12 pages.
Pennington et al., "GloVe: Global Vectors for Word Representation", Proceedings of the Conference on Empirical Methods Natural Language Processing (EMNLP), Doha, Qatar, Oct. 25-29, 2014, pp. 1532-1543.
Perlow, Jason, "Alexa Loop Mode with Playlist for Sleep Noise", Online Available at: <https://www.youtube.com/watch?v=nSkSuXziJSg>, Apr. 11, 2016, 3 pages.
Philips, Chris, "Thumbprint Radio: A Uniquely Personal Station Inspired By All of Your Thumbs Up", Pandora News, Online Available at: <https://blog.pandora.com/author/chris-phillips/>, Dec. 14, 2015, 7 pages.
Ping, et al., "Deep Voice 3: Scaling Text to Speech with Convolutional Sequence Learning", Available online at: https://arxiv.org/abs/1710.07654, Feb. 22, 2018, 16 pages.
Pocketables.com, "AutoRemote example profile", Online available at: https://www.youtube.com/watch?v=kC_zhUnNZj8, Jun. 25, 2013, 1 page.
"Pose, Cambridge Dictionary Definition of Pose", Available online at: <https://dictionary.cambridge.org/dictionary/english/pose>, 4 pages.
Qian et al., "Single-channel Multi-talker Speech Recognition With Permutation Invariant Training", Speech Communication, Issue 104, 2018, pp. 1-11.
"Quick Type Keyboard on iOS 8 Makes Typing Easier", Online available at: <https://www.youtube.com/watch?v=0CldLR4fhVU>, Jun. 3, 2014, 3 pages.
"Radio Stations Tailored to You Based on the Music You Listen to on iTunes", Apple Announces iTunes Radio, Press Release, Jun. 10, 2013, 3 pages.
Ramakrishnan et al., "Speech emotion recognition approaches in human computer interaction", Telecommunication Systems, vol. 52, 2013, pp. 1467-1478.
Rasch, Katharina, "Smart Assistants for Smart Homes", Doctoral Thesis in Electronic and Computer Systems, 2013, 150 pages.
Raux, Antoine, "High-Density Dialog Management The Topic Stack", Adventures in High Density, Online available at: https://medium.com/adventures-in-high-density/high-density-dialog-management-23efcf91db1e, Aug. 1, 2018, 10 pages.
Ravi, Sujith, "Google AI Blog: On-device Machine Intelligence", Available Online at: https://ai.googleblog.com/2017/02/on-device-machine-intelligence.html, Feb. 9, 2017, 4 pages.
Ritchie, Rene, "QuickType keyboard in iOS 8: Explained", Online Available at: <https://www.imore.com/quicktype-keyboards-ios-8-explained>, Jun. 21, 2014, pp. 1-19.
Robbins, F. Mike, "Automatically place an Android Phone on Vibrate at Work", Available online at: https://mikefrobbins.com/2016/07/21/automatically-place-an-android-phone-on-vibrate-at-work/, Jul. 21, 2016, pp. 1-11.
Rodrigues et al., "Exploring Mixed Reality in Specialized Surgical Environments", In Proceedings of the 2017 CHI Conference Extended Abstracts on Human Factors in Computing Systems (CHI EA '17), Denver, CO, USA, Online available at: https://dl.acm.org/doi/pdf/10.1145/3027063.3053273, May 6-11, 2017, pp. 2591-2598.
Ross et al., "Epidemiology as a Framework for Large-Scale Mobile Application Accessibility Assessment", In Proceedings of the 19th International ACM SIGACCESS Conference on Computers and Accessibility (ASSETS '17), Baltimore, MD, USA, Online available at: https://dl.acm.org/doi/pdf/10.1145/3132525.3132547, Oct. 29-Nov. 1, 2017, pp. 2-11.
Rowland et al., "Designing Connected Products: UX for the Consumer Internet of Things", O'Reilly, May 2015, 452 pages.
Samsung Support, "Create a Quick Command in Bixby to Launch Custom Settings by at Your Command", Online Available at: <https://www.facebook.com/samsungsupport/videos/10154746303151213>, Nov. 13, 2017, 1 page.
Santos et al., "Fighting Offensive Language on Social Media with Unsupervised Text Style Transfer", Proceedings of the 56th Annual Meeting of the Association for Computational Linguistics (vol. 2: Short Papers), May 20, 2018, 6 pages.
Schenk et al., "GazeEverywhere: Enabling Gaze-only User Interaction on an Unmodified Desktop PC in Everyday Scenarios", In Proceedings of the 2017 CHI Conference on Human Factors in Computing Systems (CHI'17). ACM, New York, NY, 30343044. Online Available at: https://doi.org/10.1145/3025453.3025455, May 6-11, 2017, 11 pages.
Seehafer, Brent, "Activate Google Assistant on Galaxy S7 with Screen off", Online available at: <https://productforums.google.com/forum/#!topic/websearch/lp3qIGBHLVI>, Mar. 8, 2017, 4 pages.
Senior et al., "Improving DNN Speaker Independence With I-Vector Inputs", ICASSP, 2014, pp. 225-229.
Seroter et al., "SOA Patterns with BizTalk Server 2013 and Microsoft Azure", Packt Publishing, Jun. 2015, 454 pages.
Settle et al., "End-to-End Multi-Speaker Speech Recognition", Proc. ICASSP, Apr. 2018, 6 pages.
Shen et al., "Style Transfer from Non-Parallel Text by Cross-Alignment", 31st Conference on Neural Information Processing Systems (NIPS 2017), 2017, 12 pages.
Sigtia et al., "Efficient Voice Trigger Detection for Low Resource Hardware", in Proc. Interspeech 2018, Sep. 2-6, 2018, pp. 2092-2096.
Sigtia et al., "Multi-Task Learning for Voice Trigger Detection", in IEEE International Conference on Acoustics, Speech and Signal Processing (ICASSP), 2020, Apr. 20, 2020, 5 pages.
Simonite, Tom, "Confronting Siri: Microsoft Launches Digital Assistant Cortana", 2014, 2 pages (Official Copy Only). {See communication under 37 CFR § 1.98(a) (3)}.
Siou, Serge, "How to Control Apple TV 3rd Generation Using Remote app", Online available at: <https://www.youtube.com/watch?v=PhyKftZOS9M>, May 12, 2014, 3 pages.
"Skilled at Playing my iPhone 5", Beijing Hope Electronic Press, Jan. 2013, 6 pages (Official Copy Only). {See communication under 37 CFR § 1.98(a) (3)}.
Smith, Jake, "Amazon Alexa Calling: How to Set it up and Use it on Your Echo", iGeneration, May 30, 2017, 5 pages.
Song, Yang, "Research of Chinese Continuous Digital Speech Input System Based on HTK", Computer and Digital Engineering, vol. 40, No. 4, Dec. 31, 2012, 5 pages (Official Copy Only). {See communication under 37 CFR § 1.98(a) (3)}.
Speicher et al., "What is Mixed Reality?", In Proceedings of the 2019 CHI Conference on Human Factors in Computing Systems (CHI '19). ACM, Article 537, Glasgow, Scotland, UK, Online available at: https://dl.acm.org/doi/pdf/10.1145/3290605.3300767, May 4-9, 2019, 15 pages.
Sperber et al., "Self-Attentional Models for Lattice Inputs", in Proceedings of the 57th Annual Meeting of the Association for Computational Linguistics, Florence, Italy, Association for Computational Linguistics, Jun. 4, 2019, 13 pages.
Sundermeyer et al., "LSTM Neural Networks for Language Modeling", Interspeech 2012, Sep. 9-13, 2012, pp. 194-197.
Sutskever et al., "Sequence to Sequence Learning with Neural Networks", Proceedings of the 27th International Conference on Neural Information Processing Systems, 2014, 9 pages.
Tamar et al., "Value Iteration Networks", Advances in Neural Information Processing Systems, vol. 29, 2016, 16 pages.

(56) References Cited

OTHER PUBLICATIONS

Tan et al., "Knowledge Transfer in Permutation Invariant Training for Single-channel Multi-talker Speech Recognition", ICASSP 2018, 2018, pp. 5714-5718.
Tech Target Contributor, "AI Accelerator", Available online at: https://searchenterpriseai.techtarget.com/definition/AI-accelerator, Apr. 2018, 3 pages.
Tech With Brett, "Everything the Google Nest Hub Can Do", Available online at: https://www.youtube.com/watch?v=x3vdytgru2E, Nov. 12, 2018, 13 pages.
Tech With Brett, "Google Home Multiple Users Setup", Available online at: https://www.youtube.com/watch?v=BQOAbRUeFRo&t=257s, Jun. 29, 2017, 4 pages.
Tkachenko, Sergey, "Chrome will automatically create Tab Groups", Available online at: https://winaero.com/chrome-will-automatically-create-tab-groups/, Sep. 18, 2020, 5 pages.
Tkachenko, Sergey, "Enable Tab Groups Auto Create in Google Chrome", Available online at: https://winaero.com/enable-tab-groups-auto-create-in-google-chrome/, Nov. 30, 2020, 5 pages.
"Use Macrodroid skillfully to automatically clock in with Ding Talk", Online available at: https://blog.csdn.net/qq_26614295/article/details/84304541, Nov. 20, 2018, 11 pages (Official Copy Only). {See communication under 37 CFR § 1.98(a) (3)}.
Vaswani et al., "Attention is all You Need", 31st Conference on Neural Information Processing Systems (NIPS 2017), 2017, pp. 1-11.
Vazquez et al., "An Assisted Photography Framework to Help Visually Impaired Users Properly Aim a Camera", ACM Transactions on Computer-Human Interaction, vol. 21, No. 5, Article 25, Online available at: https://dl.acm.org/doi/pdf/10.1145/2651380, Nov. 2014, 29 pages.
Velian Speaks Tech, "10 Google Assistant Tips!", Available online at: https://www.youtube.com/watch?v=3RNWA3NK9fs, Feb. 24, 2020, 3 pages.
Villemure et al., "The Dragon Drive Innovation Showcase: Advancing the State-of-the-art in Automotive Assistants", 2018, 7 pages.
Walker, Amy, "NHS Gives Amazon Free Use of Health Data Under Alexa Advice Deal", Available online at: <https://www.theguardian.com/society/2019/dec/08/nhs-gives-amazon-free-use-of-health-data-under-alexa-advice-deal>, 3 pages.
Wang et al., "End-to-end Anchored Speech Recognition", Proc. ICASSP2019, May 12-17, 2019, 5 pages.
Wang, et al., "Tacotron: Towards End to End Speech Synthesis", Available online at: https://arxiv.org/abs/1703.10135, Apr. 6, 2017, 10 pages.
Wang, et al., "Training Deep Neural Networks with 8-bit Floating Point Numbers", 32nd Conference on Neural Information Processing Systems (Neurl PS 2018), 2018, 10 pages.
Wei et al., "Design and Implement on Smart Home System", 2013 Fourth International Conference on Intelligent Systems Design and Engineering Applications, Available online at: https://ieeexplore.ieee.org/document/6843433, 2013, pp. 229-231.
Weng et al., "Deep Neural Networks for Single-Channel Multi-Talker Speech Recognition", IEEE/ACM Transactions on Audio, Speech, and Language Processing, vol. 23, No. 10, Oct. 2015, pp. 1670-1679.
"What's on Spotify?", Music for everyone, Online Available at: <https://web.archive.org/web/20160428115328/https://www.spotify.com/us/>, Apr. 28, 2016, 6 pages.
Wikipedia, "Home Automation", Online Available at: <https://en.wikipedia.org/w/index.php?title=Home_automation&oldid=686569068>, Oct. 19, 2015, 9 pages.
Wikipedia, "Siri", Online Available at: <https://en.wikipedia.org/w/index.php?title=Siri&oldid=689697795>, Nov. 8, 2015, 13 pages.
Wikipedia, "Virtual Assistant", Wikipedia, Online at: <https://en.wikipedia.org/w/index.php?title=Virtual_assistant&oldid=679330666>, Sep. 3, 2015, 4 pages.
Win et al., "Myanmar Text to Speech System based on Tacotron-2", International Conference on Information and Communication Technology Convergence (ICTC), Oct. 21-23, 2020, pp. 578-583.
Wu et al., "Monophone-Based Background Modeling for Two-Stage On-device Wake Word Detection", in 2018 IEEE International Conference on Acoustics, Speech and Signal Processing (ICASSP), Apr. 2018, 5 pages.
Xu et al., "Show, Attend and Tell: Neural Image Caption Generation with Visual Attention", Proceedings of the 32nd International Conference on Machine Learning, Lille, France, 2015, 10 pages.
Yang, Astor, "Control Android TV via Mobile Phone APP RKRemoteControl", Online Available at: <https://www.youtube.com/watch?v=zpmUeOX_xro>, Mar. 31, 2015, 4 pages.
Yates, Michael C., "How Can I Exit Google Assistant After I'm Finished with it", Online available at: <https://productforums.google.com/forum/#!msg/phone-by-google/faECnR2RJwA/gKNtOkQgAQAJ>, Jan. 11, 2016, 2 pages.
Ye et al., "iPhone 4S Native Secret", Jun. 30, 2012, 1 page (Official Copy Only). {See communication under 37 CFR § 1.98(a) (3)}.
Yeh, Jui-Feng, "Speech Act Identification Using Semantic Dependency Graphs With Probabilistic Context-free Grammars", ACM Transactions on Asian and Low-Resource Language Information Processing, vol. 15, No. 1, Dec. 2015, pp. 5.1-5.28.
Young et al., "POMDP-Based Statistical Spoken Dialog Systems: A Review", Proceedings of the IEEE, vol. 101, No. 5, 2013, 18 pages.
Yousef, Zulfikara., "Braina (A.I) Artificial Intelligence Virtual Personal Assistant", Online available at: https://www.youtube.com/watch?v=2h6xpB8bPSA>, Feb. 7, 2017, 3 pages.
Yu et al., "Permutation Invariant Training of Deep Models for Speaker-Independent Multi-talker Speech Separation", Proc. ICASSP, 2017, 5 pages.
Yu et al., "Recognizing Multi-talker Speech with Permutation Invariant Training", Interspeech 2017, Aug. 20-24, 2017, pp. 2456-2460.
Zhan et al., "Play with Android Phones", Feb. 29, 2012, 1 page (Official Copy Only). {See communication under 37 CFR § 1.98(a) (3)}.
Zhang et al., "Interaction Proxies for Runtime Repair and Enhancement of Mobile Application Accessibility", In Proceedings of the 2017 CHI Conference on Human Factors in Computing Systems (CHI '17). ACM, Denver, CO, USA, Online available at: https://dl.acm.org/doi/pdf/10.1145/3025453.3025846, May 6-11, 2017, pp. 6024-6037.
Zhang et al., "Very Deep Convolutional Networks for End-To-End Speech Recognition", IEEE International Conference on Acoustics, Speech and Signal Processing (ICASSP), 2017, 5 pages.
Zhao et al., "Big Data Analysis and Application", Aviation Industry Press, Dec. 2015, pp. 236-241 (Official Copy Only). {See communication under 37 CFR § 1.98(a) (3)}.
Zhao et al., "CueSee: Exploring Visual Cues for People with Low Vision to Facilitate a Visual Search Task", In Proceedings of the 2016 ACM International Joint Conference on Pervasive and Ubiquitous Computing. ACM, UbiComp '16, Heidelberg, Germany, Online available at: https://dl.acm.org/doi/pdf/10.1145/2971648.2971730, Sep. 12-16, 2016, pp. 73-84.
Zhao et al., "Enabling People with Visual Impairments to Navigate Virtual Reality with a Haptic and Auditory Cane Simulation", In Proceedings of the 2018 CHI Conference on Human Factors in Computing Systems (CHI '18). ACM, Article 116, Montréal, QC, Canada, Online available at: https://dl.acm.org/doi/pdf/10.1145/3173574.3173690, Apr. 21-26, 2018, 14 pages.
Zhao et al., "SeeingVR: A Set of Tools to Make Virtual Reality More Accessible to People with Low Vision", In Proceedings of the 2019 CHI Conference on Human Factors in Computing Systems (CHI '19). ACM, Article 111, Glasgow, Scotland, UK, Online available at: https://dl.acm.org/doi/pdf/10.1145/3290605.3300341, May 4-9, 2019, 14 pages.
Zhao et al., "Transferring Age and Gender Attributes for Dimensional Emotion Prediction from Big Speech Data Using Hierarchical Deep Learning", 2018 4th IEEE International Conference on Big Data Security on Cloud, 2018, pp. 20-24.
Zheng, et al., "Intent Detection and Semantic Parsing for Navigation Dialogue Language Processing", 2017 IEEE 20th International Conference on Intelligent Transportation Systems (ITSC), 2017, 6 pages.

(56) References Cited

OTHER PUBLICATIONS

Zhou et al., "Learning Dense Correspondence via 3D-guided Cycle Consistency", Proceedings of the IEEE Conference on Computer Vision and Pattern Recognition (CVPR), 2016, 10 pages.

Zmolikova et al., "Speaker-Aware Neural Network Based Beamformer for Speaker Extraction in Speech Mixtures", Interspeech 2017, Aug. 20-24, 2017, pp. 2655-2659.

Office Action received for Chinese Patent Application No. 201910143076.2, mailed on Sep. 5, 2022, 10 pages (5 pages of English Translation and 5 pages of Official Copy).

Lin Li, "Digital City Construction Guide", Southeast University Press, 2010, 5 pages (Official Copy only). See Communication Under Rule 37 CFR § 1.98(a) (3).

Office Action received for Chinese Patent Application No. 201910143032.X, mailed on Jul. 25, 2023, 16 pages (5 pages of English Translation and 11 pages of Official Copy).

Office Action received for Chinese Patent Application No. 201910143437.3, mailed on Jul. 19, 2023, 11 pages (5 pages of English Translation and 6 pages of Official Copy).

Chenghao, Yuan, "MacroDroid", Online available at: https://www.ifanr.com/weizhizao/612531, Jan. 25, 2016, 7 pages, Cited by the Chinese Patent Office in an Office Action for related Patent Application No. 2021105132524 on Mar. 14, 2022.

"How to adjust the order of control center buttons on iPhone iOS12 version after buying a mobile phone", Available online at: https://jingyan.baidu.com/article/5bbb5albbe5a9713eba1791b.html?, Jun. 14, 2019, 4 pages, Cited by the Chinese Patent Office in an Office Action for related Patent Application No. 2021105132524 on Mar. 14, 2022.

"iPhone 6 Smart Guide Full Version for SoftBank", Gijutsu-Hyohron Co. Ltd., vol. 1, Dec. 1, 2014, 4 pages, Cited by the Japanese Patent Office in an Office Action for related Patent Application No. 2018-192102 on Dec. 6, 2019.

Nakamura et al., "Study of Methods to Diminish Spoilers of Sports Match: Potential of a Novel Concept "Information Clouding"", vol. 54, No. 4, ISSN: 1882- 7764. Online available at: <https://ipsj.ixsq.nii.ac.jp/ej/index.php?active_action=repository_view_main_item_detail&page_id=13&block_id=8&item_id=91589&item_no=1>, Apr. 2013, pp. 1402-1412, Cited by the Japanese Patent Office in an Office Action for related Patent Application No. 2018-211624 on Feb. 7, 2020.

Simonite, Tom, "Confronting Siri: Microsoft. Launches Digital Assistant Cortana", 2014, 2 pages, Cited by the Chinese Patent Office in an Office Action for related Patent Application No. 201680049844.2 on Dec. 18, 2020.

"Skilled at Playing my iPhone 5", Beijing Hope Electronic Press, Jan. 2013, 6 pages, Cited by the Chinese Patent Office in an Office Action for related Patent Application No. 201580029053.9 on Aug. 22, 2019

Song, Yang, "Research of Chinese Continuous Digital Speech Input System Based on HTK", Computer and Digital Engineering, vol. 40, No. 4, Dec. 31, 2012, 5 pages, Cited by the Chinese Patent Office in an Office Action for related Patent Application No. 201710109781.1 on Feb. 22, 2021.

"Use Macrodroid skillfully to automatically clock in with Ding Talk", Online available at: https://blog.csdn.net/qq_26614295/article/details/84304541, Nov. 20, 2018, 11 pages, Cited by the Chinese Patent Office in an Office Action for related Patent Application No. 202010167391.1 on Apr. 20, 2021.

Ye et al., "iPhone 4S Native Secret", Jun. 30, 2012, 1 page, Cited by the Chinese Patent Office in an Office Action for related Patent Application No. 201580029053.9 on Dec. 2, 2019.

Zhan et al., "Play with Android Phones", Feb. 29, 2012, 1 page, Cited by the Chinese Patent Office in an Office Action for related Patent Application No. 201580029053.9 on Dec. 2, 2019.

Zhao et al., "Big Data Analysis and Application", Aviation Industry Press, Dec. 2015, pp. 236-241, Cited by the Chinese Patent Office in an Office Action for related Patent Application No. 202010356666.6 on Jun. 23, 2021.

\* cited by examiner

1900

```
┌─────────────────────────────────────────────────────────────────────┐
│  Provide a task item associated with a triggering criterion, wherein the   │─1902
│  triggering criterion requires an occurrence of any of a plurality of      │
│  communication events, wherein at least two of the plurality of communication │
│          events are of different communication types                       │
│  ┌─────────────────────────────────────────────────────────────────┐       │
│  │ The triggering criterion requires that the communication event be a │─1904
│  │         communication with a specified person                    │       │
│  └─────────────────────────────────────────────────────────────────┘       │
│  ┌─────────────────────────────────────────────────────────────────┐       │
│  │    The first communication event is associated with the specified │      │
│  │  person when the specified person initiates the first communication │─1906
│  │    event or receives the first communication event from the user  │      │
│  └─────────────────────────────────────────────────────────────────┘       │
│  ┌─────────────────────────────────────────────────────────────────┐       │
│  │  The different communication types include a telephone call and an │─1908
│  │                          email                                   │       │
│  └─────────────────────────────────────────────────────────────────┘       │
│  ┌─────────────────────────────────────────────────────────────────┐       │
│  │  The different communication types include a telephone call and a │─1910
│  │                       text message                               │       │
│  └─────────────────────────────────────────────────────────────────┘       │
│  ┌─────────────────────────────────────────────────────────────────┐       │
│  │  The different communication types include a telephone call and a │─1912
│  │                        video chat                                │       │
│  └─────────────────────────────────────────────────────────────────┘       │
└─────────────────────────────────────────────────────────────────────┘
                                    │
                                    ▼
┌─────────────────────────────────────────────────────────────────────┐
│    Detect the occurrence of a first communication event of the plurality of │─1914
│                       communication events                                  │
└─────────────────────────────────────────────────────────────────────┘
                                    │
                                    ▼
┌─────────────────────────────────────────────────────────────────────┐
│          Determine that the triggering criterion is satisfied              │─1916
└─────────────────────────────────────────────────────────────────────┘
                                    │
                                    ▼
┌─────────────────────────────────────────────────────────────────────┐
│ Cause a notification associated with the task item to be presented to a user of │─1918
│                        the electronic device                                │
│  ┌─────────────────────────────────────────────────────────────────┐       │
│  │  The notification includes information associated with the task item. │─1920
│  └─────────────────────────────────────────────────────────────────┘       │
└─────────────────────────────────────────────────────────────────────┘
```

Figure 19

ACTIVE TRANSPORT BASED NOTIFICATIONS

CROSS-REFERENCE TO RELATED APPLICATIONS

The present application is a continuation of U.S. patent application Ser. No. 16/036,730, filed Jul. 16, 2018, entitled "Active Transport Based Notifications", which is a continuation of U.S. patent application Ser. No. 13/729,597, filed Dec. 28, 2012, entitled "Active Transport Based Notifications" which is a Continuation-in-Part of U.S. patent application Ser. No. 13/251,118, filed Sep. 30, 2011, entitled "Performing Actions Associated with Task Items that Represent Tasks to Perform," which in turn claims priority to U.S. Provisional Patent Application No. 61/493,201, filed Jun. 3, 2011, entitled "Generating and Processing Data Items that Represent Tasks to Perform." These applications are incorporated by reference for all purposes as if fully set forth herein.

This application is related to U.S. patent application Ser. No. 12/479,477, filed Jun. 5, 2009, entitled "Contextual Voice Commands," the entire contents of which are hereby incorporated by reference as if fully set forth herein.

This application is related to U.S. patent application Ser. No. 12/987,982, filed Jan. 10, 2011, entitled "Intelligent Automated Assistant," the entire contents of which are hereby incorporated by reference as if fully set forth herein.

This application is related to U.S. patent application Ser. No. 13/251,088, filed Sep. 30, 2011, entitled "Generating and Processing Task Items that Represent Tasks to Perform," the entire contents of which are hereby incorporated by reference as if fully set forth herein.

This application is related to U.S. patent application Ser. No. 13/251,104, filed Sep. 30, 2011, entitled "Triggering Notifications Associated with Tasks Items that Represent Task to Perform," the entire contents of which are hereby incorporated by reference as if fully set forth herein.

This application is related to U.S. patent application Ser. No. 13/251,127, filed Sep. 30, 2011, entitled "Organizing Task Items that Represent Tasks to Perform," the entire contents of which are hereby incorporated by reference as if fully set forth herein.

FIELD OF THE INVENTION

The present invention relates to electronic reminders and, more particularly to, the intelligent generation, organization, triggering, and delivery of reminders and tasks in electronic to-do lists.

SUMMARY

In accordance with some implementations, a method for triggering an action associated with a task is disclosed. In some implementations, the method is performed at an electronic device having one or more processors and memory storing one or more programs for execution by the one or more processors. The method includes receiving a task item associated with a triggering criterion, wherein the triggering criterion requires an occurrence of any of a plurality of communication events, wherein the plurality of communication events includes a telephone call. The method further includes detecting the occurrence of a first communication event of the plurality of communication events. The method further includes determining that the triggering criterion is satisfied. The method further includes, upon determining that the triggering criterion is satisfied, causing a notification associated with the task item to be presented to a user of the electronic device.

In some implementations, the first communication event is a telephone call. In some implementations, at least two of the plurality of communication events are of different communication types. In some implementations, the different communication types include a telephone call and an email. In some implementations, the different communication types include a telephone call and a text message. In some implementations, the different communication types include a telephone call and a video chat.

In some implementations, the first communication event includes content, and the triggering criterion requires that the content relate to a predefined subject. In some such implementations, the method further comprises determining that the triggering criterion is satisfied based at least in part on a determination that the content relates to the predefined subject. In some implementations, the content is text from an email or a text message.

In some implementations, the first communication event is a telephone call, and the method further comprises obtaining a text string corresponding to one or more utterances spoken during the telephone call by at least one participant in the telephone call, wherein the determination that the content relates to the predefined subject includes determining that one or more words in the text string relate to the predefined subject.

In some implementations, the triggering criterion further requires that the communication event be a communication with a specified person.

In some implementations, the first communication event is a text message, and causing the notification to be presented comprises causing an affordance relating to the first task item to be displayed on the electronic device near a representation of the text message. In some implementations, the affordance is a button that, when selected by the user, causes an action associated with the task item to be performed.

In some implementations, the first communication event is an email, and causing the notification to be presented comprises causing an affordance relating to the first task item to be displayed on the electronic device near a representation of the email. In some implementations, the affordance is a button that, when selected by the user, causes an action associated with the task item to be performed.

In some implementations, the first communication event is a telephone call, and causing the notification to be presented comprises causing an audio output relating to the first task item to be produced by the electronic device. In some implementations, the electronic device is a telephone, and the audio output is produced while the telephone is ringing. In some implementations, the audio output is produced during a telephone conversation between a user of the electronic device and a participant of the telephone call. In some implementations, the audio output is produced at a lower volume than a voice of the participant of the telephone call.

In accordance with some implementations, another method for triggering an action associated with a task is disclosed. In some implementations, the method is performed at an electronic device having one or more processors and memory storing one or more programs for execution by the one or more processors. The method includes providing a task item associated with a triggering criterion, wherein the triggering criterion requires an occurrence of any of a plurality of communication events, wherein at least two of the plurality of communication events are of different communication types. The method further includes detecting the occurrence of a first communication event of the plurality of communication events. The method further includes determining that the triggering criterion is satisfied. The method further includes, upon determining that the triggering criterion is satisfied, causing a notification associated with the task item to be presented to a user of the electronic device.

In some implementations, the triggering criterion requires that the first communication event be associated with a specified person. In some implementations, the first communication event is associated with the specified person when the specified person initiates the first communication event or receives the first communication event from the user.

In accordance with some implementations, yet another method for triggering an action associated with a task is disclosed. In some implementations, the method is performed at an electronic device having one or more processors and memory storing one or more programs for execution by the one or more processors. The method includes providing a task item associated with a triggering criterion, wherein the triggering criterion requires an occurrence of a telephone call at an electronic device. The method further includes detecting the occurrence of the telephone call. The method further includes, in response to detecting the occurrence of the telephone call, causing a notification associated with the task item to be presented to a user of the electronic device, wherein the notification is separate from a telephone call notification.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods described herein.

In accordance with some implementations, an electronic device (e.g., a portable electronic device) is provided that comprises means for performing any of the methods described herein.

In accordance with some implementations, an electronic device (e.g., a portable electronic device) is provided that comprises a processing unit configured to perform any of the methods described herein.

In accordance with some implementations, an electronic device (e.g., a portable electronic device) is provided that comprises one or more processors and memory storing one or more programs for execution by the one or more processors, the one or more programs including instructions for performing any of the methods described herein.

In accordance with some implementations, an information processing apparatus for use in an electronic device is provided, the information processing apparatus comprising means for performing any of the methods described herein.

BACKGROUND

People have devised numerous ways to remind themselves of certain tasks or events. Many people have and still use physical media to write on, such as sticky notes and calendars. With the ubiquity of electronic devices, many people have turned to computers to help manage their to-do lists and keep a record of upcoming events. Numerous reminder and to-do applications are available, both for desktop computers as well as handheld devices, such as laptop computers, tablet computers, and "smart" phones.

However, the timeliness and accuracy of a notification provided to a user of a reminder application depends almost entirely on input received from the user. For example, if a user enters a reminder with the wrong date for an important event, then the user might not receive a notification of the event until after the event has occurred. As another example, if a user provides a generic description of a task (e.g., "send him an email") in a to-do application, then, when the user later reads the description, the user might not remember who "him" is and/or what the content of the email should be. In other words, when it comes to reminder and to-do applications, the old adage of "garbage in garbage out" is applicable.

Moreover, users do not always have the time or willingness to set a triggering condition for each and every event that should trigger a reminder notification, and reminder and to-do applications may not be able to monitor each type of event or condition that may be a useful trigger. For example, for a reminder such as "remind me to call my mom after I hear from my sister," traditional reminder and to-do applications would not monitor different communications types so that a reminder notification could be issued regardless of how the user "heard from" her sister.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 18A-20 are flow diagrams depicting methods for triggering actions associated with tasks, according embodiments of the invention.

DETAILED DESCRIPTION

Figure 1:
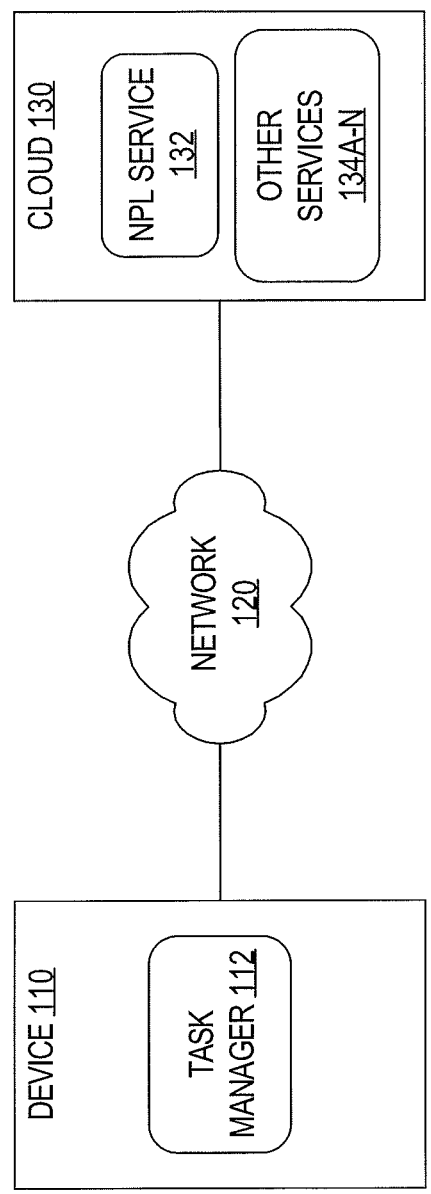
FIG. 1 is a block diagram that depicts a system that is used for creating and processing task items, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Multiple techniques are provided below for assisting a user in managing his/her tasks. Tasks are represented as task items in a computing system. Specifically, approaches for generating task items, organizing task items, triggering the notification of tasks based on corresponding task items, and consuming task items are described in detail below.

With respect to generating a task item, a task item is generated based on input from a user. The input (whether voice or text) includes one or more details about a task while context of the input is used to determine one or more other details about the task. The one or more other details are not reflected in the input. Context may include data that is stored on a device of the user. For example, a user provides the following voice input: "Call George at 5 PM today." The user may have a contact list that includes information about multiple people with the first name of George. However, based on the context of the input, such as a recent voice message from a phone number associated with a particular George, it can be determined which George the user intends to call. In this way, a user is not required to be specific about each detail of a task when providing input about the task.

With respect to triggering a notification of a task item, one or more characteristics of a device may be used to determine whether to trigger the notification. Thus, time is not the sole factor (if at all) of whether a notification should be provided to a user. Examples of such characteristics may include where the device is located, what the device is displaying or processing, and specific movements of the device. For example, the fact that the device is in a car or at work may trigger the generation of a reminder of a task. As another example, if the device is currently displaying web content, then a user of the device may be considered to be "online," which status might trigger a notification of a task to be provided to the user. As yet another example, communication events, such as emails, telephone calls, text messages, and the like, can trigger a notification of a task to be provided to the user.

With respect to "consuming" task items, instead of simply providing a reminder of a task, the task is automated so that a user is not required to perform the steps typically required to perform the task. For example, a user may want to call a particular person at a particular time. When the particular time equals the current time, instead of simply reminding the user about the call, the call can be set up, ready to make without the user having to specify the person's phone number.

With respect to organizing task items, task items may be organized automatically or manually into multiple lists. Each list corresponds to a different attribute of a task item, such as the type of task, the type of criteria that is used to trigger a notification of a task, and the location of where the task is to be performed.

Task Items

Again, a "task item" is an electronic data item that contains one or more details about a task to perform, whether by a user or automatically by a process. A task item is generated based on input from a user. A task item may be one of two types: tasks associated with reminders ("reminder task") and tasks not associated with reminders ("non-reminder task"). A reminder task is associated with an action, such as a notification being generated and provided to a user, while a non-reminder task is not associated with any action. A non-reminder task may be associated with a "complete-by" date or time. However, the complete-by date or time does not trigger the creation of a notification or other action. In other words, while a reminder task is associated with one or more triggering criteria that, when satisfied, trigger an action, a non-reminder task is not. Thus, a "task item" may or may not be associated with one or more triggering criteria that, when satisfied, triggers an action.

System Overview

FIG. 1 is a block diagram that depicts a system 100 that is used for creating task items and processing task items, according to an embodiment of the invention. System 100 includes a device 110, a network 120, and a cloud 130.

Device 110 is any computing device that is capable of receiving input from a user and displaying information about tasks. Non-limiting examples of device 110 include a desktop computer and a handheld device, such as a laptop computer, a tablet computer, and a "smart" phone. In the illustrated embodiment, device 110 includes a task manager 112. Task manager 112 processes task items, both of the reminder type or of the non-reminder type. Task manager 112 may be implemented in software, hardware, or any combination of software and hardware.

Device 110 includes communication technology (e.g., wireless technology) for sharing information with other devices. Device 110 can include a variety of integrated user interface units or can be coupled to user interface units through one or more communication ports or data links of the device. Non-limiting examples of user interface units include a voice input unit (e.g., a microphone), physical input units (e.g., a keyboard, a mouse, a track ball, a rotary dial or wheel, a touchpad, or a touch-screen), and motion sensors (e.g., an accelerometer, magnetometer, or a gyroscope). Any of these user interface units can be implemented as an external unit that communicates with device 110 to provide user input using a wired or wireless communication technology. Examples of wired communication technology include Universal Serial Bus (USB) interface, FireWire interface, etc. Examples of wireless communication technology include Bluetooth, Wi-Fi, and WiMax, infrared. Through these user interface units, device 110 can receive physical or voice inputs from the user.

Device 110 includes one or more output units to present visual and audio information to a user. Non-limiting examples of output units include a display unit for displaying visual data and a speaker for playing audio.

Cloud 130 is implemented by one or more computing devices. Cloud 130 hosts multiple services, such as a NLP (natural language processing) service 132 and one or more other services 134A-N. NLP service 132 uses one or more models of real-world things that a user can talk about in order to make sense of what the user is trying to say. For example, NLP service 132 can determine, based on models and context, what a user may be referring to when the user uses terms like, "him," "there," or "that." An example of how NLP service 132 might operate is described in U.S. patent application Ser. No. 12/987,982, referenced above.

NLP service 132 may employ numerous APIs to communicate with and initiate actions performed by the one or more other services 134A-N and, optionally, other services not hosted in cloud 130. For example, in response to voice data sent from device 110, where the voice data reflects the user command "Reserve two seats at Maribella's in San Jose at 7 PM tonight," NLP service 132 makes an API call to an online reservation service provided by Maribella's restaurant to initiate the creation of two reservations at that restaurant for 7 PM. Thus, NLP service 132 allows many operations to be performed automatically without requiring a user of device 110 to manually input text data and interact with numerous applications.

Communication between device 110 and services hosted in cloud 130 is made possible via network 120. Network 120 may be implemented by any medium or mechanism that provides for the exchange of data between various computing devices. Examples of such a network include, without limitation, a network such as a Local Area Network (LAN), Wide Area Network (WAN), Ethernet or the Internet, or one or more terrestrial, satellite, or wireless links. The network may include a combination of networks such as those described. Without limitation, the network may transmit data according to Transmission Control Protocol (TCP), User Datagram Protocol (UDP), and/or Internet Protocol (IP).

The following description includes numerous examples where both device 110 and cloud 130 take part in generating task items, organizing task items, triggering notifications of task items, and consuming task items, and examples where such operations are performed by either the device 110 or the cloud 130 alone. Instead, one or more of the techniques described herein may be implemented wholly on device 110 (making network 120 and cloud 130 unnecessary), wholly in cloud 130, or using any combination of device 110 and cloud 130.

Processing of Task Items

Task items may be created on device 110 or in cloud 130 based on input received at device 110. Although not depicted, task items may be stored on device 110 or in cloud 130, or synchronized to both. If task items are stored in cloud 130, then task manager 112 may retrieve the task items in response to, for example, input from a user or the one or more triggering criteria associated with one or more task items being satisfied.

In the scenario where task items are created and stored in cloud 130, task manager 112 may be, primarily, a set of one or more user interfaces that display information about tasks. Thus, a task service (not shown) in cloud 130 would be responsible for maintaining task items and triggering any notifications when triggering events occur.

Alternatively, task manager 112 creates and stores task items on device 110. In this scenario, task manager 112 may be entirely responsible for maintaining task items and generating any notifications when triggering events occur. One advantage of this scenario is that device 110 may be operating in an "offline" mode where device 110 is not capable of communicating with any service hosted in cloud 130.

Further, in this scenario, device 110 may include a service like NLP service 132, which may be part of task manager 112 or may execute separately from task manager 112. Such a service acts as a conversational interface to allow a user to quickly and easily create tasks. Such a service may be implemented by a process that is continually executing in the background without requiring a user of device 110 to provide input to cause the service to execute. Thus, whenever device 110 starts up (or restarts), the service is automatically started.

Alternatively, information needed to create task items may be identified by NLP service 132 (i.e., hosted in cloud 130). Device 110 may include a user input interface that continuously executes in the background, identifies input (e.g., voice or text) from a user, and sends the input over network 120 to NLP service 132. Once NLP service 132 identifies task details in the input, NLP service 132 may send task information (e.g., a description of a task and a time to complete the task) (a) over network 120 to task manager 112, which creates and stores a task item based on the information or (b) to a task service in cloud 130 to create a task item based on the information.

Most of the examples provided herein involve NLP service 132 receiving input data from device 110, identifying details (about a task) reflected in the input data, and providing those details to task manager 112. However, embodiments of the invention are not limited to this scenario. Such examples may alternatively involve only device 110 or may involve device 110 as merely an input and display device where NLP service 132 and a task service in cloud 130 provide the primary functionality.

I. Generating Task Items Based on Context

According to an embodiment of the invention, a task item is generated based on input and context of the input. "Context" of input refers to data that is currently or recently (relative to input, from a user, that initiated the generation of a task item) displayed or processed at device 110. Thus, context data is not reflected in the input from the user. For example, a user of device 110 may provide the following voice input: "Send him an email about the project when I get home." The pronoun "him" is ambiguous because it is not clear, from the input alone, to whom "him" refers. However, the context of the voice input may be that device 110 currently displays (or just recently displayed) an email from an individual named Jack Bauer where the email includes a request for a status update about a project named "Bunny." Based on the voice input and the context, task manager 112 (or a task service in cloud 130) creates a task item that includes the description "Send Jack Bauer an email about Project Bunny" and that includes the triggering criterion of device 110 being at a geographical location that is at or near the user's home. When device 110 is at or near the user's home, task manager 112 causes a notification to be displayed on device 110 where the notification includes the description from the task item.

Figure 2:
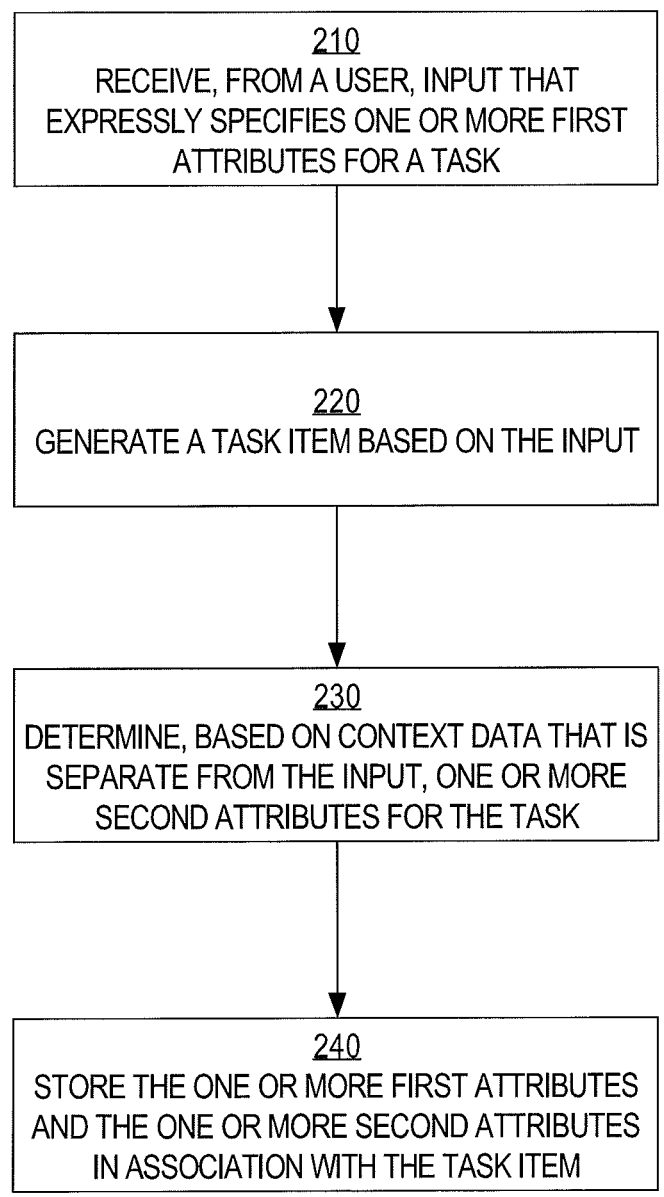
FIG. 2 is a flow diagram that depicts a process for generating a task item based on context of user input, according to an embodiment of the invention.

FIG. 2 is a flow diagram that depicts a process 200 for generating a task item based on context of user input, according to an embodiment of the invention. At step 210, input that expressly specifies one or more first attributes for a task is received from a user. The input may be text input or voice input. The text input may be from a user of device 110 pressing physical keys on device 110 or pressing a touch screen of device 110 that includes a graphical keyboard. Additionally or alternatively, device 110 includes a microphone that accepts, from a user, voice input that device 110 converts into voice data. Device 110 may send the input data (whether voice data or text data) to NLP service 132, which analyzes the input data to identify the one or more first attributes for the task. Instead, as noted previously, device 110 may include functionality to analyze the input data to identify the one or more first attributes for the task. (Although many of the examples herein refer to natural language processing, natural language processing is not required.)

At step 220, a task item is generated for the task based on the input data. At step 230, one or more second attributes for the task are determined based on context data that is separate from the input. Although step 230 is depicted as occurring after step 220, step 230 may occur before step 220.

At step 240, the one or more first attributes and the one or more second attributes are stored in association with the task item.

The steps of process 200 may be performed by one or multiple devices. For example, the input in step 210 may be processed at device 110 to generate the task item. In this scenario, task manager 112 (or another process executing on device 110) identifies the context data associated with the input to determine the one or more second attributes, for the task, that are not identified in the input. Task manager 112 then stores the one or more second attributes in or in association with the task item.

Alternatively, in another scenario, device 110 sends the user input over network 120 to NLP service 132. NLP service 132 accepts, as input, context data associated with the input to determine the one or more second attributes, for the task, that are not identified in the input. Context data may have been sent to NLP service 132 prior to the input that initiates the generation of the task item (in step 220). NLP service 132 sends the one or more second attributes to task manager 112 (or a task service in cloud 130). Task manager 112 stores the one or more second attributes in or in association with a newly-generated task item.

Certain words or phrases may be used to cue NLP service 132 to communicate with manager 112. For example, user commands that begin with "Remind me . . . " and "I need to . . . " are used by NLP service 132 to determine to communicate with task manager 112. In response to detecting one of those user commands, NLP service 132 analyzes the input data (from device 110) and, optionally, context data for certain types of task details, such as a location, time, description, and/or action. NLP service 132 then determines to communicate with task manager 112 and sends, to task manager 112, the task details as part of the communication(s).

Sources of Context Data

Context data associated with user input that initiates the generation of a task item may come from one of many sources. Non-limiting examples of context data include data that is or was displayed on device 110 ("display data"), data that is stored on or in association with device 110 ("personalized data"), data that is or was processed by device 110 ("process data"), data that was previously provided by a user of device 110 ("input data"), data that indicates the location of device 110 ("location data").

The following is an example of display data, or data that is or was displayed on device 110. Device 110 displays a map that includes a marker associated with a specific location on the map. A user of device 110 then says, while the map is displayed or soon after the map was displayed, "I need to be there by 5 today." NLP service 132 (or a voice analyzer on device 110) analyzes voice data that reflects the voice input. NLP service 132 analyzes data that is currently displayed on device 110 to determine what "there" refers to. NLP service 132 identifies the marker and the associated location and replaces "there" with the location. NLP service 132 sends, to task manager 112, task data that indicates 5 PM today as the completion time of the task and the specified location as the location of the task. Task manager 112 generates a task item based on the task data.

As another example of display data, device 110 displays an email that is from a particular sender and includes a subject line. A user of device 110 then says, "I need to email him about this subject in two hours." Device 110 sends voice data that reflects this input and an image of what is displayed to NLP service 132. In response, NLP service 132 identifies the email address of the sender of the email and the subject of the email. NLP service 132 sends, to task manager 112, task data that indicates a time of two hours from the current time as the completion time of the task and The following is an example of personalized data, or data that is stored on or in association with device 110. A user of device 110 says, "I will have lunch with Rachelle tomorrow at 12 noon." Device 110 sends voice data that reflects this input to NLP service 132, which identifies "Rachelle" in the voice data. NLP service 132 looks up "Rachelle" in contact data or an "address book" (stored on device 110 or in cloud 130) and determines that the last name of Rachelle is Goodwin. NLP service 132 then causes "Rachelle Goodwin" to be associated with a task item that is generated for the task. In addition to or instead of being stored on device 110, personalized data may be stored in cloud 130, i.e., remote to device 110.

The following is an example of process data, or data that was recently processed by device 110. For example, a user of device 110 used device 110 as a phone to communicate with a friend. Device 110 keeps track of who the user recently spoke with. After ending the call, the user says, "Remind me to call her back in 30 minutes." NLP service 132, in addition to analyzing the voice input, analyzes data that indicates who recently established a phone call with device 110 (e.g., the last five phone calls). NLP service 132 determines the phone number of the most recently established phone call with device 110. NLP service 132 then determines, based on contact data, that the phone number is associated with particular individual. NLP service 132 sends, to task manager 112, task data that indicates a task of calling, a time of 30 minutes from the current time as the completion time of the task, the name of the particular individual, and, optionally, the phone number of the particular individual. Task manager 112 generates a task item based on the task item.

The following is an example of input data, or data that was recently (e.g., the last 5 minutes) provided by a user of device 110. The input from the user may be text input or voice input. Device 110 or NLP service 132 keeps track of recently entered input and may use that input to determine the identity of certain terms reflected in current input. For example, a user of device 110 says, "Remind me to meet him there at 7 tonight." NLP service 132 receives voice data that reflects that voice input and identifies the terms "him" and "there." Although it is not clear who "him" is and where "there" is, NLP service 132 accesses input that was recently received from the user. Such recently-received input reflects the names "George Reed" (identified as a name of a person) and "Starbucks" (identified as a place). In response, NLP service 132 causes a task item to be generated where the task is to "Meet George Reed at Starbucks" where the time is 7 PM of the current day.

The following is example of location data, or data that indicates a location of device 110, whether current or past. A user of device 110 says, "Remind me to meet Julian here next Thursday for lunch." Device 110 sends voice data that reflects this input to NLP service 132. NLP service 132 identifies the term "here" and, in response, determines where device 110 is currently located. The current location may be determined in numerous ways. For example, device 110 may provide, to NLP service 132, a geographical location, such as longitude and latitude coordinates. NLP service 132 may then determine, based on the coordinates, a name of the place or establishment that is located at those coordinates. NLP service 132 causes a name of the place or establishment to be associated with a task item for the task to meet Julian for lunch on the date indicated.

Alternatively, the user may say, "I need to meet Josh Peters tomorrow at the same place where I was last Thursday at noon." Device 110 sends voice data that reflects this input to NLP service 132. NLP service identifies the phrase "at the same place where I was last Thursday at noon" and, in response, determines where device 110 was located last Thursday at noon. NLP service 132 accesses location history data (stored in cloud 130 or stored on device 110 and sent to NLP service 132) and determines where device 110 was located last Thursday at noon. The location history may indicate the name of a place or may consist of geographical coordinates. If geographical coordinates, then NLP service 132 determines a name of the place or establishment that is located at those coordinates. NLP service 132 causes that name to be associated with a task item for the task to meet Josh Peters on the date indicated.

Events that occur with respect to device 110 may also be used to create task items. Such events may fall into one or more categories (or types) of context data described above, such as display data, presentation data, and process data. For example, device 110 detects an incoming call and notifies the user of the call by causing a phone number or other identifying information about the call or caller to be displayed on a screen of device 110. In addition to this information, the display may include three selectable options: "Answer", "Ignore", and "Call Back Later." If the user selects "Call Back Later", then a task item is created where the task item identifies the caller and, optionally, a time of the call and/or a time to make a call to the caller. Also, the task item may be automatically categorized as a task of type "To Call."

Many of the examples herein regarding generating task items include a user providing voice or text input that includes details about a task. Another non-limiting example of how a task item may be generated is a user selecting (or highlighting) text that is displayed on a screen of device 110. The selected text is considered context data. After the text is selected, the user may be presented with one or more options, one of which is a "Remind" option which, when selected; causes a task item to be generated. Task manager 112 generates the task item based on the information reflected in the selected text. Details of the task item may be also determined from other context data, such as a time or event to trigger a notification of the task.

Virtual Dialogue

In some situations, NLP service 132 is unable to determine one or more details about a task based on input received from device 110 and the context associated with the input. Thus, in an embodiment, NLP service 132 prompts a user of device 110 for further input to determine the one or more details. The one or more details may pertain to any attribute of a task item, such as the description of the task, the location of the task, the location of a reminder (if any), or the time of the task.

For example, NLP service 132 receives, from device 110, voice data that reflects a user's command to "Remind me to call Steve at 7." NLP service 132 may have access to information (e.g., an address book) about numerous contacts, of the user, that have the name of Steve. Further, nothing in the address book can be used to disambiguate which of the Steve contacts to call. Therefore, NLP service 132 sends, to device 110, the following message to be displayed (or played audibly) by device 110: "Do you mean Steve Anderson, Steve Hanson, or Steve Jobs?" The user then provides, to device 110, voice or text input that indicates one of the three Steve contacts. In response, device 110 sends the corresponding voice or text data over network 120 to NLP service 132.

As another example, NLP service 132 receives, from device 110, voice data that reflects a user's command to "I need to pick up bread at Whole Foods." In response, NLP service 132 performs a lookup of the nearest Whole Foods stores to (a) the current location of device 110 or (b) the user's home. There may be multiple Whole Foods stores that are near device 110's current location and near the user's home. Therefore, NLP service 132 sends, to device 110, the following message to be displayed by device 110: "Which Whole Food's? The one on Almaden Rd, Chester Expressway, or Green Street?" The user then provides, to device 110, voice or text input that indicates one of the three Whole Foods stores. In response, device 110 sends the corresponding voice or text data over network 120 to NLP service 132.

As another example, NLP service 132 receives, from device 110, voice data that reflects a user's command to "Remind me to text Jerry by 8." In response, NLP service 132 determines, based on the voice data and the context of the input that Jerry is Jerry Wall, indicated in the user's contact list (or address book). However, it is unclear whether the user intended 8 AM or 8 PM as the time to send an SMS message to Jerry. Therefore, NLP service 132 sends, to device 110, the following message to be displayed by device 110: "Do you want to text Jerry Wall at 8 AM or 8 PM?" The user then provides, to device 110, voice or text input that selects one of the two times. In response, device 110 sends the corresponding voice or text data over network 120 to NLP service 132.

Autocategorization of Task Items

In an embodiment, NLP service 132 determines, based on input from a user of device 110, one or more categories to associate with a task item. The one or more categories may be one of many different categories, which may be virtually limitless. Non-limiting examples of categories with which a task item may be associated include things to purchase, things to do on vacation, things to do at work, and things to do while driving. Each category may be associated with a sub-category. For example, a "purchase category" may be divided into a grocery category indicating items to purchase at a grocery store, a book category indicating books to purchase, and a music category indicating songs to purchase.

For example, a user may provide the following voice input to device 110: "Remind me to get milk." Device 110 sends voice data that reflects that input to NLP service 132. NLP service 132 determines that a task item should be created and that "get milk" should be the description associated with the task item. NLP service 132 may also determine that milk is a grocery item and that the task item should be associated with a grocery category and/or a purchase category. Thus, NLP service 132 may send, to task manager 112, category data that indicates one or more categories with which the task item (whether created by NLP service 132, by a task service in cloud 130, or by task manager 112) should be associated.

As will be described hereinafter, the one or more categories associated with each task item may be used to organize task items that belong to the same category and display, on device 110, task items of the same category. This will allow a user of device 110 to view task items by category, in addition to or instead of by completion time, by creation time, by trigger type (described hereinafter), by location, by type (e.g., reminder task v. non-reminder task), or by some other criterion.

II. Triggering Notifications of Task Items

As noted previously, a task item may be associated with one or more triggering criteria (or triggers) that, when satisfied, causes a notification to be presented to a user of device 110 or some other action to be performed. When one or more triggering criteria of a task item are satisfied, a notification (or other action) is "triggered." Non-limiting examples of triggering criteria include time, location, relative travel time, context triggers, and exogenous triggers, each of which is described in more detail below.

Time Trigger

The time of a time trigger may be an absolute time, a relative time, a recurring time, or a symbolic deadline. An example of an absolute time is Jun. 6, 2011, 9 AM Pacific Time. An example of a relative time is "10 minutes before the Patriots-Jets football game." An example of a recurring time is "Every Thursday at LOAM." An example of a symbolic deadline is "end of business day".

Location Trigger

According to an embodiment of the invention, the location of device 110 is a triggering criterion associated with a task item. Such a triggering criterion is referred to herein as a "location trigger." The location of device 110 may be determined in one of many ways. For example, the location of device 110 may be automatically determined based on Wi-Fi positioning, cell positioning, and/or GPS (global positioning system) positioning. Device 110 may determine its current location with or without input from a service in cloud 130.

In an embodiment, a user may provide input that indicates a label to be associated with a certain geographical location. For example, a user of device 110 may speak the following sentence, "I am home" or "I am at Whole Foods." NLP service 132 may then associate the word "home" or phrase "Whole Foods" with the current location of device 110, as determined based on one of the three positioning methods mentioned previously. This association of a word with a location may be later leveraged to determine where "home" or "Whole Foods" is located.

A location trigger may not be associated with a specific geographic location or area. Instead, a location trigger may be associated with a place that is not limited to a specific geographic location or area. For example, a location trigger of a task item may be "on the road" or "while driving." Device 110 (or a process executing on device 110) determines that the current location of device 110 is on a freeway or another busy road. Thus, this determination can be made regardless of the speed at which device 110 is moving or whether device 110 is paired with another device that would indicate that the user is traveling. Based on this determination, task manager 112 analyzes one or more task items to determine whether any task items are associated with the "on the road" or "while driving" location trigger.

As another example, a location trigger of a task item may be the user's car. Specifically, the user may have provided the following voice command: "Remind me to call my mom while driving." NLP service 132 analyzes voice data that reflects that command and determines that "while driving" refers to the user's car. The user's car may have a Bluetooth-enabled component to allow device 110 to communicate with the user's car. When device 110 comes into range of a Bluetooth signal propagated by a Bluetooth-enabled component in the user's car, device 110 determines that device 110 is located in (or at least near) the user's car. In response to this determination, task manager 112 triggers the location trigger of the task item. Task manager 112 causes a reminder message to be displayed on device 110, where the reminder message informs the user to call his mother. The user may then provide a single tap or a voice response that causes a phone application executing on device 110 to initiate a call to a phone number associated with the user's mom.

While establishing a connection (or "pairing") with another Bluetooth-enabled device is one example of pairing that can be used to determine device 110's location, other types of pairings are possible. For example, device 110 may detect certain network data during the evening and morning hours. The network data indicates one or more networks to which device 110 may connect. The network data may include the names of one or more networks or MAC addresses of one or more routers. Device 110 may then determine that whenever that network data is detected, device 110 is considered to be at the user's home. Thus, actual pairing is not required since pairing entails the establishment of a connection between device 110 and another device, such as a router. As another example, device 110 may detect a Wi-Fi signal on a train, subway, or bus. The Wi-Fi signal might indicate the type of transportation that corresponds to the Wi-Fi signal. Thus, device 110 might detect, based on the Wi-Fi signal, that its location is "on a train," "in a subway," or "on a bus." If a triggering criterion of a task item indicates one or more of these locations, then an action associated with the task item may be triggered. Further, such "transit-oriented" locations may also be considered to be associated with specific contexts (described in more detail below), such as "in transit" or "while traveling." Thus, detection by task manager 112 of such contexts may cause actions associated with certain task items to be performed.

The foregoing examples of location triggers can be categorized as "arrival triggers," such as are found in user input to "Remind me to do X when I arrive at Y." Another type of location trigger is a "departure trigger," an example of which is found in the user command to "Remind me to do X when I leave work" or " . . . when I leave here." In an embodiment, in the departure trigger scenario, a minimum distance from the current location and the location of the departure is required before a particular departure trigger "fires." Such a minimum distance may be helpful to avoid the performance of corresponding actions when there are false starts.

Additionally, a location trigger may be one of multiple conditions that trigger an action of a task item. Examples of user commands that include multiple conditions include "Remind me to do X when I get home or at 8 PM at the latest," "Remind me to do X before 8 PM or when I leave, whichever is first," and "Remind me to do X before 8 PM or while I am driving, whichever is first."

Travel Time Trigger

In an embodiment, the location of device 110 and a time associated with a task item is used to provide a notification to a user of device 110. Thus, while the time may be one of the one or more triggering criteria associated with the task item, the location of device 110 may not be, at least explicitly so.

Figure 3:
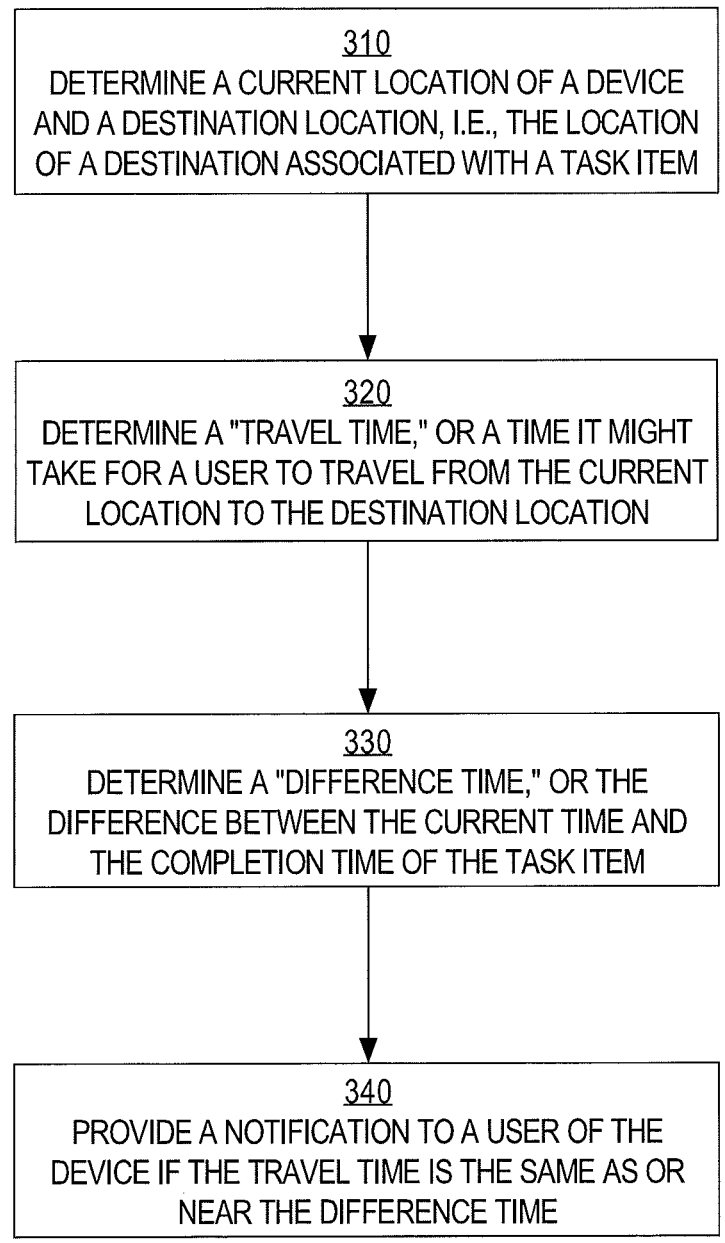
FIG. 3 is a flow diagram that depicts a process for determining a time to provide a reminder to a user ahead of a scheduled time for a task, according to an embodiment of the invention.

FIG. 3 is a flow diagram that depicts a process 300 for determining a time to provide a reminder to a user ahead of a scheduled time for a task, according to an embodiment of the invention. Process 300 may be performed by one or more processes executing on device 110 or in cloud 130. However, for ease of explanation, all the steps in process 300 are performed by task manager 112.

At step 310, task manager 112 determines a current location of device 110. At step 320, task manager 112 determines a location of a destination (or "destination location") associated with (or identify by) a task item. At step 320, based on the distance between the two locations, task manager 112 determines a "travel time," or the time it might take for the user of device 110 to travel to the destination location. At step 330, task manager 112 determines a "difference time," or the difference between the current time and the time triggering criterion associated with the task item. At step 340, if the travel time is the same as or near the difference time, then task manager 112 provides a notification to the user. This notification acts as a reminder for the user to begin (if s/he has not already done so) traveling to the destination.

For example, a task item may be for a reminder to meet Sue at a particular restaurant at 2 PM. Task manager 112 determines the location of device 110 and the location of the particular restaurant. The location of the particular restaurant may be determined by initiating, e.g., an Internet search and identifying the closest restaurant, with the same name, to device 110's location. Alternatively, an address of the particular restaurant may already be stored in association with the task item. Based on the distance between device 110's location and the particular restaurant, task manager 112 determines how long it will take for the user of device 110 to travel to the particular restaurant (or "travel time"). When the travel time is the same as or near (e.g., within 10 minutes) the difference between the current time and the time trigger (i.e., 2 PM), then task manager 112 causes, to be displayed on device 110, a message that indicates that the user should leave soon to arrive at the particular restaurant at 2 PM.

In an embodiment, the time of when to leave for a destination changes based on the current location of device 110. For example, when the current location of device 110 is at location A and the destination is at location B, task manager 112 determines that the user should begin traveling 50 minutes before the time of a scheduled task. However, in response to detecting that the current location of device 110 is now at location C, task manager 112 determines that the user should begin traveling 20 minutes before the time of the scheduled task. For example, a user of device 110 may be at home at the beginning of the day and task manager 112 determines that it will take 50 minutes to travel, from the user's home, to the location of a dinner event in the evening. Later in the day, the user of device 110 travels to work, which is closer to the location of the dinner event. In response to device 110 being at a different location, task manager 112 determines that it will take 20 minutes to travel, from the user's work, to the location of the dinner event.

In an embodiment, the time of when to leave for a destination changes based on current traffic information. For example, at 2:30 PM, task manager 112 determines that the time of when a user of device 110 should leave for a restaurant is 5:00 PM. However, due to a car accident on a freeway that the user can take to arrive at the restaurant, the traffic slows considerably. Task manager 112 determines, at 3:30 PM, that the time of when the user should leave for the restaurant is 4:00 PM.

Figure 4:
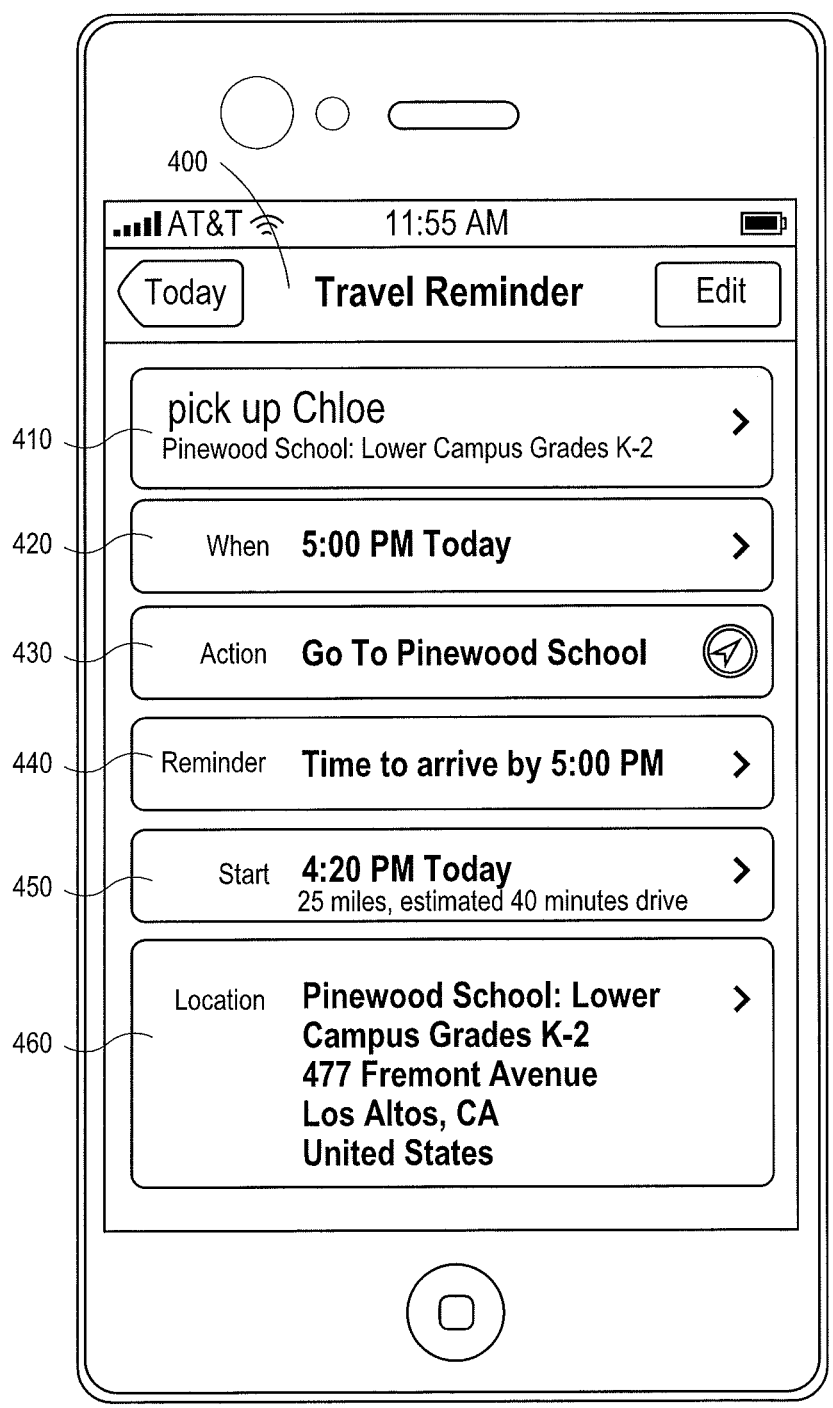
FIG. 4 is a view of a travel reminder, according to an embodiment of the invention.

FIG. 4 is a view 400 of a travel reminder, according to an embodiment of the invention. View 400 is displayed by device 110. The travel reminder of view 400 contains six data items. The six data items include: (1) a description 410 of the corresponding task ("pick up Chloe"); (2) a time 420 of when to complete the task ("5:00 PM Today"); (3) an action 430 to perform when the user of device 110 should begin traveling to the destination; (4) a reminder time 440 that indicates that the user would like to be reminded of when the user should begin traveling to arrive at the destination on time; (5) a start time 450 that indicates when the user should begin traveling to arrive at the destination on time; and (6) a location 460 that indicates a name of the destination and an address of the destination. Another travel reminder that device 110 displays may contain more or less data items.

The action associated with action 430 may be triggered (or performed) in response to task manager 112 determining that the current time (indicated at the top of travel reminder) equals the time indicated by start time 450. In the illustrated example, action 430 is a map-related action where task manager 112 causes a map to be generated at start time 450 and displayed to the user of device 110. The map includes an indication of the address of location 460, an indication of the user's current location, or both. Instead of automatically causing the map to be displayed at start time 450, task manager 112 might first cause a message to be displayed on device 110, wherein the message includes an option to generate the map. If the user selects the option (e.g., through voice input or tapping on the screen), then task manager 112 causes the map to be generated and displayed.

A reminder setting may be in an "on" or "off" mode. In FIG. 4, reminder time 440 is in an "on" mode. If reminder time 440 is in an "off" mode, then the travel reminder of view 400 might not include reminder time 440 or start time 450.

As indicated previously, task manager 112 might change start time 450 in response to changes in device 110's location. Thus, while start time 450 may indicate "3:30 PM Today" when device 110 is located at the user's home in the morning, start time 450 may indicate "4:20 PM Today" when device 110 is located at the user's work office in the afternoon.

In an embodiment, task manager 112 checks for changes in computed start time 450 in response to significant changes in device 110's location. Significant changes in location may be determined as a result of other events that are already being computed. For example, device 110 might already process events when it transitions between cell towers, and these events could trigger the re-computation of a change in location and, therefore, in an updated start time 450. Other non-limiting examples of events that indicate a potential significant change in location are changes in Wi-Fi signatures detected, the computation of accurate GPS locations for some other application (such as maps or navigation), a power cycle event, turning on or off radios on the device, alerts based on accelerometer signals, and the receipt of text messages or push notifications that contain location information.

In an embodiment, task manager 112 combines strategies for detecting significant event changes. For example, in a low power/low resolution mode, task manager 112 only checks for significant location changes every N minutes or only when some periodic computation occurs, such as checking for incoming data. In a high power/high resolution mode, task manager 112 uses cell tower positioning and/or GPS. A combined strategy might run the low power solution by default and then invoke the high power solution when the estimated start time is soon or when other events occur (for example, a change in Wi-Fi or Bluetooth signatures is detected).

In an embodiment, a travel reminder or start time item in a travel reminder may be associated with one or more modes of transportation. Non-limiting examples of modes of transportation include driving a car, riding a bus, bicycling, and walking. A default transportation mode may be driving a car. For example, task manager 112 may provide the option for a user to view start time 450 in a "car" mode, a "bus" mode, a "bike" mode, a "walking" mode, or multiple modes simultaneously. Depending on the current mode(s) selected for start time 450, the start time may vary widely. For example, in FIG. 4, while start time 450 indicates "4:20 PM Today" for a car mode, start time 450 may indicate "3:15 PM Today" for a bus mode, "3:45 PM Today" for a biking mode, and "11:30 AM Today" for a walking mode.

In a related embodiment, a task item is associated with both a location and a date/time and a notification of the task may be triggered by either the user (or, rather, the user's device) being at the location or by the date/time. For example, if the user's device is at the location, (either on the date or regardless of the date), then a notification is triggered. If the user has not arrived at the location on the day indicated by the date (or at the location by the time), then the time is used as a "last resort" for triggering a notification.

Context Triggers

As described previously, time and location are examples of types of triggering criteria associated with a task item. Another type of triggering criteria associated with a task item is context. A "context trigger" refers to one or more characteristics of device 110 other than simply the device 110's location. Thus, like context triggers, travel triggers and travel time triggers also refer to one or more characteristics of device 110.

Context triggers may be categorized into one of two types: data-oriented context triggers and spatial-oriented context triggers. Non-limiting examples of data and/or events on which data-oriented context triggers can depend include the kind or type of data that device 110 is displaying on its screen (e.g., video), the specific application(s) or type of application(s) that are currently executing on device 110 (e.g., a texting application or a music application), the type of input that device 110 is receiving from a user (e.g., voice, text, selections, button presses), the occurrence of (or a property of) a communication event (e.g., receiving or initiating a telephone call, text message, or email, etc.), and the type of network connections available to device 110 (e.g., Wi-Fi or cellular network).

For example, a user command that device 110 receives may be "I need to email Bob when I am surfing the Internet." The phrase "surfing the Internet" is presumed to mean that when the user is interacting with a web browser on device 110, the context of device 110 (or of the user) is "when online." In response to determining the context of the device or of the user, a reminder will be sent to the user to inform the user to email Bob. Additionally another reminder may be provided to the user for any other task items that are associated with the "when online" context trigger.

As another example, a user command that device 110 receives may be "Remind me to email Jane Smith when I have a Wi-Fi connection." In response to device 110 detecting a Wi-Fi signal that does not require a password or that requires a password accessible to device 110, task manager 112 causes a notification to be displayed on a screen of device 110, where the notification indicates that Jane is to email Jane Smith.

Another type of data-oriented context trigger is a communication based trigger. Communication based triggers detect the occurrence of and/or a property of a communication event that occurs at or is detectable by device 110. Communication events include, for example, telephone calls, emails, text messages (e.g., SMS messages, Internet chat messages, IMESSAGE messages), videotelephony calls (e.g., FACETIME video chat sessions), and the like. These communication events can be used as triggering criteria for reminder notifications. In particular, by monitoring various communication types, such as the examples listed above, the usefulness and relevance of reminder notifications can be increased. For example, triggering criteria can be selected to more closely match the user's intent in setting the reminder. For example, when a user asks to be reminded to mention something to a person "the next time I talk to her," it may more accurately reflect the user's intent to trigger the reminder before or during any communication event with that person—regardless of the communication type—rather than just monitoring for a communication event of a single type (e.g., a telephone call).

In some implementations, communication based triggers are configured to detect the occurrence of a communication event with a certain person or group of people that the user identifies when creating the task item. For example, a user may issue a command to device 110 to "remind me to ask my Mom about Thanksgiving plans next time I talk to her." A task item can then be created that will detect the next communication event between the user and his mother.

Several types of triggering criteria can be established for communication based triggers. For example, triggering criteria can be based on the type of communication event (e.g., telephone calls, emails, etc.), the identity of a party to a communication event (e.g., a sender of an email, a participant in a telephone call), the initiator of a communication event (e.g., who called whom), the content of a communication event (e.g., whether the communication relates to a particular subject or includes particular words), or any combination of these or other factors. Thus, the statement "next time I talk to her" in the example above may be interpreted as a condition on the party to the communication event (i.e., the user's mother) and on the type of communication event (i.e., that the communication type must include a voice communication, component). As discussed below, that statement could also be interpreted without regard to the type of communication event, such that the reminder is triggered when any type of communication is detected between the user and his mother. With respect to conditions on the initiator of the communication, the statement "next time I talk to her" may suggest that the user did not intend to constrain the triggering event based on who initiated the communication, and the reminder can be triggered regardless of who called whom, for example. On the other hand, the command "next time I call her," may be interpreted such that the reminder is only triggered if the user initiates the communication with his mother. Further examples and explanations of communication based triggers and various triggering constraints are discussed below.

In some implementations, the specific type or types of communication events that trigger a reminder depend on the particular words in the user input that established the reminder. For example, in order to create a task item with a communication based trigger, a user may issue the following command to device 110 (e.g., as a voice input): "Remember to text Mom when I am talking to my sister Sarah." As noted above, in some implementations, the phrase "when I am talking to my sister Sarah" is presumed to mean that a reminder should be provided to the user when a voice communication (e.g., a phone call) is established with Sarah. In some implementations, however, the command is interpreted to mean that a reminder should be triggered when any type of communication event with Sarah is detected, such as a phone call, an email, a text message, a videochat, etc. Thus, in some implementations, device 110 monitors communication events of multiple different types in order to determine whether a triggering criterion has been met. Given the various ways in which people communicate, and the numerous communication types available on the device 110, triggering a single notification with multiple types of communications provides for flexible and convenient task reminders. Indeed, it would be a nuisance if a user had to create a different rule or triggering criterion for each communication type, such as one reminder to be triggered based on an email, another based on a phone call, another based on a text message, and so on, especially when all of the reminders would have identical content.

In some cases, though, users will wish to specify that only particular communication types are to trigger a particular notification. For example, a user may request a notification to be triggered "the next time I call James," "the next time I email James," or "the next time I text with James," etc. In these cases, tasks will be created with triggers limited to phone calls, emails, or text messages, respectively. In some implementations, users may specify a particular group of communication types to trigger a particular notification. For example, a user may request a notification for a task to be triggered "the next time I text or email with James." Accordingly, this notification will be triggered by a text message or email communication event with a contact named "James."

In some implementations, NLP service 132 interprets the particular terms in a task item creation command to determine what communication types to monitor as triggering criteria for that task item. For example, in some implementations, NLP service 132 interprets phrases such as "talk to," "speak with," "chat with," and "hear from" as establishing a trigger based on any communication type, and not only phone calls. Specifically, many users may understand these terms to relate to several types of communication (e.g., phone, text, etc.), rather than to just a single type (e.g., phone). Accordingly, when a command is received that uses these terms, the triggering criteria will not be limited to only one communication type. Moreover, interpreting such terms to include different communication types may reflect a user's intent more accurately: unless a user specifies a particular communication type (e.g., by reciting words such as "call" or "email" or "text"), it may be that the user actually intends the reminder to be triggered upon the occurrence of any of the various possible communication types. On the other hand, in some implementations, NLP service 132 interprets terms such as "talk," "speak," and/or "chat" as establishing a trigger requiring a voice-based communication event, such as a telephone call or a video chat.

In some implementations, where the user's command does not explicitly recite the communication types that are to trigger a notification, or when it is otherwise unclear from the user's command, device 110 (in conjunction with NLP service 132, discussed above) engages in a virtual dialogue with the user to disambiguate the user's input. In some implementations, NLP service 132 prompts a user for further input to determine additional details about the task item. For example, if a user requests a reminder to be triggered "next time I talk to James," device 110 may respond by presenting to the user a question such as "do you mean when you are on the phone with James?" or "shall I also remind you when you email or text with James?" Such questions may be presented audibly, visually, or both. The user can then provide an answer to the question, which device 110 and/or NLP service 132 will interpret to determine what types of communication events will trigger that particular notification. These and other techniques can be used to disambiguate other aspects of a user's input as well, such as ambiguous names in user inputs (e.g., where multiple people named "James" appear in the user's contacts), and the like.

As noted above, communication based triggers can also depend on which party to a communication event initiated the communication. For example, a triggering criterion of "next time I call my wife" indicates that the notification should be triggered only when the user initiates a telephone call with his wife, but not when the user's wife calls the user. On the other hand, communication based triggers can also be agnostic to which party initiated the communication. For example, in some implementations, a triggering criterion of "next time I talk to my wife" will be satisfied regardless of whether the user called (or emailed, texted, etc.) his wife, or whether the wife called (or emailed, texted, etc.) the user.

In some implementations, communication based triggers are configured to detect the occurrence of communication events of a particular communication type without regard to whom the communication is with. For example, a user may issue the command "Remind me to call my mom next time I am on the phone." The phrase "on the phone" can be presumed to mean that when the user is using device 110 as a phone, a notification will be sent to the user to inform the user to call his/her mom. This notification will be triggered regardless of the other party to the phone call. In another example, the command "Remind me to email Bob next time I'm sending emails" results in a triggering criterion that will be satisfied when the user sends any email, regardless of the recipient.

In some implementations, communication based triggers are conditioned on the content of a communication event. For example, a notification can be triggered only when a particular subject, topic, word, etc., is detected in the content of a communication. The content of a communication event can be textual (e.g., the body of a text message or email), audio (e.g., words spoken during a telephone call or video chat), or any other content (e.g., information relating to attachments to emails or text messages). Various techniques may be used to determine whether particular content satisfies a triggering criterion. In some implementations, natural language processing techniques are used to determine subjects, topics, words, etc., in a communication. For example, NLP service 132 can analyze a transcript of a telephone call or the body of an email to determine whether it satisfies the triggering criterion (e.g., whether the communication relates to "Project Bunny," or discusses the stock price of Apple Inc.).

Communication based triggers can be used to trigger notifications of various types. For example, notifications can include static content and/or dynamic content. In some implementations, static content includes text or other fixed content (e.g., image, sounds, files, etc.) that is specified by the user. For example, a task item may be created in response to the input "remind me to tell Sherri about the dinner plans when she calls." When Sherri calls, then, the notification will include text such as "Tell Sherri about the dinner plans." Dynamic content, on the other hand, includes information that is obtained, identified, updated, or retrieved at the time the notification is triggered. For example a task item may be created in response to a user input to "tell me the score of the last Packers game when I talk to Dad." In this example, device 110 (or any appropriate combination of devices or systems described herein) looks up the score of the most recent Packers game when a communication event with the user's father is detected, and notifies the user of the score. Other dynamic content that can be looked up or searched includes emails, web content, stock prices, sports scores/ statistics, weather reports, news stories, and the like. For example, an input that creates a task item may include a request for dynamic content such as "find all recent emails from my boss when he calls," or "get the weather in Florida when my parents call," or "search the web for news on Apple, Inc. when I'm texting with Tim." Such content is then presented to the user when the appropriate communication event is detected.

In some implementations, the content (either static or dynamic content, as described above) is provided at the same device at which the communication event is detected. Continuing an example from above, when a phone call from Sherri is detected at a user's smart phone, the text of the reminder can be presented in a popup window (or spoken by an audio output unit) on the smart phone. In some implementations, the content is provided at a different device. Continuing another example from above, when a phone call from a user's boss is detected on a user's phone, recent emails from the user's boss are displayed on a computer that is separate from the phone (e.g., a laptop, desktop, or tablet computer).

Figure 18A:
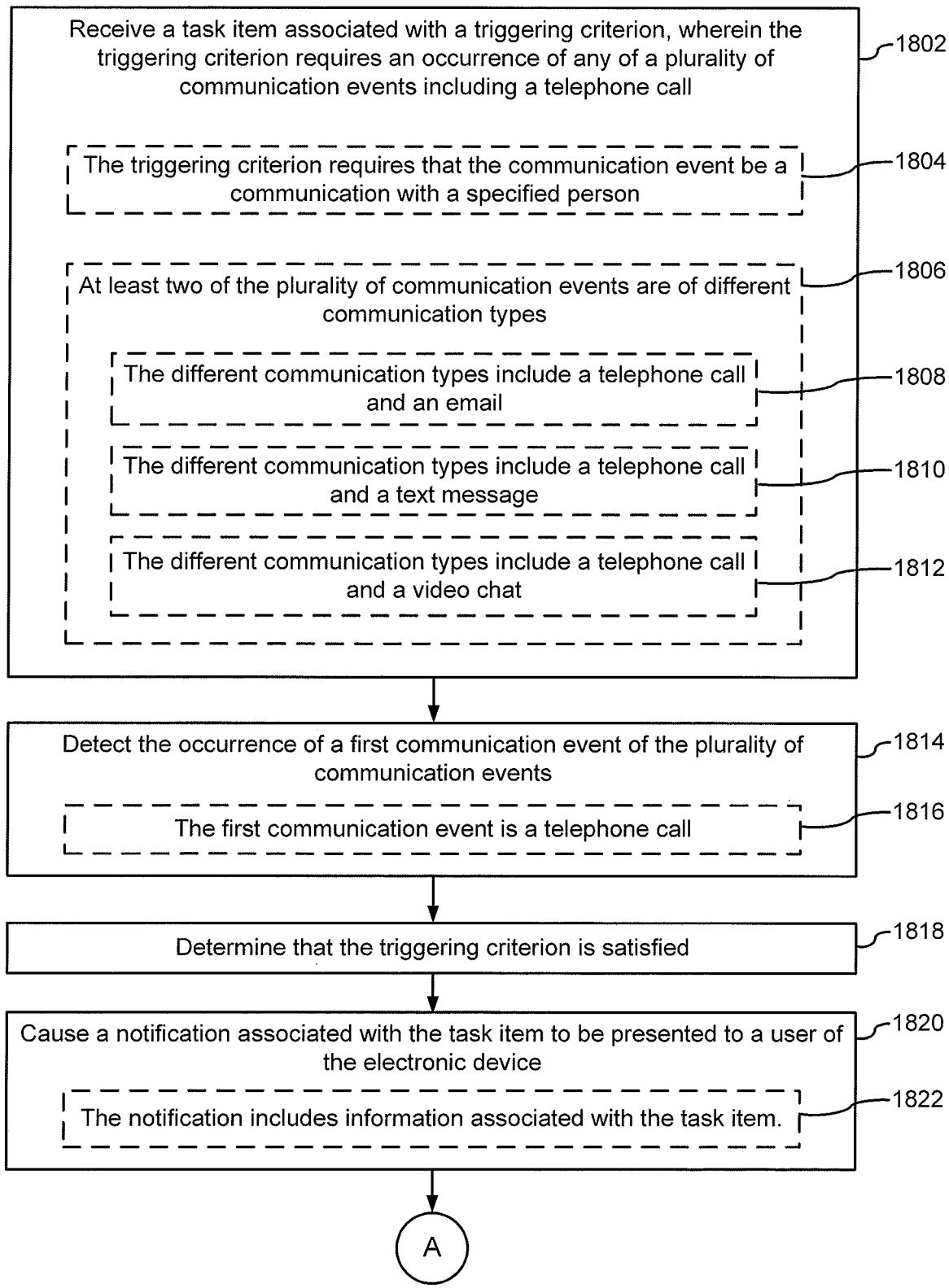

Attention is directed to FIG. 18A, which is a flow diagram that depicts a method 1800 for triggering an action associated with a task, according to some implementations. In some implementations, the method 1800 is performed by an electronic device (e.g., device 110) with a processor and memory storing instructions for execution by the processor. In some implementations, the method 1800 is performed by device 110 in conjunction with one or more other electronic devices (e.g., devices in the cloud 130). In some implementations, the method 1800 is performed entirely by an electronic device in the cloud 130.

A task item associated with a triggering criterion is received, wherein the triggering criterion requires an occurrence of any of a plurality of communication events including a telephone call (1802). For example, the triggering criterion may be the occurrence of a telephone call, and a plurality of communication events are monitored in order to detect the occurrence of the telephone call. In some implementations, the triggering criterion requires that the communication event be a communication with a specified person (1804).

In some implementations, at least two of the plurality of communication events are of different communication types (1806). For example, in some implementations, communication events of different types (e.g., phone, email, text message, etc.) are monitored in order to determine whether a communication event satisfying the triggering criterion occurs. In some implementations, the different communication types include a telephone call and an email (1808). In some implementations, the different communication types include a telephone call and a text message (1810). In some implementations, the different communication types include a telephone call and a videochat (1812).

The occurrence of a first communication event of the plurality of communication events is then detected (1814). In some implementations, the first communication event is a telephone call (1816).

Subsequently, it is determined that the triggering criterion is satisfied (1818). For example, in some implementations, detecting the occurrence of a first communication event (1806) satisfies the triggering criterion. In some implementations, other conditions must also be met in order to determine that the triggering criterion is satisfied. For example, as described below, a triggering criteria may be satisfied only upon a determination that content in a communication event relates to a predefined subject.

In response to determining that the triggering criterion is satisfied, a notification associated with the task item is caused to be presented to a user of the electronic device (1820). In some implementations, such as when the method 1800 is performed at least partially on device 110 (e.g., a smart phone, laptop/desktop/tablet computer, etc.), causing the notification to be presented to a user comprises any of displaying text on a screen of the device, outputting audio from an audio output unit, and the like. In some implementations, the notification includes information associated with the task item (1822). For example, if the task item includes information (e.g., text) that is to be presented as a reminder (e.g., "ask Mom about Thanksgiving plans"), that information can be presented to the user—either visually, audibly, or both—when the triggering criterion is satisfied. In some implementations, where information is presented to the user audibly, it is presented such that only the user can hear it. For example, a voice output including the words "ask Mom about Thanksgiving plans" may be presented to a user during a telephone call with his mother such that only the user can hear the output.

In some implementations, information associated with the task item includes dynamic information, as described above. The dynamic content is then obtained, retrieved, or identified when the notification is presented to the user. For example, the task item may be associated with a request to "show me the stock price for Apple Inc. when Tim calls." When the triggering criterion is satisfied for this task item (e.g., "Tim" called the user), the current stock price for Apple Inc. is retrieved and presented to the user as part of the notification.

Figure 18B:
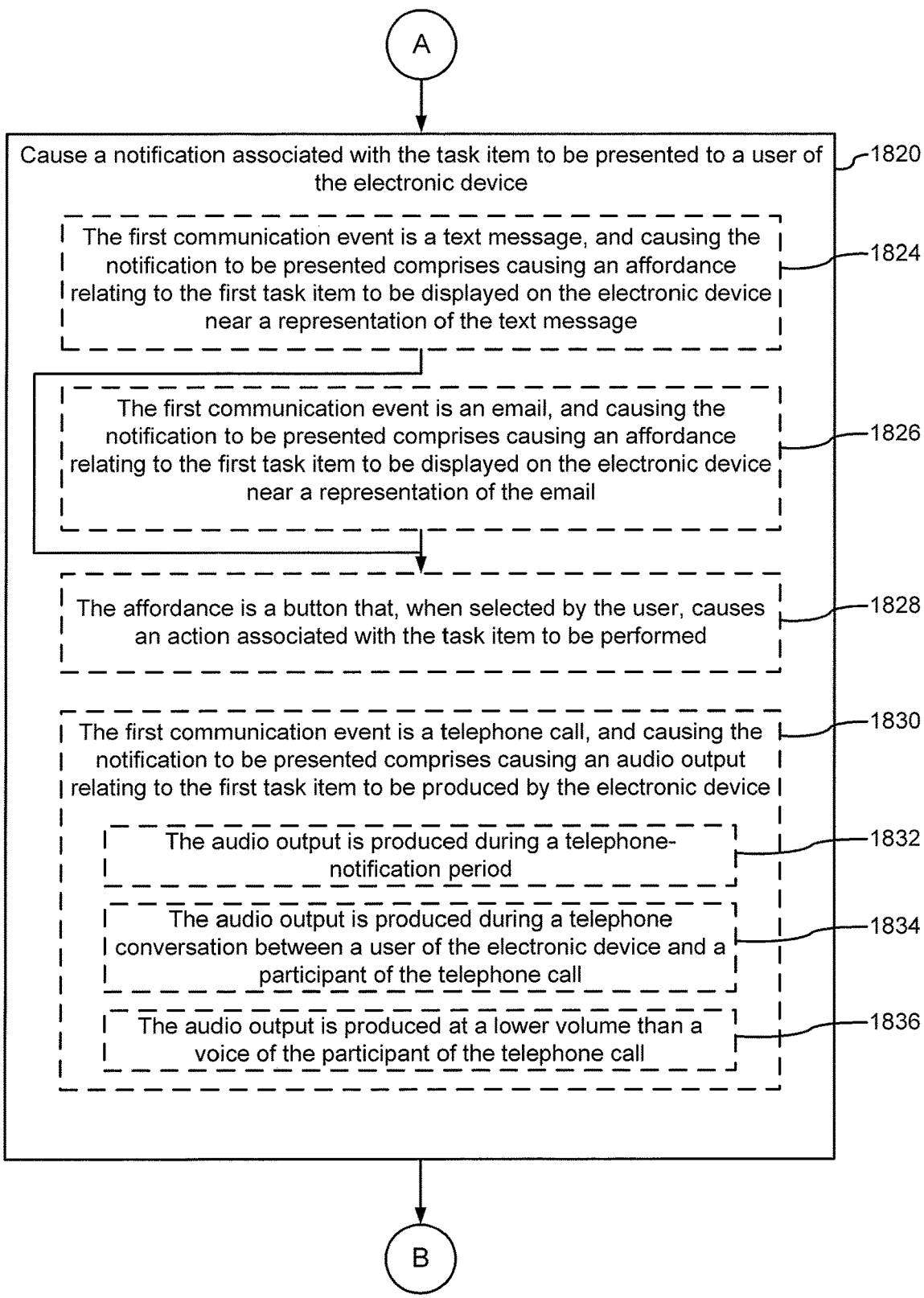

Step (1820) of method 1800 continues on FIG. 18B. In some implementations, the first communication event is a text message, and causing the notification to be presented comprises causing an affordance relating to the first task item to be displayed on the electronic device near a representation of the text message (1824). In some implementations, the affordance is a selectable element displayed on a touch screen of an electronic device (e.g., a smart phone). The affordance may be configured to cause an action associated with the task item to be performed when the affordance is selected or otherwise activated. For example, in some implementations, the affordance initiates a communication event (e.g., a phone call), presents a draft text message or email to the user, or the like.

In some implementations, the task item includes information that determines whether an affordance is to be displayed, and what action should be taken in response to a selection of the affordance. For example the task item may have been created in response to a user input to "send a text to Mom when I talk to Sarah." When a communication event with Sarah is detected, a button may be presented in association with the text "Send Text to Mom." In some implementations, selection of the button causes a predefined text message to be sent to the user's mother, or causes a text message editing application or region to appear so that the user can compose or edit a text message.

In some implementations, the first communication event is an email, and causing the notification to be presented comprises causing an affordance relating to the first task item to be displayed on the electronic device near a representation of the email (1826). In some implementations, the affordance is a button that, when selected by the user, causes an action associated with the task item to be performed (1828).

In implementations where a draft communication (such as a draft email, text message, or any other draft communication that includes fields) is presented to a user, one or more of the fields of the draft are pre-populated with information from or related to the task item. For example, if a draft text message is presented to the user in response to a task item to "send a text message" to a recipient, the "to" field may be pre-populated with a phone number, email address, or other identifier of the recipient. Moreover, the "message" field (e.g., for the body of the text message) may even be pre-populated. As another example, if a draft email is presented to the user, the "to" field may be pre-populated with the email address of the intended recipient, and the "subject" and "message" fields may also be pre-populated if such information is available. The name and/or contact information of the recipient and/or the content for the "subject" and "message" field of a text message or email may be included in the task item. As noted above, such a draft may be presented to a user in response to the user selecting an affordance presented in a notification item, or in response to a triggering criterion being satisfied and without the user separately selecting an affordance.

In some implementations, the first communication event is a telephone call, and causing the notification to be presented comprises causing an audio output relating to the first task item to be produced by the electronic device (1830). The audio output can be any audio, including synthesized or recorded voice output, tones or beeps, music, and the like. In some implementations, the audio output is produced during a telephone-notification period (e.g., while the telephone is ringing) (1832). For example, the audio output (e.g., a synthesized voice output) is produced during the time in which a phone is ringing to alert a user to an incoming telephone call. In some implementations, the ringing of the incoming call is muted or its volume is reduced so that the audio output can be heard by a user. In some implementations, the audio output (e.g., a synthesized voice output) is produced during a ringing period of an outgoing call. For example, a synthesized voice saying "don't forget to ask about Thanksgiving plans" may briefly interrupt the ringing sound of an outgoing call when it is detected that the user is calling his mother. In some implementations, the ringing is muted while the audio is being presented to the user. In some implementations, the volume of the ringing is lowered, but is still audible, while the audio is being presented to the user. In some implementations, if the notification period ends while audio is being presented, such as if the recipient picks up the phone, the audio output is terminated.

In some implementations, once a user initiates a communication event that satisfies a triggering criterion, actual execution of the communication event can be delayed until the audio output is presented. For example, if the user initiates a telephone call that satisfies a triggering criterion (e.g., by entering a phone number and pressing a "call" button or touchscreen element), the audio output is presented to the user before the phone call is actually placed. Accordingly, the audio output (e.g., "don't forget to ask about Thanksgiving plans") can be presented to the user in its entirety without being interrupted by the recipient answering the phone, and without interrupting the user's conversation.

In some implementations, the audio output is produced during a telephone conversation between a user of the electronic device and a participant of the telephone call (1834). For example, an audio output, such as a tone, beep, or the like, can be output during a telephone conversation to alert a user that a notification has been activated. This can prompt the user to look at a screen of the telephone. Or, a synthesized voice could be output by the device, during the telephone conversation for the user to hear. In some implementations, the audio output is configured so that the other party to the telephone conversation does not hear the output. In some implementations, the audio output is produced at a lower volume than a voice of the participant of the telephone call (1836).

Figure 18C:
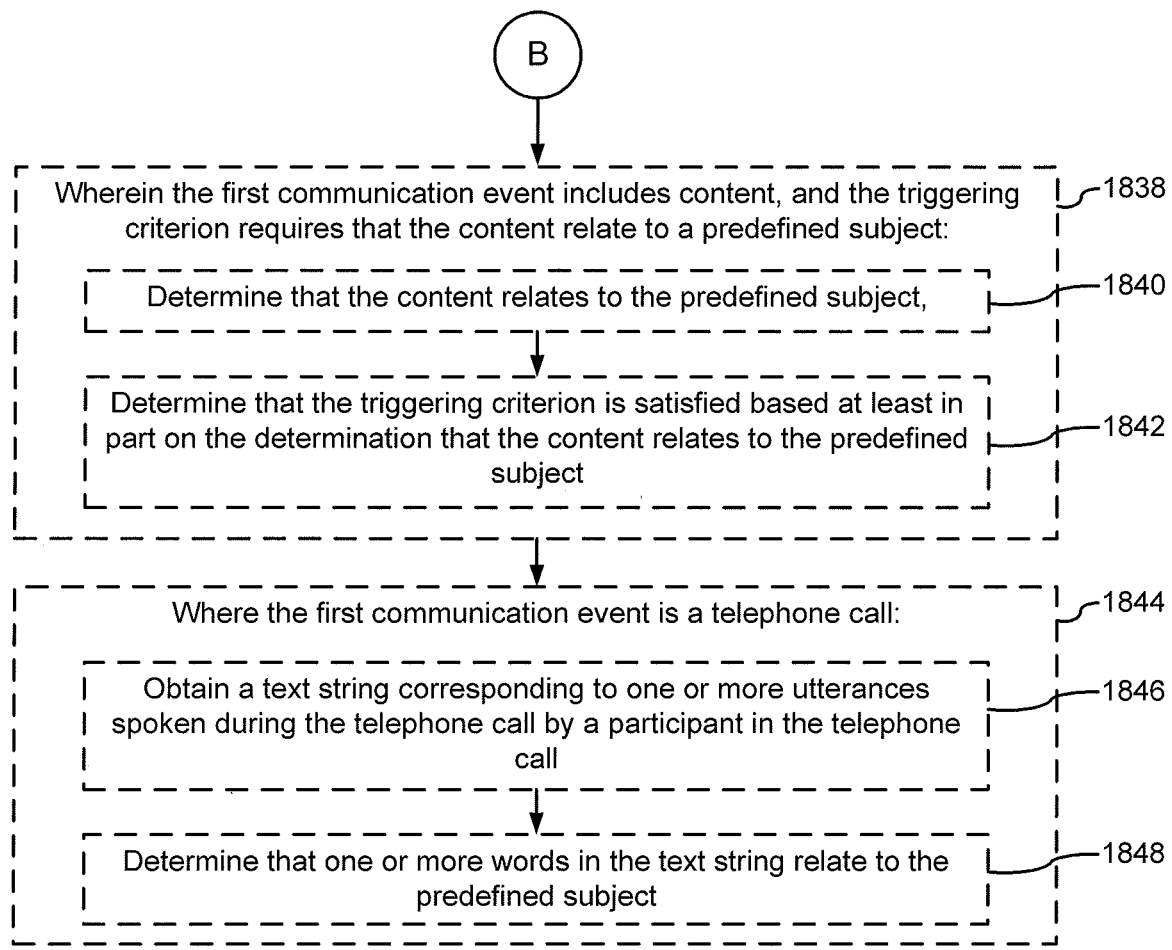

Method 1800 continues on FIG. 18C. In some implementations, the first communication event includes content, and the triggering criterion requires that the content relate to a predefined subject (1838). For example, the first communication event may contain voice content (in the case of a telephone call or video chat, for example), textual content (in the case of an email or text message, for example), attached file content, image content, video content, and the like. Triggering criteria for a notification can be conditioned on one or more properties of such content, such that a notification is presented to a user when a condition relating to the content is satisfied. For example, a task item may be configured to present a notification to a user "the next time Jack emails about Project Bunny." Accordingly, device 110 (and/or other suitable devices or services) determines whether emails received from Jack relate to "Project Bunny," and if so, the triggering criterion is deemed satisfied. Returning to FIG. 18C, in some implementations, where the first communication event includes content, and the triggering criterion requires that the content relate to a predefined subject (1838), it is determined that the content relates to the predefined subject (1840). In some implementations, determining that the triggering criterion is satisfied (e.g., at step (1818)) is based at least in part on the determination that the content relates to the predefined subject (1842). In some implementations, the determination that the content relates to the predefined subject is performed using natural language processing techniques (e.g., performed by NLP service 132, discussed above).

In some implementations, the triggering criterion requires that the content of a first communication event relate to a predefined subject, and the first communication event is a telephone call (1844). In some implementations, a text string corresponding to one or more utterances spoken during the telephone call by a participant in the telephone call is obtained (1846). In some implementations, it is determined whether one or more words in the text string relate to the predefined subject (1848). In some implementations, NLP service 132 converts voice data obtained from one or more of the participants in a telephone conversation into text. The text is then processed (e.g., by NLP service 132 and/or device 110) to determine whether one or more words in the text string relate to the predefined subject. For example, if a triggering criterion for a notification is "when I talk to Jack about Project Bunny," a conversation between the user' and Jack can be analyzed to determine whether either party says the words "Project Bunny," or says other words that may be indicative of that subject.

Attention is directed to FIG. 19, which is a flow diagram that depicts a method 1900 for triggering an action associated with a task, according to some implementations. In some implementations, the method 1900 is performed by an electronic device (e.g., device 110) with a processor and memory storing instructions for execution by the processor. In some implementations, the method 1900 is performed by device 110 in conjunction with one or more other electronic devices (e.g., devices in the cloud 130). In some implementations, the method 1900 is performed entirely by an electronic device in the cloud 130.

A task item associated with a triggering criterion is provided, wherein the triggering criterion requires an occurrence of any of a plurality of communication events, and wherein at least two of the plurality of communication events are of different communication types (1902). In some implementations, the triggering criterion requires that the communication event be a communication with a specified person (1904). In some implementations, the first communication event is associated with the specified person when the specified person initiates the first communication event or receives the first communication event from the user (1906). For example, a communication event may be associated with a specified person regardless of who initiated the communication event (e.g., regardless of who called whom, who emailed whom, etc.). In some implementations, the different communication types include a telephone call and an email (1908). In some implementations, the different communication types include a telephone call and a text message (1910). In some implementations, the different communication types include a telephone call and a video chat (1912).

The occurrence of a first communication event of the plurality of communication events is detected (1914). For example, an incoming or outgoing telephone call, email, text message, or the like is detected. It is determined that the triggering criterion is satisfied (1916). For example, in some implementations, just detecting the occurrence of a first communication event (1914) satisfies the triggering criterion. In some implementations, however, other conditions must be met in order to determine that the triggering criterion is satisfied. For example, as described above, a triggering criteria may be satisfied only upon a determination that content in a communication event relates to a predefined subject. In response to determining that the triggering criterion is satisfied, a notification associated with the task item is caused to be presented to a user of the electronic device (1918). In some implementations, the notification includes information associated with the task item (1920). For example, if the task item includes text (e.g., information) that is to be presented as a reminder (e.g., "ask Mom about Thanksgiving plans"), that text can be presented to the user-either visually, audibly, or both—when the triggering criterion is satisfied.

Figure 20:
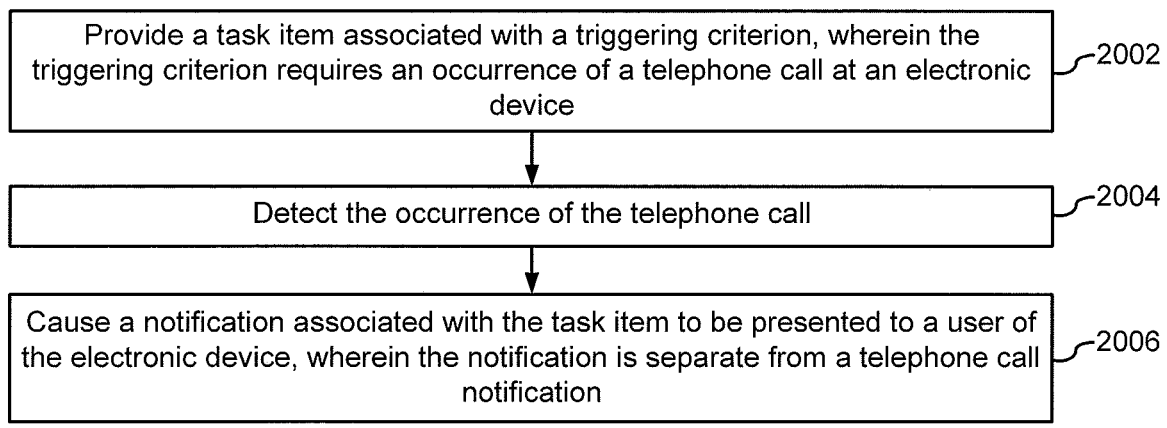

Attention is directed to FIG. 20, which is a flow diagram that depicts a method 2000 for triggering an action associated with a task, according to some implementations. In some implementations, the method 2000 is performed by an electronic device (e.g., device 110) with a processor and memory storing instructions for execution by the processor. In some implementations, the method 2000 is performed by device 110 in conjunction with one or more other electronic devices (e.g., devices in the cloud 130). In some implementations, the method 2000 is performed entirely by an electronic device in the cloud 130.

A task item associated with a triggering criterion is provided, wherein the triggering criterion requires an occurrence of a telephone call at an electronic device (2002). In some implementations, the triggering criterion requires that the communication event be a communication with a specified person. The occurrence of the telephone call is detected (2004). In response to detecting the occurrence of the telephone call, a notification associated with the task item is caused to be presented to a user of the electronic device, wherein the notification is separate from a telephone call notification (2006). In some implementations, the notification includes text that is displayed on a screen of a smart phone during or before a telephone call notification (e.g., a ringtone, vibration, or other call notification technique). In some implementations, the notification includes audio content that is presented to the user during or before a telephone call notification.

Referring now to spatial-oriented context triggers, non-limiting examples of spatial-oriented context triggers include the speed at which device 110 is moving (e.g., over 30 mph indicating driving, or less than 3 mph indicating walking), a direction (absolute or relative) at which device 110 is moving, and a set of movements of device 110 (e.g., short vertical movements while moving continuously in a horizontal direction). In other words, device 110 may be configured to detect how device 110 is moving through space.

For example, device 110 (or rather a process executing on device 110) determines, based on detecting changes in its location over a period of time, that device 110 is moving at 60 mph. Based on this information, device 110 determines that the device's context is "while driving" or "on the road." Task manager 112 analyzes one or more task items to determine whether any task items are associated with a "while driving" or "on the road" context trigger. If a task item is associated with a "while driving" or "on the road" context trigger, then an action (e.g., displaying a notification) associated with the task item is performed.

As another example, device 110 determines, based on detecting changes in its location over a period of time, that device 110 is moving towards his home over a certain period of time (e.g., 5 minutes). Based on this information, device 110 determines that the context is "on my way home." Task manager 112 analyzes one or more task items to determine whether any task items are associated with a "on my way home" context trigger. If a task item is associated with a "on my way home" context trigger, then an action (e.g., displaying a notification) associated with the task item is performed.

As another example, device 110 includes an accelerator that detects certain repetitive movements. Device 110 may determine, based on these repetitive movements over a period of time, that the user of device 110 might be running at a slow pace. Based on this determination, device 110 determines that the context is "while jogging." Task manager 112 analyzes one or more task items to determine whether any task items are associated with a "while jogging" or "while walking" context trigger. If a task item is associated with a "while jogging" or "while walking" context trigger, then an action (e.g., displaying a notification) associated with the task item is performed.

As another example, device 110 might detect that it has not moved for a period of time (e.g., 3 hours). A user of device 110 might be interested in being alert and non-movement of device 110 might indicate that the user is asleep. Thus, the user might issue the command, "Alert me if the phone doesn't move for 3 hours."

In addition to data-oriented and spatial-oriented triggers, other kinds of triggers may be based on any sensor on device 110. Device 110 may include multiple sensors, such as temperature sensors and light sensors. For example, device 110 might include a thermometer for detecting the outside temperature or an internal temperature of device 110. Thus, a user of device 110 might issue the command, "Remind me to call Harold when it reaches 100 degrees."

Exogenous Triggers

Another type of triggering criteria that may be associated with a task item is exogenous criteria. An "exogenous trigger" is a triggering criterion that depends on one or more factors that exist outside and separate from device 110 and the user of device 110. Such factors may be considered "events" that occur with respect to devices other than device 110 or with respect to data that is stored on one or more devices other than device 110. Non-limiting examples of exogenous triggers include social location, social proximity, standing queries, and local events.

An example of a social location trigger is when a friend or associate of the user of device 110 arrives or leaves a certain location. For example, a user command that initiated the creation of a task item may have been "Notify me if Sarah leaves the mall." Thus, the location of Sarah (or Sarah's mobile device) is an essential factor in setting off this type of exogenous trigger. Specifically, task manager 112 determines the current location of Sarah's device. The current location of Sarah's device may be provided by a cloud service (e.g., in cloud 130) to which both Sarah's device and device 110 are subscribed. Device 110 receives, from the cloud service, updates as to the location of Sarah's device. Task manager 112 uses that location information to determine whether the social location trigger should be activated. A similar user command is "Remind me when my daughter gets home."

An example of a social proximity trigger is when a friend or associate of the user of device 110 is within a certain distance of the user (or device 110). For example, a user command that initiated the creation of a task item may have been "Remind me to call George when he is within 100 feet of me." Thus, the location of George (or George's mobile device) is an essential factor in setting off this exogenous trigger. Specifically, task manager 112 or another process executing on device 110 compares the current location of device 110 with the current location of George's device to determine the distance that separates the two devices. Alternatively, George's device may transmit its location to a cloud service to which both George's device and device 110 are subscribed. Device 110 receives, from the cloud service, updates as to a distance between George's device and device 110. Task manager 112 uses that distance information to determine whether the social proximity trigger should be activated.

An example of a standing query trigger is when a webpage mentions a particular term or phrase, such as a company name. To detect this, a standing query is generated and issued continuously (e.g., once a day). For example, a user command that initiated the creation of a task item may have been "Tell me when cnn.com mentions Berkman Industries." Task manager 112 or another process executing on device 110 issues a search query (e.g., to a search engine) and receives results. When task manager 112 determines that the results include a webpage from cnn.com that includes the name "Berkman Industries," task manager 112 provides a notification to the user of device 110.

An example of a local event trigger is when a certain local event occurs. To detect this, task manager 112 receives data from an online service. Task manager 112 (or a task service in cloud 130) may periodically send a request to the online service (via one or more communication protocols). Alternatively, task manager 112 may subscribe with the online service to receive information about certain events. For example, a user command that initiated the creation of a task item may have been "Tell me when Beatles tickets go on sale at Shoreline." In response, task manager 112, another process executing on device 110, or NLP service 132 sends a subscription request to an online ticket service to receive a notification when Beatles tickets for a performance at Shoreline Amphitheatre become available for purchase. When task manager 112 is determines Beatles tickets are available for purchase, task manager 112 provides a notification to the user of device 110.

As another example, a user might be interested in knowing when the surf is up. Thus, the user might issue the command, "Remind me an hour before the surf is up." Task service 112 (or a task service in cloud 130) might regularly issue a query of a surfing site or might subscribe for alerts from the surfing site.

Based on the foregoing, the types and examples of exogenous triggers are virtually endless. As long as task manager 112 (or a task service in cloud 130) can make a determination about an event that occurs separate from device 110, that event can be used to trigger the performance of an action associated with a task item.

III. Consuming Task Items (Active Payloads)

A task item is "consumed" when an action associated with the task item is performed. Such an action may be a notification that is displayed (or played, if the notification is an audio notification) on device 110. In addition to or instead of providing a notification to a user of device 110, other possible actions include initiating a phone call or a search query, sending an HTTP request (that includes a Uniform Resource Location (URL)), sending an email or a text (SMS) message, causing an application to execute, and causing a purchase to be made on the user's behalf. Such actions that can be associated with task items are referred to as "active payloads." The processing of an active payload causes some action to be performed, whether by task manager 112 or by another process, whether local or remote to device 110. In other words, instead of simply notifying the user of a task associated with a task item, task manager 112 (or a service in cloud 130) can automate the action part of the task item.

As alluded to above, causing an action to be performed may involve task manager 112 causing another application or process to perform the action. The calling or invoking of the other application (e.g., via an API of the other application) may be performed with or without further input, as indicated in the following examples.

The types of "other" applications can vary greatly. Non-limiting examples of applications that might be available on device 110 include a phone application, an email application, a Web browser, a music player application, a media player application, a music download application, an image processing application, a geopositioning application, a contacts application, an SMS application, a video game application, and a text processing application.

For example, a user of device 110 says aloud, "Remind me to call her back this afternoon." This voice input is converted into voice data that device 110 sends (along with context data) over network 120 to NLP service 132. NLP service 132 analyzes the voice data and the context data to determine that "her" refers to Marilyn Merlot. NLP service 132 determines that "afternoon" is 2 PM (whether based on context data, a pre-defined setting, or prior history) and determines a phone number for Marilyn Merlot based on a contacts list (or address book), associated with the user, that includes one or more phone numbers for Marilyn Merlot. The contacts list may be stored on device 110 or in cloud 130. NLP 132 sends, to task manager 112 (or to a task service in cloud 130), reminder data used to generate a task item. The reminder data includes the date of "Today", time of 2 PM, and an instruction to call Marilyn Merlot using a particular phone number. When task manager 112 determines that the current time is 2 PM, task manager 112 may cause a message to be displayed that prompts the user to call Marilyn Merlot. The message may include a "Later" button and a "Call Now" button. If the user selects the "Later" button, then task manager 112 will send the message again later in the afternoon (e.g., in 1 hour). If the user selects the "Call Now" button, then task manager 112 initiates a call to Marilyn Merlot. This initiation may involve task manager 112 making an API call to a phone application (not shown) executing on device 110 and passing the phone number as an argument of the API call. The phone application then uses the phone number to call a device associated with the phone number.

As another example, a user of device 110 says aloud, "Text Lindsay that I love her at 5 o'clock." This voice input is converted into voice data that device 110 sends over network 120 to NLP service 132. NLP service 132 analyzes the voice data to determine that a cell phone number of Lindsay is necessary and that "5 o'clock" refers to 5 PM of the current day. Task manager 112 (or a task service in cloud 130) creates a task item that includes the following data items: (1) a completion time of 5 PM today, (2) an action of sending a text (or SMS) message, (3) a number of Lindsay's cell phone, and (4) a text string of "I love you" that will be part of the text message. In response to determining that the current time is 5 PM, task manager 112 analyzes the task item to determine the action that needs to be performed. Task manager 112 then causes a text message that includes the text string associated with the task item to be sent to Lindsay's cell phone. This step may comprise task manager 112 invoking an API call of a texting application (not shown) executing on device 110, where the text string ("I love you") is an argument of the API call.

As another example, a user of device 110 says aloud, "Show me directions on how to get to Rachel's Restaurant in San Jose when I leave the office." This voice input is converted into voice data that device 110 sends over network 120 to NLP service 132. NLP service 132 analyzes the voice data to determine that a cell phone number of Lindsay is necessary and that "5 o'clock" refers to 5 PM of the current day. Task manager 112 (or a task service in cloud 130) creates a task item that includes the following data items: (1) a location trigger of leaving the user's office and (2) an action of displaying instructions (and, optionally, a map) on how to arrive at Rachel's Restaurant from the user's office. In response to determining that the user of device 110 has left his/her office, task manager 112 analyzes the task item to determine the action that needs to be performed. Task manager 112 then causes (without further input from the user) a travel directions request to be sent to a travel directions service. The travel directions request includes the name of the restaurant, any address information of the restaurant, or both. The travel directions service may be hosted on device 110 or on another device (not shown).

As another example, a user of device 110 says aloud, "Order a cheese only pizza at Pizza Heaven in San Jose, home delivered, 30 minutes before the Bulls-Pacers game starts." This voice input is converted into voice data that device 110 sends over network 120 to NLP service 132. NLP service 132 analyzes the voice data to determine that a Bulls-Pacers game starts at 6 PM local time; thus, the time trigger is 5:30 PM local time. NLP service 132 also determines that Pizza Heaven in San Jose allows online ordering. Task manager 112 (or a task service in cloud 130) creates a task item that includes the following data items: (1) a time trigger of 5:30 PM and (2) an action of ordering a cheese only pizza from Pizza Heaven with home delivery as an option. In response to determining that the current time is 5:30 PM, task manager 112 (or a task service in cloud 13) analyzes the task item to determine the action that needs to be performed. Task manager 112 then causes a pizza order request to be sent to Pizza Heaven's online ordering service. The pizza order request includes the pizza type of cheese only, the delivery option of home delivery, and the user's home address. The pizza order request may be in the Rhin of an API call to the online ordering service, where arguments of the API call include indications of cheese only topping, home delivery, and the user's home address. Alternatively, before causing the pizza order required to be sent, task manager 112 may formulate a message that is displayed on (or played by) device 110, where the message informs the user about this task. If the user provides affirmative input, then task manager 112 causes the pizza request order to be sent. If the user provides negative input, then no pizza request order is sent.

As another example, a user of device 110 says aloud, "Play my classical station on Pandora at 3 PM tomorrow." The time of "3 PM tomorrow" coincides with the end of a scheduled exam for the user. This voice input is converted into voice data that device 110 sends over network 120 to NLP service 132. NLP service 132 analyzes the voice data to determine a date and time that the intended action is going to be performed. Task manager 112 (or a task service in cloud 130) creates a task item that includes the following data items: (1) a time trigger of 3 PM with a date that identifies the following day and (2) an action of playing a classical "station" of the user's Pandora music application, where the classical station was established by the user and associated with the user's Pandora account. In response to determining that the current time is 3:00 PM on the proper date, task manager 112 (or a task service in cloud 13) analyzes the task item to determine the action that needs to be performed. Task manager 112 then causes the Pandora music application (not shown) to begin executing on device 110 and to "play" the user's classical station. Task manager 112 may cause the classical station to play by invoking an. API call to the Pandora music application, where an argument of the API call includes an indication of a classical station.

In some embodiments, active payloads are processed automatically based on one or more triggering events (e.g., time, location, etc.) without providing reminders, notifications, or otherwise requesting further permission from the user. The device 110 can thus automatically take actions on behalf of the user without the user needing to provide further input. For example, task items can cause the device 110 to send a pre-written email or text message to a recipient in response to a triggering event. A user could say to the device 110 "tell my wife I'm almost there when I get off the freeway." The device 110 (and/or any associated services such as NLP service 132) can create a task item with an active payload that will send a message (such as a text message or email) saying "I'm almost there" to the user's wife when the user reaches a particular location (e.g., an exit ramp near the user's house). In some embodiments, a recording of the user's voice input corresponding to the message "I'm almost there" can be delivered to the recipient via voicemail, or as an attachment to an email or text message. Also, other triggering events can also cause active payloads to be processed automatically and without user intervention, such as time, date, receipt of messages from others, etc.

The active payloads described above enable the device 110 to initiate certain actions based on a triggering criterion of a task item. For example, if a task item is a reminder to call a co-worker at a 2:00 PM, the device 110 may automatically prompt the user with a "Call Now" button at 2:00 PM. In some cases, though, it is beneficial to configure the task items so that the active payload can be processed without a triggering event. Specifically, a user may create task items that do not have triggers (such as a time or location trigger), or a user may wish to complete a task item before its triggering condition is met. To accommodate this, in some embodiments, an action associated with a task item is performed in response to a user selecting the task item itself. By linking the active payload to the task item (or an input associated with the task item), the active payload can be processed at the user's request without requiring other triggering conditions to be met. Further, it allows a user who is viewing a task list to take advantage of active payloads by simply selecting the task item from the list at their own convenience. For example, a user may view a task list to review his outstanding tasks, and see a task item that he could conveniently complete right away. The user can then simply select the task item (e.g., the description "call Greg Almond") in order to process the active payload (e.g., initiate a phone call to Greg Almond) and complete the task item.

In order to be selectable by a user, tasks list items may be associated with an activation region that, when selected by a user, causes the action associated with the task to be performed. Activation regions are any area of a graphical display that can be selected by pressing, clicking, touching, or otherwise selecting the area of the display. In some embodiments, the activation region coincides with or overlaps graphical or textual elements that are displayed on a screen (e.g., a touch screen) of the device 110. In some embodiments, the activation region coincides with or overlaps a title or description of the task item, such that when a user selects the displayed text of the title or description, the device 110 performs an action associated with that task item. Task items that may include selectable text in accordance with some embodiments are shown in FIG. 6.

In some embodiments, the activation region coincides with or overlaps a graphical element that is displayed on the touch screen in association with the task list item. Graphical elements may be displayed next to, in line with, above, below, or otherwise near the task list item, indicating to the user that the action associated with that task list item will be performed upon selection of the graphical element.

Figure 6:
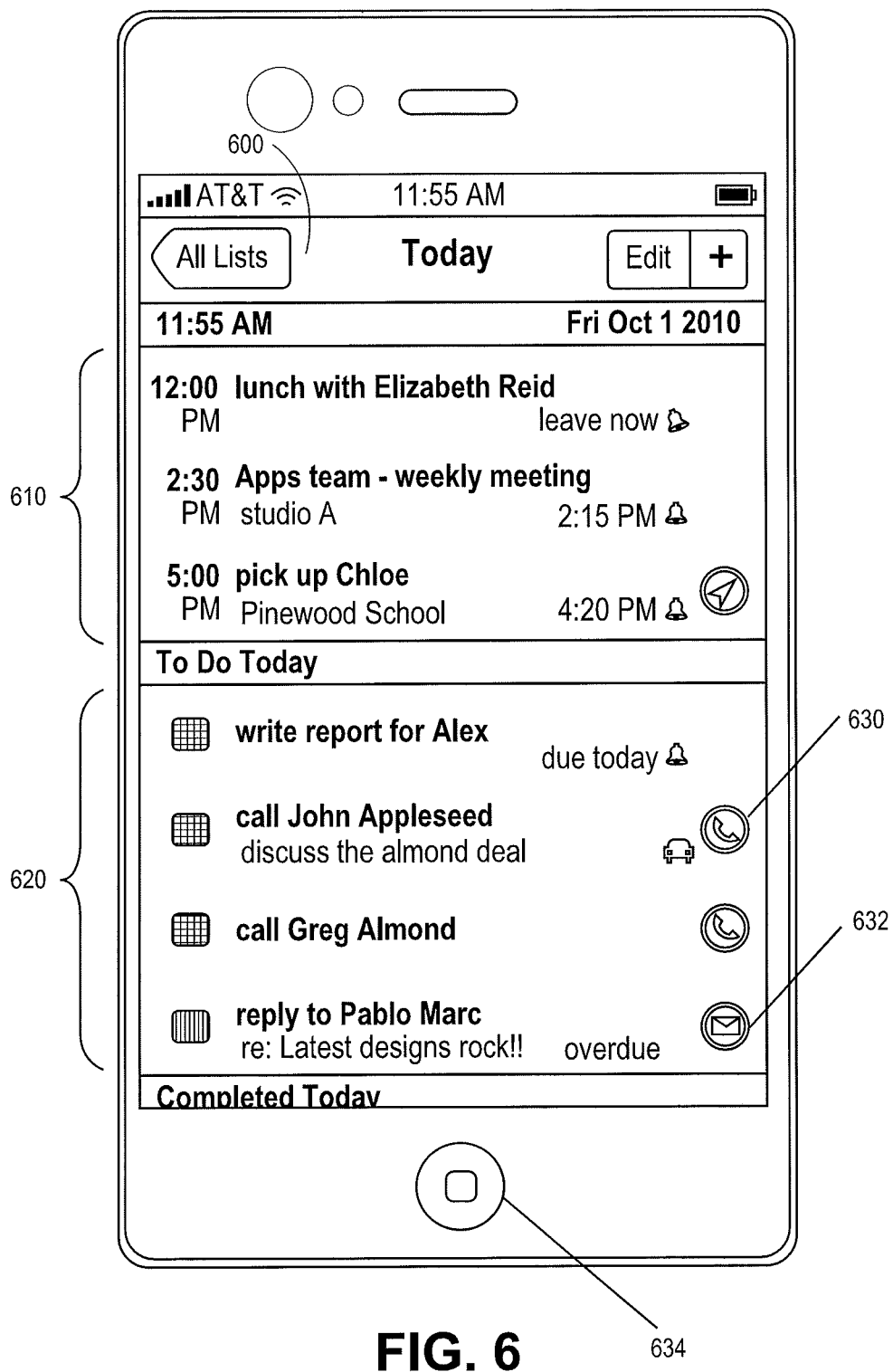

Examples of graphical elements displayed in conjunction with task items are shown in FIG. 6. For example, graphic 630 includes a graphical depiction of a telephone handset, which can be made user-selectable by overlaying an activation region on the graphic 630. When the graphic 630 is selected by a user (e.g., by pressing, tapping, touching, etc.), the device 110 will perform actions associated with initiating a telephone call to "John Appleseed." For example, the device 110 may place a telephone call to a phone number associated with John Appleseed.

Similarly, graphic 632 includes a graphical depiction of a letter, which can be made user-selectable by overlaying an activation region on the graphic 632. When the graphic 632 is selected by a user (e.g., by pressing, tapping, touching, etc.), the device 110 will perform actions associated with sending a text or email message to the recipient "Pablo Marc." For example, the device 110 may display a prompt with a text input region to a user, in which the user can compose a message addressed to Pablo Marc.

In some embodiments, a user can select a task item using a voice input. Voice activation may be used alone or in conjunction with activation regions as described above. In some embodiments, a task item is selected when the device 110 detects a spoken utterance that matches a title, description, or indicator of the task item. For example, a user viewing the task list in FIG. 6 may say aloud "reply to Pablo Marc," which would cause the device 110 to process an active payload associated with that task item. In another example, a user may say aloud "Call John," and the device 110 will recognize that this utterance corresponds to the task item "call John Appleseed" and process an active payload associated with that task item.

In some embodiments, when a task item is selected, an action associated with that task is performed without further user intervention. For example, if the user selects the task item "call John Appleseed," the device 110 will initiate a telephone call to John Appleseed. In some embodiments, selection of a task item causes a prompt to be displayed to the user, asking the user for confirmation that the device 110 should perform an action associated with that task item. This confirmation or permission step can help prevent inadvertent actions if a user selects a task list item by mistake. For example, upon selection of the task item "call John Appleseed," the device 110 may display a prompt with selectable options of "Call Now" or "Cancel." Similarly, upon selection of the task item "reply to Pablo Marc," the device 110 may provide an empty text composition area (where the user can compose the body of an email or text message to be sent to Pablo Marc) and selectable options of "Send" or "Cancel."

Figure 17:
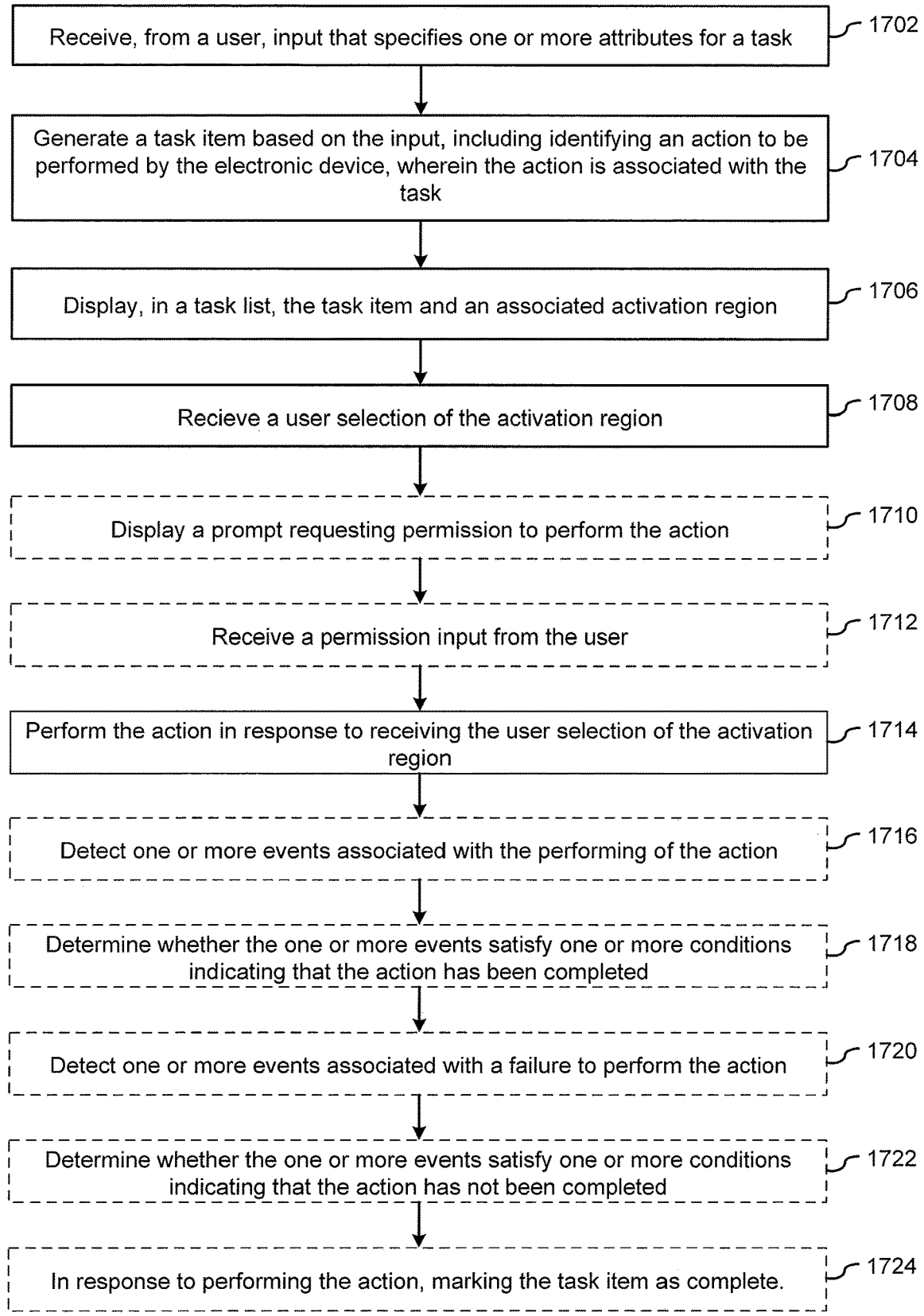
FIG. 17 is a flow diagram that depicts a process for initiating actions associated with task items, according to an embodiment of the invention.

Attention is directed to FIG. 17, which is a flow diagram that depicts a method 1700 for initiating actions associated with task items, according to an embodiment of the invention. In some embodiments, the method 1700 is performed by an electronic device (e.g., device 110) with a processor and memory storing instructions for execution by the processor. The method 1700 includes receiving, from a user, input that specifies one or more attributes for a task (1702). (See also FIG. 2, step (210), and attendant discussion.) In some embodiments, the input is based on voice input that was received at a handheld device (e.g., the device 110). In some embodiments, the input is based on text input that was received at a handheld device through a text-input device (e.g., physical keyboard, touch screen keyboard, etc.). In some embodiments, the input initiates the creation of the task item, and includes data that identifies an action (to be performed by the device) associated with the task. For example, inputs may include the words "send message," "email," or "call," which the device 110 could recognize as identifying the particular action that should be associated with that task. The method 1700 further includes generating a task item based on the input, including identifying an action to be performed by the electronic device, wherein the action is associated with the task (1704). (See also FIG. 2, step (220), and attendant discussion.)

In some embodiments, the task item is not associated with a triggering criterion (e.g., a time or location trigger) that determines when to trigger a notification to complete the task, or when the action is to be performed. The task item "call Greg Almond" in FIG. 6 illustrates a task item that is not associated with a triggering criterion.

The identified action can be any action that the device 110 can perform, including those actions discussed above in reference to active payloads. In some embodiments, the action is causing an email or a text message (e.g., including a previously drafted message) to be sent over a network to a recipient that is associated with the task item. In some embodiments, the action is displaying a text composition area. In some embodiments, text input by a user into the text composition area is then sent as an email or a text message over a network to a recipient that is associated with the task item. In some embodiments, the text composition area is associated with an email address or telephone number of a recipient associated with the task item. In some embodiments, the action is initiating a phone call to a device associated with a phone number that is associated with the task item. In some embodiments, the action is initiating a search based on a search query or URL that is associated with the task item.

In some embodiments, causing an action to be performed (such as one of the actions described above) comprises a first process causing a second process to perform the first action. In some embodiments, the first process causing the second process to perform the action comprises the first process invoking an API call of the second process, wherein the API call comprises one or more attributes associated with the task item The method 1700 further includes displaying, in a task list, the task item and an associated activation region (1706). (See also FIGS. 6 and 8.) In some embodiments, the activation region overlaps a title of the task item, such that the title of the task item is selectable by a user. In some embodiments, the activation region overlaps a description of the task item, such that the description of the task item is selectable by a user. In some embodiments, the activation region overlaps a graphical object, which may be displayed next to or near a title and/or a description of the task item, such that the graphical object is selectable by a user.

The method 1700 further includes receiving a user selection of the activation region (1708). The user may select an activation region by clicking, touching, pressing, and the like. In some embodiments, the method 1700 includes after receiving a user selection of the activation region and prior to performing the action, displaying a prompt requesting permission to perform the action (1710), and receiving a permission input from the user (1712). Requiring a user to read and/or respond to a prompt with permission to proceed can help prevent the device 110 from taking actions that the user did not intend.

The method 1700 further includes performing the action in response to receiving the user selection of the activation region (1714). Some examples of actions that may be performed are described above with reference to step (1704).

In some embodiments, the method 1700 further includes, in response to performing the action, marking the task item as complete (1724).

Automated Task Completion

In an embodiment, task manager 112 (or a task service in cloud 130) "marks" the task item as complete in response to detecting that a task item is consumed. In other words, a task item may be associated with a complete or an incomplete status. Task manager 112 may provide an interface for a user to view task items managed by task manager 112 and determine whether a task item is complete or not. Task manager 112 may provide an option for a user of device 110 to view all completed task items. The completed task items may be ordered based on when the task items were created, consumed (or completed), or some other criteria.

In some embodiments, the task manager 112 (or another component of the device 110) marks a task item as complete once it has detected that the task has actually been performed. In some embodiments, if a task item has an active payload, the task manager 112 determines that a task as been performed when an action associated with the active payload is performed. For example, if a task item is a reminder to make a telephone call to a person, the task manager 112 marks the task item as complete when, after the task item is selected by a user, the device 110 initiates a telephone to that person.

In some embodiments, task items are marked as complete based on one or more rules that identify that a task has been or is likely to have been performed. In particular, the task manager 112 may be able to monitor various aspects of the device 110, such as network communication traffic (e.g., voice, internet protocol, etc.), API calls, and the like, to determine whether tasks have been performed. In one example, if a task item is a reminder to send an email or text message, the task manager 112 may detect whether, after selection of the task item, an email or text message is actually sent by the device 110. Once the task manager 112 detects that the email or text message has been sent, the task item related to that action is marked as complete.

In another example, if a task item is a reminder to call someone, the task manager 112 may detect whether a telephone call has been initiated. In some cases, this requires not only detecting whether a telephone call was initiated, but also whether the telephone call was successful. For example, a user may initiate a telephone call, but the other party may not pickup, or the call may go to voicemail. In these cases, it may be inappropriate to mark the task as complete. Accordingly, several different aspects of the device 110 may be monitored in order to determine whether a telephone call task item has been successfully completed.

In some embodiments, the task manager 112 monitors a communication interface (e.g., communication interface 1618) of the device 110 to detect whether a telephone call has been initiated after the user has selected the task item. In some embodiments, the task manager 112 detects whether the telephone call results in a successful connection. In some embodiments, the task manager 112 monitors for voice input from the user that is characteristic of a telephone call. The task manager 112 can use any of this information (and/or other information), alone or in combination, to determine whether the phone call was successfully completed.

In some embodiments, the task manager 112 can also determine that a task was not successfully completed in order to prevent the marking of a task item as complete. Specifically, a user may take certain actions on the device 110 that are inconsistent with the completion of a recently selected task item. For example, if a user selects a task item that initiates a phone call, but selects an "end call" button after a short amount of time (or before the call is answered by a recipient), the task manager 112 can determine that the task item should not be marked as complete.

Indeed, any type of cancellation of a process that is necessary for completion of a task may be detected in order to determine that a task has not been completed. In some embodiments, device 1.10 includes one or more control elements that are configured to cancel current operations, or that have an effect of cancelling certain operations. The control element may be an activation region of a touch screen, a power button, a control button, a switch, or the like. Button 634 (FIG. 6) illustrates an example of a control element that, when pressed, may cancel certain operations and/or cause the device 110 to enter a different operating state.

In some embodiments, if a user activates (e.g., by touching, clicking, pressing, etc) a particular control element after a task item is selected, but before the task is completed, the task manager 112 will recognize that the task item should not be marked as complete. Returning to the email example from above, if a task item is selected that causes the display of a text input area, and the user selects a control element that has the effect of terminating the message before it is sent, the task manager 112 will recognize that the task (i.e., sending an email to a particular recipient) was not completed.

Detecting events that indicate both task completion and task non-completion allows the task manager 112 to accurately and automatically determine whether task items should be marked as complete. This helps to further automate the task list functions of the device 110, as the user does not need to return to the task list and manually mark task items as complete. Moreover, it prevents the task manager 112 from marking task items as complete when they should not be.

Additionally or alternatively, task items that are consumed (i.e., completed) are deleted from storage. For example, task manager 112 deletes, from storage on device 110, any task items that have been consumed. The deletion of a task item may occur a certain period of time (e.g., 1 month) after the corresponding task has been completed to allow a user of device 110 to review recently-consumed task items. If a task service in cloud 130 manages task items that are stored in cloud 130, then that task service may delete consumed task items.

Attention is directed to FIG. 17, which illustrates a method 1700 that includes determining whether a task item should be marked as complete, according to an embodiment of the invention.

In some embodiments, the method 1700 includes detecting one or more events associated with the performing of the action (1716), and determining whether the one or more events satisfy one or more conditions indicating that the action has been completed (1718). The different types of actions are described above with reference to step (1704).

In some embodiments, the action is sending an email, and the one or more conditions are satisfied upon determining that an email has been sent by the electronic device. In some embodiments, the action is initiating a telephone call, and the one or more conditions are satisfied upon receiving a telephone call initiation request. In some embodiments, the action is initiating a telephone call, and the one or more conditions are satisfied upon detecting a telephone call connection event. In embodiments where the action is initiating a telephone call, the one or more conditions may be satisfied upon detecting a voice input that is characteristic of a telephone call.

In some embodiments, the method 1700 further includes detecting one or more events associated with a failure to perform the action (1720), and determining whether the one or more events satisfy one or more conditions indicating that the action has not been completed (1722). This helps to ensure that tasks are not marked as complete where they were aborted after the task item was selected but before it was able to be completed. In some embodiments, the one or more conditions are satisfied upon receiving a user selection of a control element on the electronic device. In some embodiments, the control element is selected from the group consisting of an activation region of a touch screen, a power button, a control button, and a switch. In some embodiments where the action is initiating a telephone call, the one or more conditions include not detecting a voice input within a predetermined time after selection of the activation region.

Delayed Task Interpretation

In an embodiment, when a task item is created, only some details of the corresponding task may be known and stored in association with the task item. Other details regarding the description, address (if any), trigger, and/or action may be determined later, whether automatically or via a manual process.

For example, device 110 sends, to NLP service 132, voice data that reflects a user command to "Call Sarah at 5." NLP service 132 determines that 5 PM of the current day is a time trigger and causes task manager 112 (or a task service in cloud 130) to create a task item with that time trigger. However, an action item associated with the task item is "Call Sarah" without any indication of a phone number. NLP service 132 has not yet determined who Sarah is and, thus, what phone number to use to call her. Instead, those details are determined later; for example, when the current time is 5 PM and the action is triggered or sometime before the trigger activates. At 5 PM, task manager 112 sends the action item "Call Sarah" (whether in text form or audio form) to NLP service 132 or another service to identify information about a particular Sarah (if there are many) and to determine a phone number for Sarah. When a phone number for Sarah is determined, task manager 112 (or another process) causes a phone application on device 110 to initiate a call using the phone number. In this example, the disambiguation of (a) the identity of an individual and (b) a phone number for that individual is delayed until after the task item is generated.

As another example, device 110 sends, to NLP service 132, voice data that reflects a user command to "Check the weather in San Jose tomorrow morning." NLP service 132 determines that 7 AM of the next day is a time trigger and causes task manager 112 (or a task service in cloud 130) to create a task item with that time trigger. However, an action item associated with the task item is "Check the weather in San Jose" without any indication of how to perform the action. NLP service 132 has not yet interpreted that portion of the user command to determine how the weather in San Jose is to be checked. Instead, those details are determined later; for example, when the current time is 7 AM of the next day and the action is triggered or sometime before the trigger activates. At 7 AM of the next day, task manager 112 sends the action item "Check the weather in San Jose" (whether in text form or audio form) to NLP service 132 or another service to identify how the weather in San Jose is to be checked. In response, NLP service 132 or another service retrieves information about the weather in San Jose and provides that information to device 110 to be displayed. In this example, the determination of how the action is to be performed is delayed until after the task item is generated.

Response to Alert

As alluded to previously, for a task item that is associated with an action that is more than a mere notification, instead of performing the action, a user of device 110 is first alerted of a task and the user is allowed to respond with an affirmative or negative response. For example, an action of a task item is to email Jane Smith about Project Knuckles. Task manager 112 causes, to be displayed on device 110, a message that indicates that the user of device 110 is suppose to email Jane Smith. The user may press a physical or graphical button that indicates an affirmative response. Alternatively, the user may speak the command, "Do it" or "Yes" indicating an affirmative response. In response to the input (whether via a touch screen of device 110, a keyboard selection, or voice input), task manager 112 causes an email application on device 110 to compose an email message addressed to Jane Smith with a subject line that refers to Project Knuckles. Alternatively, the user may decide to be reminded later of the task to email Jane Smith. Thus, in response to the notification, the user provides input (via device 110) that indicates that s/he would like to email Jane Smith some time later, such as in one hour or the next day. Such input may be the user saying "Remind me later" or simply "later."

In an embodiment, when the action is to respond to an act of communication such as an email message, task manager 112 stores the context of the communication at the time of task creation and retrieves the context at the time of performing the action. The context of communication might be, in various embodiments, a Universal Resource Identifier or other reference to the context or a copy of the data of the context. For example, task manager 112 stores a reference to or copy of the email message that is to be replied to. When the action is performed, the contents of the email message can be recreated just as if the user had performed a reply when initially reading it. Other examples of context data that can be stored and retrieved in this manner include without limitation text messages, documents, web pages, voicemail messages, photographs, audio recordings, and videos.

As another example, an action of a task item is to call George Burt. In response to determining to trigger the action to call, task manager 112 provides an indication that a reminder is available for a user of device 110. The indication may be device 110 buzzing/shaking, generating an audible noise, and/or displaying a notification message. Without holding device 110, the user says aloud, "Read it." In response to task manager 112 (or another process) processing this input, device 110 plays an audible version of the following statement: "Reminder . . . call George Burt." The audible version may be based on a playback of the original input from the user or may reflect a computer-generated voice. If the user decides to call George Burt, then the user may simply say, "Okay" or "Do it," which causes a phone application on device 1.10 to call George Burt. If the user decides not to call George Burt, then the user may say, "Ignore" or "remind me later."

IV. Organizing Task Items Using Lists

According to an embodiment of the invention, a task item may be associated with one or more lists. A list is a set of one or more task items that are associated with (or belong to) the same category. Lists are ways that a user of device 110 can view task items in an organized way. The different lists allow the user to intelligently and intuitively browse the tasks that s/he would like to perform (or have performed on his/her behalf). FIGS. 6-14 depict views of various types of lists, according to an embodiment of the invention.

When a new task item is created, task manager 112 (or a service in cloud 130) identifies one or more attributes associated with the new task item and assigns the new task item to one or more lists. For example, if the new task item includes the action "to call," then task manager 112 (or other process) adds the new task item to a To Call list. Similarly, if the new task item includes a certain context and a particular location, then task manager 112 might identify the context and/or the particular location and add the new task item to a location list and/or a context list. Alternatively, a user might manually identify one or more of the lists, which are described in detail below, to which a new task item is to be added.

All Lists View

Figure 5A:
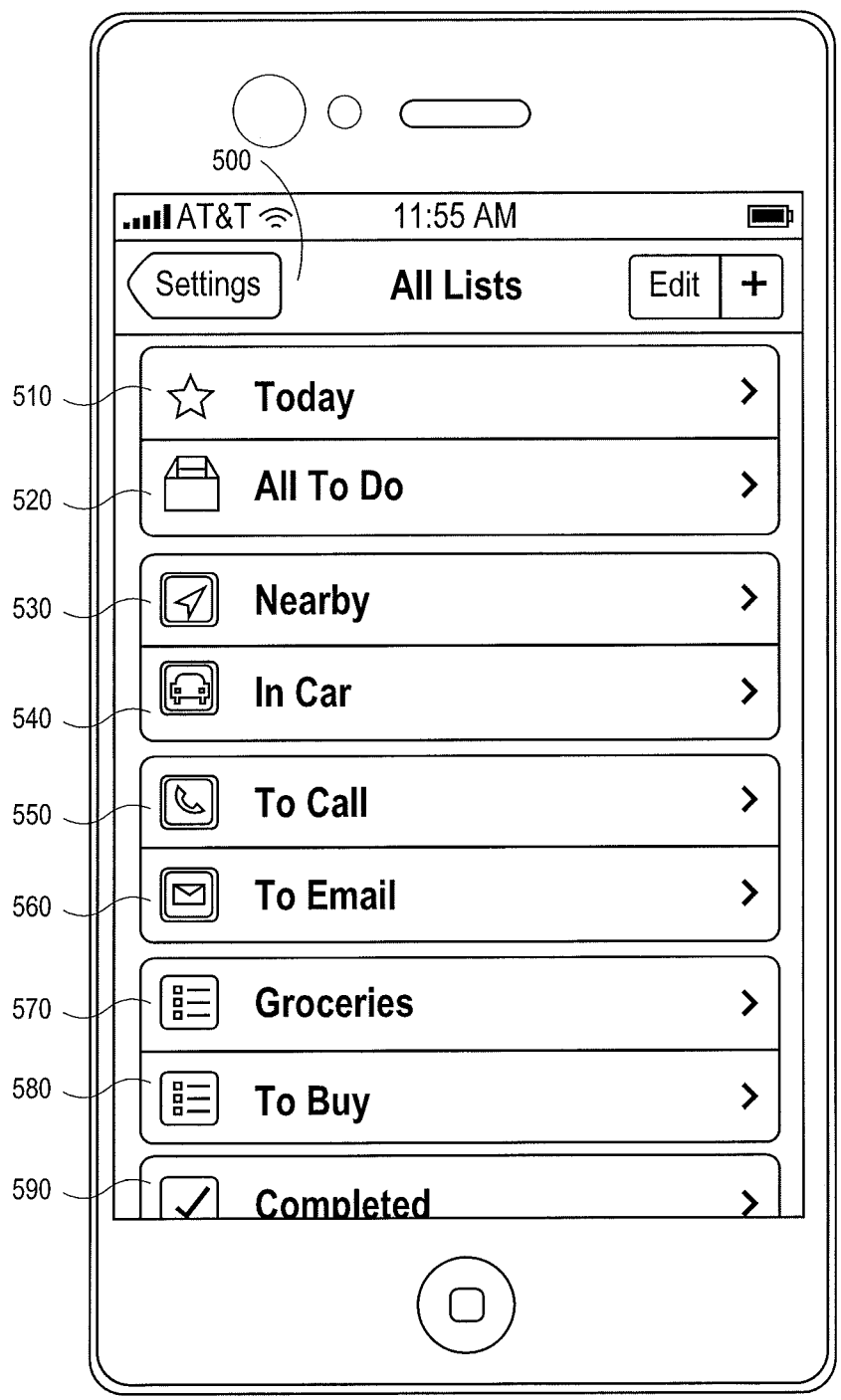
FIGS. 5A-15 depict views of various types of lists, according to an embodiment of the invention.

FIG. 5A depicts an All Lists view 500 that device 110 might display, according to an embodiment of the invention. All List view 500 does not contain information about any specific task items. Instead, All Lists view 500 includes references to multiple lists maintained by task manager 112 (or a task service in cloud 130): a Today list 510, an All To Do list 520, a Nearby list 530, an In Car list 540, a To Call list 550, a To Email list 560, a Groceries list 570, a To Buy list 580, and a Completed list 590. As noted previously, a task item may be associated with (or belong to) multiple lists. For example, a task item whose description is to buy milk and whose time trigger is today may belong to Today list 510, All To Do list 520, Groceries list 570, and To Buy list 580.

Lists may be characterized as one of three types: built-in or predefined list, smart list, or custom list. Today list 510, All To Do list 520, and Completed list 590 are examples of built-in or pre-defined lists.

Smart lists are based on different characteristics or attributes that a task item might have, such as an action (e.g., call, email, text, alert), a location, and/or a context in which the action is to be performed. Examples of smart lists include By Action lists, By Location lists, and By Context lists. In Car list 540, To Call list 550, and To Email list 560 are examples of By Action lists. Other examples of By Actions lists might include a To Text list, a To Lookup list, and a To Visit list.

Examples of custom lists include lists that are based on categories identified by NLP service 132 and lists that are created by a user. Groceries list 570 and To Buy list 580 are examples of custom lists. Another example of a custom list is a wine list (not shown) that includes a list of the user's favorite wines.

Returning to the lists depicted in FIG. 5A, task items that belong to Today list 510 are associated with a triggering criterion that indicates a time during the current day that the corresponding task must or should be performed. All task items belong to All To Do list 520. Task items that belong to Nearby list 530 are associated with locations that are considered to be within a certain distance (e.g., 1 mile) from the current location of device 110. Task items that belong to In Car list 540 are associated with tasks that are to be performed in a car or while traveling. Task items that belong to To Call list 550 are associated with the action to call a person or entity. Task items that belong to To Email list 560 are associated with the action to email a person or entity. Task items that belong to Groceries list 570 are associated with grocery items (e.g., milk, eggs, fruit) to purchase. Task items that belong to To Buy list 580 are associated with items to purchase, such as clothing, books, songs, or groceries. Task items that belong to Completed list 590 are considered completed, which may indicate that the corresponding tasks have been performed or at least that an action (e.g., an alert or notification) associated with each task item has been performed.

All Lists view 500 also includes a "+" image that when selected, allows a user of device 110 to create another custom list so that current and/or future task items can be added thereto.

Figure 5B:
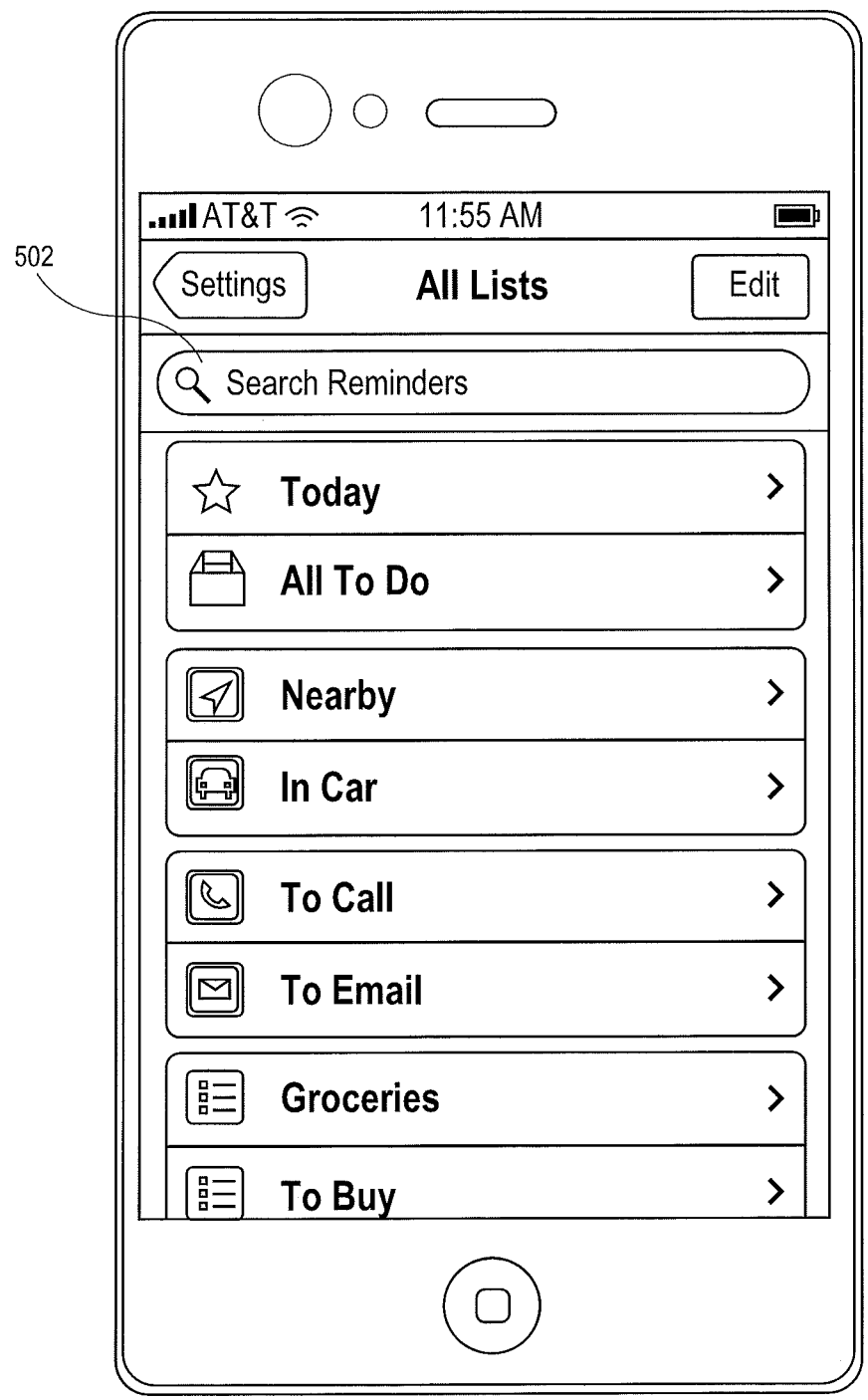

FIG. 5B depicts some of the lists depicted in FIG. 5A, but with a search field 502 to allow a user of device 110 to search for a specific task item. A task item may be searched for based on, for example, the task item's associated creation date, completion date (if known), completion status, context trigger (if any), location (if any), and/or action type (e.g., notify only, call, email, or buy).

Today List

FIG. 6 depicts a view 600 of a Today list that device 110 displays, for example, in response to user selection of Today list 510. View 600 includes a list of tasks that are divided into two sections: a section 610 for task items that are associated with a specific time and a section 620 for task items that are not associated with a specific time. Each of the task items in section 610 is associated with a travel time reminder. The third task item in section 610 and the second through fourth task items in section 620 are associated with actions that are more than mere reminders or alerts.

For example, the third task item in section 610 is to "pick up Chloe" at 5:00 PM. The icon to the right of that description is an image of a compass, indicating that the action associated with this task item is to generate travel directions to help guide the user of device 110 to the intended destination, which is Pinewood School in this example.

As another example, the second task item in section 620 is to "call John Appleseed." The icon to the right of that description is an image of a phone, indicating that the action associated with this task item is to call John Appleseed. The image adjacent to the phone image is of a car, indicating that the user of device 110 is to call John Appleseed when the user is in a car or while the user is traveling.

As another example, the last task item in section 620 is to "reply to Pablo Marc." The icon to the right of that description is an image of an envelope, indicating that the action associated with this task item is to send an email to Pablo Marc. View 600 also indicates that this task item is overdue, or rather, that the originally-scheduled time to email Pablo Marc has passed.

Single Task Item View

Figure 7:
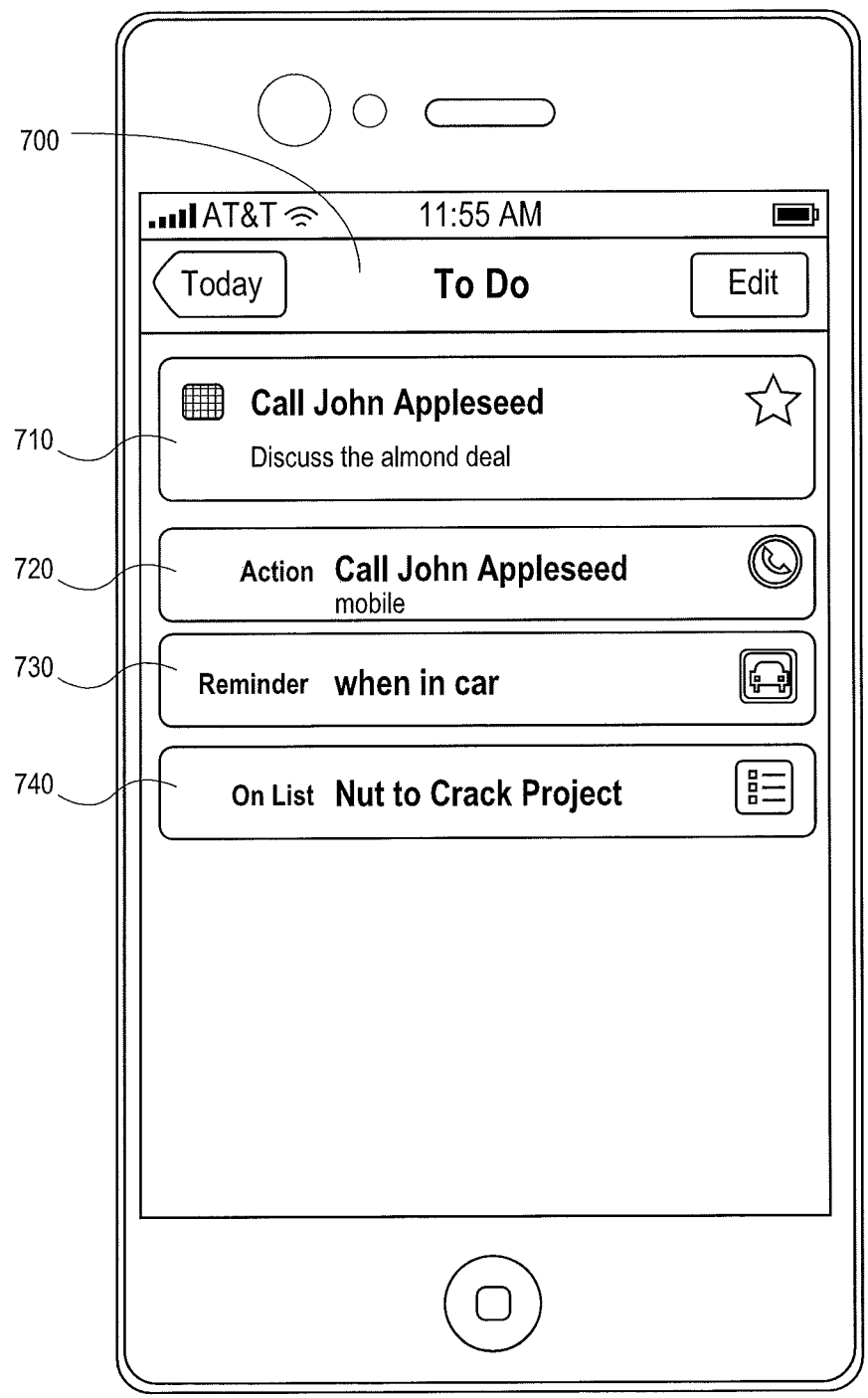

FIG. 7 depicts a view 700 that device 110 displays and that includes details about a particular task item. View 700 may have been generated based on a user selection of the second task item in section 620 in view 600 of FIG. 6. The displayed task item contains four data items: a description item 710, an action item 720, a reminder item 730, and a list assignment item 740.

Description item 710 contains a high-level description of the task ("Call John Appleseed") and includes details about the subject matter ("Discuss the almond deal"). Selection of description item 710 may allow a user of device 110 to edit the description.

Action item 720 contains a description of the action ("Call") and includes which phone ("mobile") of John Appleseed to use. Selection of action item 720 may allow the user of device 110 to view the phone number associated with John Appleseed and/or provide other contact options, such as another phone number associated with John Appleseed, an email address of John Appleseed, etc. Furthermore, selection of the phone icon in action item 720 may cause task manager 112 to initiate a call phone to John Appleseed right then instead of waiting for the one or more triggering criteria associated with the task item to be satisfied.

Reminder item 730 indicates the type of trigger ("when in car") that, when detected, will cause the action to be performed, or at least an alert about the task. Selection of reminder item 730 may allow a user to change the type of reminder.

List assignment item 740 indicates the list to which the task item belongs, which is the "Nut to Crack Project" list in this example. This list is an example of a customized list. Selection of list assignment item 740 may cause device 110 to display multiple task items that belong to the "Nut to Crack Project" list.

All to do List

Figure 8:
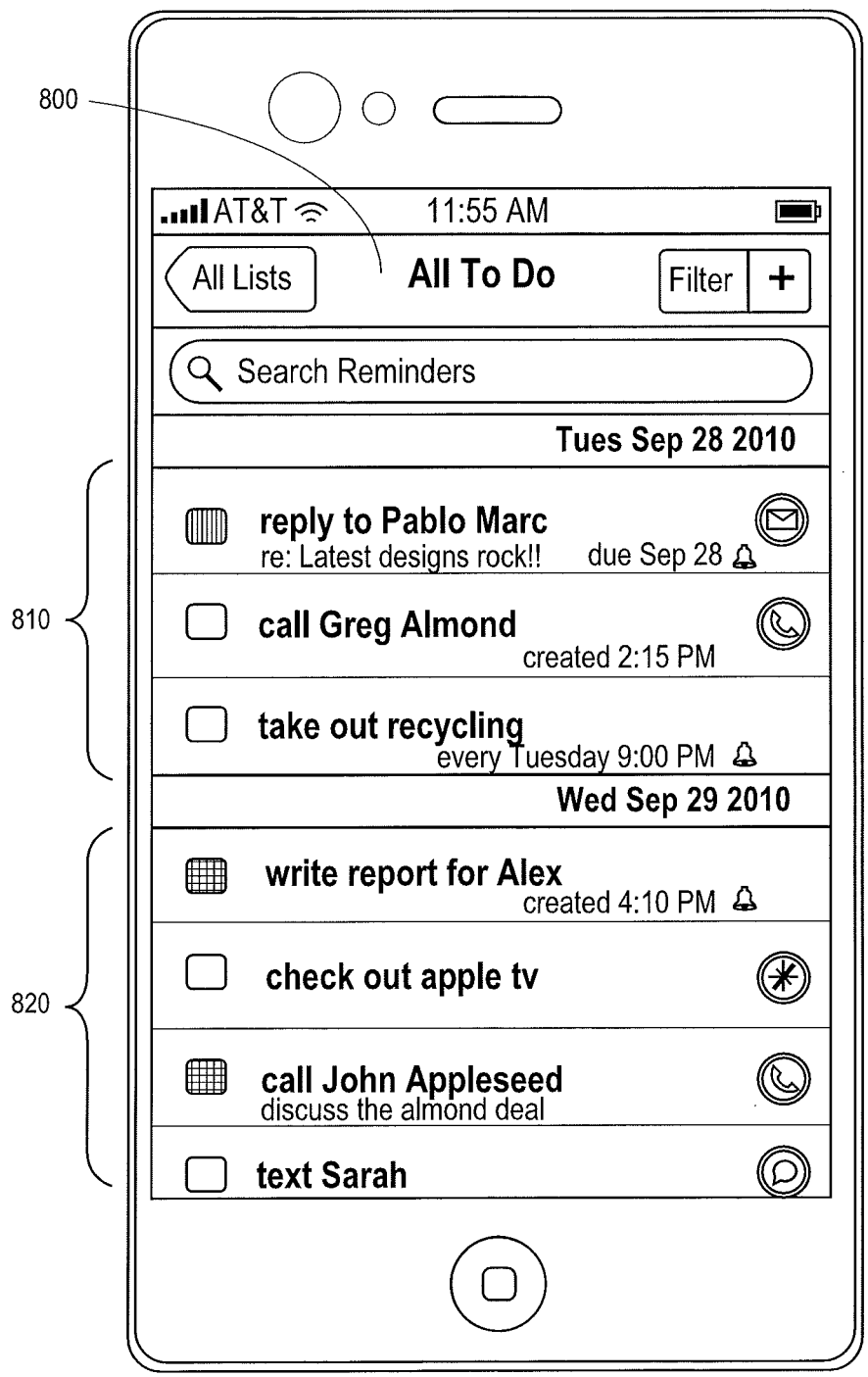

FIG. 8 depicts a view 800 of an All To Do list that device 110 displays and that includes information about multiple task items. In this example, the multiple task items are ordered by date. View 800 may have been generated based on a user selection of All To Do list 820 in view 800 of FIG. 8A. View 800 is divided into two sections: section 810 that contains task items (or references thereto) to be completed on one day and section 820 that contains task items to be completed on the following day.

Some of the task items referenced in view 800 have been completed. Such completed task items are shown with a lighter gray image to the left of the corresponding description. Task items that have been completed may be distinguished from not-yet-completed task items by other techniques, such as check marks.

In the example depicted in FIG. 8, the task items are organized by the date on which the corresponding tasks should be performed (or "due date"). However, the task items referenced in view 800 may be organized by the date on which a user of device 110 is to be alerted or reminded of the corresponding tasks ("alert date"), the date on which the task items were created ("created date"), the date on which the task items were modified ("modified date"), or the date on which the corresponding tasks were performed ("completed date").

Nearby List

Figure 9:
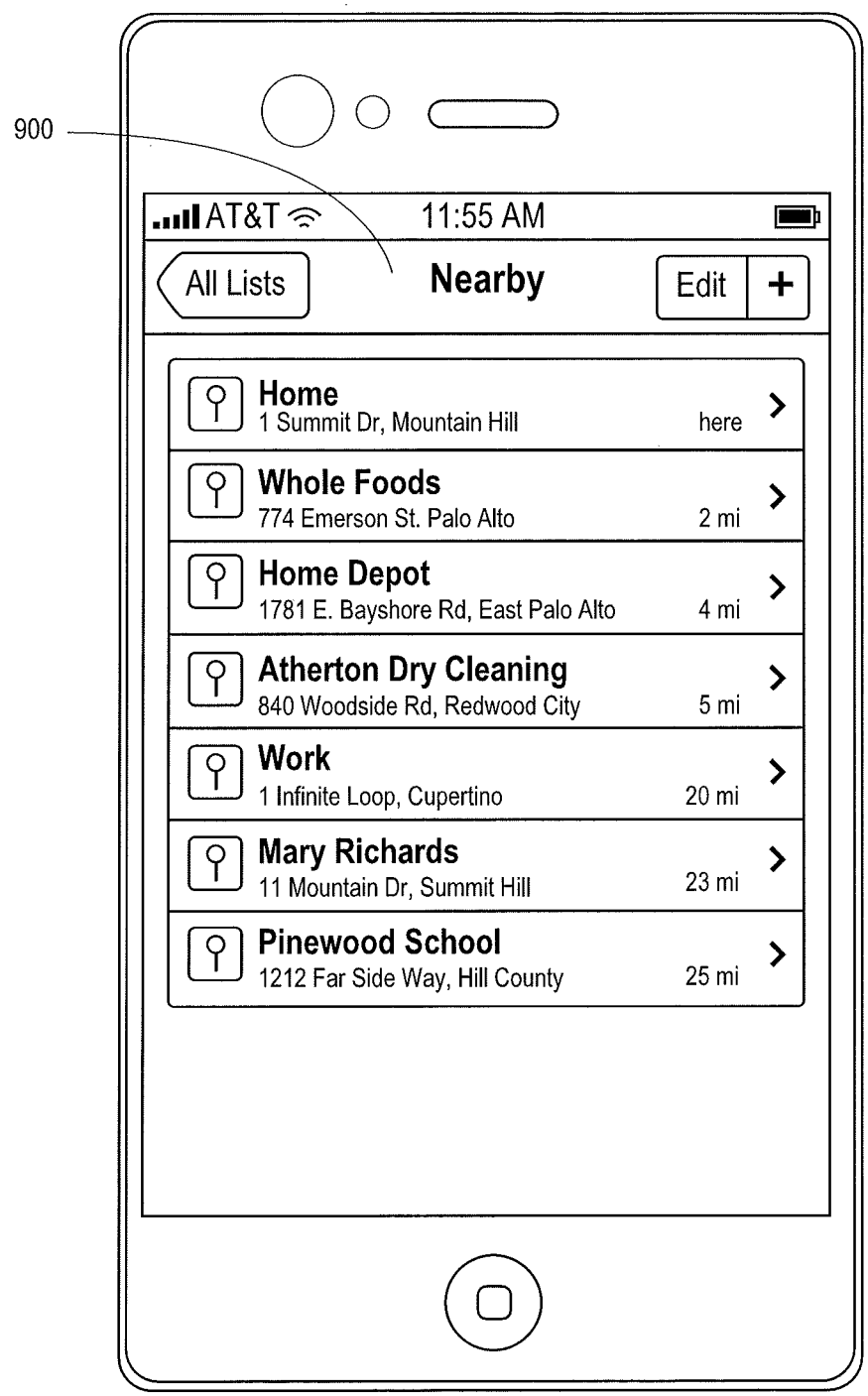

FIG. 9 depicts a view 900 of a "Nearby" list that device 110 displays. View 900 may have been generated based on a user selection of Nearby list 830 in view 800 of FIG. 8A. View 900 contains information about multiple locations that are ordered based on distance from device 110's current location. The location indicated at the top of the list ("Home") is closest to the current location of device 110 while the location indicated at the bottom of the list ("Pinewood School") is furthest from the current location of device 110.

Each location indicated in view 900 is associated with a different location list. Each location list may be associated with one or more task items. For example, the "Home" location may be associated with four task items (which may be displayed on user selected of the "Home" location) while the "Atherton Dry Cleaning" location may be associated with just one task item.

Because the locations indicated in view 900 are ordered based on distance from the current location of device 110, when the current location of device 110 changes, the location indicators may be re-ordered, some may be removed from view 900, and others not currently displayed in view 900 may appear in view 900. For example, if device 110 is currently located in a store that is next to the Whole Foods store identified by the second location indicated in view 900, then, if device 110 displays view 900, that Whole Foods location indicator will be at the top of the list.

As indicated above, view 900 includes a "Home" location and a "Work" location. The association of a location labeled "Home" (or "Work") with a particular address may be made in numerous ways. For example, many mobile devices store profile information about a user of the mobile device. This information is referred to as a "me card." A me card typically stores a user's home address and the user's work address. Thus, task manager 112 (or another process) analyzes the me card that is stored on device 110 to determine a home address and a work address (if any) of the user.

In an embodiment, a radius is associated with a particular location and any task items that are associated with a location that is within the distance indicated by the radius is considered to be associated with the particular location. For example, a radius associated with a home of a user of device 110 is 2 miles. If a task item is associated with a park and the park is within 2 miles from the home, then the task item is associated with a "home" list, along with other task items that are associated with the home.

Location List View

As noted previously, a location list is an example of a smart list. In an embodiment, any task item that is associated with a location (e.g., as part of the one or more triggering criteria) is automatically associated with a location list that is associated with the same location as the location of the task item. Task manager 112 (or a task service in cloud 130) may maintain multiple location lists.

Figure 10A:
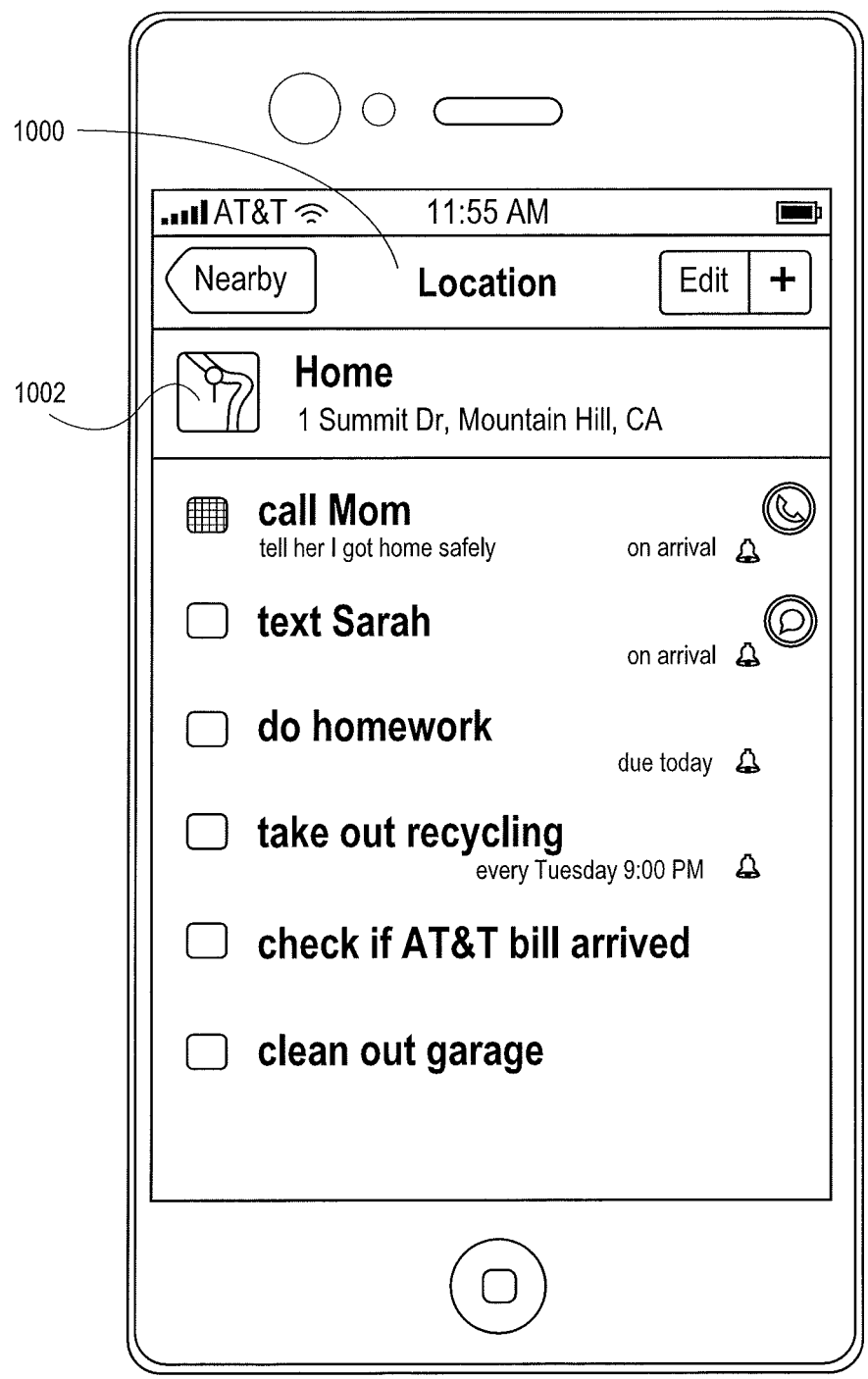

FIG. 10A depicts a Location List view 1000 that device 110 displays. Location list view 1000 may have been generated based on a user selection the "Home" location indicator in Nearby view 900 of FIG. 9. Location list view 1000 contains six task items. The bell image adjacent to each of the first four task items indicates that a reminder (or alert) for those task items will be generated when device 110 is at or near the user's home or at least sometime on a specified date. A reminder or alert will not be generated for the last two task items.

Location List view 1000 also includes a map icon 1002 which, when selected, causes task manager 112 to communicate with a map application that generates a map of the location associated with the map icon. In this example, a map of the user's home would be generated.

Figure 10B:
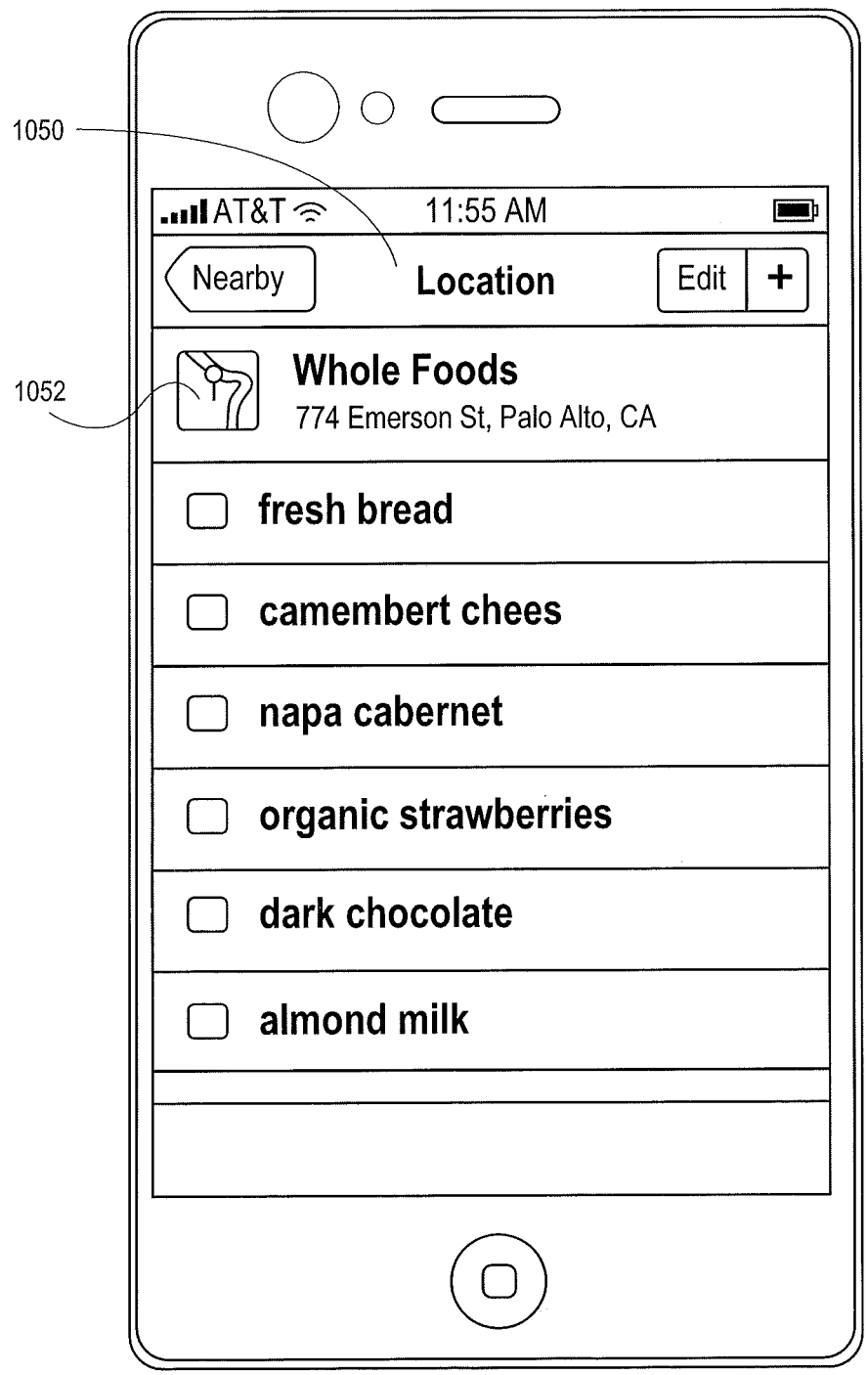

FIG. 10B depicts a Location List view 1050 that device 110 displays. Location List view 1050 may have been generated based on a user selection the "Whole Foods" location indicator in Nearby view 900 of FIG. 9. Location List view 1050 contains six data items, each of which may or may not be a task item. Instead, each data item in Location List view 1050 simply identifies a grocery item to purchase at a Whole Foods grocery store. None of the grocery items are associated with a reminder (although they could be) or a completion date (although they could be).

The grocery items identified in Location List view 1050 was associated with the Whole Foods grocery list in response to input from a user of device 110. For example, a user spoke the following command: "Add almond milk to my grocery list" or "Remember to pick up almond milk at Whole Foods near my house." Device 110 transmits voice data that reflects this command to NLP service 132. NLP service 132 determines, based on the voice data, that the user intends to purchase almond milk. NLP service 132 may cause task manager 112 to (a) create a task item for the task of purchasing almond milk and add the task item to the Whole Foods list or (b) simply add "almond milk" to the Whole Foods list.

Location List view 1050 also includes a map icon 1052 which, when selected, causes task manager 112 to communicate with a map application that generates a map of the location associated with the map icon. In this example, a map of the Whole Foods store identified by the displayed address would be generated.

Smart Lists

Figure 11A:
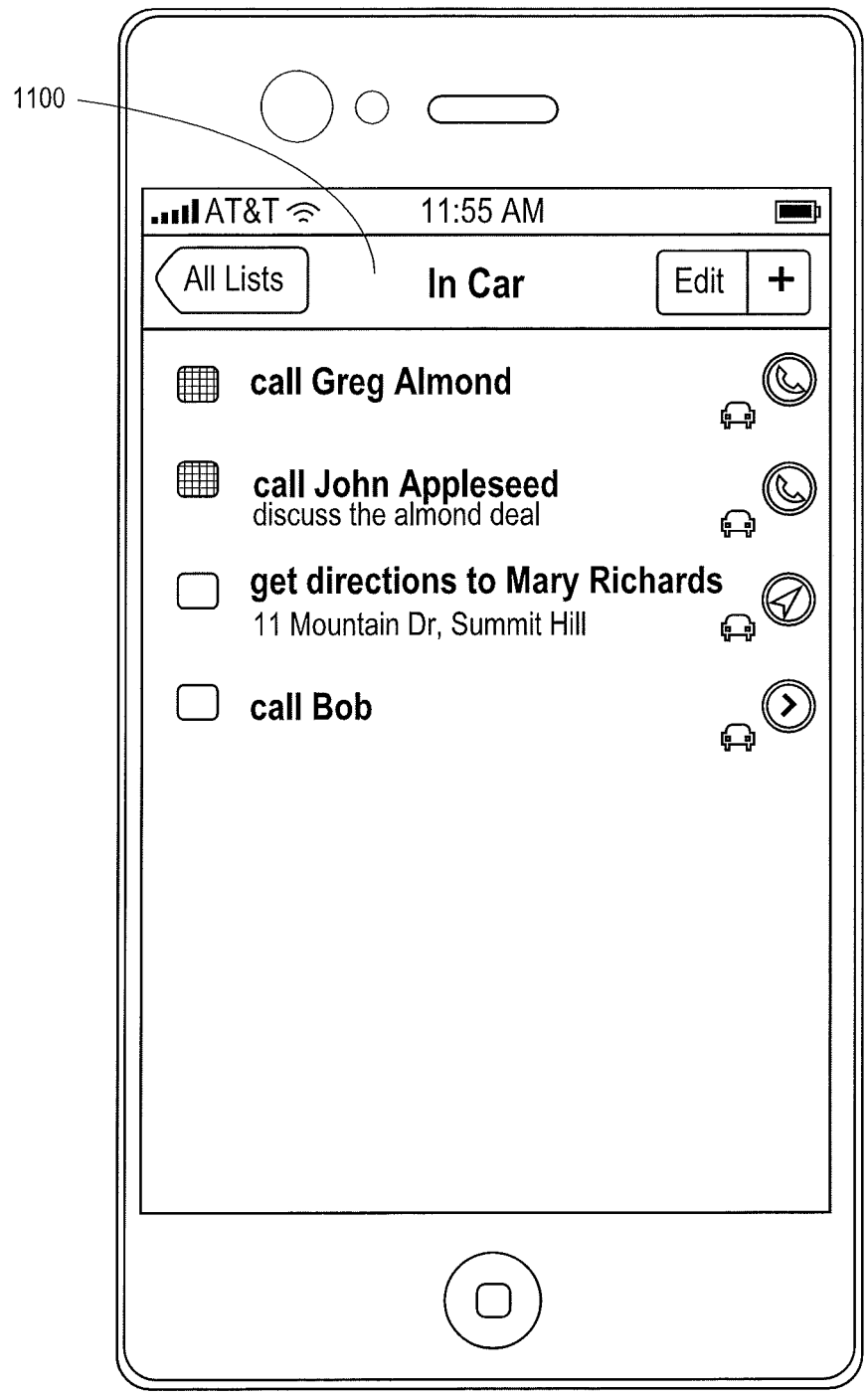
Figure 11B:
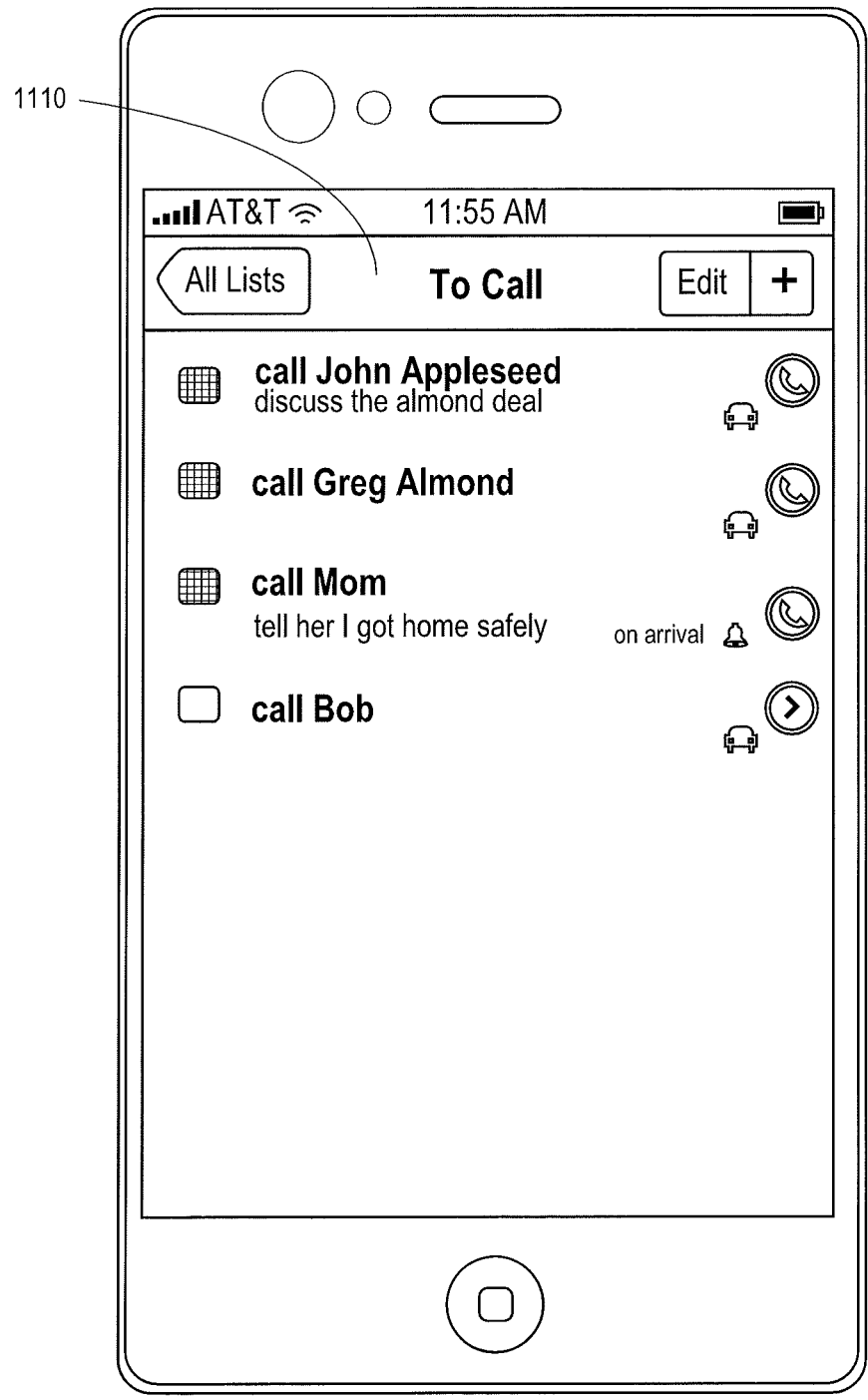
Figure 11C:
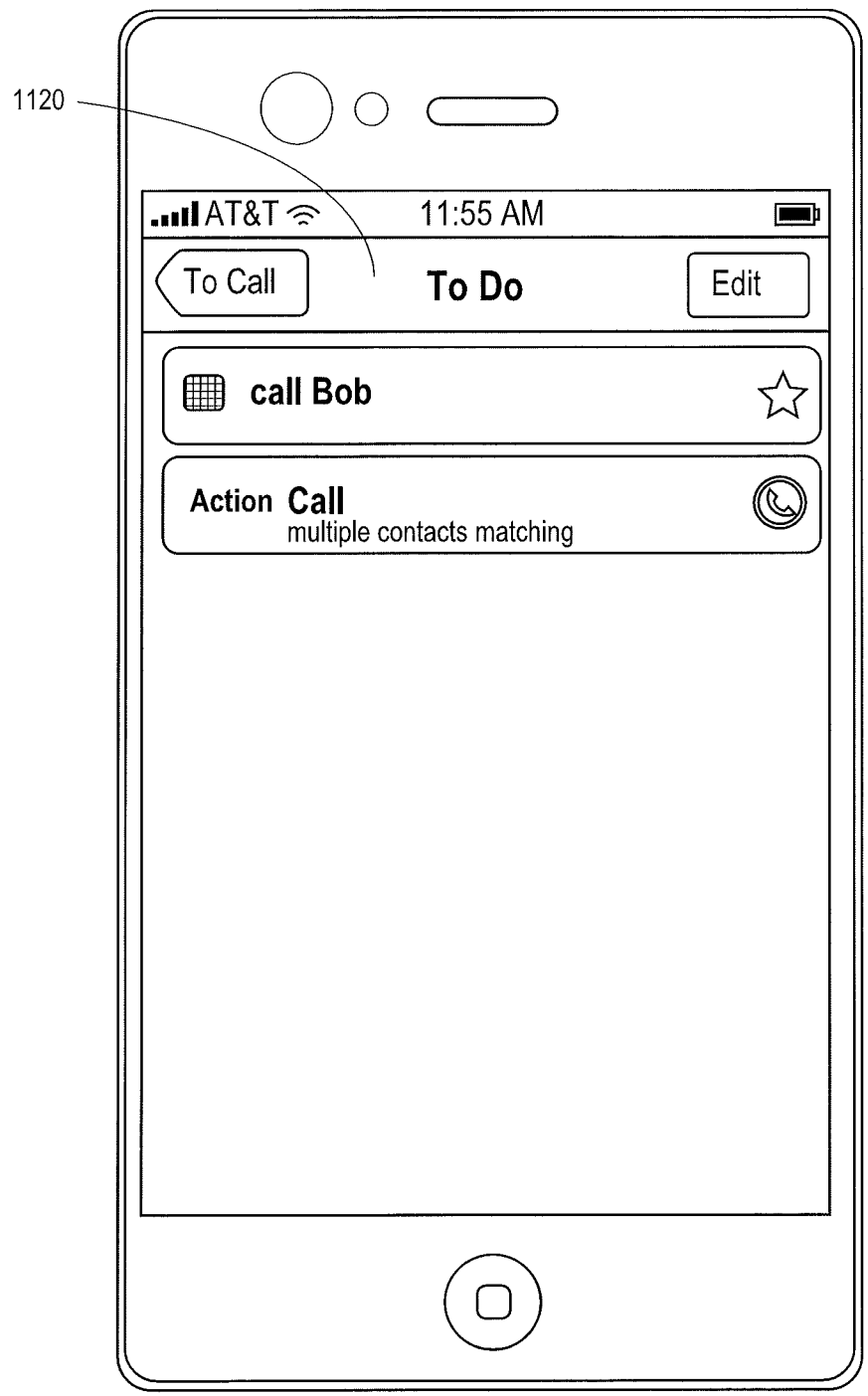
Figure 11D:
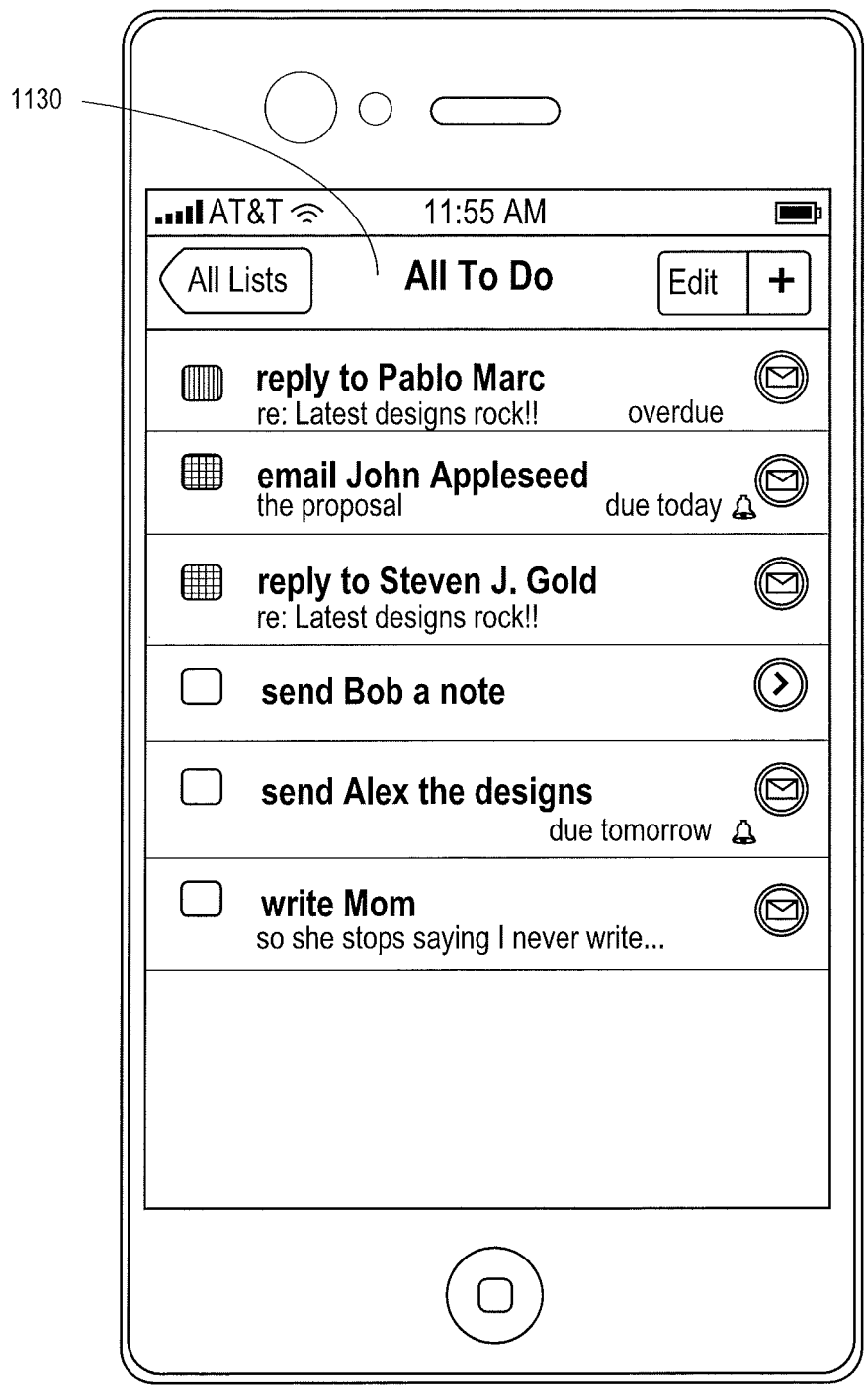

As noted previously, By Location lists, By Action lists, and By Context lists are examples of smart lists. FIG. 11A depicts a view 1100 of a By Context list; specifically, an In Car list. FIG. 11B and FIG. 11D depict views of different By Action lists; specifically, a To Call list and a To Email list.

View 1100 contains task items that are associated with tasks that are to be performed in a specific context, i.e., the "In Car" context. The task items in the In Car list may be associated with different actions, such as calling and getting directions.

In contrast, view 1110, depicted in FIG. 11B, contains task items that are associated with the same action, which, in this example, is to call a person or entity. The first three task items in view 1110 have a phone icon, indicating that a phone number for the person indicated in the corresponding task is known to task manager 112. However, the last task item in view 1110 is not associated with a phone icon, indicating that a phone number for "Bob" is not positively known to task manager 112, probably because many contacts in the user's contact list may have the name of Bob. Selection of the "call Bob" task item in view 1110 causes device 110 to display a view 1120 depicted in FIG. 11C.

View 1120 indicates two data items that are contained in (or associated with) the "call Bob" task item: a description item and an action item. The action item indicates that multiple contacts are known as "Bob." As a result, the action item includes a call button that is disabled, whereas the call buttons associated with the other task items in view 1110 are not disabled. Selection of the action item may initiate a process for disambiguating the identity of "Bob." For example, selection of the action item may cause task manager 112 to display a list of names, each of which have the name of Bob or Robert. In this way, the disambiguation of an identity or of a phone number may occur much later than the creation of the corresponding task item.

View 1130, depicted in FIG. 11D, includes six task items, each of which includes an action to email. The active payload arguments of a To Email task item include a "To" or email address and, optionally, a subject for the subject line of the email.

In an embodiment, an "email" task item is created from an email application that is separate from task manager 112. The email application may invoke an API call of task manager 112 to create a task item whose action is to email, where the action includes an active payload that includes an email address and a subject.

Custom Lists

Figure 12:
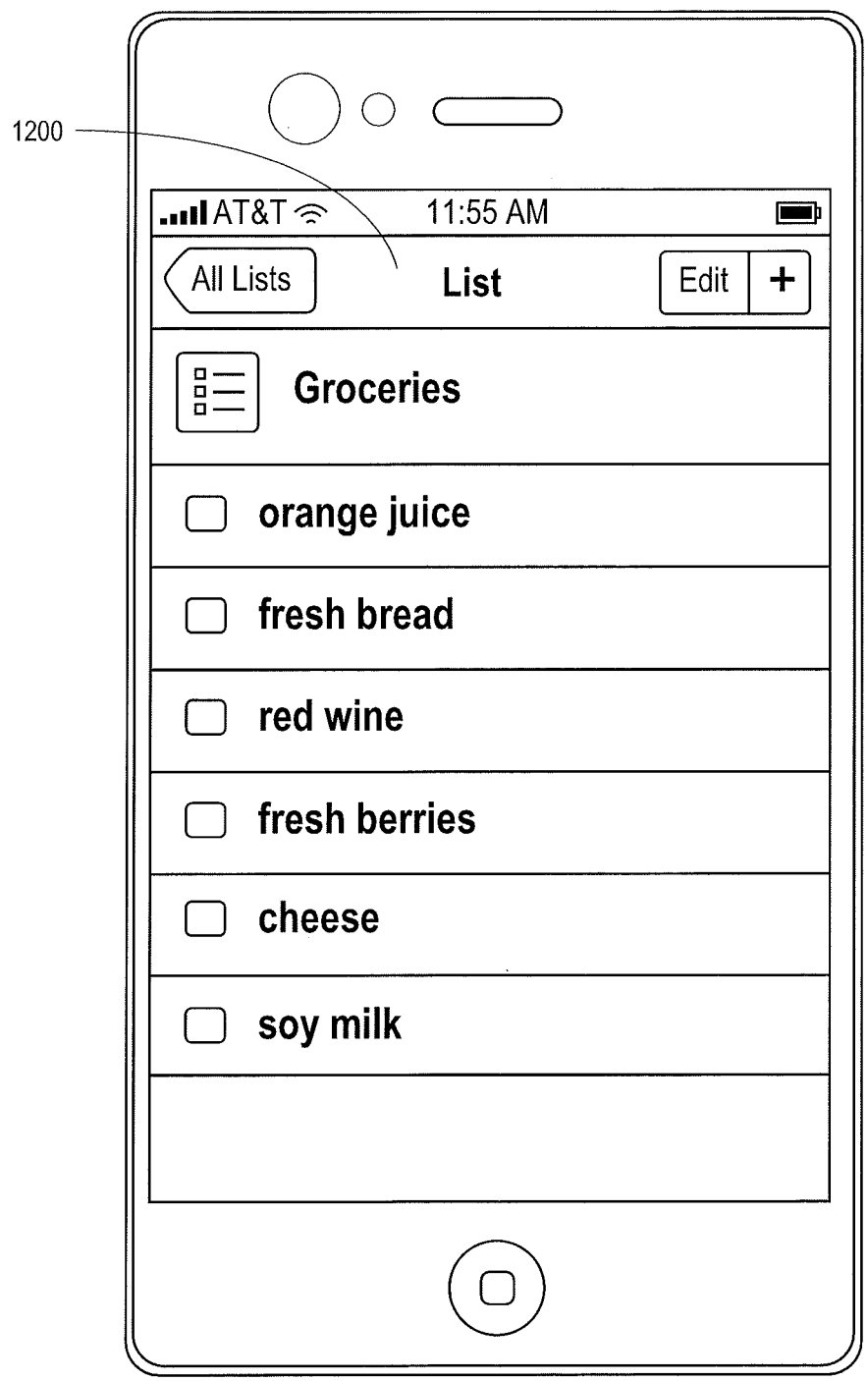

As noted previously, custom lists are one of the three main types of lists, including built-in lists and smart lists. Examples of custom lists indicated above include Grocery list 570 and To Buy list 580 (referenced in FIG. 5A). FIG. 12 depicts a view 1200 that might be generated in response to user selection of Grocery list 570. View 1200 includes six data items, each referring a different grocery item to purchase. Each of these data items may be task items that only have a description. The data items may have been associated with the grocery list based on input from NLP service 132. For example, NLP service receives, from device 110, voice data that reflects the user command to "pick up fresh bread from the store." NLP service 132 determines that the user of device 110 intends to purchase fresh bread from a grocery store and associates "fresh bread" with a grocery category. In response, NLP service 132 sends, to task manager 112, a create task item command to create a task item that includes the description "fresh bread" and that is associated with the grocery category. In response, task manager 112 creates a task item and associates the task item with a grocery list that task manager 112 maintains.

Figure 13:
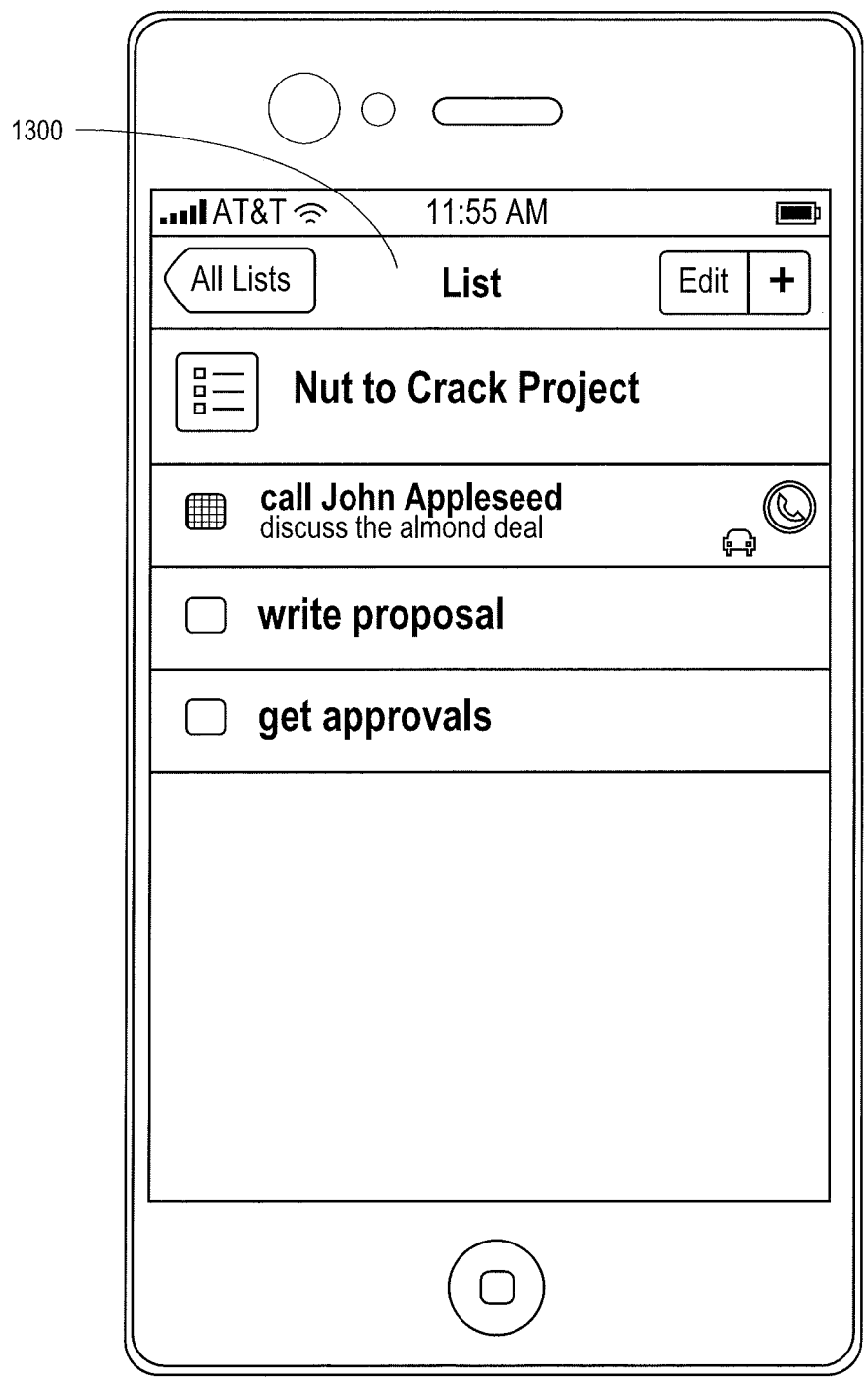

FIG. 13 depicts a view 1300 of another type of custom list: a user-defined list. This user-defined list is entitled, "Nut to Crack Project," and contains three task items, the first of which is associated with an action (i.e., call) and a context trigger (e.g. "in car" or "while driving"). A user of device 110 may "manually" associate a task item with a user-defined list. For example, after task manager 112 creates a task item, the user selects the task item and, via one or more selectable (e.g., menu) options displayed on device 110, selects a particular user-defined list, which causes task manager 112 to associate the task item with the particular user-defined list.

Alternatively, NLP service 132 may determine, based on input data (whether voice or text) received from device 110, a specific list to associate with a task item. For example, voice data may reflect a user command to "I need to write a proposal for the Nut to Crack Project." NLP service 132 determines that "write a proposal" is the task and that "Nut to Crack Project" is the name of a list, which task manager 112 may or may not have yet created. NLP service 132 then sends, to task manager 112, the description ("write proposal") and the name of a possible list to which the to-be-created task item may be added ("Nut to Crack Project"). Task manager 112 determines whether there is a list that has the same or similar name as "Nut to Crack Project." If so, then task manager 112 creates a new task item and associates the task item with that list. If not, then task manager 112 creates a new list with that name, creates a new task item, and associates that task item with the new list.

Lists and Notes

Figure 14:
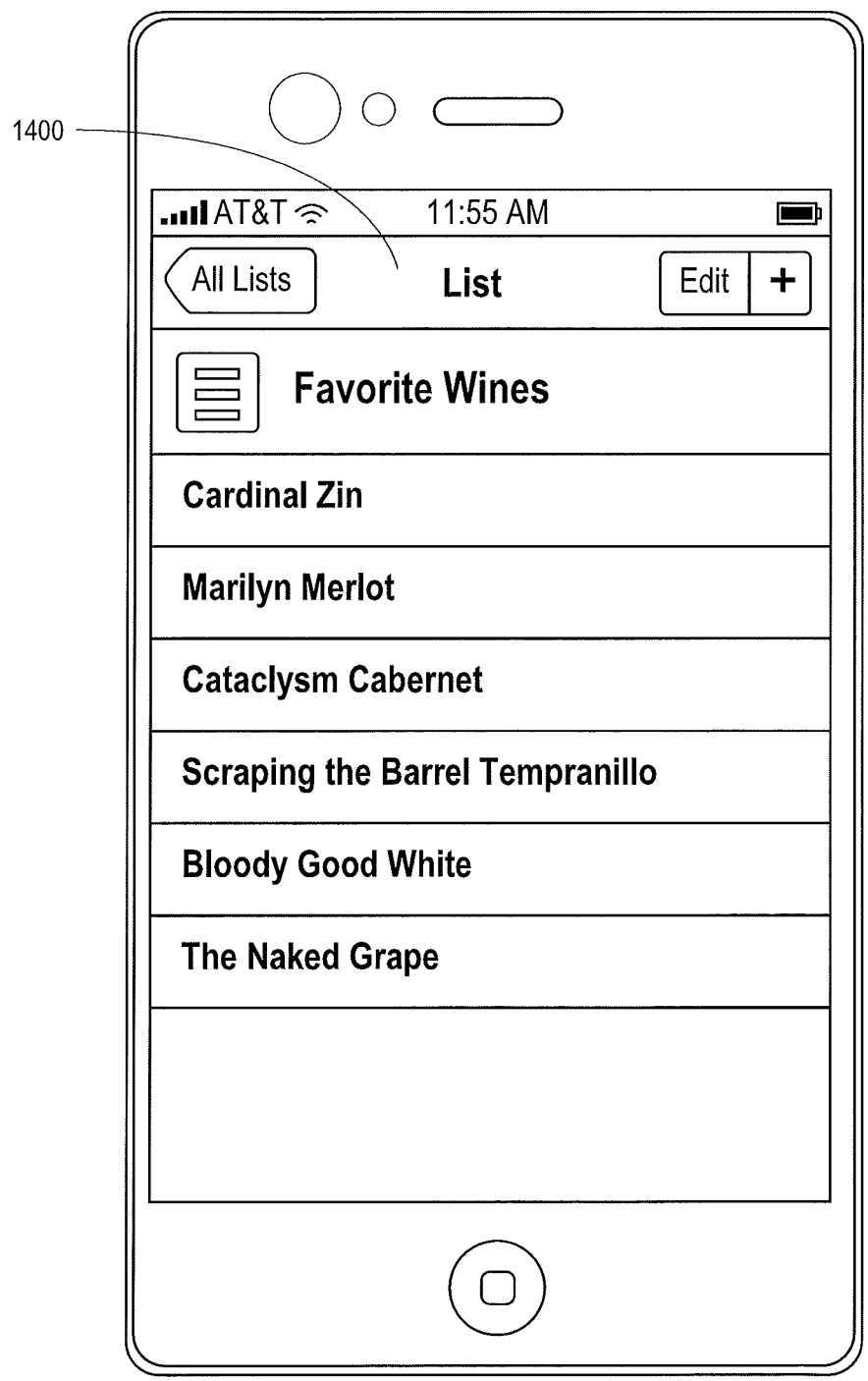

As noted previously, a list may contain items that are not tasks. Such "non-task" are referred to as "notes" that consist only of a description. FIG. 14 depicts a view 1400 of a Favorite Wines list, which contains six notes, each referring to a different wine.

Also as noted previously, NLP service 132 may be configured to recognize list names so that task manager 112 can easily assign tasks and notes to the appropriate list(s).

Calendar Events

In an embodiment, calendar events created in the context of a calendar application are used to create task items that are managed by task manager 112. The calendar application may be part of task manager 112 or may be separately executing applications. For example, the calendar application might be configured to send newly-created calendar events to task manager 112, e.g., via one or more API calls that cause task manager 112 to create a task item based on the details of a calendar event, such as a description, a date, a location (if any), a duration (if any), and a reminder (if any). Alternatively, task manager 112 might provide a calendar service that allows a user to view a calendar and create events that are associated with a specific date and time or set of dates. Upon creation of events, task manager 112 also creates task items for the events.

Figure 15:
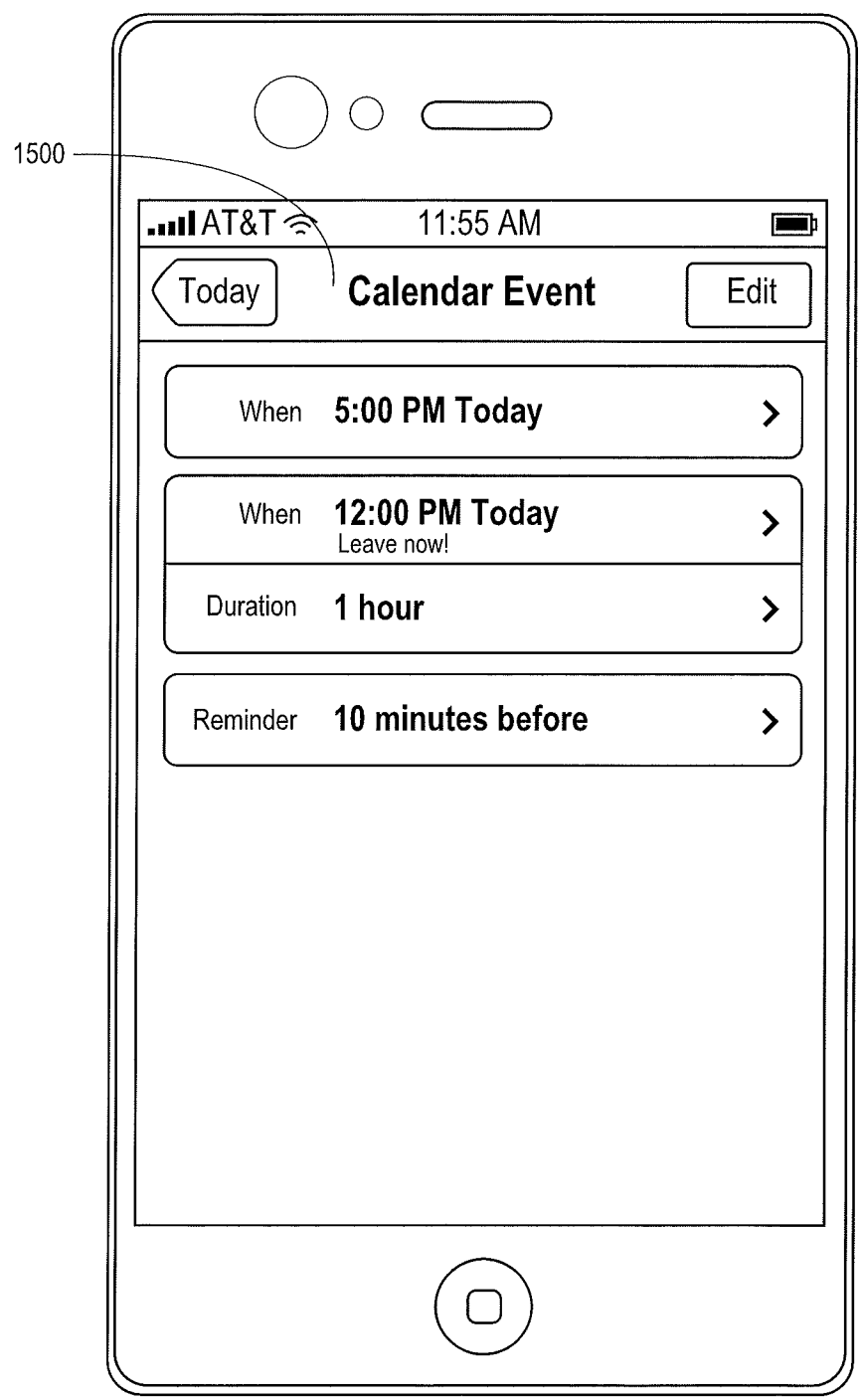

FIG. 15 depicts a view 1500 of a task item that was generated based on a calendar event. The task item includes four data items: a description ("lunch with Elizabeth Reid"), a begin time ("12:00 PM Today"), a duration ("1 hour"), and a reminder ("10 minutes before"). Selection of any of the four data items may allow a user of device 110 to edit the corresponding data items. In an embodiment, if a change is made to a task item that was generated based on a calendar event, then that change is "pushed" to the calendar event that is managed by a calendar application.

In either scenario, if a calendar event that is created and maintained by the calendar service is associated with a location, then a task item that is generated based on the calendar event might also be associated with the location. In that case, task manager 112 might automatically associate the task item with a location list, such as the location list in view 1000 of FIG. 10A.

Combinations

While the foregoing description includes four main approaches (generating task items, organizing task items, triggering notifications, and consuming task items), each of these approaches may be implemented individually or may be used together, as noted in many of the examples. For example, natural language processing may be used to generate a task item, but none of the approaches described herein for processing the task item (i.e., organizing the task item, triggering a notification, and consuming the task item) are used. As another example, natural language processing may be used to generate a task item and an approach for organizing the task item as described herein may be used, but none of the approaches for triggering a notification or consuming the task item described herein are used. As another example, none of the approaches for generating and organizing task items and triggering a notification is used, but the approach for consuming the task item as described herein is used.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 16:
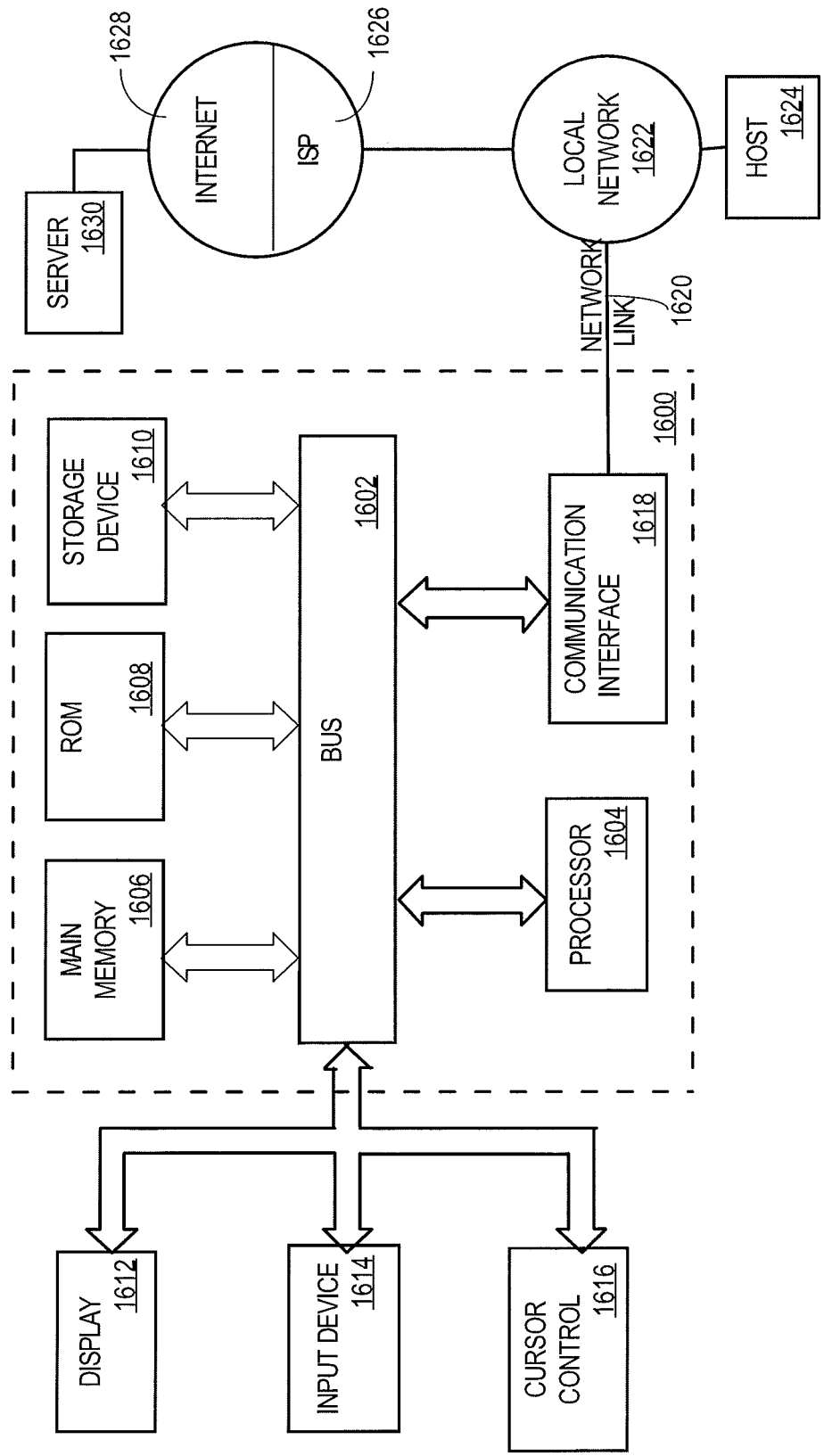
FIG. 16 is a block diagram that illustrates a computer system upon which an embodiment of the invention may be implemented.

For example, FIG. 16 is a block diagram that illustrates a computer system 1600 upon which an embodiment of the invention may be implemented. Computer system 1600 includes a bus 1602 or other communication mechanism for communicating information, and a hardware processor 1604 coupled with bus 1602 for processing information. Hardware processor 1604 may be, for example, a general purpose microprocessor.

Computer system 1600 also includes a main memory 1606, such as a random access memory (RAM) or other dynamic storage device, coupled to bus 1602 for storing information and instructions to be executed by processor 1604. Main memory 1606 also may be used for storing temporary variables or other intermediate information during execution of instructions to be executed by processor 1604. Such instructions, when stored in non-transitory storage media accessible to processor 1604, render computer system 1600 into a special-purpose machine that is customized to perform the operations specified in the instructions.

Computer system 1600 further includes a read only memory (ROM) 1608 or other static storage device coupled to bus 1602 for storing static information and instructions for processor 1604. A storage device 1610, such as a magnetic disk or optical disk, is provided and coupled to bus 1602 for storing information and instructions.

Computer system 1600 may be coupled via bus 1602 to a display 1612, such as a cathode ray tube (CRT), for displaying information to a computer user. An input device 1614, including alphanumeric and other keys, is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane.

Computer system 1600 may implement the techniques described herein using customized hard-wired logic, one or more ASICs or FPGAs, firmware and/or program logic which in combination with the computer system causes or programs computer system 1600 to be a special-purpose machine. According to one embodiment, the techniques herein are performed by computer system 1600 in response to processor 1604 executing one or more sequences of one or more instructions contained in main memory 1606. Such instructions may be read into main memory 1606 from another storage medium, such as storage device 1610. Execution of the sequences of instructions contained in main memory 1606 causes processor 1604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1610. Volatile media includes dynamic memory, such as main memory 1606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1602. Transmission media can also take the form of acoustic or light waves, such as those generated during radio-wave and infra-red data communications.

Various forms of media may be involved in carrying one or more sequences of one or more instructions to processor 1604 for execution. For example, the instructions may initially be carried on a magnetic disk or solid state drive of a remote computer. The remote computer can load the instructions into its dynamic memory and send the instructions over a telephone line using a modem. A modem local to computer system 1600 can receive the data on the telephone line and use an infra-red transmitter to convert the data to an infra-red signal. An infra-red detector can receive the data carried in the infra-red signal and appropriate circuitry can place the data on bus 1602. Bus 1602 carries the data to main memory 1606, from which processor 1604 retrieves and executes the instructions. The instructions received by main memory 1606 may optionally be stored on storage device 1610 either before or after execution by processor 1604.

Computer system 1600 also includes a communication interface 1618 coupled to bus 1602. Communication interface 1618 provides a two-way data communication coupling to a network link 1620 that is connected to a local network 1622. For example, communication interface 1618 may be an integrated services digital network (ISDN) card, cable modem, satellite modem, or a modem to provide a data communication connection to a corresponding type of telephone line. As another example, communication interface 1618 may be a local area network (LAN) card to provide a data communication connection to a compatible LAN. Wireless links may also be implemented. In any such implementation, communication interface 1618 sends and receives electrical, electromagnetic or optical signals that carry digital data streams representing various types of information.

Network link 1620 typically provides data communication through one or more networks to other data devices. For example, network link 1620 may provide a connection through local network 1622 to a host computer 1624 or to data equipment operated by an Internet Service Provider (ISP) 1626. ISP 1626 in turn provides data communication services through the world wide packet data communication network now commonly referred to as the "Internet" 1628. Local network 1622 and Internet 1628 both use electrical, electromagnetic or optical signals that carry digital data streams. The signals through the various networks and the signals on network link 1620 and through communication interface 1618, which carry the digital data to and from computer system 1600, are example forms of transmission media.

Computer system 1600 can send messages and receive data, including program code, through the network(s), network link 1620 and communication interface 1618. In the Internet example, a server 1630 might transmit a requested code for an application program through Internet 1628, ISP 1626, local network 1622 and communication interface 1618.

The received code may be executed by processor 1604 as it is received, and/or stored in storage device 1610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific faun in which such claims issue, including any subsequent correction.

What is claimed is:

1. A non-transitory computer readable storage medium storing one or more programs, the one or more programs comprising instructions, which when executed by one or more processors of an electronic device, cause the electronic device to:

receive a natural language input from a user of the electronic device, wherein the natural language input includes an action to be performed, a location associated with the action, and a time associated with the action, wherein the action is a programmed function of the electronic device, and wherein the natural language input specifies:
  performing the action based on a current location of the electronic device corresponding to the location associated with the action prior to a current time of the electronic device corresponding to the time associated with the action; or
  performing the action based on the current time of the electronic device corresponding to the time associated with the action prior to the current location of the electronic device corresponding to the location associated with the action;

generate, based on the natural language input, a task item associated with the action;

store the task item in association with the location associated with the action and the time associated with the action; and after storing the task item in association with the location associated with the action and the time associated with the action:

determine whether the current location of the electronic device corresponds to the location associated with the action;

determine whether the current time of the electronic device corresponds to the time associated with the action;

in accordance with a determination that the current location corresponds to the location associated with the action prior to the current time of the electronic device corresponding to the time associated with the action, cause the action to be performed by the electronic device, wherein causing the action to be performed by the electronic device includes:

in accordance with a determination that a telephone conversation between a user of the electronic device and a participant of a telephone call is occurring, producing an audio output related to the task item during the telephone conversation, wherein the audio output is produced at a lower volume than a voice of the participant of the telephone call; and in accordance with a determination that the current time of the electronic device corresponds to the time associated with the action prior to the current location of the electronic device corresponding to the location associated with the action, cause the action to be performed by the electronic device.

2. The non-transitory computer readable storage medium of claim 1, wherein the one or more programs further comprise instructions, which when executed by the one or more processors, cause the electronic device to:

determine the location associated with the action and the time associated with the action based on context data that was displayed by the electronic device while receiving the natural language input or was displayed by the electronic device within a threshold duration before receiving the natural language input.

3. The non-transitory computer readable storage medium of claim 1, wherein the one or more programs further comprise instructions, which when executed by the one or more processors, cause the electronic device to:

determine the location associated with the action and the time associated with the action based on context data processed by the electronic device within a threshold duration before receiving the natural language input.

4. The non-transitory computer readable storage medium of claim 1, wherein the one or more programs further comprise instructions, which when executed by the one or more processors, cause the electronic device to:

before receiving the natural language input and when the electronic device is at a first location, receive a second natural language input specifying one or more words that describe the location associated with the action; and in accordance with receiving the second natural language input, associate the one or more words with the first location.

5. The non-transitory computer readable storage medium of claim 4, wherein the one or more programs further comprise instructions, which when executed by the one or more processors, cause the electronic device to:

determine the location associated with the action based on detecting the one or more words in the natural language input, wherein determining that the current location of the electronic device corresponds to the location associated with the action includes determining that the current location corresponds to the first location.

6. The non-transitory computer readable storage medium of claim 1, wherein:

the location associated with the action corresponds to a car; and determining that the current location of the electronic device corresponds to the location associated with the action includes determining that the electronic device is communicatively paired to the car.

7. The non-transitory computer readable storage medium of claim 1, wherein:

the location associated with the action corresponds to a type of transportation; and determining that the current location of the electronic device corresponds to the location associated with the action includes determining that the current location corresponds to the type of transportation.

8. The non-transitory computer readable storage medium of claim 1, wherein causing the action to be performed by the electronic device includes sending an email message or a text message to a recipient.

9. The non-transitory computer readable storage medium of claim 1, wherein the one or more programs further comprise instructions, which when executed by the one or more processors, cause the electronic device to:

display, in a task list, the task item;

receive a user input corresponding to a selection of the task item; and in response to receiving the user input corresponding to the selection of the task item, cause the action to be performed by the electronic device.

10. An electronic device, comprising:

one or more processors; and memory storing one or more programs for execution by the one or more processors, the one or more programs including instructions for:

receiving a natural language input from a user of the electronic device, wherein the natural language input includes an action to be performed, a location associated with the action, and a time associated with the action, wherein the action is a programmed function of the electronic device, and wherein the natural language input specifies:

performing the action based on a current location of the electronic device corresponding to the location associated with the action prior to a current time of the electronic device corresponding to the time associated with the action; or performing the action based on the current time of the electronic device corresponding to the time associated with the action prior to the current location of the electronic device corresponding to the location associated with the action;

generating, based on the natural language input, a task item associated with the action;

storing the task item in association with the location associated with the action and the time associated with the action; and after storing the task item in association with the location associated with the action and the time associated with the action:

determining whether the current location of the electronic device corresponds to the location associated with the action;

determining whether the current time of the electronic device corresponds to the time associated with the action;

in accordance with a determination that the current location corresponds to the location associated with the action prior to the current time of the electronic device corresponding to the time associated with the action, causing the action to be performed by the electronic device, wherein causing the action to be performed by the electronic device includes:

in accordance with a determination that a telephone conversation between a user of the electronic device and a participant of a telephone call is occurring, producing an audio output related to the task item during the telephone conversation, wherein the audio output is produced at a lower volume than a voice of the participant of the telephone call; and in accordance with a determination that the current time of the electronic device corresponds to the time associated with the action prior to the current location of the electronic device corresponding to the location associated with the action, cause the action to be performed by the electronic device.

11. The electronic device of claim 10, wherein the one or more programs further include instructions for:

determining the location associated with the action and the time associated with the action based on context data that was displayed by the electronic device while receiving the natural language input or was displayed by the electronic device within a threshold duration before receiving the natural language input.

12. The electronic device of claim 10, wherein the one or more programs further include instructions for:

determining the location associated with the action and the time associated with the action based on context data processed by the electronic device within a threshold duration before receiving the natural language input.

13. The electronic device of claim 10, wherein the one or more programs further include instructions for:

before receiving the natural language input and when the electronic device is at a first location, receiving a second natural language input specifying one or more words that describe the location associated with the action; and in accordance with receiving the second natural language input, associating the one or more words with the first location.

14. The electronic device of claim 13, wherein the one or more programs further include instructions for:

determining the location associated with the action based on detecting the one or more words in the natural language input, wherein determining that the current location of the electronic device corresponds to the location associated with the action includes determining that the current location corresponds to the first location.

15. The electronic device of claim 10, wherein:

the location associated with the action corresponds to a car; and determining that the current location of the electronic device corresponds to the location associated with the action includes determining that the electronic device is communicatively paired to the car.

16. The electronic device of claim 10, wherein:

the location associated with the action corresponds to a type of transportation; and determining that the current location of the electronic device corresponds to the location associated with the action includes determining that the current location corresponds to the type of transportation.

17. The electronic device of claim 10, wherein causing the action to be performed by the electronic device includes sending an email message or a text message to a recipient.

18. The electronic device of claim 10, wherein the one or more programs further include instructions for:

displaying, in a task list, the task item;

receiving a user input corresponding to a selection of the task item; and in response to receiving the user input corresponding to the selection of the task item, causing the action to be performed by the electronic device.

19. A method, comprising:

at an electronic device having one or more processors and memory storing one or more programs for execution by the one or more processors:

receiving a natural language input from a user of the electronic device, wherein the natural language input includes an action to be performed, a location associated with the action, and a time associated with the action, wherein the action is a programmed function of the electronic device, and wherein the natural language input specifies:

performing the action based on a current location of the electronic device corresponding to the location associated with the action prior to a current time of the electronic device corresponding to the time associated with the action; or performing the action based on the current time of the electronic device corresponding to the time associated with the action prior to the current location of the electronic device corresponding to the location associated with the action;

generating, based on the natural language input, a task item associated with the action;

storing the task item in association with the location associated with the action and the time associated with the action; and after storing the task item in association with the location associated with the action and the time associated with the action:

determining whether the current location of the electronic device corresponds to the location associated with the action;

determining whether the current time of the electronic device corresponds to the time associated with the action;

in accordance with a determination that the current location corresponds to the location associated with the action prior to the current time of the electronic device corresponding to the time associated with the action, causing the action to be performed by the electronic device, wherein causing the action to be performed by the electronic device includes:

in accordance with a determination that a telephone conversation between a user of the electronic device and a participant of a telephone call is occurring, producing an audio output related to the task item during the telephone conversation, wherein the audio output is produced at a lower volume than a voice of the participant of the telephone call; and in accordance with a determination that the current time of the electronic device corresponds to the time associated with the action prior to the current location of the electronic device corresponding to the location associated with the action, causing the action to be performed by the electronic device.

20. The method of claim 19, further comprising:
determining the location associated with the action and the time associated with the action based on context data that was displayed by the electronic device while receiving the natural language input or was displayed by the electronic device within a threshold duration before receiving the natural language input.

21. The method of claim 19, further comprising:
determining the location associated with the action and the time associated with the action based on context data processed by the electronic device within a threshold duration before receiving the natural language input.

22. The method of claim 19, further comprising:
before receiving the natural language input and when the electronic device is at a first location, receiving a second natural language input specifying one or more words that describe the location associated with the action; and in accordance with receiving the second natural language input, associating the one or more words with the first location.

23. The method of claim 22, further comprising:
determining the location associated with the action based on detecting the one or more words in the natural language input, wherein determining that the current location of the electronic device corresponds to the location associated with the action includes determining that the current location corresponds to the first location.

24. The method of claim 19, wherein:
the location associated with the action corresponds to a car; and determining that the current location of the electronic device corresponds to the location associated with the action includes determining that the electronic device is communicatively paired to the car.

25. The method of claim 19, wherein:
the location associated with the action corresponds to a type of transportation; and determining that the current location of the electronic device corresponds to the location associated with the action includes determining that the current location corresponds to the type of transportation.

26. The method of claim 19, wherein causing the action to be performed by the electronic device includes sending an email message or a text message to a recipient.

27. The method of claim 19, further comprising:
displaying, in a task list, the task item;
receiving a user input corresponding to a selection of the task item; and
in response to receiving the user input corresponding to the selection of the task item, causing the action to be performed by the electronic device.

* * * * *